(12) United States Patent
Goldstein et al.

(10) Patent No.: US 12,540,163 B2
(45) Date of Patent: Feb. 3, 2026

(54) COMPOSITIONS AND METHODS FOR INHIBITING AN INFLAMMATORY RESPONSE AND TREATING INFLAMMATORY DISEASES

(71) Applicant: The Regents of the University of California, Oakland, CA (US)

(72) Inventors: Steven A. Goldstein, Irvine, CA (US); Ruiming Zhao, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 266 days.

(21) Appl. No.: 18/564,822

(22) PCT Filed: May 27, 2022

(86) PCT No.: PCT/US2022/031347
§ 371 (c)(1),
(2) Date: Nov. 28, 2023

(87) PCT Pub. No.: WO2022/251637
PCT Pub. Date: Dec. 1, 2022

(65) Prior Publication Data
US 2024/0254166 A1    Aug. 1, 2024

Related U.S. Application Data

(60) Provisional application No. 63/194,502, filed on May 28, 2021.

(51) Int. Cl.
*C07K 7/06* (2006.01)
*A61P 11/00* (2006.01)
*A61P 37/06* (2006.01)
*A61K 38/00* (2006.01)

(52) U.S. Cl.
CPC ............. *C07K 7/06* (2013.01); *A61P 11/00* (2018.01); *A61P 37/06* (2018.01); *A61K 38/00* (2013.01)

(58) Field of Classification Search
CPC ........ C07K 7/06; C07K 14/00; C07K 14/705; A61P 11/00; A61P 37/06; A61K 38/00
See application file for complete search history.

(56) References Cited

U.S. PATENT DOCUMENTS

| | | |
|---|---|---|
| 2012/0270236 A1 | 10/2012 | Ramsey et al. |
| 2015/0087552 A1 | 3/2015 | Jensen et al. |
| 2015/0203812 A1 | 7/2015 | Tombola |
| 2019/0330285 A1 | 10/2019 | Goldstein |

*Primary Examiner* — Jessica Worsham
(74) *Attorney, Agent, or Firm* — Gregory P. Eihnorn; Greer, Burns & Crain, Ltd.

(57) ABSTRACT

In alternative embodiments, provided are compositions, including products of manufacture and kits, and methods, for inhibiting the ability of neutrophils, or polymorphonuclear leukocytes (PMNs), to release reactive oxygen species (ROS), thus also inhibiting or ameliorating neutrophil (PMN) contribution to an inflammatory response, thus also treating, ameliorating or preventing neutrophil (PMN)-meditated inflammatory-related pathologies such as acute respiratory distress syndrome (ARDS), including ARDS caused by a viral infection such as COVID-19.

12 Claims, 56 Drawing Sheets
Specification includes a Sequence Listing.

FIG. 7
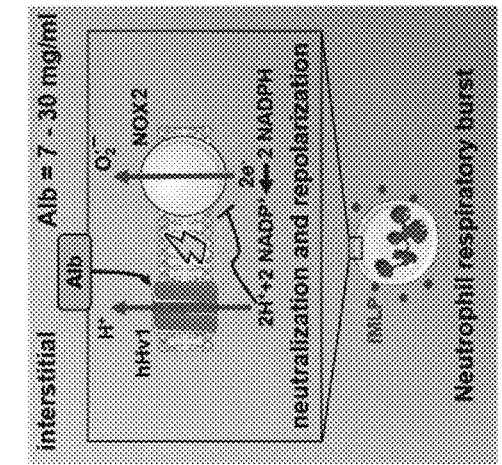
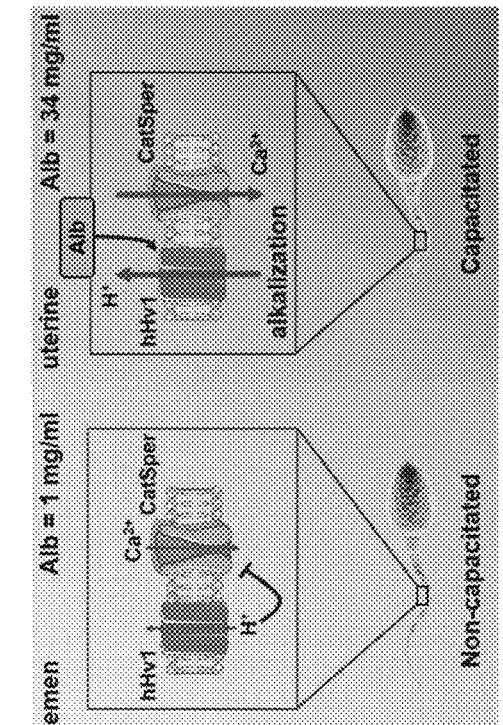
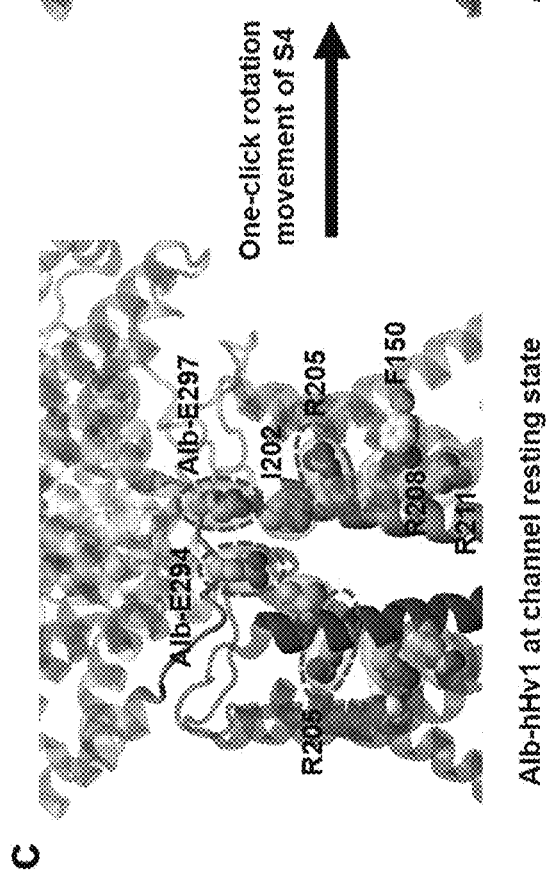

FIG. 29

Supplementary table 1. Parameters for Alb activation of hHv1 in HEK293T cells, human sperm and neutrophils

| Channel in HEK293 | Without Alb | | | With 500 μM Alb | | | | |
|---|---|---|---|---|---|---|---|---|
| | $V_{0.5}$, mV | τ activation, ms | τ deactivation, ms | $V_{0.5}$, mV | τ activation, ms | τ deactivation, ms | $V_{0.5}$ shift | $I_{Alb}/I_{Ctrl}$, 0 mV | $EC_{50}$ (μM) |
| | Condition: pH$_i$ = 6.5 and pH$_o$ = 7.5 | | | | | | | | |
| hHv1 | 15 ± 2 | 2620 ± 220 | 86.9 ± 8.4 | -30 ± 2 | 99.4 ± 9.2 | 418 ± 47 | 45 | 8 ± 1 | 74.9 ± 6.7 |
| hsexCiHv1 | 27 ± 4 | 4726 ± 936 | 39.1 ± 7.5 | -16 ± 4 | 171 ± 33 | 198 ± 37 | 43 | 9 ± 1 | 63.3 ± 12.5 |
| hHv1-G198L | 16 ± 3 | 2653 ± 128 | 63.9 ± 6.1 | -28 ± 3 | 72.1 ± 11.7 | 520 ± 84 | 46 | 8 ± 1 | 3.4 ± 0.5 |
| Hv1Sper | -16 ± 2 | 369 ± 57 | 170 ± 38 | -31 ± 4 | 87.3 ± 19.1 | 236 ± 31 | 15 | 1.6 ± 0.2 | NO |
| | | | | With T-Alb-YFP | | | | | |
| hHv1 | | | | 3 ± 1 | 872 ± 163 | 175 ± 37 | 12 | 3.1 ± 0.3 | |
| | Condition: pH$_i$ = 6.7 and pH$_o$ = 7.2 (Human tubular fluid medium) | | | | | | | | |
| Native Cells | | | | | | | | | |
| | | | | With 500 μM Alb | | | | | |
| hHv1 | 37 ± 3 | 11024 ± 952 | 79.8 ± 4.3 | -3 ± 1 | 349 ± 27 | 461 ± 25 | 40 | 10 ± 1 | NO |
| | Condition: pH$_i$ = 6.0 and pH$_o$ = 7.4 | | | | | | | | |
| Sperm H⁺ current | 15 ± 3 | 1846 ± 40 | 94 ± 10 | -38 ± 3 | 217 ± 21 | 486 ± 63 | 53 | 7.6 ± 1.3 | 159 ± 16 |
| | Condition: pH$_i$ = 6.0 and pH$_o$ = 7.5 | | | With 450 μM Alb | | | | | |
| Neutrophil H⁺ current | 42 ± 2 | 383 ± 65 | 111 ± 18 | 7 ± 1 | 63.9 ± 9.2 | 165 ± 25 | 35 | 2.5 ± 0.3 | 112 ± 9 |

SEQUENCE LISTING

```
<160> NUMBER OF SEQ ID NOS: 18

<210> SEQ ID NO 1
<211> LENGTH: 10
<212> TYPE: PRT
<213> ORGANISM: artificial sequence
<220> FEATURE:
<223> OTHER INFORMATION: synthetic peptide
<220> FEATURE:
<221> NAME/KEY: MISC-FEATURE
<222> LOCATION: (2)..(10)
<223> OTHER INFORMATION: X CAN BE ANY AMINO ACID

<400> SEQUENCE: 1

Gln Xaa His Gln Phe Glu Xaa Xaa Xaa Xaa
1               5                   10

<210> SEQ ID NO 2
<211> LENGTH: 10
<212> TYPE: PRT
<213> ORGANISM: artificial sequence
<220> FEATURE:
<223> OTHER INFORMATION: synthetic peptide
<220> FEATURE:
<221> NAME/KEY: MISC-FEATURE
<222> LOCATION: (8)..(10)
<223> OTHER INFORMATION: X CAN BE ANY AMINO ACID

<400> SEQUENCE: 2

Gln Ala His Gln Phe Glu Ala Xaa Xaa Xaa
1               5                   10
```

<210> SEQ ID NO 3
<211> LENGTH: 10
<212> TYPE: PRT
<213> ORGANISM: artificial sequence
<220> FEATURE:
<223> OTHER INFORMATION: synthetic peptide

<400> SEQUENCE: 3

Gln Ala His Gln Phe Glu Ala Leu Leu Leu
1               5                   10

<210> SEQ ID NO 4
<211> LENGTH: 41
<212> TYPE: PRT
<213> ORGANISM: artificial sequence
<220> FEATURE:
<223> OTHER INFORMATION: synthetic peptide

<400> SEQUENCE: 4

Ser Ser Thr Cys Ile Pro Ser Gly Gln Pro Cys Ala Asp Ser Asp
1               5                   10                  15

Cys Cys Glu Thr Phe His Cys Lys Trp Val Phe Phe Thr Ser Lys Phe
                20                  25                  30

Met Cys Arg Arg Val Trp Gly Lys Asp
        35                  40

<210> SEQ ID NO 5
<211> LENGTH: 39
<212> TYPE: PRT
<213> ORGANISM: artificial sequence
<220> FEATURE:
<223> OTHER INFORMATION: synthetic peptide

<400> SEQUENCE: 5

Gly Cys Lys Trp Tyr Leu Gly Asp Cys Ala Asp Ser Asp Cys Cys
1               5                   10                  15

Glu Thr Phe His Cys Lys Trp Val Phe Phe Thr Ser Lys Phe Met Cys
                20                  25                  30

Arg Arg Val Trp Gly Lys Asp
        35

<210> SEQ ID NO 6
<211> LENGTH: 71
<212> TYPE: PRT
<213> ORGANISM: artificial sequence
<220> FEATURE:
<223> OTHER INFORMATION: synthetic polypeptide

<400> SEQUENCE: 6

Asp Ala Leu Leu Val Leu Ala Glu Leu Ile Leu Asp Leu Lys Ile Ile
1               5                   10                  15

Gln Pro Asp Lys Asn Asn Tyr Ala Ala Met Val Phe His Tyr Met Ser
                20                  25                  30

Ile Thr Ile Leu Val Val Ser Phe Ile Leu Asp Ile Val Leu Leu Phe
            35                  40                  45

Gln Glu His Gln Phe Glu Ala Leu Gly Leu Leu Ile Leu Leu Arg Leu
        50                  55                  60

Trp Arg Val Ala Arg Ile Ile
65                  70

<210> SEQ ID NO 7
<211> LENGTH: 71

<212> TYPE: PRT
<213> ORGANISM: artificial sequence
<220> FEATURE:
<223> OTHER INFORMATION: synthetic polypeptide

<400> SEQUENCE: 7

Asp Ala Leu Leu Val Leu Ala Glu Leu Ile Leu Asp Leu Lys Ile Ile
1               5                   10                  15

Gln Pro Asp Lys Asn Asn Tyr Ala Ala Met Val Phe His Tyr Met Ser
            20                  25                  30

Ile Thr Ile Leu Val Val Ser Phe Ile Leu Asp Ile Val Leu Leu Phe
        35                  40                  45

Gln Glu His Gln Phe Glu Ala Leu Gly Leu Leu Ile Leu Leu Arg Leu
50                  55                  60

Trp Arg Val Ala Arg Ile Ile
65                  70

<210> SEQ ID NO 8
<211> LENGTH: 71
<212> TYPE: PRT
<213> ORGANISM: artificial sequence
<220> FEATURE:
<223> OTHER INFORMATION: synthetic polypeptide

<400> SEQUENCE: 8

Asp Ser Phe Leu Val Val Gly Glu Leu Ile Leu Asp Leu Lys Ile Ile
1               5                   10                  15

Gln Pro Asp Lys Asn Asn Tyr Ala Ala Met Val Phe His Gly Phe Ser
            20                  25                  30

Leu Ser Ile Leu Val Ile Ser Phe Ile Leu Asp Ile Val Leu Leu Phe
        35                  40                  45

Gln Glu His Gln Phe Glu Ala Leu Gly Leu Leu Ile Leu Leu Arg Leu
50                  55                  60

Trp Arg Val Phe Arg Ile Ile
65                  70

<210> SEQ ID NO 9
<211> LENGTH: 73
<212> TYPE: PRT
<213> ORGANISM: artificial sequence
<220> FEATURE:
<223> OTHER INFORMATION: synthetic polypeptide

<400> SEQUENCE: 9

Asp Ser Phe Leu Val Val Gly Glu Leu Ile Leu Asp Leu Lys Ile Ile
1               5                   10                  15

Gln Pro Asp Lys Asn Asn Tyr Ala Ala Met Val Phe His Gly Phe Ser
            20                  25                  30

Leu Ser Ile Leu Val Ile Ser Phe Gly Val Asp Ile Ala Leu Ile Phe
        35                  40                  45

Val Gly Glu Ser Glu Ala Leu Ala Ala Ile Gly Leu Leu Val Ile Leu
            50                  55                  60

Arg Leu Trp Arg Val Phe Arg Ile Ile
65                  70

<210> SEQ ID NO 10
<211> LENGTH: 71
<212> TYPE: PRT
<213> ORGANISM: artificial sequence
<220> FEATURE:
<223> OTHER INFORMATION: synthetic polypeptide

<400> SEQUENCE: 10

Asp Ser Phe Leu Val Val Gly Glu Leu Leu Ile Asp Leu Lys Val Ile
1               5                   10                  15

Ile Val Pro His Gly Asn Pro Ala Pro Glu Ile Leu His Gly Phe Ser
                20                  25                  30

Leu Ser Ile Leu Val Ile Ser Phe Ile Leu Asp Ile Val Leu Leu Phe
            35                  40                  45

Gln Glu His Gln Phe Glu Ala Leu Gly Leu Leu Ile Leu Leu Arg Leu
    50                  55                  60

Trp Arg Val Phe Arg Ile Ile
65                  70

<210> SEQ ID NO 11
<211> LENGTH: 76
<212> TYPE: PRT
<213> ORGANISM: artificial sequence
<220> FEATURE:
<223> OTHER INFORMATION: syntthetic polypeptide

<400> SEQUENCE: 11

Asp Ala Leu Leu Val Leu Ala Glu Leu Ile Leu Asp Leu Lys Ile Ile
1               5                   10                  15

Gln Pro Asp Lys Asn Asn Tyr Ala Ala Met Val Phe His Tyr Met Ser
                20                  25                  30

Ile Thr Ile Leu Val Val Ser Phe Gly Val Asp Ile Ala Leu Ile Phe
            35                  40                  45

Val Gly Glu Ser Glu Ala Leu Ala Ala Ile Gly Leu Leu Val Ile Leu
    50                  55                  60

Arg Leu Trp Arg Val Ala Arg Ile Ile Phe Ile Gly
65                  70                  75

<210> SEQ ID NO 12
<211> LENGTH: 40
<212> TYPE: PRT
<213> ORGANISM: artificial sequence
<220> FEATURE:
<223> OTHER INFORMATION: synthetic peptide

<400> SEQUENCE: 12

Leu Pro Tyr Tyr Val Thr Ile Phe Leu Thr Glu Ser Asn Lys Ser Val
1               5                   10                  15

Leu Gln Phe Gln Asn Val Arg Arg Val Val Gln Ile Phe Arg Ile Met
                20                  25                  30

Arg Ile Arg Ile Leu Lys Leu Ala
            35                  40

<210> SEQ ID NO 13
<211> LENGTH: 34
<212> TYPE: PRT
<213> ORGANISM: artificial sequence
<220> FEATURE:
<223> OTHER INFORMATION: synthetic peptide

<400> SEQUENCE: 13

Leu Pro Tyr Tyr Ile Leu Asp Ile Val Leu Leu Phe Gln Glu His Gln
1               5                   10                  15

Phe Glu Ala Leu Gly Leu Leu Ile Leu Leu Arg Leu Trp Arg Ile Leu
                20                  25                  30

Lys Leu

```
<210> SEQ ID NO 14
<211> LENGTH: 10
<212> TYPE: PRT
<213> ORGANISM: artificial sequence
<220> FEATURE:
<223> OTHER INFORMATION: synthetic peptide

<400> SEQUENCE: 14

Leu Pro Ala Thr Gly Gly Gly Gly Gly Gly
1               5                   10

<210> SEQ ID NO 15
<211> LENGTH: 5
<212> TYPE: PRT
<213> ORGANISM: artificial sequence
<220> FEATURE:
<223> OTHER INFORMATION: synthetic peptide
<220> FEATURE:
<221> NAME/KEY: misc_feature
<222> LOCATION: (3)..(3)
<223> OTHER INFORMATION: Xaa can be any naturally occurring amino acid

<400> SEQUENCE: 15

Leu Pro Xaa Thr Gly
1               5

<210> SEQ ID NO 16
<211> LENGTH: 6
<212> TYPE: PRT
<213> ORGANISM: artificial sequence
<220> FEATURE:
<223> OTHER INFORMATION: synthetic peptide

<400> SEQUENCE: 16

Leu Pro Ala Thr Gly Gly
1               5

<210> SEQ ID NO 17
<211> LENGTH: 6
<212> TYPE: PRT
<213> ORGANISM: artificial sequence
<220> FEATURE:
<223> OTHER INFORMATION: synthetic peptide

<400> SEQUENCE: 17

Gly Gly Gly Gly Gly Gly
1               5

<210> SEQ ID NO 18
<211> LENGTH: 10
<212> TYPE: PRT
<213> ORGANISM: artificial sequence
<220> FEATURE:
<223> OTHER INFORMATION: synthetic peptide

<400> SEQUENCE: 18

Leu Pro Ala Thr Gly Gly Gly Gly Gly Gly
1               5                   10
```

COMPOSITIONS AND METHODS FOR INHIBITING AN INFLAMMATORY RESPONSE AND TREATING INFLAMMATORY DISEASES

RELATED APPLICATIONS

This application is a national phase application claiming benefit of priority under 35 U.S.C. § 371 to Patent Convention Treaty (PCT) International Application serial number PCT/US2022/031347, filed May 27, 2022, which claims the benefit of priority under 35 U.S.C. § 119 (e) of U.S. Provisional Application No. 63/194,502, filed May 28, 2021. The aforementioned applications are expressly incorporated herein by reference in their entirety and for all purposes. All publications, patents, patent applications cited herein are hereby expressly incorporated by reference for all purposes.

STATEMENT AS TO FEDERALLY SPONSORED RESEARCH

This invention was made with government support under GM111716 and GM057846 awarded by the National Institutes of Health (NIH). The government has certain rights in the invention.

TECHNICAL FIELD

This invention generally relates to biology and inflammatory diseases. In alternative embodiments, provided are compositions, including products of manufacture and kits, and methods, for inhibiting the ability of neutrophils, or polymorphonuclear leukocytes (PMNs), to release reactive oxygen species (ROS), thus also inhibiting or ameliorating neutrophil (PMN) contribution to an inflammatory response, thus also treating, ameliorating or preventing neutrophil (PMN)-meditated inflammatory-related pathologies such as acute respiratory distress syndrome (ARDS), including ARDS caused by a viral infection such as an influenza or a coronavirus infection, for example, caused by infection with COVID-19.

BACKGROUND

Neutrophils, or polymorphonuclear leukocytes (PMNs), release reactive oxygen species (ROS) to combat infection, but this inflammatory response can also produce pathology such as acute respiratory distress syndrome (ARDS), a disorder that leads to accumulation of albumin-rich fluid in the lung air spaces and is fatal in 40% of patients. Pharmacologic therapies focused on downstream cytokine actions have failed to improve morbidity or mortality.

Human voltage-gated proton channels (hHv1) are expressed in many human tissues including innate and adaptive immune cells, cancer cells and sperm. hHv1 channels are comprised of two identical subunits, each with 273 residues and four transmembrane spans (S1-S4) that resemble the voltage sensor domains (VSDs) in conventional voltage-gated ion channels. In hHv1, there are two $H^+$-selective conduction pathways, one in each VSD. The activation of hHv1 depends on both the transmembrane potential and the pH gradient across the membrane. Upon membrane depolarization, hHv1 S4 segments move outward leading to conformational changes that open the $H^+$ conduction pathways.

hHv1 has been implicated in many aspects of health and disease. In the absence of known high-affinity and specific inhibitors of the channel, we designed a selective inhibitor of hHv1, the C6 peptide, and used it to demonstrate that $H^+$ efflux via the channel is required in human sperm to induce intracellular alkalization and $Ca^{2+}$ influx to initiate capacitation. Furthermore, we showed that it also operates in human neutrophils to maintain cytoplasmic pH during the respiratory burst allowing sustained reactive oxygen species (ROS) production. We identified C6 using a high-throughput, phage-display strategy whereby approximately 1 million novel peptides were fabricated on an inhibitor cysteine knot (ICK) toxin scaffold and sorted on purified hHv1 protein. Phagemids expressing C6 were selected by their capacity to bind to hHv1 protein. C6 has 41 residues including six cysteines that form three intramolecular disulfide bonds.

Before the development of C6, known hHv1 inhibitors were pharmacologically promiscuous or of low affinity. Synthesized C6 inhibits hHv1 by binding with positive cooperatively to the external channel residues linking the S3 and S4 transmembrane spans (S3-S4 loop), one peptide on each loop, and holds the voltage sensor in a conformation that favors channel closure. As a result, the channel passes fewer $H^+$ ions because more positive voltages are required to open the pores.

SUMMARY

In alternative embodiments, provided are synthetic peptides (also called Hv1 modulating agents) for inhibiting activity of a voltage-gated proton channel polypeptide (Hv1), wherein the synthetic peptide has or consists of:
  (a) an amino acid sequence QXHQFEXXXX (SEQ ID NO:1);
  (b) an amino acid sequence QAHQFEAXXX (SEQ ID NO:2);
  (c) an amino acid sequence QAHQFEALLL (SEQ ID NO:3), or
  (d) a homodimer or a heterodimer comprising a peptide of (a), (b), or (c), wherein optionally the heterodimer comprises (a) and (b), (b) and (c), or (a) and (c), or the homodimer comprise two of (a), two of (b) or two of (c), or a trimer comprising three of (a), (b) or (c), or any combination thereof,
wherein X is any hydrophobic amino acid, and optionally the hydrophobic amino acid is glycine (G), alanine (A), valine (V), leucine (L), isoleucine (I) or phenylalanine (F).

In alternative embodiments, provided are recombinant nucleic acids encoding a synthetic peptide as provided herein.

In alternative embodiments, provided are expression vehicles comprising or having contained therein a recombinant nucleic acid as provided herein, wherein optionally the expression vehicle comprises or is an expression cassette, a plasmid, an expression vector or a recombinant virus.

In alternative embodiments, provided are cells comprising or having contained therein a synthetic peptide as provided herein, a recombinant nucleic acid as provided herein, or an expression vehicle as provided herein.

In alternative embodiments, provided are pharmaceutical compositions comprising: a synthetic peptide as provided herein, a recombinant nucleic acid as provided herein, or an expression vehicle as provided herein. In alternative embodiments, the pharmaceutical compositions are formulated as a liposome, a dendrimer or a nanoparticle; or formulated as an aerosol, a lyophilate or a powder.

In alternative embodiments, provided are methods for:
inhibiting intracellular alkalization, initiating capacitation, acrosomal reaction, and oocyte fertilization capabilities of human sperm,
inhibiting the ability of neutrophils, or polymorphonuclear leukocytes (PMNs), to release reactive oxygen species (ROS),
inhibiting or ameliorating neutrophil (PMN) contribution to an inflammatory response, or
treating, ameliorating or preventing a neutrophil (PMN)-meditated inflammatory-related pathology,
comprising:
administering to an individual in need thereof:
(a) a synthetic peptide as provided herein, a recombinant nucleic acid as provided herein, an expression vehicle as provided herein, a cell as provided herein or a pharmaceutical composition as provided herein, or
(b) a synthetic peptide for inhibiting activity of a voltage-gated proton channel polypeptide (Hv1), wherein the synthetic peptide has or consists of a structure:
  (i) of about 10 to about 100 amino acids in length;
  (ii) having an amino acid sequence that comprises one or more toxin sequence elements, each of which has a length within a range of about 5 to about 18 amino acids in length;
  (iii) a peptide component has 0, 1, 2, 3, 4, 5, or 6 conserved cysteine residues of an ICK structural motif,
  (iv) has 0, 1, 2, or 3 disulfide bridges; and
  (v) has 0, 1, 2, or 3 beta strands,
wherein optionally the synthetic peptide has a sequence comprising or consisting of:

```
                                       (SEQ ID NO: 4)
SSTCIPSGQPCADSDDCCETFHCKWVFFTSKFMCRRVWGKD
(also called "C6"),
or
                                       (SEQ ID NO: 5)
GCKWYLGDCADSDDCCETFHCKWVFFTSKFMCRRVWGKD
(also called "C5"),
``` a homodimer comprising two peptides (SEQ ID NO:4) (also called "C6") or two peptides (SEQ ID NO:5) (also called "C5"), or a heteroduplex of (SEQ ID NO:4) and (SEQ ID NO:5),
or a sequence as described in U.S. patent application publication no: US 2019 0330285 A1.
In alternative embodiments of the methods:
the neutrophil (PMN)-meditated inflammatory-related pathology is acute respiratory distress syndrome (ARDS),
and optionally ARDS caused by a viral, bacterial or fungal infection; a sepsis; pancreatitis; trauma or injury; pneumonia; or, aspiration into the lungs,
and optionally the viral infection is an influenza or a coronavirus infection, and optionally the coronavirus infection is a COVID-19 infection; and/or
the synthetic peptide is formulated and/or administered as a liposome, a dendrimer or a nanoparticle; or formulated or administered as an aerosol, a lyophilate or a powder.
In alternative embodiments, provided are kits comprising a synthetic peptide as provided herein, a recombinant nucleic acid as provided herein, an expression vehicle as provided herein, a pharmaceutical composition as provided herein, or a cell as provided herein, or a synthetic peptide as used in a method of any of the preceding claims, and optionally including instructions for practicing a method of any of the preceding claims.
In alternative embodiments, provided are uses of:
(a) a synthetic peptide as provided herein, a recombinant nucleic acid as provided herein, an expression vehicle as provided herein, a pharmaceutical composition as provided herein, or a cell as provided herein, or
(b) a synthetic peptide for inhibiting activity of a voltage-gated proton channel polypeptide (Hv1), wherein the synthetic peptide has or consists of a structure:
  (i) of about 10 to about 100 amino acids in length;
  (ii) having an amino acid sequence that comprises one or more toxin sequence elements, each of which has a length within a range of about 5 to about 18 amino acids in length;
  (iii) a peptide component has 0, 1, 2, 3, 4, 5, or 6 conserved cysteine residues of an ICK structural motif,
  (iv) has 0, 1, 2, or 3 disulfide bridges; and
  (v) has 0, 1, 2, or 3 beta strands,
wherein the synthetic peptide has a sequence comprising or consisting of:

```
                                       (SEQ ID NO: 4)
GCKWYLGDCADSDDCCETFHCKWVFFTSKFMCRRVWGKD,
or
                                       (SEQ ID NO: 5)
STCTPTDQPCADSDDCCETFHCKWVFFTSKFMCRRVWGKD,
``` or a sequence as described in U.S. patent application publication no: US 2019 0330285 A1,
in the preparation of a pharmaceutical composition for:
inhibiting intracellular alkalization, initiating capacitation, acrosomal reaction, and oocyte fertilization capabilities of human sperm,
inhibiting the ability of neutrophils, or polymorphonuclear leukocytes (PMNs), to release reactive oxygen species (ROS),
inhibiting or ameliorating neutrophil (PMN) contribution to an inflammatory response, or
treating, ameliorating or preventing a neutrophil (PMN)-meditated inflammatory-related pathology.
In alternative embodiments, provided are synthetic peptides for inhibiting activity of a voltage-gated proton channel polypeptide (Hv1), wherein the synthetic peptide has or consists of:
(a) an amino acid sequence QXHQFEXXXX (SEQ ID NO: 1);
(b) an amino acid sequence QAHQFEAXXX (SEQ ID NO:2);
(c) an amino acid sequence QAHQFEALLL (SEQ ID NO:3), or
(d) a homodimer comprising a peptide of (a), (b), or (c),
wherein X is any hydrophobic amino acid, and optionally the hydrophobic amino acid is glycine (G), alanine (A), valine (V), leucine (L), isoleucine (I) or phenylalanine (F).
In alternative embodiments of methods as provided herein:
the neutrophil (PMN)-meditated inflammatory-related pathology is acute respiratory distress syndrome (ARDS), and optionally ARDS caused by a viral, bacterial or fungal infection; a sepsis; pancreatitis; trauma or injury; pneumonia; or, aspiration into the lungs, and optionally the viral infection is an influenza or a coronavirus infection, and optionally the coronavirus infection is a COVID-19 infection; and/or
the synthetic peptide is formulated and/or administered as a liposome, a dendrimer or a nanoparticle; or formulated or administered as an aerosol, a lyophilate or a powder.

In alternative embodiments, provided are synthetic peptides for use in:
 inhibiting intracellular alkalization, initiating capacitation, acrosomal reaction, and oocyte fertilization capabilities of human sperm,
 inhibiting the ability of neutrophils, or polymorphonuclear leukocytes (PMNs), to release reactive oxygen species (ROS),
 inhibiting or ameliorating neutrophil (PMN) contribution to an inflammatory response, or
 treating, ameliorating or preventing a neutrophil (PMN)-mediated inflammatory-related pathology, or
 for use in the preparation of a pharmaceutical composition,
wherein the synthetic peptide comprises:
 (a) a synthetic peptide as provided herein, a recombinant nucleic acid as provided herein, an expression vehicle as provided herein, a pharmaceutical composition as provided herein, or a cell as provided herein, or
 (b) a synthetic peptide for inhibiting activity of a voltage-gated proton channel polypeptide (Hv1), wherein the synthetic peptide has or consists of a structure:
  (i) of about 10 to about 100 amino acids in length;
  (ii) having an amino acid sequence that comprises one or more toxin sequence elements, each of which has a length within a range of about 5 to about 18 amino acids in length;
  (iii) a peptide component has 0, 1, 2, 3, 4, 5, or 6 conserved cysteine residues of an ICK structural motif;
  (iv) has 0, 1, 2, or 3 disulfide bridges; and
  (v) has 0, 1, 2, or 3 beta strands,
 wherein the synthetic peptide has a sequence comprising or consisting of:

```
                                    (SEQ ID NO: 4)
GCKWYLGDCADSDDCCETFHCKWVFFTSKFMCRRVWGKD, or
                                    (SEQ ID NO: 5)
STCTPTDQPCADSDDCCETFHCKWVFFTSKFMCRRVWGKD,
``` or a sequence as described in U.S. patent application publication no: US 2019 0330285 A1.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference in their entireties for all purposes.

DESCRIPTION OF DRAWINGS

The drawings set forth herein are illustrative of exemplary embodiments provided herein and are not meant to limit the scope of the invention as encompassed by the claims.

FIG. 1A left image illustrate representative proton current traces in non-capacitated human sperm in the absence (top image) and presence (bottom image) of 80 µM Alb in response to test pulses from −60 and +60 mV in 20 mV increments from a holding voltage of −60 mV every 10 seconds (s) with an approximately 30-fold proton gradient ($pH_i$=6.0 and $pH_o$=7.4) using divalent cation-free bath solution;

FIG. 1A right image graphically illustrates hHv1 currents measured at the end of a test pulse to +60 mV after exposing sperm to 80 µM Fab (black), 80 µM Alb (grey), or 80 µM Alb+1 µM C6 (hatched);

FIG. 1B graphically illustrates dose-response relationships for Alb potentiation of sperm proton current at depolarization voltage of +60 mV;

FIG. 1C graphically illustrates conductance-voltage relationships (G-V) for sperm proton currents in the absence (■) or presence of 800 µM Alb (●);

FIG. 1D left graphically illustrates data where non-capacitated sperm were loaded with the fluorescent ratiometric pH probe BCECF (2, 7'-bis-(Carboxyethyl)-5- (and -6)-carboxyfluorescein) and changes of fluorescence intensity were measured, and 75 µM Alb (grey) increased $pH_i$ and the increase was inhibited by 20 µM C6 (dark grey), and 75 µM Fab alone had no effect (black);

FIG. 1D right graphically illustrates data where BCECF fluorescent signals were converted to ΔpH according to the lineal relation between fluorescence ratio values ($R_{F508/F450}$) and $pH_i$ values as described in Methods; alb-induced cytoplasmic alkalization in a concentration dependent manner (grey); the Alb-triggered $pH_i$ increase was inhibited by C6 (dark grey) and Fab did not increase the $pH_i$ (black);

FIG. 1E graphically illustrates data where non-capacitated sperm were loaded with the fluorescent intracellular calcium indicator Fluo-3 and changes in fluorescence were measured, and Alb potentiates the increase of $[Ca^{2+}]_i$ induced by progesterone (15 µM) in a concentration dependent manner (grey bars); and the $[Ca^{2+}]_i$ increase potentiated by 75 µM Alb was fully suppressed by 20 µM C6 peptide (hatched).

FIG. 1F graphically illustrates data where acrosomal exocytosis induced by 15 µM progesterone was evaluated in diluted human sperm suspensions under different conditions as described in Methods), and upon progesterone stimulation, control capacitated sperm underwent the acrosome reaction (Cap, black bar), whereas non-capacitated sperm did not (Non-Cap, black bar), and incubation of C6 peptide (20 µM) with non-capacitated sperm had no effect (C6+Non-Cap, black bar), as discussed in further detail in Example 1, below.

FIG. 2A graphically illustrates representative proton currents via hHv1 in human neutrophils studied in the absence (left image) and presence (middle image) of 450 µM Alb in response to test pulses from −60 and +60 mV in 20 mV increments, from a holding voltage of −60 mV every 15 s with a approximately 30-fold proton gradient ($pH_i$=6.0 and $pH_o$=7.5) in divalent cation-free bath solution;

FIG. 2A right image graphically illustrates hHv1 currents measured at the peak of a test pulse to +60 mV after exposing neutrophils to 450 μM Fab (black), 450 μM Alb (grey), or 450 μM Alb+20 μM C6 (hatched);

FIG. 2B left image graphically illustrates the effect of N-formylmethionyl-leucyl-phenylalanine (fMLF) alone or in combination with Alb on ROS production by human neutrophils, ROS production from unstimulated neutrophils is negligible (white). Alb (dark grey) enhanced and sustained the fMLF-stimulated ROS production compared to neutrophils stimulated with fMLF alone (black), and incubation with 20 μM C6 (light grey) inhibited ROS production potentiated by 450 μM Alb;

FIG. 2B right image graphically illustrates ROS produced 60 min after fMLF stimulation, in a concentration dependent manner, incubation with Alb increased the fMLF-stimulated ROS production by human neutrophils (grey bars); addition of C6 (20 μM, right or red bar) inhibited the ROS production potentiated by 450 μM Alb;

FIG. 2C graphically illustrates human neutrophils ($2\times10^5$ cells) were incubated without (grey) or with 450 μM Alb (black) and then stimulated with increasing concentrations of fMLF; and the increase was inhibited by 20 μM C6 (hatched).

FIG. 2D graphically illustrates human neutrophils ($6\times10^5$ cells) were incubated with Alb for 30 min at 37° C. and then stimulated with 1 μM fMLF, the values are normalized to elastase release stimulated with fMLF alone (control, black), and 450 μM Alb increased the elastase release by neutrophils (grey), and the increase was inhibited by 20 μM C6 (right, or red), whereas 450 μM Fab had no effect on fMLF-stimulated elastase release (hatched), as discussed in further detail in Example 1, below.

FIG. 3A graphically illustrates representative proton current traces for hHv1 channels before (left image), and in the presence of 75 μM Alb (right image), with steps of 20 mV increments from −60 mV to +40 mV, FIG. 3B graphically illustrates conductance-voltage (G-V) for hHv1 in the absence (■) or presence of 75 μM Alb (●);

FIG. 3C graphically illustrates time course for activation and deactivation of hHv1 on acute application (bar) and washout of 75 μM Alb;

FIG. 3D graphically illustrates dose-response relationships for Alb activation of hHv1 at depolarization voltage of 0 mV;

FIG. 3E illustrates a cartoon schematic showing two C6 peptides binding to an intact dimeric hHv1 channel; and FIG. 3F graphically illustrates 20 μM C6 peptide (grey trace) was applied to cells after control pulses (black trace) without Alb (left) or after pre-activation with 75 μM Alb (right);

Figure 1:
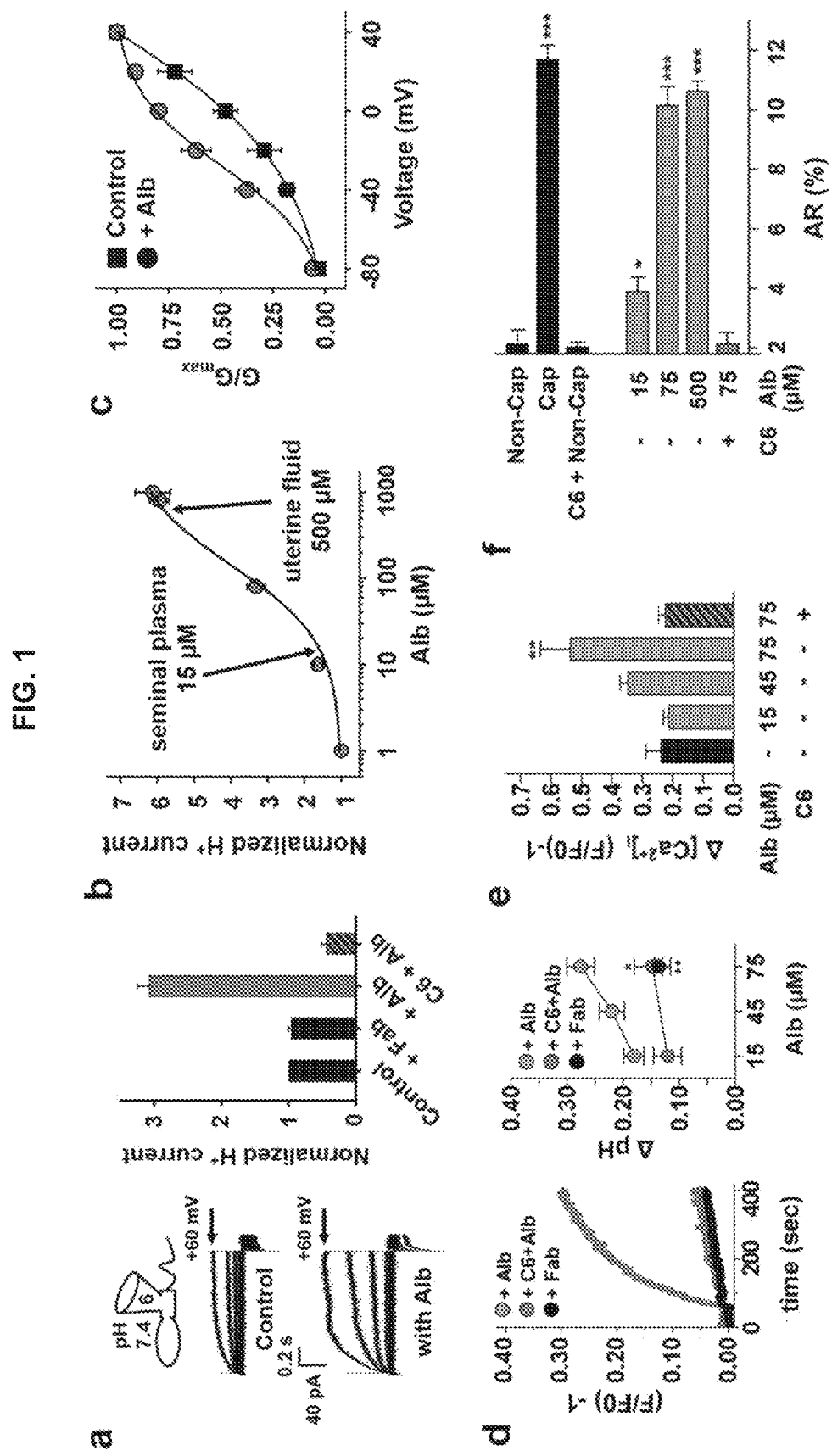
FIG. 1A-F illustrate data showing how albumin (Alb) activates human voltage-gated proton channel polypeptide (Hv1)(or hHv1) in human sperm to initiate capacitation and allow the acrosome reaction.

as discussed in further detail in Example 1, below.

FIG. 4A-G illustrate data showing that Alb binds to S3-S4 loop of hHv1 channels:

FIG. 4A top image illustrates sequence alignments of the S1-S2 and S3-S4 motifs of hHv1 (black), CiHv1 (grey) and loop-transplant chimeras:

```
SEQ ID NO: 6 is hHv1:
DALLVLAELILDLKIIQPDKNNYAAMVFHYMSITILVVSF

ILDIVLLFQEHQFEALGLLILLRLWRVARII
```

-continued
```
SEQ ID NO: 7 is CiHv1:
DSFLVVGELLIDLKVIIVPHGNPAPEILHGFSLSILVISF

GVDIALIFVGESEALAAIGLLVILRLWRVFRII

SEQ ID NO: 8 is [hS1-S2, S3-S4CiHv1]:
DSFLVVGELILDLKIIQPDKNNYAAMVFHGFSLSILVISF

ILDIVLLFQEHQFEALGLLILLRLWRVFRII

SEQ ID NO: 9 is [hS1-S2CiHv1]:
DSFLVVGELILDLKIIQPDKNNYAAMVFHGFSLSILVISF

GVDIALIFVGESEALAAIGLLVILRLWRVFRII

SEQ ID NO: 10 is [hS3-S4CiHv1]:
DSFLVVGELLIDLKVIIVPHGNPAPEILHGFSLSILVISF

ILDIVLLFQEHQFEALGLLILLRLWRVFRII

SEQ ID NO: 11 is [CiS3-S4hHv1]:
DALLVLAELILDLKIIQPDKNNYAAMVFHYMSITILVVSF

GVDIALIFVGESEALAAIGLLVILRLWRVARIIFIG
```

FIG. 4A bottom image illustrates representative proton current traces at 0 mV for channels in the absence (black trace) or presence of 75 μM Alb (grey trace);

FIG. 4B graphically illustrates activation by Alb (75 μM) of WT and chimeric channels, current at the end of a test pulse to 0 mV is plotted, cartoons represent the topology of a single subunit with hHv1 (SEQ ID NO:6) segments in black and CiHv1 segments in lighter shade, or grey);

FIG. 4C graphically illustrates a mutagenesis scan of the S3-S4 loop of hHv1 (substitution with Cys except for V187A, L189A and L203A) showing changes in Alb activation, where the numbering corresponds to the amino acid sequence of hHv1;

FIG. 4D left images graphically illustrate representative proton current traces for hHv1-G199L channels in the absence (top image) and presence of 1 μM Alb (bottom image) with steps of 20 mV from −60 mV to +40 mV;

FIG. 4D right image graphically illustrates Alb dose-response relationship for hHv1-G199L;

FIG. 4E illustrates a cartoon of one TAMRA-Alb molecule binding to the two subunits in a hHv1-G199L-teal fluorescent protein (TFP) channel;

FIG. 4F left image illustrates incubation of carboxy-tetramethyl-rhodamine-Alb (TAMRA-Alb) with heterologously expressed hHv1-G199L-TFP results in single colocalized particles (grey) with both TAMRA and TFP fluorescence at the surface of cells (circles);

FIG. 4F middle images illustrate a montage of photobleaching time course of a single fluorescent particle (indicated by arrow in left panel) during continuous excitation to bleach the fluorophores (every fifth frame shown);

FIG. 4F right images graphically illustrate time courses for simultaneous photobleaching of both fluorophores in the particle, showing (upper image) one stepwise change in fluorescence intensity for TAMRA-Alb and (lower image) two for hHv1-G199L-TFP (arrows); and FIG. 4G graphically illustrates a histogram of photobleaching steps for hHv1-G199L-TFP (hatched) and TAMRA-Alb (grey bars) on simultaneous photobleaching. 89% of studied particles with hHv1-TFP were bleached in 2 steps, the data analyzed by the approach of Hines[66] estimate hHv1-G199L channels in surface particles formed with two subunits, as discussed in further detail in Example 1, below.

FIG. 5A-J illustrate data showing that DII of Alb is required for binding to hHv1 channels:

FIG. 5A illustrates a schematic representation of T-Alb-VFP showing binding of Alb to the hHv1-TFP channel, T-Alb-VFP is a fusion protein of Alb with an N-terminal signal peptide (naturally cleaved after expression), Alb protein, a hydrophilic flexible linker, the transmembrane domain of the platelet-derived growth factor receptor (TFP), and the monomeric yellow fluorescent protein, mVenus at the intracellular C-terminus;

FIG. 5B graphically illustrates representative current traces (studied as in FIG. 2A with steps from −60 to +40 mV) for hHv1-TFP channels without (Control) or with co-expression of T-Alb-VFP, T-NO-VFP (no Alb inserted) and T-C6-VFP;

FIG. 5C graphically illustrates whole-cell peak current density of hHv1-TFP channels measured at 0 mV without (Control) or with co-expression of T-NO-VFP, T-Alb-VFP and T-C6-VFP are plotted from the experiments shown in FIG. 5B;

FIG. 5D graphically illustrates G-V relationship for hHv1-TFP without (■) or with co-expression of T-Alb-VFP (●);

FIG. 5E illustrates images of hHv1-TFP (cyan) and T-Alb-VFP (yellow) are shown to reach the cell surface;

FIG. 5F graphically illustrates data from exemplar photobleaching showing the decay of fluorescence intensity for regions of single cells expressing hHv1-TFP (■) or hHv1-TFP with T-Alb-VFP (●);

FIG. 5G graphically illustrates FRET showed that hHv1-TFP (black bars) assembled with T-Alb-VFP and T-C6-VFP but not with T-NO-VFP, and in contrast, CiHv1-TFP (white bars), a proton channel that is not activated by Alb or inhibited by C6[5], did not show FRET with T-Alb-VFP and T-C6-VFP;

FIG. 5H graphically illustrates data showing that tethered Alb domain variants (T-DI-VFP, T-DII-VFP, T-DIII-VFP, T-DI-DII-VFP, T-DII-DIII-VFP and T-DI-DIII-VFP) were produced as described in Methods, and co-expressed with hHv1-TFP for FRET studies, the $\tau$ of photobleaching for each pair was normalized to the $\tau$ of photobleaching of hHv1-TFP alone (Control);

FIG. 5I graphically illustrates T-Alb-VFP with mutations were designed based on two predicted Alb sites as hot spots for interaction with S3-S4 loop peptide of hHv1 from in silico docking analysis, produced as described in Methods, and co-expressed with hHv1-TFP for FRET studies; and FIG. 5J graphically illustrates normalized $\tau$ of photobleaching with T-Alb-VFP, where each pair was normalized to the $\tau$ of photobleaching of hHv1-TFP alone (Control), as discussed in further detail in Example 1, below.

FIG. 6A-B illustrate Alb-hHv1 structural models from molecular dynamics simulations: the structural model of Alb-hHv1 complex was generated using the VMD software program using the crystal structure of Alb (PDB 1BM0) and our reported (see Li, Q. et al. PNAS USA Vol 112, E5926-5935 (2015)) modeling structure of dimeric hHv1 at rest, and the final complex model was equilibrated and refined by MD simulations in a hydrated lipid bilayer, using residue-residue interactions suggested by in silico docking, electrophysiological scanning (FIG. 4C) and FRET studies (FIG. 5H-I);

FIG. 6A illustrates an Alb-hHv1 complex in two orientations showing the three Alb domains DI (grey), DII (orange) and DIII (wheat) and the two subunits (cyan and blue) of a dimeric hHv1 channel, and the horizontal gray lines indicate the position of the membrane boundary; and FIG. 6B illustrates a close-up view of the interaction interface between Alb and two individual hHv1 subunits in two binding sites in the structural model, the left image showing interaction Site 1, H193 of hHv1 subunit A (cyan) may form direct interaction with Alb residue H288 and the adjacent E188 and E192; and, the right image showing interaction Site 2, H193 of hHv1 subunit B (blue) may form direct interaction with Alb residue H338 and the adjacent Y334, R337 and F374, as discussed in further detail in Example 1, below.

FIG. 7A-C illustrate schematics showing the physiology of Alb activation of hHv1 in human sperm and neutrophils and proposed molecular mechanism:

FIG. 7A illustrates a schematic showing the higher level of Alb in the female reproductive tract activates hHv1 in sperm leading to $H^+$ efflux and cytosolic alkalization, initiating capacitation by potentiating CatSper;

FIG. 7B illustrates a schematic showing that activation of hHv1 in neutrophils by Alb potentiates $H^+$ efflux, maintaining physiological $pH_i$ and compensating for the depolarization caused by NOX2, enhancing enzyme activity and allowing sustained ROS production; and FIG. 7C illustrates a schematic showing Alb activation of hHv1 is proposed to proceed by an electrostatic gating modification mechanism, as discussed in further detail in Example 1, below.

FIG. 8A-G illustrates data showing that Alb induces intracellular alkalization and enhances progesterone-induced $Ca^{2+}$ influx:

FIG. 8A graphically illustrates data where $pH_i$ changes were measured with BCECF and converted to $\Delta pH$ as described in Methods, where Alb increased the speed of cytoplasmic alkalization in a concentration dependent manner, and C6 inhibited intracellular alkalization induced by Alb (dark grey) whereas did not (black);

FIG. 8B graphically illustrates data showing the increase in $[Ca^{2+}]_i$ triggered by progesterone (Pg) was measured in the absence of Alb (left image) and after adding Alb (middle image and the fluorescence increase stimulated by Pg in presence of Alb was inhibited by C6 (right image);

FIG. 8C graphically illustrates the presence of Alb (grey bar) increased peak $[Ca^{2+}]_i$ stimulated by Pg 2.4-fold over baseline and this increase was inhibited by C6 (dark grey bar) or NNC (Tocris Bioscience RND Systems Company (Bristol, UK)) (dark grey bar);

FIG. 8D graphically illustrates representative recordings of $[Ca^{2+}]_i$ without (left image) or with (right image) bovine serum albumin (BSA) in arbitrary fluorescence units (au);

FIG. 8E graphically illustrates $[Ca^{2+}]_i$ changes normalized to peak fluorescence units (au) on addition of iono with (right image) or without (left image, control) Alb;

FIG. 8F graphically illustrates five independent samples of human sperm with BSA (right, grey) showed a 2.2-fold increase in peak $[Ca^{2+}]_i$ compared to control (left, black) here calculated as $\Delta Pg/\Delta iono$, where $\Delta Pg$ and $\Delta iono$ are the change in peak $[Ca^{2+}]_i$ induced by Pg and iono, respectively; and FIG. 8F graphically illustrates $pH_i$ changes measured as described in FIG. 8A, where BSA increased the speed of cytoplasmic alkalization and BSA pre-saturated and applied with a 10-fold molar excess cholesterol had a similar effect on the rate of $pH_i$ increase as did untreated BSA alone, as described in further detail in Example 1, below.

FIG. 9A-B graphically illustrate that Alb does not activate CatSper in human sperm:

FIG. 9A-B graphically illustrate a typical voltage-ramp protocol as used for recording monovalent CatSper current in whole-cell voltage-clamp experiments with non-capacitated human sperm:

FIG. 9A graphically illustrates a representative monovalent CatSper current trace in the absence (black trace) and presence (red trace) of 80 µM Alb, or in presence of 10 mM NH$_4$Cl (blue trace) are shown; and FIG. 9B graphically illustrates relative current amplitudes measured at +80 and −80 mV from experiments as shown in FIG. 9A, as described in further detail in Example 1, below.

FIG. 10A-D graphically illustrate that Alb activates proton currents and increases fMLF-stimulated ROS production by human neutrophils:

FIG. 10A graphically illustrates proton currents via hHv1 in human neutrophils, studied as described in FIG. 2A, with a approximately 30-fold proton gradient (pH$_i$=6.0 and pH$_o$=7.5), G-V for neutrophils proton currents in the absence (■) or presence of 450 µM Alb (●);

FIG. 10B graphically illustrates the ROS production was measured as described in FIG. 2B;

FIG. 10C graphically illustrates normalized ROS production by human neutrophils without (black) or with the incubation of 450 µM Alb (grey) stimulated with an increasing concentration of fMLF equivalent to the FIG. 2C; and FIG. 10D graphically illustrates the effect of 10 µM fMLF alone or in combination with 450 µM Alb on ROS production by human neutrophils, as described in further detail in Example 1, below.

Figure 11:
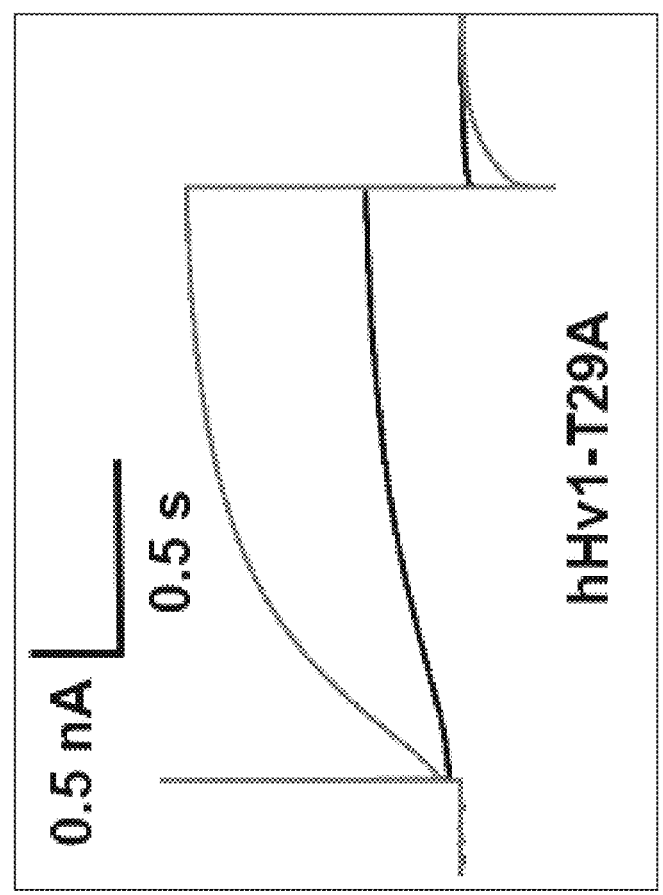

FIG. 11 graphically illustrates activation of hHv1-T29A by Alb at 75 µM.

FIG. 12A-E graphically illustrate voltage dependent activation of hHv1 by Alb at 500 µM:

FIG. 12A graphically illustrates representative proton current traces for hHv1 channels before (top image), and in the presence of 500 µM Alb (bottom image) with steps of 20 mV increments from −60 mV to +60 mV;

FIG. 12B graphically illustrates conductance-voltage relationships (G-V) for hHv1 in the absence (■) or presence of 500 µM Alb (●);

FIG. 12C graphically illustrates dose-response relationships for Alb on increasing of the activation time constants (Tact) of hHv1 at depolarizing voltages of 0 mV and +60 mV;

as described in further detail in Example 1, below.

FIG. 13A-B graphically illustrate human protein Fab or Proteinase K-digested Alb do not potentiate hHv1 current:

FIG. 13A graphically illustrates 800 µM Fab (red trace) was applied after control pulses (black trace) and shows no activation of the proton current; and FIG. 13B graphically illustrates Alb was incubated and digested with proteinase K at a concentration of 800 µM, and Alb after digestion (red trace) was applied after control pulses (black trace) and shows no activation of the proton current, as described in further detail in Example 1, below.

FIG. 14A-D graphically illustrate that Alb does not activate other voltage-gated channels that were studied:

FIG. 14A-D graphically illustrate voltage gated potassium channels were expressed in HEK293T cells, and studied using 300 ms (hKv1.3 (FIG. 14A), hKv2.1 (FIG. 14B), hKv1.5 (FIG. 14C)) or 1.5 s (hI$_{ks}$) pulses to 0 mV from a holding voltage of −80 mV with 10 s interval, and 75 µM Alb (grey trace) was applied after control pulses and shows no activation comparing to control current before application (black trace); and FIG. 14E graphically illustrates hNav1.5 was expressed in HEK293T cells, and studied using 20 ms pulses to 0 mV from a holding voltage of −100 mV with 10 s interval, and 75 µM Alb (grey trace) was applied after control pulses and shows no activation comparing to control current before application (black trace), as described in further detail in Example 1, below.

Figure 15:
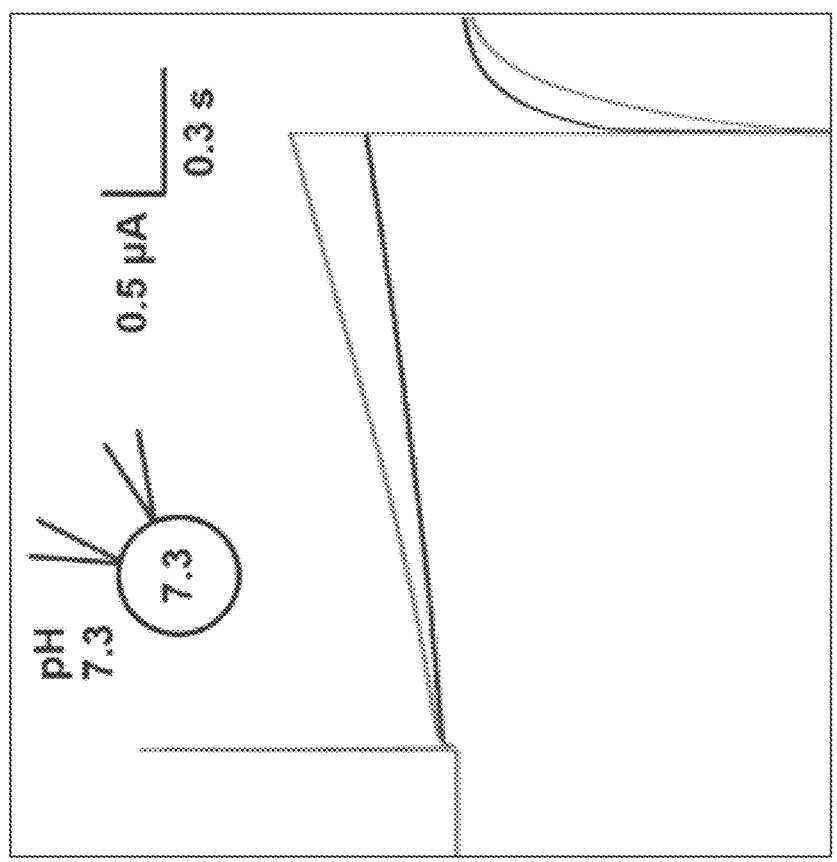

FIG. 15 graphically illustrates that Alb activates hHv1 expressed in *Xenopus* oocytes, hHv1 channels were expressed in *Xenopus* oocytes and studied by two-electrode voltage clamp (TEVC), and 75 µM Alb (grey trace) was applied after control pulses (black trace) and increased hHv1 currents approximately 1.8-fold (n=3), as described in further detail in Example 1, below.

FIG. 16A-B illustrate Alb activation on Hv1Sper:

FIG. 16A graphically illustrates representative proton current traces for Hv1Sper channels before (left image), and in the presence of 500 µM Alb (right image) with steps of 20 mV increments from −80 mV to +60 mV; and FIG. 16A graphically illustrates G-V for Hv1Sper in the absence (■) or presence of 500 µM Alb (●), as described in further detail in Example 1, below.

FIG. 17A-B illustrate that Alb activates hHv1 in human tubal fluid:

FIG. 17A graphically illustrates representative proton current traces for hHv1 channels in HTF medium before (left image), and in the presence of 500 µM Alb (right image), with steps of 20 mV increments from −60 mV to +60 mV; and FIG. 17B graphically illustrates G-V for hHv1 in HTF medium in the absence (■) or presence of 500 µM Alb (●), as described in further detail in Example 1, below.

FIG. 18A-B illustrate that S3-S4 loop of hHv1 confers Alb activation to hKv2.1:

FIG. 18A illustrates sequence alignment of hKv2.1 (grey), hHv1 (black) and h$_{S3-S4}$Kv2.1 chimera transplanting the S3-S4 loop of hHv1 into hKv2.1, SEQ ID NO:6 is hHv1: VVSFILDIVLLFQEHQFEAL-GLLILLRLWRVARII SEQ ID NO:12 is hKv2.1: LPYYVTI-FLTESNKSVLQFQNVRRVVQIFRIMRIRILKLA SEQ ID NO:13 is h$_{S3-S4}$Kv2.1: LPYYILDIVLL-FQEHQFEALGLLILLRLWRILKL, and FIG. 18B illustrates representative current traces for hKv2.1 (left image) and h$_{S3-S4}$Kv2.1 (right image) without (black) or with 500 µM Alb application (grey), as described in further detail in Example 1, below.

FIG. 19A-B illustrate that ΔHv1 monomeric channels appear to be insensitive, or weakly activated, by Alb:

FIG. 19A illustrates representative proton current traces for ΔHv1 channels before (left image), and in the presence of 800 µM Alb (right image) with steps of 20 mV from −60 mV to 40 mV; and FIG. 19B graphically illustrates dose-response relationships for Alb activation of ΔHv1, as described in further detail in Example 1, below.

FIG. 20A-D illustrate in silico prediction of interaction between Alb and S3-S4 loop of hHv1:

FIG. 20A illustrates docking result for two low energy poses of S3-S4 loop peptide (cyan and lime) with Alb, showing binding Site 1 on DI (grey) and DII (orange) of Alb is one hot spot for hHv1 channel interaction;

FIG. 20B illustrates a close-up view of interaction interface between S3-S4 loop peptide and Alb in Site 1 in a docking model, the hHv1-H193 (cyan) could be a partner to Alb-E188, Alb-H288 and Alb-E292;

FIG. 20C illustrates a docking result for three low energy poses of S3-S4 loop peptide (blue, green, and red) with Alb, showing binding Site 2 on DII (orange) of Alb is the other hot spot for hHv1 channel interaction; and FIG. 20D illustrates a close-up view of interaction interface between S3-S4 loop peptide and Alb in Site 2 in a docking model, the hHv1-H193 (blue) could be a partner to Alb-Y334, Alb-R337, Alb-H338, Alb-D340, Alb-F374 and Alb-V381, as described in further detail in Example 1, below.

Figure 21:
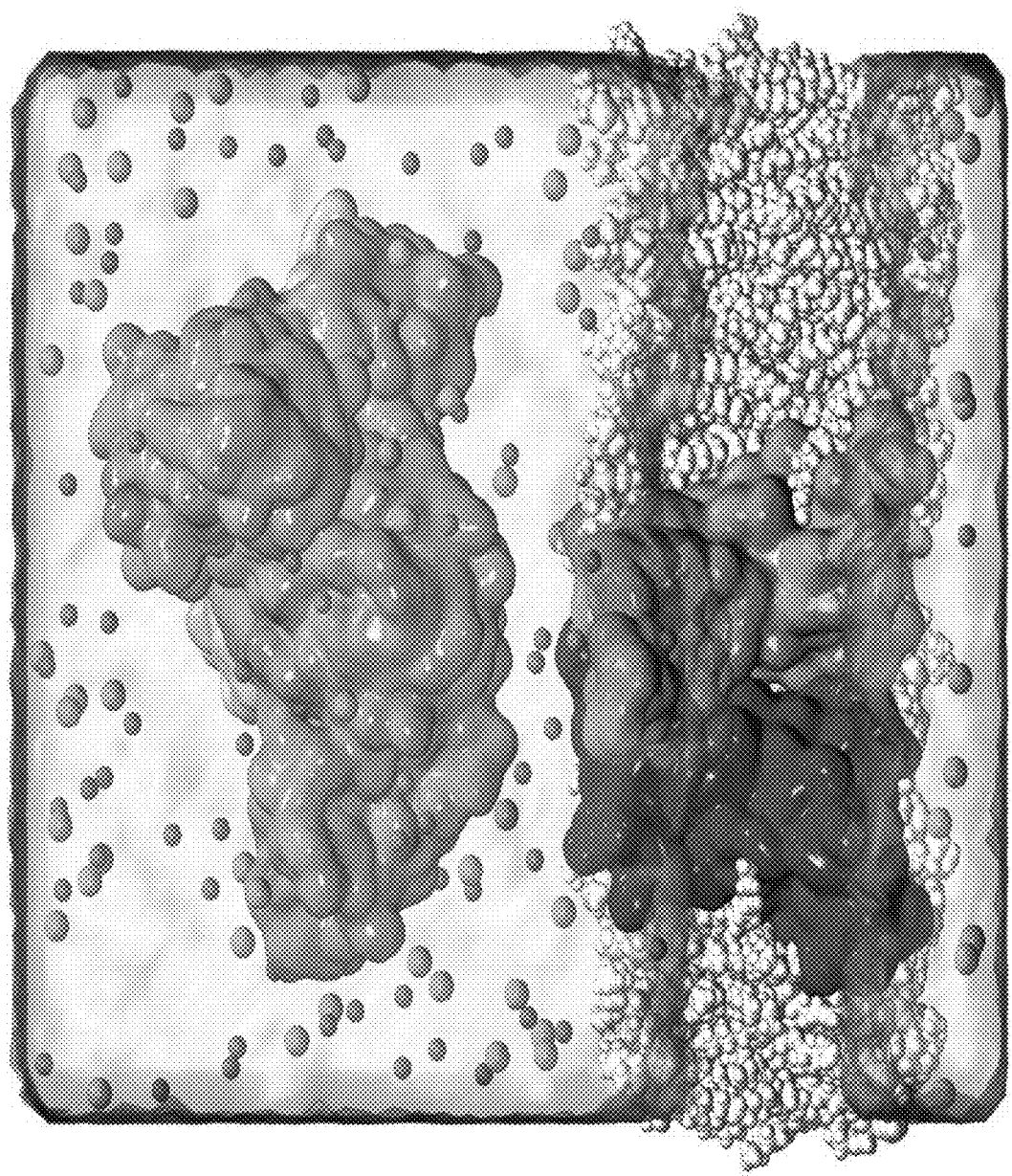

FIG. 21 illustrates molecular dynamics simulation system of the Alb-hHv1 complex, the Alb was orientated with its DII (orange) facing the extracellular side of the dimeric hHv1 (cyan for subunit A, blue for subunit B) as described in further detail in Example 1, below.

FIG. 22A-D illustrate the structural stability of Alb and the Alb-hHv1 complex:

FIG. 22A-B graphically illustrate time series of the backbone RMSDs of Alb and its three domains Alb-DI, Alb-DII, Alb-DIII in reference to the corresponding initial (red), final (blue) and crystal (black) structures in the 1.5 s ANTON2 simulation of the Alb-hHv1$_{down}$ system (FIG. 22A) and the Alb-hHv1$_{up}$ system (FIG. 22A); and FIG. 22C-D illustrate top-view (left panel) and side-view (right panel) of the final structure of the Alb-hHv1$_{down}$ complex (FIG. 22C) and the Alb-hHv1$_{up}$ complex (FIG. 22D), the crystal structure of Alb was superimposed in transparent ribbon representation, showing the distortion of the Alb-DIII domain due to its steric clash with the S1-S2 loop of hHV1 (highlighted in the dashed box), as described in further detail in Example 1, below.

Figure 23:
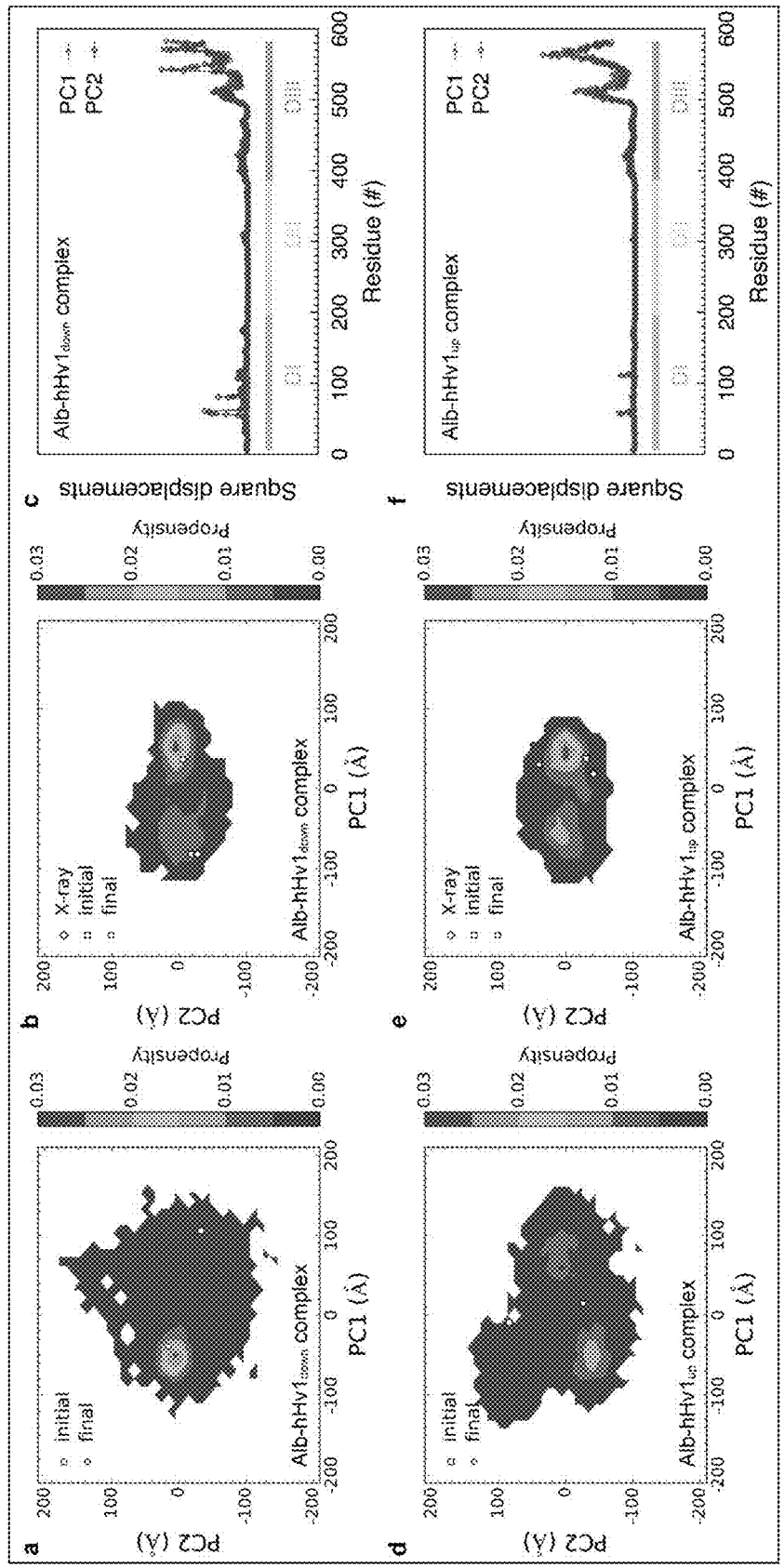

FIG. 23A-F illustrate a principal component analysis of global and intra-molecular conformational changes of Alb during the simulations: principal component analysis (PCA) was performed on Cartesian coordinates of the Cα atoms of Alb generated in the 1.5 µs ANTON2 simulation of the Alb-hHv1$_{down}$ system (FIG. 23A, FIG. 23B, FIG. 23C) and the Alb-hHv1$_{up}$ system (FIG. 23D, FIG. 23E, FIG. 23F); and FIG. 23D and FIG. 23F are comparisons of the square displacement of each residue along PC1 and PC2, as described in further detail in Example 1, below.

FIG. 24A-B graphically illustrate the distance distributions of two atoms or centers of mass of two groups of atoms from representative pairs of residues, and snapshots from the last 500 ns ANTON2™ trajectories of the Alb-hHv1$_{down}$ (FIG. 24A) and Alb-hHv1$_{up}$ (FIG. 24B) systems were used for the calculation, as described in further detail in Example 1, below.

FIG. 25A-C graphically illustrate cholesterol saturated Alb activates hHv1 like untreated Alb, and Alb activates hHv1-H140A but not hHv1-H193A channels.

Figure 26:
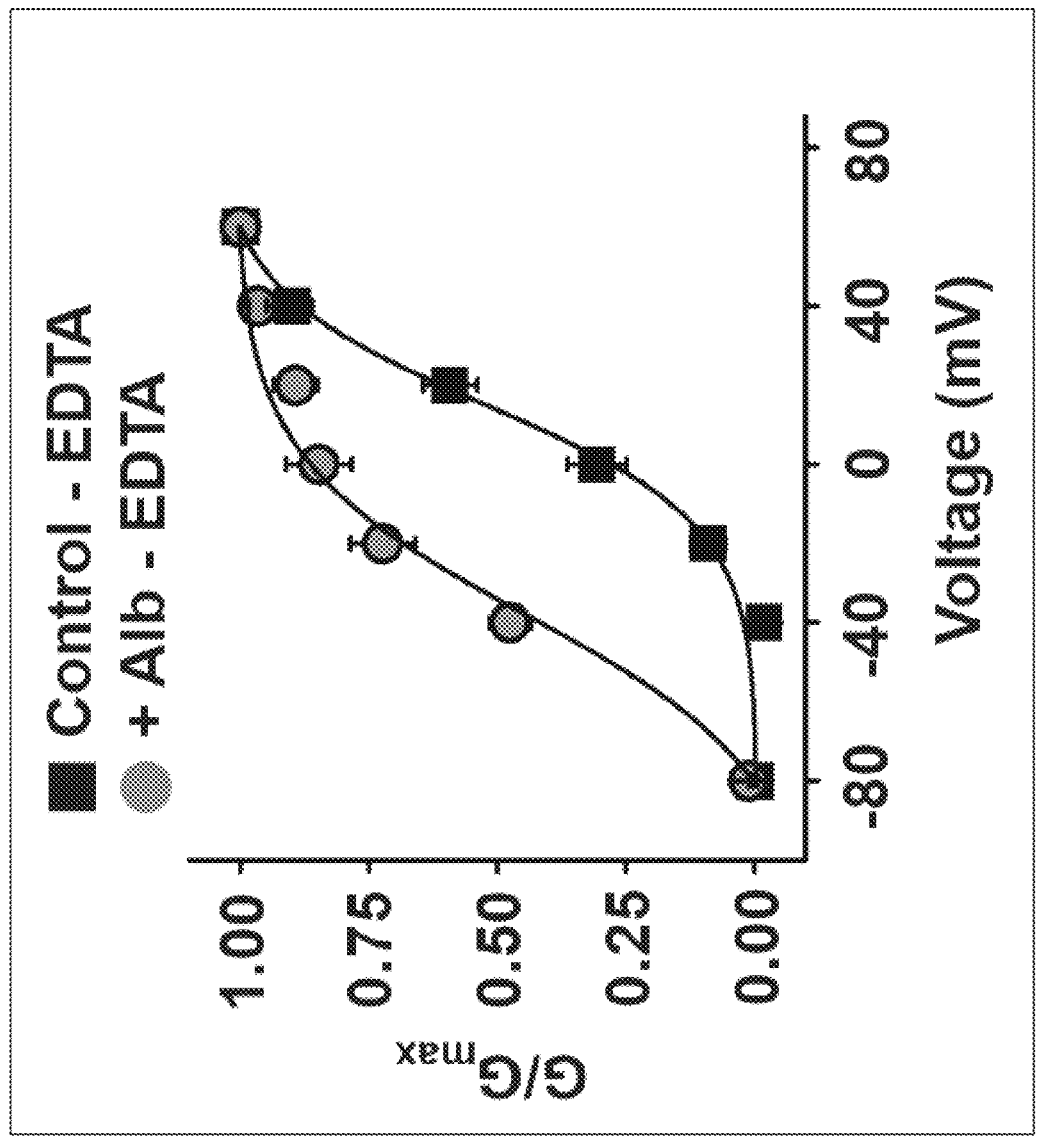

FIG. 26 illustrates Alb activation of sperm proton currents without EDTA, as described in further detail in Example 1, below.

Figure 27:
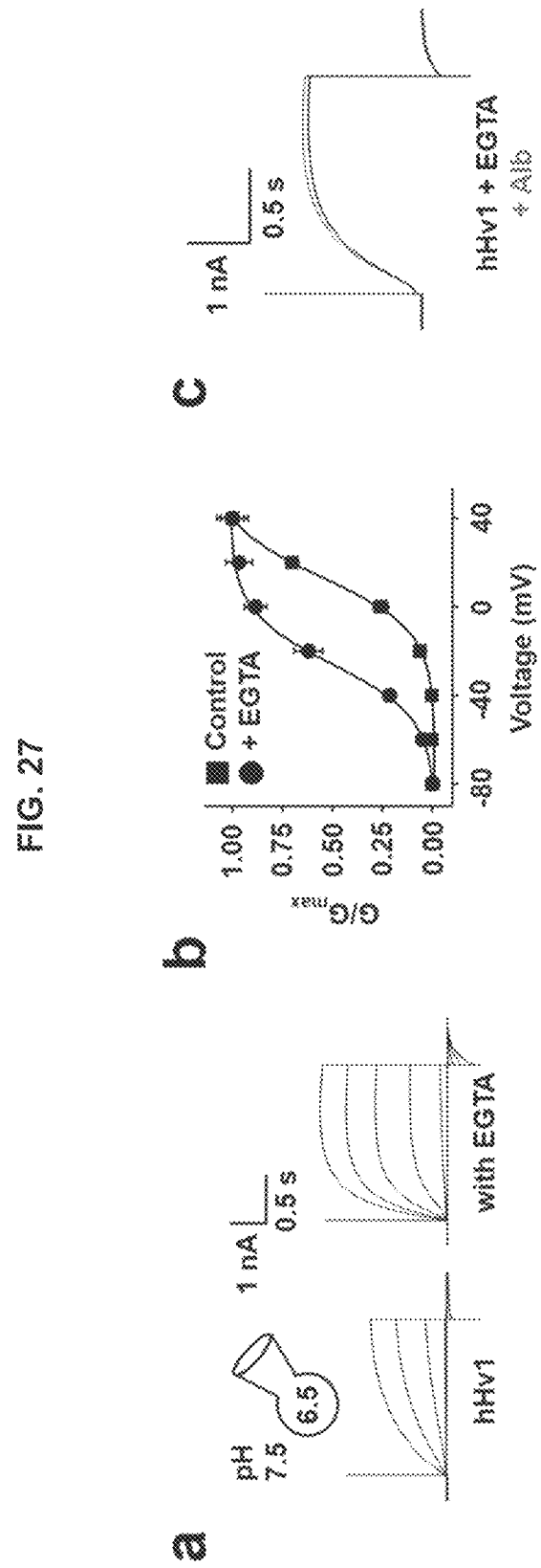

FIG. 27A-C graphically illustrate that EGTA activates hHv1:

FIG. 27A graphically illustrates representative proton current traces for hHv1 channels before (left image), and in the presence of 1 mM EGTA (right image), with steps of 20 mV increments from −80 mV to +40 mV;

FIG. 27B graphically illustrates G-V for hHv1 in the absence (■) or presence of 1 mM EGTA (●);

FIG. 27C graphically illustrates 500 µM Alb (grey trace) was applied after control pulses after pre-activation with 1 mM EGTA (black trace) and shows attenuated activation of the proton current, as described in further detail in Example 1, below.

Figure 28:
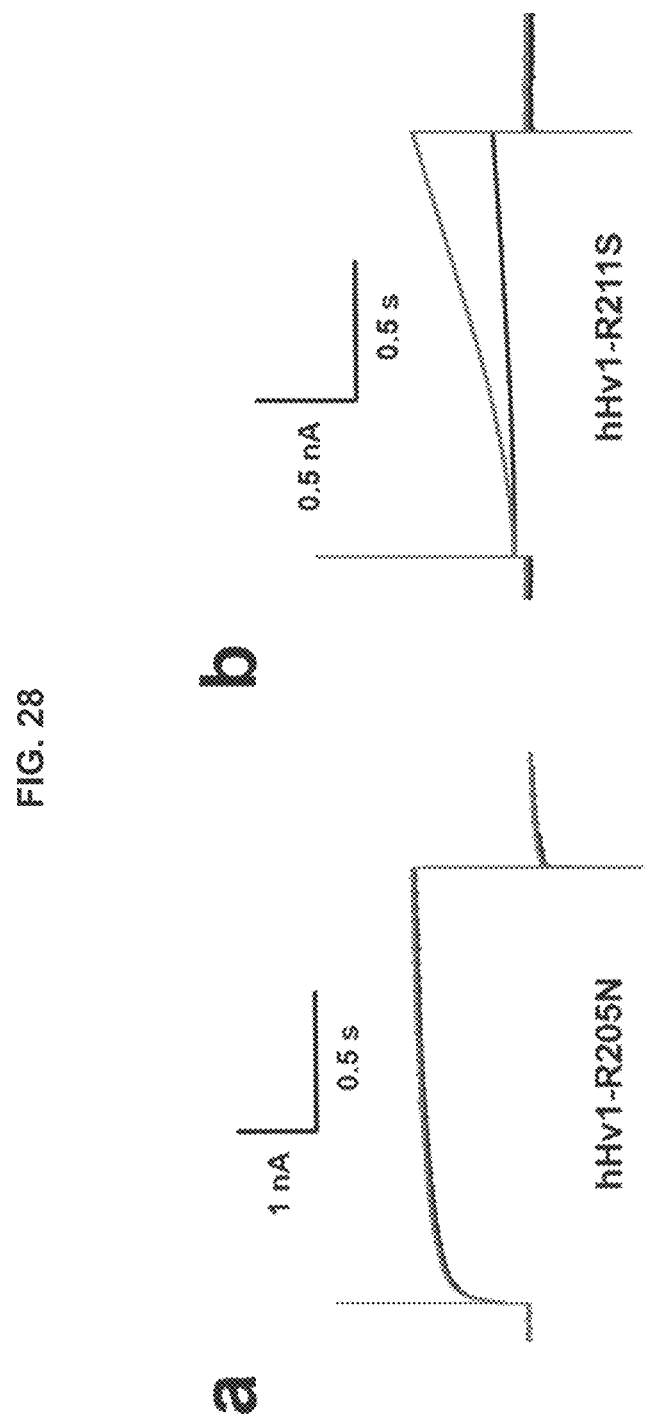

FIG. 28A-B graphically illustrate hHv1-R205N and hHv1-R211S channels were studied using whole-cell voltage clamp with 1.5 µs pulses to 0 mV (hHv1-R205N) or +40 mV (hHv1-R211S) from a holding voltage of −60 mV with 10 s interval with a 10-fold proton gradient (pH$_i$=6.5 and pHo=7.5) and divalent cation-free bath solution, and after control pulses (black trace), 75 µM Alb (grey trace) was applied:

FIG. 28A illustrates that the R205 mutation fully eliminate activation by 75 µM Alb; and FIG. 28B illustrates that the mutation of R211 did not alter Alb-activation showing an approximately 5-fold increase in current (n=3), as described in further detail in Example 1, below.

FIG. 29 illustrates a table (also referred to as supplementary table 1) showing the parameters for Alb activation of hHv1 in HEK293T cells, human sperm and neutrophils, as described in further detail in Example 1, below.

Figure 30:
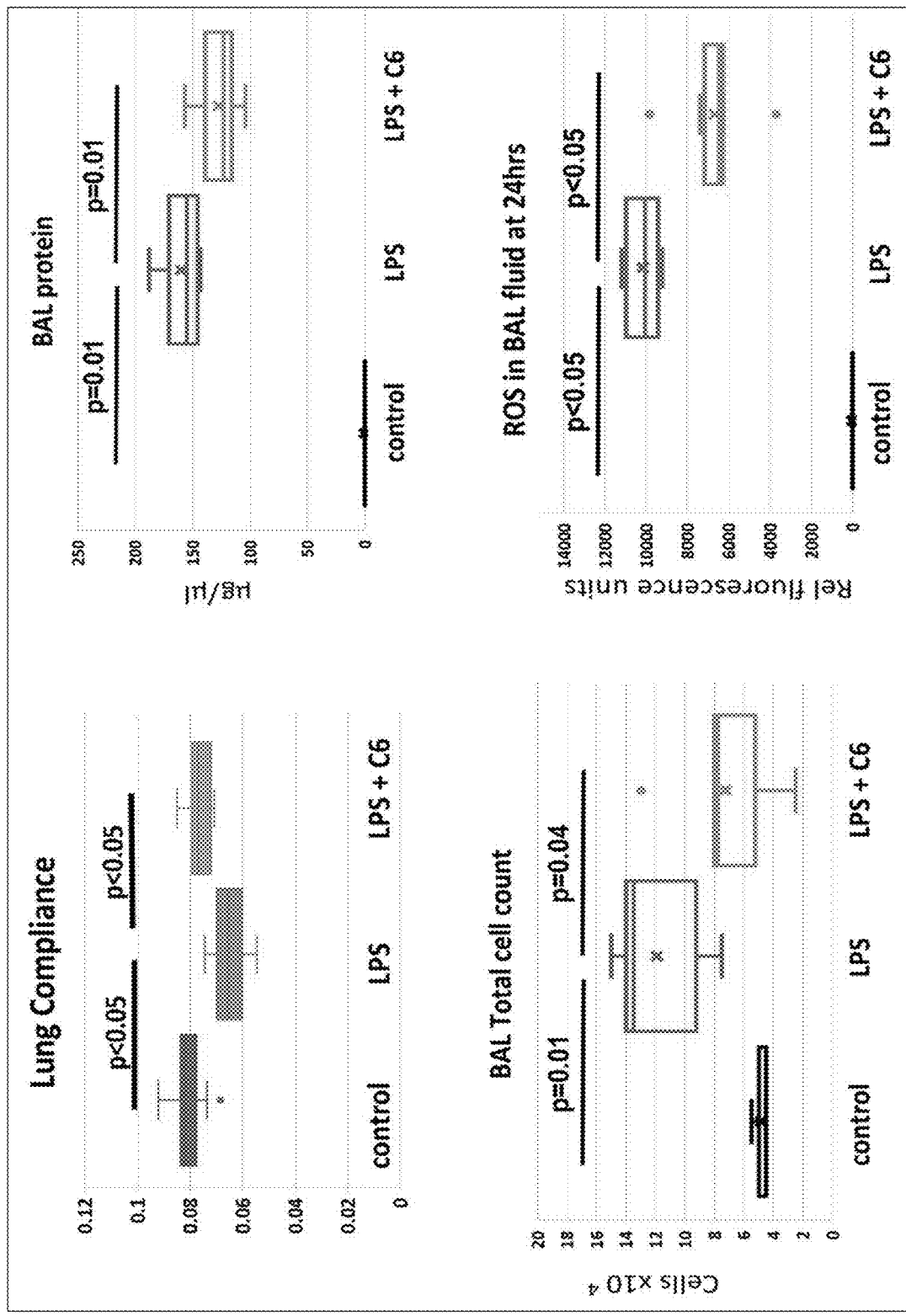

FIG. 30 illustrates data showing that C6 protects in the LPS-induced acute lung injury mouse model, and that C6 improves ARDS parameters in LPS mouse model: lung compliance (C) (upper left image), bronchoalveolar lavage (BAL) protein (upper right image), BAL total protein count (lower left image), and lavage ROS in BAL fluid (lower right image), as described in further detail in Example 2, below.

FIG. 31A-F illustrates that C6 is a peptide blocker for hHv1:

FIG. 31A illustrates the amino acid sequence of C6 (SEQ ID NO:4), with disulfides;

FIG. 31B schematically illustrates a 3D model of C6;

FIG. 31C schematically illustrates two C6 on two hHv1 subunits;

FIG. 31D graphically illustrated hHv1 current −/+250 nM C6 (HEK293T cells, steps of 10 mV, −60 mV to 50 mV);

FIG. 31E graphically illustrates E G-V for hHv1+/−250 nM C6; and

FIG. 31F graphically illustrates C6 inhibition of hHv1 and CiHv1, as described in further detail in Example 2, below.

FIG. 32A-D illustrates data showing that Alb activates hHv1:

FIG. 32A graphically illustrates that Alb (75 µM) activates hHv1 in HEK293T cells, 20 mV steps, −60 mV to +40 mV;

FIG. 32A graphically illustrates that Alb shifts G-V to favor opening;

FIG. 32C graphically illustrates a time-course for activation and deactivation on application (bar), at 0 mV normalized to pre-Alb level; and FIG. 32D graphically illustrates a dose-response for Alb activation at 0 mV, as described in further detail in Example 2, below.

FIG. 33A-B graphically illustrates that Alb binds to the hHv1 S3-S4 loop:

FIG. 33A illustrates drawings of hHv1 (black) and CiHv1 (grey) chimeras on H$^+$ current at 0 mv, using 75 µM Alb, and normalized to pre-Alb levels; and FIG. 33B illustrates a mutant scan of the hHv1 S3-S4 loop showing five key sites, as described in further detail in Example 2, below.

FIG. 34A-C illustrates that one Alb binds to dimeric hHv1 channels, and Alb-hHv1 channel stoichiometry is 1:1:

FIG. 34A illustrates a cartoon of TAMRA-Alb and hHv1-G199L-TFP channel;

FIG. 34B illustrates images showing colocalization of TAMRA-Alb and hHv1-G199L-TFP at cell surface (circles); and FIG. 34C illustrates a steps histogram, analysis per 4 supports 1 Alb:2 hHv1 subunits in complex, as described in further detail in Example 2, below.

FIG. 35A-C illustrate that Alb tethered to the cell surface (T-Alb) allows demonstration that domain II binds to hHv1 and identifies key residues:

FIG. 35A illustrates a cartoon of TAlb-VFP and hHv1-TFP channel;

FIG. 35B graphically illustrates hHv1-TFP current −/+ expression with T-Alb-VFP, T-NO-VFP (no insert) and T-C6-VFP; and FIG. 35C graphically illustrates how FRET validates how T-Alb-VFP residues interact with hHv1 S3-S4, as described in further detail in Example 2, below.

FIG. 36A-B illustrate a structural model of Alb-hHv1 complex:

FIG. 36A illustrates a Alb-hHv1 complex in two orientations showing the 3 Alb domains DI (grey), DII (orange) and DIII (wheat) and the two subunits of a dimeric hHv1 channel (cyan and blue). and FIG. 36B illustrates a proposed gating modification mechanism, as described in further detail in Example 2, below.

FIG. 37A-B illustrate that oxidizing Alb enhances activation of hHv1:

FIG. 37A-B illustrates a hHv1 current +/−15 μM oxidized Alb (grey trace), 0 mV, HEK293T cells; and FIG. 37B illustrates a dose response relationship for oxidized Alb activation of hHv1 normalized pre-Alb current, as described in further detail in Example 2, below.

Figure 38A:
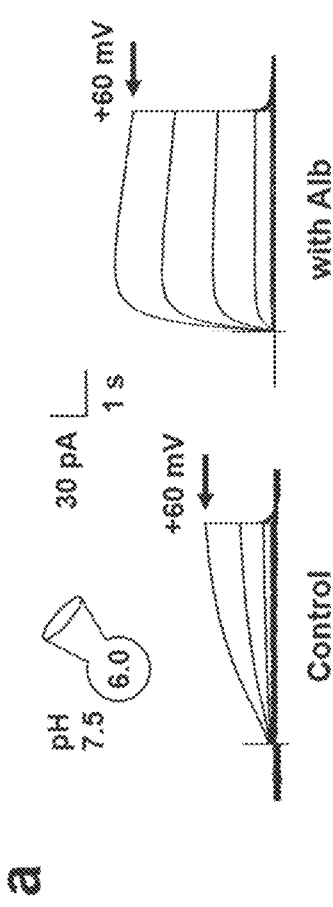
Figure 38B:
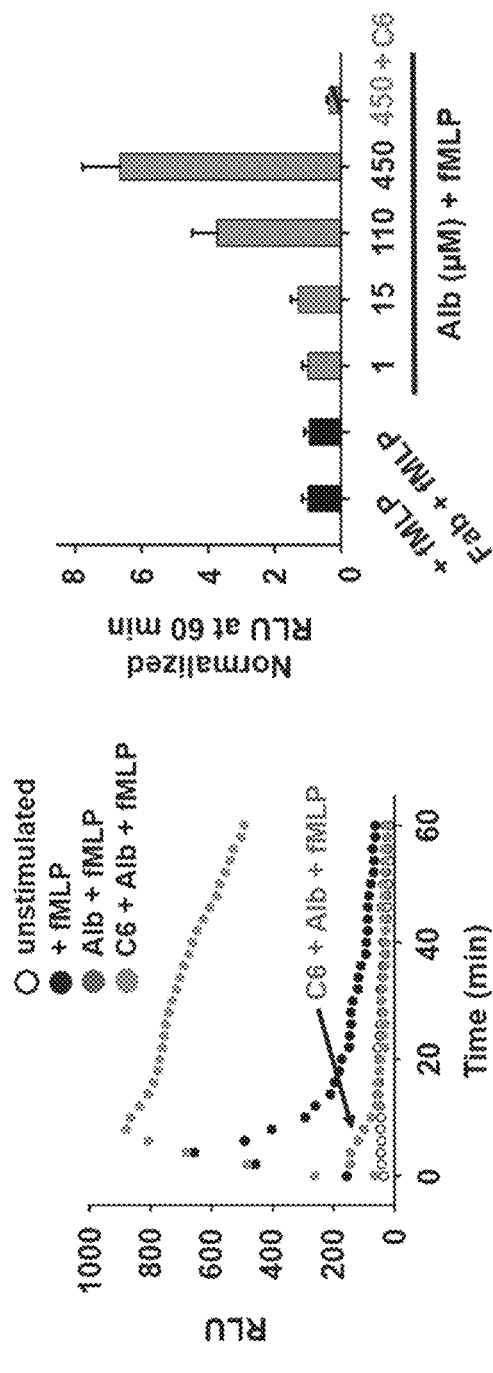

FIG. 38A-B illustrate human PMN current and ROS:

FIG. 38A left image illustrates H$^+$ currents increase with Alb, steps −60 to 60 mV, and right image graphically shows current with Fab, Alb, Alb+20 μM C6 (60 mV, n=4 cells); and FIG. 38B left image illustrates Alb increases and sustains ROS, C6 blocks ROS, and right image graphically shows that Alb increases ROS levels, as described in further detail in Example 2, below.

Figure 39:
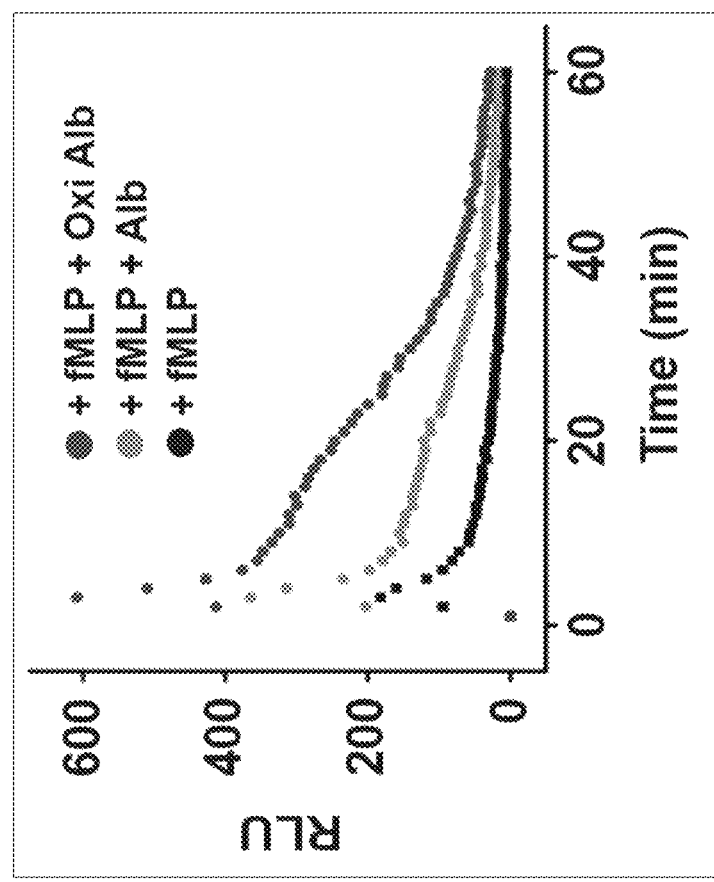

FIG. 39 graphically illustrates that oxidized albumin is more potent than Alb, as described in further detail in Example 2, below.

FIG. 40A-B illustrate that a designed peptide based on the S3-S4 loop peptide (L*) inhibits Alb activation of hHv1 and human PMN ROS production, and that L* suppresses Alb-activation of hHv1, hHv1 current, 0 mV, HEK293T cells: FIG. 40A: +/−500 μM L* (red), FIG. 40B: −/+75 μM Alb+500 μM Lsc (scramble) L* or L, as described in further detail in Example 2, below.

Figure 41:
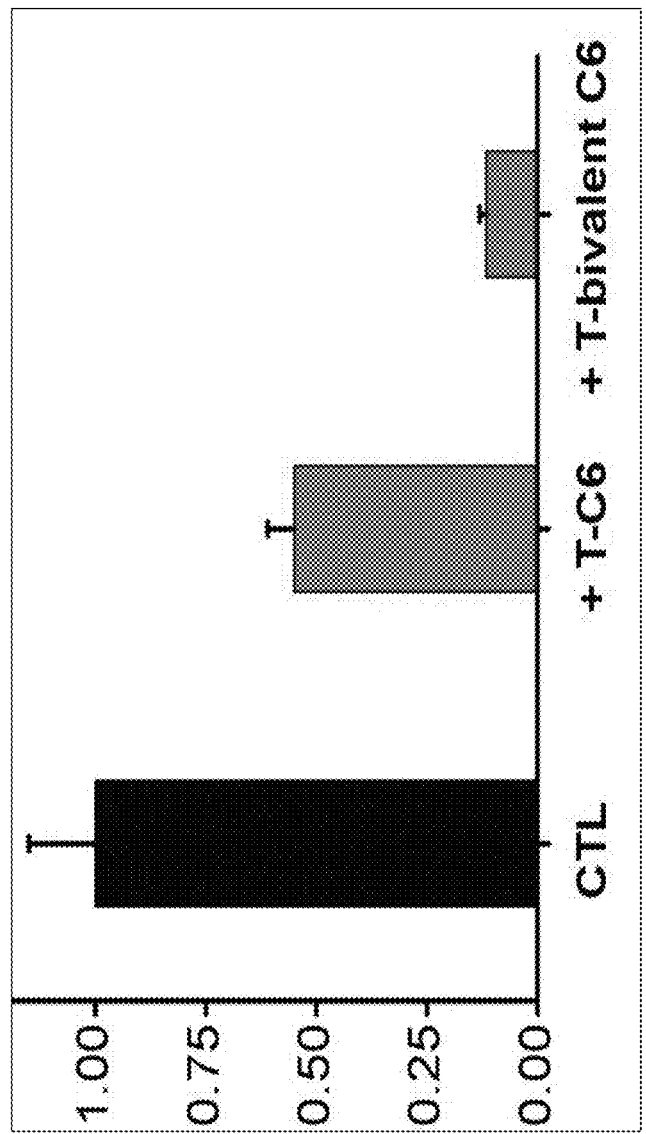

FIG. 41 graphically illustrates bivalent C6 is a second generation inhibitor with greater affinity, as described in further detail in Example 2, below.

FIG. 42A-D illustrate a high-throughput assay for hHv1 regulators:

FIG. 42A illustrates an exemplary channel;

FIG. 42B illustrates that a switch bath from pH 7 to 7.9±500 μM Alb activates hHv1;

FIG. 42C illustrates that raising pH$_i$ and fluorescence unless hHv1 is blocked (curves normalized to TVFP-H148G); and FIG. 42D illustrates C6 Ki approximately 13 nM, 3 wells per dose, as described in further detail in Example 2, below.

Figure 43:
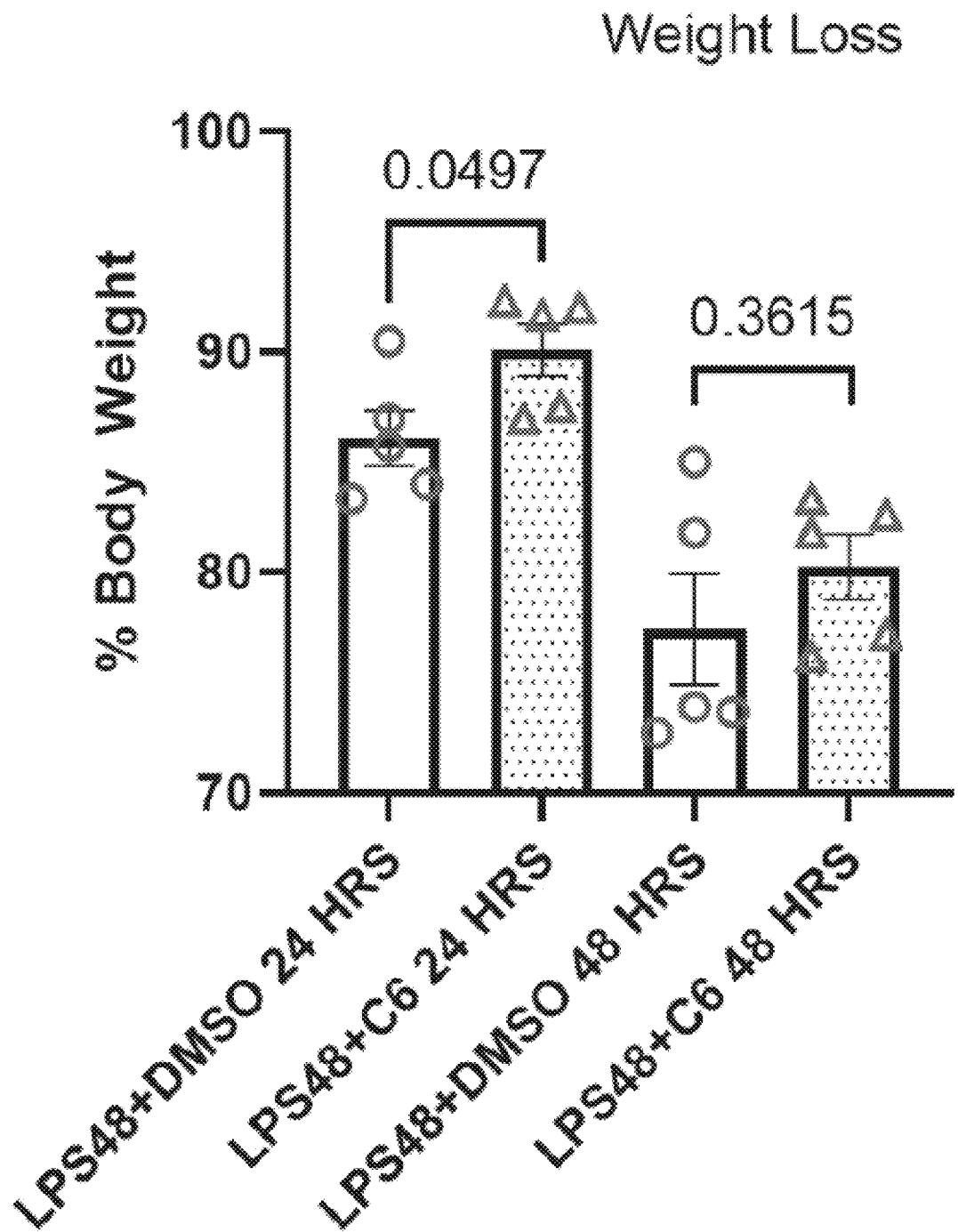

FIG. 43 graphically illustrates that LPS induced mice treated with DMSO had continuing body weight loss in 24 and 48 hours, while mice treated with C6 has significant less weight loss in 24 h and less (although not significant) weight loss in 48 hours (h), as described in further detail in Example 3, below.

Figure 44:
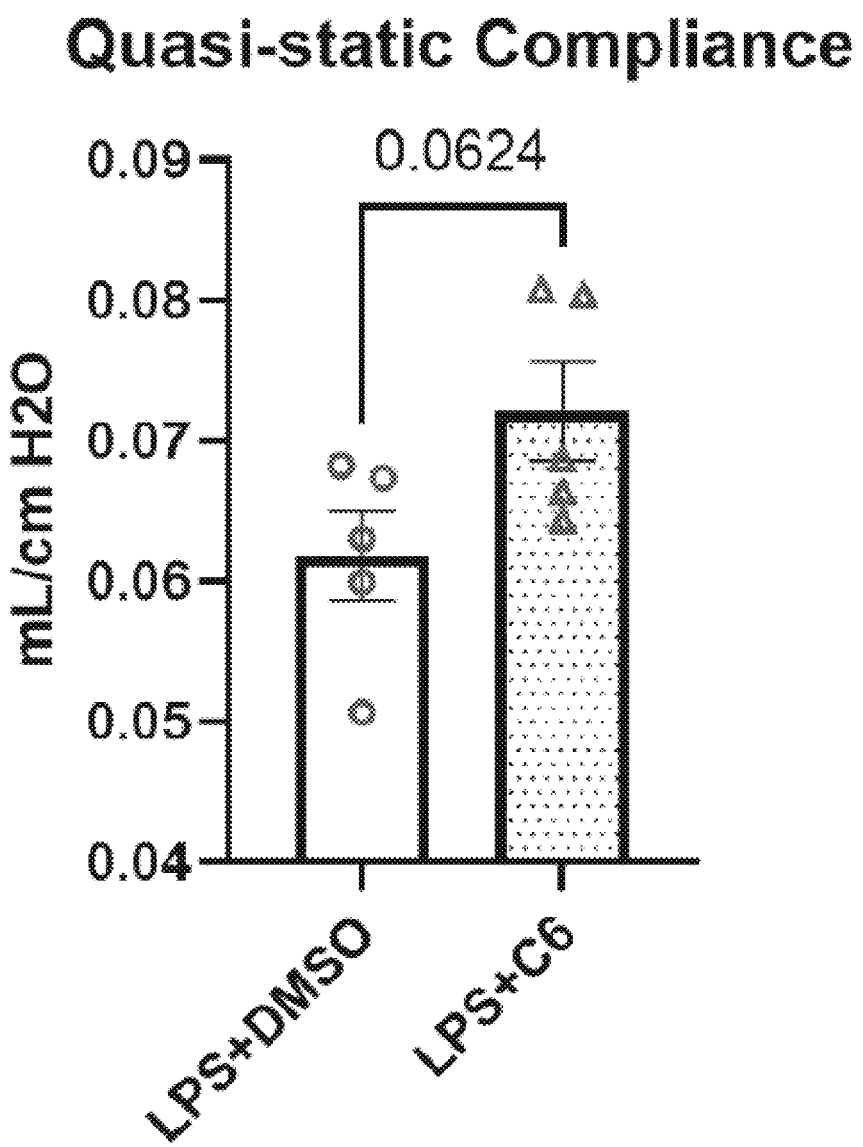

FIG. 44 graphically illustrates that LPS induced mice treated with DMSO had decreased lung compliance after 48 hours, while mice treated with C6 had improved lung compliance, as described in further detail in Example 3, below.

FIG. 45A-B graphically illustrate that LPS induced mice treated with DMSO had cell influx in lung after 48 hours, while mice treated with C6 has 30% less cell influx (FIG. 45A), most of which are neutrophils (FIG. 45A), as described in further detail in Example 3, below.

Figure 46:
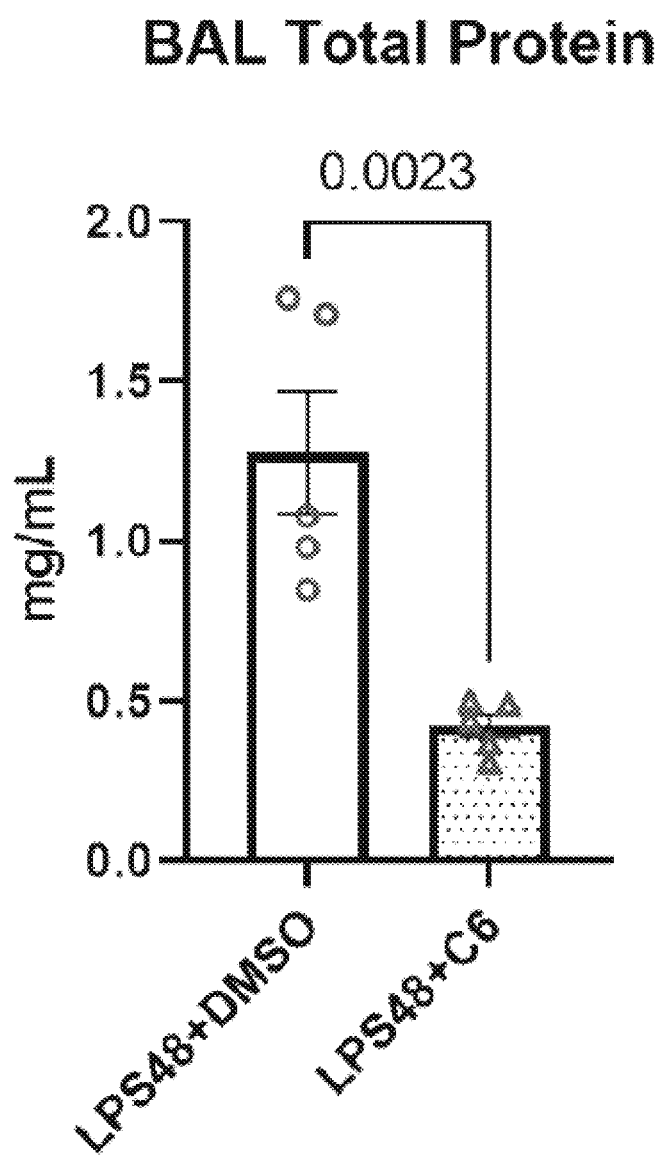

FIG. 46 graphically illustrates that LPS induced mice treated with DMSO had protein influx in lung after 48 hours, while mice treated with C6 has significantly less protein influx, as described in further detail in Example 3, below.

Figure 47:
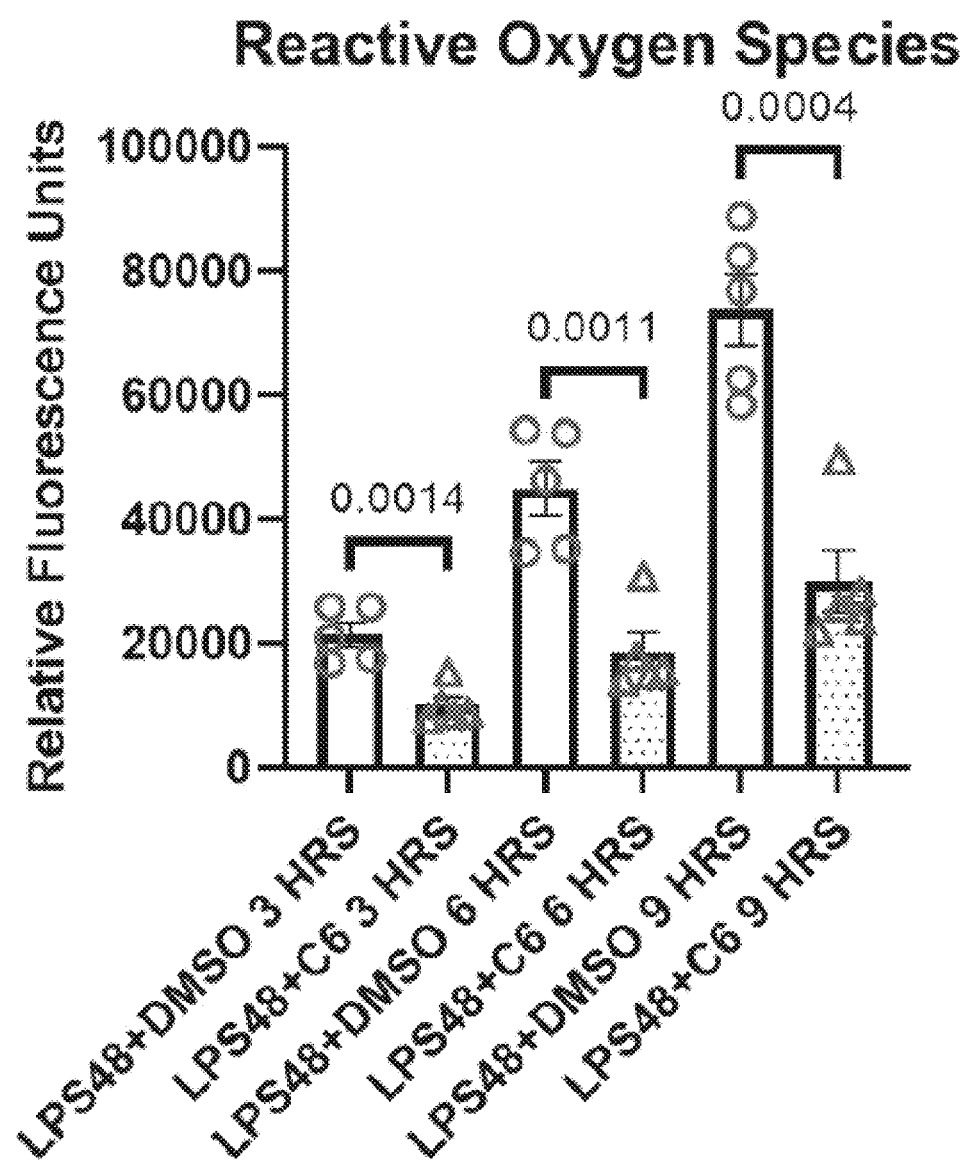

FIG. 47 graphically illustrates that administration of C6 decreases the total ROS production by cells in BAL fluid, where cells in BAL fluid was recovered by centrifuge and the ROS production by cells was continually quantitated for 9 hours using fluorogenic dye DCFDA, as described in further detail in Example 3, below.

Figure 48:
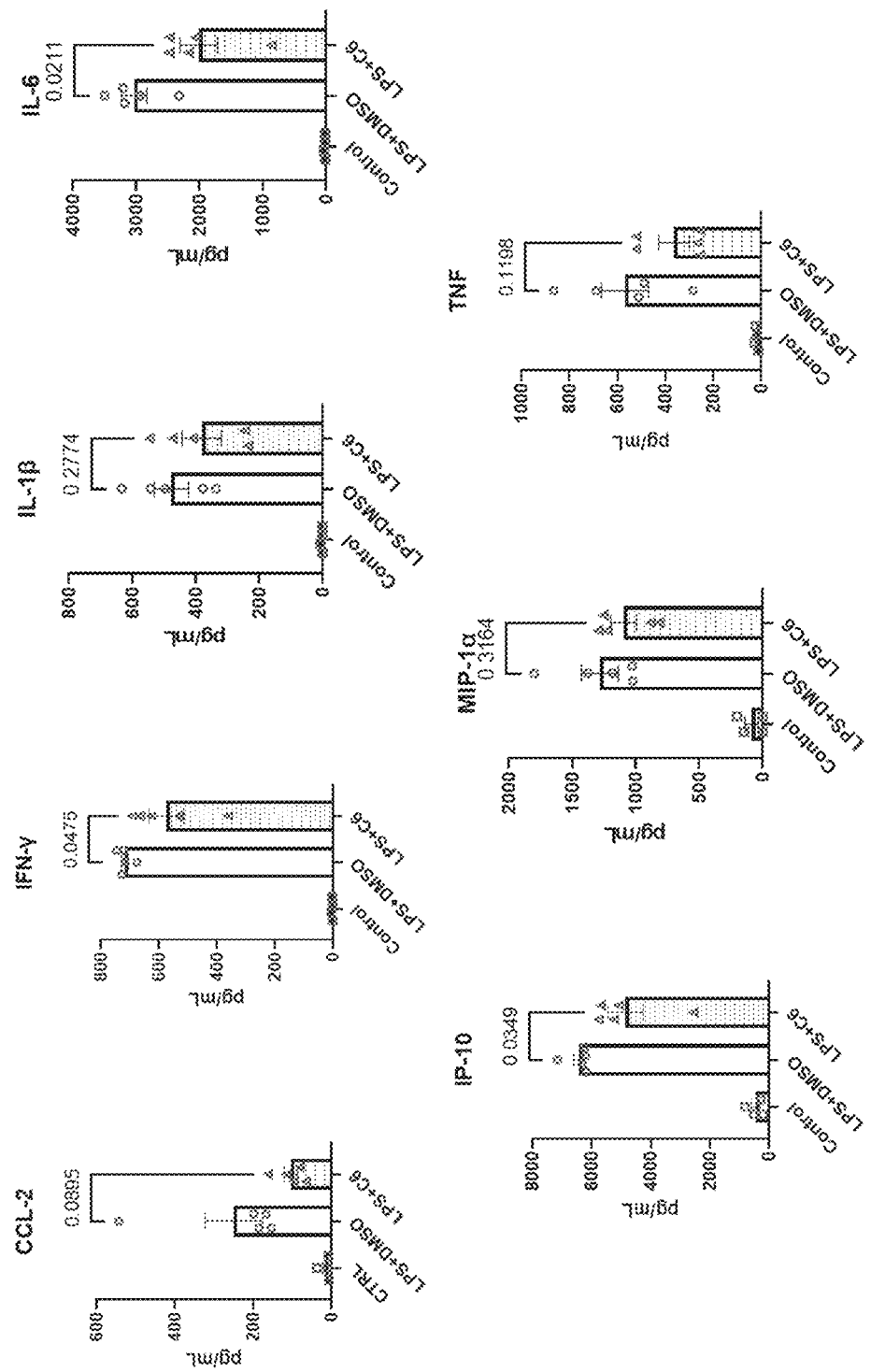

FIG. 48 graphically illustrates that the levels of proinflammatory cytokines are elevated in BAL fluid in ARDS patients, and that C6 prevented LPS-induced accumulation of proinflammatory cytokines, including CCL-2, IL-10, IL-6, MIP-1a, TNF, IFN-γ and IP-10 in the BAL fluid, as described in further detail in Example 3, below.

FIG. 49A-I graphically illustrate state-dependent inhibition of C6 on hHv1 channels:

FIG. 49A illustrates a cartoon showing two C6 peptides binding on two subunits of a hHv1 channel;

FIG. 49B graphically illustrates representative H$^+$ current traces for hHv1 channels before (left image), and in the presence of 250 nM C6 (right image) with steps of 20 mV from −60 to +40 mV;

FIG. 49C graphically illustrates current-voltage relationships for hHv1 in the absence (■) or presence of 250 nM C6 (●);

FIG. 49D graphically illustrates dose-response relationships for C6 inhibition of hHv1 studied at +40 mV (black), +20 mV (dark grey) and 0 mV (light grey);

FIG. 49E graphically illustrates a time course for block and unblock of hHv1 on acute application (red bar) and washout of 250 nM C6 recorded at +40 mV (black), +20 mV (dark grey) and 0 mV (light grey);

FIG. 49F graphically illustrates the effect of voltage on C6 blocking kinetics, the $k_{on}$ was insensitive to voltage, whereas $k_{off}$ and $K_i$ were responsive. Blocking parameters, $k_{on}$(▲), $k_{off}$(♦), $K_i$(●) were normalized to its value at 0 mV;

FIG. 49G graphically illustrates conductance-voltage relationships (G-V) for hHv1 (■), hHv1-R205N (♦) and hHv1-R211S (▲);

FIG. 49H graphically illustrates dose-response relationship for C6 inhibition of hHv1-R205N studied at +40 mV, and the insert shows representative current traces with 1 μM C6 (grey) or without C6 (black); and FIG. 49I graphically illustrates dose-response relationship for C6 inhibition of hHv1-R211 S studied at +40 mV. Insert: representative current traces with 1 μM C6 (grey) or without C6 (black), as described in further detail in Example 4, below.

Figure 50:
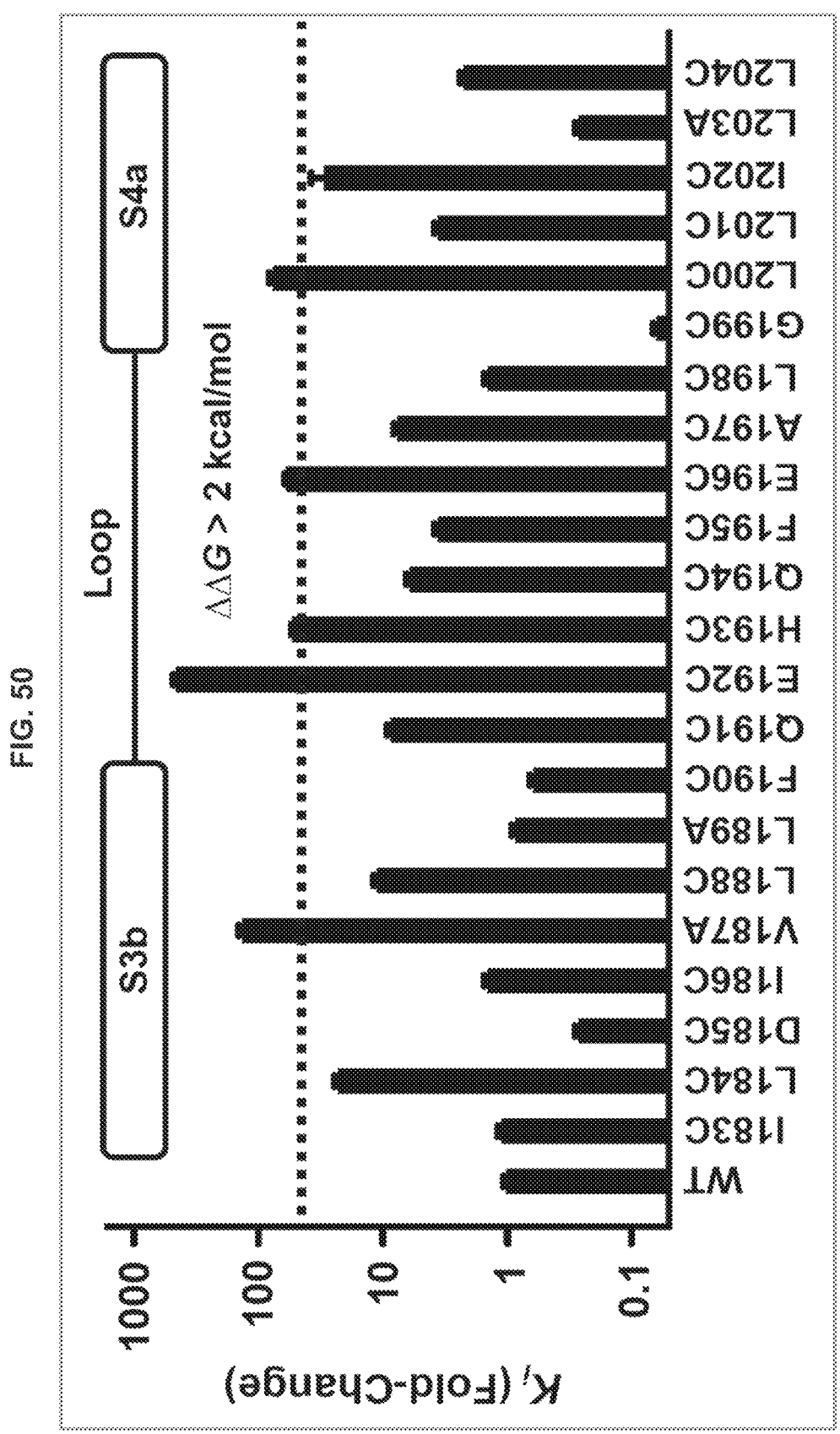
Figure 51:
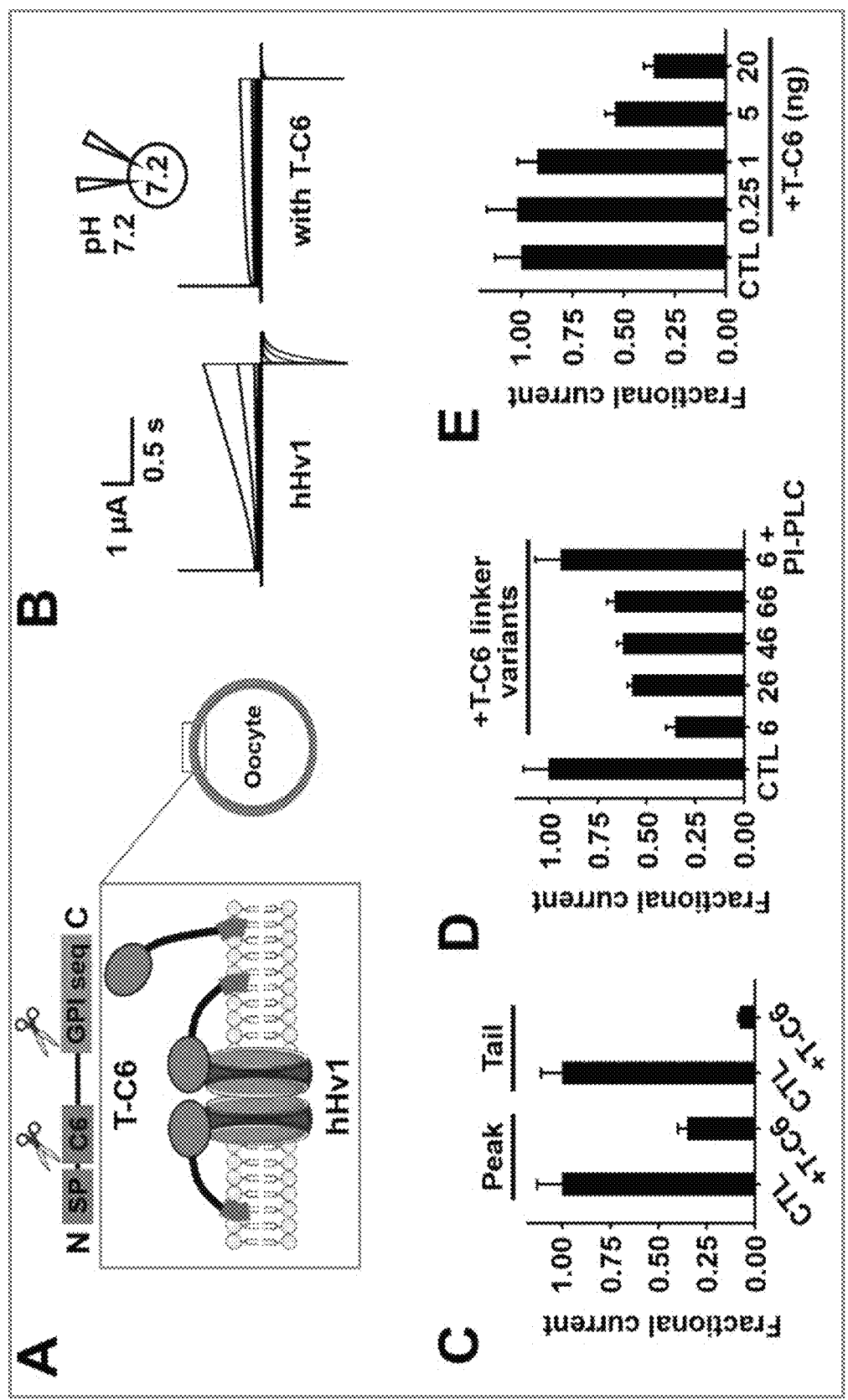

FIG. 50 graphically illustrates the effects of mutations in S3-S4 loop of hHv1 on C6 affinity, where hHv1 and point mutant channels were expressed in HEK293T cells and the $K_i$ for C6 was determined by whole-cell patch clamp as in FIG. 49, as described in further detail in Example 4, below.

FIG. 51A-E graphically illustrate that T-C6 blocks hHv1 channels:

FIG. 51A graphically illustrates T-C6 was constructed as chimeric fusion protein with an N-terminal secretory signal sequence (SP), the C6 sequence, a hydrophilic flexible linker (6 residues), and a C-terminal GPI membrane anchor targeting sequence;

FIG. 51B graphically illustrates representative current traces (steps from −60 to +80 mV) for hHv1 channels without (CTL) or with 20 ng T-C6 cRNA coinjection;

FIG. 51C graphically illustrates hHv1 currents at +80 mV (Peak) and −60 mV (Tail) with T-C6 (20 ng of cRNA) normalized to the unblocked condition (CTL);

FIG. 51D graphically illustrates T-C6 linker variants with hydrophilic flexible linkers range from 6 to 66 residues show different extent of inhibition to hHv1; and FIG. 51E graphically illustrates concentration-response for T-C6 inhibition of hHv1 currents at +80 mV normalized to the unblocked condition (CTL), as described in further detail in Example 4, below.

FIG. 52 graphically illustrates a T-C6 screening mutagenesis: hHv1 was expressed in oocytes and inhibition by T-C6 and variants were studied by TEVC after coinjection of 20 ng of the cRNAs, and changes of free energy of C6 blockade ($\Delta\Delta G$) were calculated, as described in further detail in Example 4, below.

FIG. 53A-D illustrate partitioning of C6 into lipid membranes:

FIG. 53A graphically illustrates ratio of bound/free C6 (red) or AgTx2 (black) plotted as a function of LUVs concentration;

FIG. 53B illustrates surface and ribbon representations of the homology model of C6, basic, polar and hydrophobic residues are colored blue, green and yellow, respectively;

FIG. 53C graphically illustrates time series of the z coordinate of the center-of-mass of Cα atoms of the six cysteines (orange line) of C6, phosphate atoms in the upper and inner lipid leaflets (gray lines), and the heavy sidechain atoms of F28 (red line) and W38 (blue line) of C6, respectively, in the molecular dynamics (MD) simulations system with a POPC:POPG lipid bilayer; and FIG. 53D illustrates snapshot of C6 partitioning into a POPC:POPG lipid bilayer using its hydrophobic motifs in the MD simulations, the two hydrophobic residues of C6, F28 and W38 (yellow), inserting into the lipid bilayer are shown in stick and surface representation, three disulfide bonds are shown in stick representation (cyan), as described in further detail in Example 4, below.

FIG. 54A-B illustrate C6-hHv1 structural model from molecular dynamics simulations:

FIG. 54A illustrates a C6-hHv1 complex in two orientations showing two C6 molecules (orange) bind to the two subunits (cyan and blue) of an intact dimeric hHv1 channel; and FIG. 54B illustrates a close-up view of the interaction interface between one C6 and one hHv1 subunit in the structural model. F28, M33 and W38 (yellow side chains) of C6 form hydrophobic interactions with L200, H193 and V187 (yellow side chains) of hHv1, respectively, as described in further detail in Example 4, below.

FIG. 55A-I illustrate a mutant cycle analysis that validates modeled pairwise interactions between C6 and hHv1:

FIG. 55A-F illustrate dose-response curves for the inhibition of WT and mutant channels by C6 and variants;

FIG. 55G illustrates a thermodynamic cycle for mutations C6-R36A and hHv1-E192A, showing large coupling energy:

FIG. 55H illustrates that in FIG. 55G, a cycle for C6-K31A with hHv1-E192A shows negligible coupling energy ($\ln\Omega \approx 0$), despite the large energetic effect of the C6-K31A mutation alone; and FIG. 55I graphically illustrates coupling energy values for the indicated combinations of peptide C6 variants and hHv1 mutations, as described in further detail in Example 4, below.

FIG. 56A-G illustrate hHv1 Inhibition by $C6_2$:

FIG. 56A illustrates T-$C6_2$ was constructed using T-C6 and replacing the encoding sequence for C6 with two C6 connected by flexible linkers with either 10 or 40 residues;

FIG. 56B illustrates inhibition of hHv1 currents in oocytes by T-C6 and T-$C6_2$ linker variants (20 ng cRNA) studied at +80 mV and shown normalized to the unblocked condition (CTL);

FIG. 56C illustrates conjugation of C6 peptides using Sortase A transpeptidase enzyme;

FIG. 56D illustrates Representative $H^+$ current traces for hHv1 channels in HEK293T cells before (Left image), and in the presence of 10 nM $C6_2$ peptide (Right image) with steps of 20 mV from −60 to +40 mV;

FIG. 56E illustrates a time course for block and unblock of hHv1 in HEK293T cells on acute application (red bar) and washout of 10 nM $C6_2$ peptide recorded at +40 mV;

FIG. 56F illustrates a dose-response relationships for $C6_2$ peptide inhibition of hHv1 in HEK293T cells at +40 mV. The inhibition constant $K_i$ of $C6_2$ for hHv1 channels was estimated from the fit to Eq. 1 to be 631±52 μM with a Hill coefficient of 1.01±0.03; and FIG. 56G illustrates a homology model of $C6_2$ and the 'down' state dimeric hHv1 model were used to build a structural model of $C6_2$-hHv1 complex using MD simulations; the $C6_2$-hHv1 complex in two orientations shows two C6 epitopes (orange) connected by a 10-residue peptide linker binding simultaneously to the two hHv1 subunits (cyan and blue), and the horizontal gray lines indicate the position of the membrane boundary, as discussed in further detail in Example 4, below.

Like reference symbols in the various drawings indicate like elements.

DETAILED DESCRIPTION

In alternative embodiments, provided are compositions comprising a synthetic peptide as provided herein, and products of manufacture and kits, and methods, for inhibiting the ability of neutrophils, or polymorphonuclear leukocytes (PMNs), to release reactive oxygen species (ROS), thus also inhibiting or ameliorating neutrophil (PMN) contribution to an inflammatory response, thus also treating, ameliorating or preventing neutrophil (PMN)-meditated inflammatory-related pathologies such as acute respiratory distress syndrome (ARDS), including ARDS caused by a viral infection such as COVID-19.

In alternative embodiments, provided are compositions, including products of manufacture and kits, and methods, for inhibiting intracellular alkalization, initiating capacitation, acrosomal reaction, and oocyte fertilization capabilities of human sperm.

In alternative embodiments, provided are compositions and methods for targeting human hHv1 in PMN because (i) the channel in these cells initiates and sustains ARDS, (ii)

C6 (SEQ ID NO:4), a unique blocker of hHv1 suppresses ROS production by human PMN[5] and (iii) C6 suppresses pulmonary compromise in an acute lung injury mouse model for ARDS.

A high-affinity and specific direct blocker of Hv1 (C6 peptide) has been used to show, first, that human sperm require hHv1-mediated H⁺ efflux to initiate capacitation, allowing the acrosomal reaction, and oocyte fertilization; and, second, that hHv1 in human PMN is required to produce and sustain release of inflammatory agents, including ROS and proteases, during the innate immune inflammatory response. Data as provided herein demonstrate a second target in the pathway: albumin (Alb) is required to activate hHv1 in human PMN and we describe a peptide (L*) that blocks Alb-activation and ROS production. Supporting our driving hypothesis, we show here that both C6 and L* inhibit hHv1 in human PMN, decreasing ROS production, and that C6 protects in an acute lung-injury mouse model, restoring lung compliance, and decreasing ROS, cytokines, protein, and cells in bronchoalveolar lavage fluid. We also present new, novel methods to speed structure-function studies and inhibitor design (T-peptides) and screen for small molecule inhibitors. We benefit from use of cutting-edge biophysical, spectroscopic, structural, and in vivo methods, and two expert collaborators.

Alb activation of hHv1 seeks the structural and mechanistic basis for the action of Alb and a more potent natural metabolite. Alb regulation of the PMN inflammatory response delineates the role of hHv1 in PMN using C6 (SEQ ID NO:4) and the peptide QAHQFEALLL (SEQ ID NO:3), also called "L*". Inhibiting PMN inflammatory pathology seeks the basis for action of C6 and L*; tests second generation peptide inhibitors and small molecule mimetics; and studies select agents on human PMN and an ARDS mouse model.

Significance: Embodiments as provided herein address an unmet medical need, recently made more apparent by the advent of COVID-19-related ARDS, and has broader influence because Hv1 and Alb in PMN and other cells are complicit in additional acute and chronic inflammatory disorders. Unique hHv1 inhibitors and innovative methods are applied herein to understand and suppress the pathophysiology of ARDS. Embodiments as provided herein address a specific unmet medical need, the absence of an effective medical therapy for Acute Respiratory Distress Syndrome (ARDS), a disorder that is fatal in 40% of patients (and is seen, for example, in patients with SARS-CoV-2 infection). Embodiments as provided herein are broadly impactful because the white blood cells called neutrophils (PMN) that damage the lungs in ARDS also cause other acute and chronic inflammatory diseases. We have showed that the human voltage-gated proton channel (hHv1) in PMN is essential to produce the inflammatory response, and provided herein is a treatment for ARDS by a novel strategy: targeting hHv1 in PMN, both directly and by blocking a natural activator of hHv1 we describe here to be required for normal hHv1 operation, thereby offering two ways to confront the disease at the earliest stage before it becomes a more complex disorder.

We designed C6 peptide to address the absence of specific inhibitors of human voltage-gated proton channels (hHv1). Two C6 bind to the two hHv1 voltage sensors at the resting state, inhibiting activation on depolarization. As discussed in Example 4, we identified the C6-hHv1 binding interface using tethered-toxin variants and channel mutants, unveiling an important role for negatively-charged lipids and present a model of the C6-hHv1 complex. We created a peptide with two C6 epitopes ($C6_2$) that binds to both channel subunits simultaneously, yielding picomolar affinity and significantly improved inhibition at high potentials. C6 and $C6_2$ are novel tools to regulate hHv1, a channel involved in innate immune system inflammatory pathophysiology, sperm capacitation, cancer cell proliferation, and tissue damage in ischemic stroke.

Pharmaceutical Compositions

In alternative embodiments, provided are pharmaceutical compositions comprising a synthetic peptide as provided herein, a recombinant nucleic acid, or an expression vehicle as provided herein, wherein optionally the pharmaceutical composition is formulated as a liposome, a dendrimer or a nanoparticle; or formulated as an aerosol, a lyophilate or a powder. In alternative embodiments, pharmaceutical compositions are provided herein are administered for: inhibiting intracellular alkalization, initiating capacitation, acrosomal reaction, and oocyte fertilization capabilities of human sperm; inhibiting the ability of neutrophils, or polymorphonuclear leukocytes (PMNs), to release reactive oxygen species (ROS); inhibiting or ameliorating neutrophil (PMN) contribution to an inflammatory response; and/or treating, ameliorating or preventing a neutrophil (PMN)-meditated inflammatory-related pathology.

In alternative embodiments, pharmaceutical composition as used herein comprises a composition that is suitable for administration to a human or animal subject. In some embodiments, a pharmaceutical composition comprises an active agent formulated together with one or more pharmaceutically acceptable carriers. In some embodiments, the active agent is present in a unit dose amount appropriate for administration in a therapeutic regimen. In some embodiments, a therapeutic regimen comprises one or more doses administered according to a schedule that has been determined to show a statistically significant probability of achieving a desired therapeutic effect when administered to a subject or population in need thereof. In some embodiments, a pharmaceutical composition may be specially formulated for administration in solid or liquid form, including those adapted for the following: oral administration, for example, drenches (aqueous or non-aqueous solutions or suspensions), tablets, for example, those targeted for buccal, sublingual, and systemic absorption, boluses, powders, granules, pastes for application to the tongue; parenteral administration, for example, by subcutaneous, intramuscular, intravenous or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream, or foam; sublingually; ocularly; transdermally; or nasally, pulmonary, and to other mucosal surfaces. In some embodiments, a pharmaceutical composition is intended and suitable for administration to a human subject. In some embodiments, a pharmaceutical composition is sterile and substantially pyrogen-free.

In some embodiments, a composition as provided herein comprises a pharmaceutically acceptable composition that includes and/or delivers a synthetic peptide as provided herein, for example, an Hv1 modulating agent as described herein. For example, in some embodiments, a provided composition includes an Hv1 modulating agent polypeptide component. Alternatively or additionally, in some embodiments, a provided composition includes a nucleic acid that encodes an Hv1 modulating agent polypeptide component, a cell that expresses (or is adapted to express) an Hv1 modulating agent polypeptide component, etc. In some embodiments Hv1 modulating agents having any of the modifications of the present disclosure are included in pharmaceutical compositions.

In some embodiments, general considerations in the formulation and manufacture of pharmaceutical agents are found, for example, in Remington's Pharmaceutical Sciences, 19.sup.th ed., Mack Publishing Co., Easton, Pa., 1995.

In alternative embodiments, pharmaceutical compositions as provided herein are in a variety of forms: these include, for example, liquid, semi-solid and solid dosage forms, such as liquid solutions (for example, injectable and infusible solutions), dispersions or suspensions, microemulsions, liposomes and suppositories. The proper fluidity of a solution can be maintained, for example, by the use of a coating such as lecithin, by the maintenance of the required particle size in the case of dispersion and by the use of surfactants. Prolonged absorption of injectable compositions can be brought about by including in the composition an agent that delays absorption, for example, monostearate salts and gelatin. The preferred form of pharmaceutical composition depends on the intended mode of administration and therapeutic application. Typical compositions are in the form of injectable or infusible solutions, such as compositions similar to those used for administration of antibodies to humans.

In alternative embodiments, a pharmaceutical composition as provided herein can include a pharmaceutically acceptable carrier. For example, pharmaceutical compositions can include a therapeutic agent in addition to one or more inactive agents such as a sterile, biocompatible carrier.

In alternative embodiments, exemplary carriers include any and all solvents, dispersion media, coatings, antibacterial and antifungal agents, isotonic and absorption delaying agents, and the like that are physiologically compatible. For example, carriers may include sterile water, saline, buffered saline, or dextrose solution. In alternative embodiments, the composition contains any of a variety of additives, such as stabilizers, buffers, excipients (for example, sugars, amino acids, etc.), or preservatives. Preferably, the carrier is suitable for oral, intravenous, intramuscular, subcutaneous, parenteral, spinal or epidermal administration (for example, by injection or infusion).

In alternative embodiments, pharmaceutical compositions as provided herein include a pharmaceutically acceptable salt, for example, a salt that retains the desired biological activity of the Hv1 modulating agent and does not impart any undesired toxicological effects (see for example, Berge, S. M., et al., J. Pharm. Sci. 66:1-19, 1977). Depending on the route of administration, the Hv1 modulating agent may be coated in a material to protect the compound from the action of acids and other natural conditions that may inactivate the compound. In certain embodiments, a pharmaceutical composition can include a therapeutic agent that is encapsulated, trapped, or bound within a lipid vesicle, a bioavailable and/or biocompatible and/or biodegradable matrix, or other microparticles.

In certain embodiments, synthetic peptide as provided herein, for example, an Hv1 modulating agent, is prepared with a carrier that protects against rapid release, such as a controlled release formulation, including implants, and microencapsulated delivery systems. Biodegradable, biocompatible polymers can be used, such as ethylene vinyl acetate, polyanhydrides, polyglycolic acid, collagen, polyorthoesters, and poly lactic acid. Many methods for the preparation of such formulations are patented or generally known. See, for example, Sustained and Controlled Release Drug Delivery Systems, J. R. Robinson, ed., Marcel Dekker, Inc., New York, 1978. Pharmaceutical formulation is a well-established art, and is further described in Gennaro (ed.), Remington: The Science and Practice of Pharmacy, 20.sup.th ed., Lippincott, Williams & Wilkins, 2000; Ansel et al., Pharmaceutical Dosage Forms and Drug Delivery Systems, 7.sup.th Ed., Lippincott Williams & Wilkins Publishers, 1999; and Kibbe (ed.), Handbook of Pharmaceutical Excipients American Pharmaceutical Association, 3rd ed., 2000.

In alternative embodiments, pharmaceutical compositions as provided herein comprise a synthetic peptide as provided herein, for example, an Hv1 modulating agent, that is not aggregated. For example, in some embodiments, less than 1%, 2%, 5%, 10%, 20%, or 30%, by dry weight or number, of Hv1 modulating agent is present in an aggregate. In alternative embodiments, pharmaceutical compositions as provided herein comprise an Hv1 modulating agent that is not denatured. For example, less than 1%, 2%, 5%, 10%, 20%, or 30%, by dry weight or number, of Hv1 modulating agents administered is denatured. In some embodiments, a provided pharmaceutical composition will include an Hv1 modulating agent that is not inactive. For example, less than 1%, 2%, 5%, 10%, 20%, or 30%, by dry weight or number, of Hv1 modulating agents administered is inactive.

In alternative embodiments, pharmaceutical compositions as provided herein are formulated to reduce immunogenicity of provided synthetic peptides as provided herein, for example, Hv1 modulating agents. For example, in some embodiments, a synthetic peptide as provided herein, or Hv1 modulating agent, is associated with (for example, bound to) an agent, such as polyethylene glycol and/or carboxymethyl cellulose, that masks its immunogenicity. In some embodiments, a provided binding agent has additional glycosylating that reduces immunogenicity.

Methods of Administration

In alternative embodiments, pharmaceutical compositions as provided herein are administered in any dose appropriate to achieve a desired outcome. In some embodiments, the desired outcome is reduction in intensity, severity, and/or frequency, and/or delay of onset of one or more symptoms of an Hv1 associated disease or condition.

In alternative embodiments, pharmaceutical compositions as provided herein are administered in a therapeutically effective amount of a synthetic peptide as provided herein, for example, a synthetic peptide as provided herein, or an Hv1 modulating agent composition, for example, an amount which is effective, upon single or multiple dose administration to a subject, in treating a subject, for example, curing, alleviating, relieving or improving at least one symptom of a disease or condition in a subject to a degree beyond that expected in the absence of such treatment. A therapeutically effective amount of the composition may vary according to factors such as the disease state, age, sex, and weight of the individual, and the ability of the compound to elicit a desired response in the individual. A therapeutically effective amount is also one in which any toxic or detrimental effects of the composition is outweighed by the therapeutically beneficial effects. A therapeutically effective dosage can modulate a measurable parameter, favorably, relative to untreated subjects. The ability of a synthetic peptide as provided herein, or an Hv1 modulating agent, to inhibit a measurable parameter can be evaluated in an animal model system predictive of efficacy in a human disorder.

In some embodiments, pharmaceutical compositions are administered in multiple doses. In some embodiments, pharmaceutical compositions are administered in multiple doses/day. In some embodiments, pharmaceutical compositions are administered according to a continuous dosing regimen, such that the subject does not undergo periods of less than therapeutic dosing interposed between periods of therapeutic dosing. In some embodiments, pharmaceutical compositions are administered according to an intermittent dosing regimen, such that the subject undergoes at least one period of less than therapeutic dosing interposed between two periods of therapeutic dosing.

Dosage regimens can be adjusted to provide the optimum desired response (for example, a therapeutic response). For example, a single bolus may be administered, several divided doses may be administered over time or the dose may be proportionally reduced or increased as indicated by the exigencies of the therapeutic situation. It is especially advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of ligand calculated to produce the desired therapeutic effect in association with the required pharmaceutical carrier.

An exemplary, non-limiting range for a therapeutically or prophylactically effective amount of a synthetic peptide as provided herein, for example, an Hv1 modulating agent described herein, is between about 0.1-20 mg/Kg, or about 1-10 mg/Kg. In some embodiments, an agent can be administered by parenteral (for example, intravenous or subcutaneous) infusion at a rate of less than 20, 10, 5, or 1 mg/min to reach a dose of about 1 to 50 mg/m.sup.2 or about 5 to 20 mg/m$^2$. It is to be noted that dosage values may vary with the type and severity of the condition to be alleviated. It is to be further understood that for any particular subject, specific dosage regimens should be adjusted over time according to the individual need and the professional judgment of the person administering or supervising the administration of the compositions (for example, the supervising physician), and that dosage ranges set forth herein are only exemplary.

In alternative embodiments, pharmaceutical compositions as provided herein are administered by a variety of routes, including oral, intravenous, intramuscular, intra-arterial, subcutaneous, intraventricular, transdermal, interdermal, rectal, intravaginal, intraperitoneal, topical (as by powders, ointments, creams, or drops), mucosal, nasal, buccal, enteral, sublingual; by intratracheal instillation, bronchial instillation, and/or inhalation; and/or as an oral spray, nasal spray, and/or aerosol. For example, for therapeutic applications, a synthetic peptide as provided herein, for example, an Hv1 modulating agent composition, can be administered by intravenous infusion at a rate of less than 30, 20, 10, 5, or 1 mg/min to reach a dose of about 1 to 100 mg/m.sup.2 or 7 to 25 mg/m.sup.2. Alternatively, the dose could be 100.mu.g/Kg, 500.mu.g/Kg, 1 mg/Kg, 5 mg/Kg, 10 mg/Kg, or 50 mg/Kg. The route and/or mode of administration will vary depending upon the desired results. In general the most appropriate route of administration will depend upon a variety of factors including the nature of the agent (for example, its stability in the environment of the gastrointestinal tract), the condition of the patient (for example, whether the patient is able to tolerate oral administration), etc.

In alternative embodiments, pharmaceutical compositions as provided herein are administered by: parenteral (for example, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal, epidural and intrastemal injection and infusion) means. In one embodiment, the Hv1 modulating agent composition is administered by intravenous infusion or injection. In another embodiment, the Hv1 modulating agent composition is administered by intramuscular or subcutaneous injection. In another embodiment, the Hv1 modulating agent composition is administered orally. In some embodiments, the Hv1 modulating agent composition is administered topically. In some embodiments, the Hv1 modulating agent composition is administered transdermally. Pharmaceutical compositions typically must be sterile and stable under the conditions of manufacture and storage.

In alternative embodiments, pharmaceutical compositions as provided herein comprise a synthetic peptide as provided herein, for example, Hv1 modulating agents, that are administered either alone or in combination with one or more other agents. In some embodiments, Hv1 modulating agents or pharmaceutical compositions of the present disclosure may be administered with one or more other Hv1 modulating agents. In some embodiments, Hv1 modulating agents or pharmaceutical compositions of the present disclosure may be administered with one or more other pharmaceutical agent including, but not limited to, small molecules, vaccines and/or antibodies. In some embodiments, Hv1 modulating agents or pharmaceutical compositions may be administered in combination with an adjuvant. Combinations of agents may be administered at the same time or formulated for delivery together. Alternatively, each agent may be administered at a dose and on a time schedule determined for that agent. Additionally, the invention encompasses the delivery of the pharmaceutical compositions in combination with agents that may improve their bioavailability, reduce or modify their metabolism, inhibit their excretion, or modify their distribution within the body. Although the pharmaceutical compositions of the present invention can be used for treatment of any subject (for example, any animal, or a human) in need thereof, they are most preferably used in the treatment of humans.

In alternative embodiments, pharmaceutical compositions as provided herein are used to impact various diseases, disorders, and conditions. In alternative embodiments, pharmaceutical compositions as provided herein are used in the treatment of Hv1 associated diseases or conditions. Synthetic peptides as provided herein, for example, Hv1 modulating agents and/or Hv1 modulating agent compositions described herein, can be administered, alone or in combination with, another agent to a subject, for example, a patient, for example, a patient who has a disorder (for example, an Hv1-associated disease or condition, for example. immune deficiency), a symptom of a disorder or a predisposition toward a disorder, with the purpose to cure, heal, alleviate, relieve, alter, remedy, ameliorate, improve or affect the disorder, the symptoms of the disorder or the predisposition toward the disorder. The treatment may also delay onset, for example, prevent onset, or prevent deterioration of a condition.

In some embodiments, synthetic peptides as provided herein, or Hv1 modulating agents, formulated in pharmaceutical compositions, are administered to a subject suffering from or susceptible to an Hv1 associated disease or condition. In some embodiments, a subject is considered to be suffering from an Hv1 associated disease or condition if the subject is displaying one or more symptoms commonly associated with said disease or condition. Synthetic peptides as provided herein, or Hv1 modulating agent compositions, may be administered prior to or after development of one or more such symptoms. For example, synthetic peptides as provided herein, or Hv1 modulating agents, are used to ameliorate inflammation, allergies, autoimmunity, cancer, asthma, brain damage from ischemic stroke, Alzheimer's disease, infertility, and numerous other conditions. In some embodiments, the desired outcome is reduction in intensity, severity, and/or frequency, and/or delay of onset of one or more of these conditions. Additionally or alternatively, Hv1 modulating agents may be used as a form of birth control by blocking sperm function.

In alternative embodiments, pharmaceutical compositions as provided herein comprise a synthetic peptide as provided herein, for example, Hv1 modulating agents, used to change any of the functions of Hv1 channels described in the present disclosure to achieve a preferred or therapeutic outcome. As described herein, Hv1 channels transport protons across cell membranes and are expressed in a variety of cells and tissues. Functions of Hv1 channels differ depending on the cells in which they are expressed. Uses for Hv1 modulating agents can include increasing or decreasing proton current across cell membranes and/or increasing or decreasing pH in the cytosolic, extracellular, or intraluminal space of cells.

In some embodiments, uses for synthetic peptides as provided herein, for example, Hv1 modulating agents, include effects on Hv1-related processes. For example, in some embodiments, Hv1 modulating agents may be used to increase or decrease the expression and/or function of NOX enzymes, including NOX1, NOX2, NOX3, and/or NOX4. In some embodiments, Hv1 modulating agents may be used to increase or decrease production of ROS.

In some embodiments, uses for synthetic peptides as provided herein, for example, Hv1 modulating agents, include altering biological functions in specific cells. For example, the function of Hv1 channels in white blood cells includes extrusion of protons to facilitate ROS production via NOX activity in the phagosome. This process allows white blood cells to destroy bacteria and other pathogens. In some embodiments, uses of Hv1 modulating agents may include changing these functions in white blood cells. Alternatively, Hv1 channel function in human sperm has been associated with sperm capacitation, activation and mobility to achieve fertilization. In some embodiments, Hv1 modulating agent uses include increasing or decreasing sperm function and/or fertilization ability.

Products of Manufacture and Kits

Provided are products of manufacture and kits for practicing methods as provided herein; and optionally, products of manufacture and kits can further comprise instructions for practicing methods as provided herein.

In addition to the synthetic peptide as provided herein, for example, Hv1 modulating agent, the composition of the kit can include other ingredients, such as a solvent or buffer, a stabilizer or a preservative, and/or a second agent for treating a condition or disorder described herein. Alternatively, other ingredients can be included in the kit, but in different compositions or containers than the Hv1 modulating agent. In such embodiments, the kit can include instructions for admixing the Hv1 modulating agent and the other ingredients, or for using the Hv1 modulating agent together with the other ingredients.

Alternatively or additionally, contents of kits may include, but are not limited to, expression plasmids containing nucleotides (or characteristic or biologically active portions) encoding synthetic peptide as provided herein, for example, Hv1 modulating agents (or characteristic or biologically active portions or fragments thereof). Alternatively or additionally, kits may contain expression plasmids that express synthetic peptide as provided herein, for example, Hv1 modulating agents (or characteristic or biologically active fragments or portions thereof). Alternatively or additionally, kits may contain isolated and stored synthetic peptide as provided herein, for example, Hv1 modulating agents.

In certain embodiments, kits for use as provided herein include, a reference sample, instructions for processing samples, performing tests on samples, instructions for interpreting the results, buffers and/or other reagents necessary for performing tests. In certain embodiments the kit can comprise a panel of antibodies.

Provided are kits for administration of pharmaceutical compositions. For example, in some embodiments, provided are kits comprising at least one dose of an Hv1 modulating agent. In some embodiments, the invention provides a kit comprising an initial unit dose and one or more subsequent unit doses of an Hv1 modulating agent. In some such embodiments, the initial unit dose is greater than the subsequent unit doses or wherein all of the doses are equal.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About (use of the term "about") can be understood as within 20%, 19%, 18%, 17%, 16%, 15%, 14%, 13%, 12% 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 75%, 80%, 85%, 90%, 91%, 92%, 93%, 94%, 95%, 96%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

The invention will be further described with reference to the examples described herein; however, it is to be understood that the invention is not limited to such examples.

EXAMPLES

Unless stated otherwise in the Examples, all recombinant DNA techniques are carried out according to standard protocols, for example, as described in Sambrook et al. (2012) Molecular Cloning: A Laboratory Manual, 4th Edition, Cold Spring Harbor Laboratory Press, NY and in Volumes 1 and 2 of Ausubel et al. (1994) Current Protocols in Molecular Biology, Current Protocols, USA. Other references for standard molecular biology techniques include Sambrook and Russell (2001) Molecular Cloning: A Laboratory Manual, Third Edition, Cold Spring Harbor Laboratory Press, NY, Volumes I and II of Brown (1998) Molecular Biology LabFax, Second Edition, Academic Press (UK). Standard materials and methods for polymerase chain reactions can be found in Dieffenbach and Dveksler (1995) PCR Primer: A Laboratory Manual, Cold Spring Harbor Laboratory Press, and in McPherson at al. (2000) PCR—Basics: From Background to Bench, First Edition, Springer Verlag, Germany.

Example 1: Human Sperm and Neutrophils Require Direct Activation of the Proton Channel by Albumin to Operate/Direct Activation of the Proton Channel by Albumin Leads to Human Sperm Capacitation and Sustained Release of Inflammatory Mediators by Neutrophils This example demonstrates that methods and compositions as provided herein are effective for inhibiting, ameliorating or preventing PMN-mediated inflammation in vivo.

Albumin (Alb) is shown here to activate human voltage-gated proton channels (hHv1). Dose-response studies reveal the concentration of Alb in semen is too low to activate hHv1 in sperm whereas the high level in uterine fluid yields proton efflux, allowing capacitation, the acrosomal reaction, and oocyte fertilization. Similarly, Alb activation of hHv1 in neutrophils allows sustained production and release of reactive oxygen species and proteases upon immune stimulation. One Alb binds to the two hHv1 voltage sensor domains (VSDs), enhancing open probability and increasing proton current. A computational model of the Alb-hHv1 complex, validated by experiments, identifies two sites in Alb domain II that bind the two hHv1 VSDs and suggests an electrostatic gating modification mechanism that favors their active "up" conformation. This report resolves longstanding conundrums: how hHv1 opens at negative sperm membrane potentials and why Alb facilitates in vitro fertilization, and describes new cellular physiology that is widespread.

Regulation of intracellular pH ($pH_i$) is essential to cell biology in health and disease[1] and, since its identification[2, 3], the human voltage-gated proton channels (hHv1) has been recognized to be both widespread and central in many of these processes[4]. Recently, we used a designed peptide inhibitor (C6) of the channel to demonstrate that $H^+$ efflux via hHv1 is required in human sperm to induce intracellular alkalization and initiate capacitation, and essential in human neutrophils to maintain cytoplasmic pH during the respiratory burst to allow reactive oxygen species (ROS) production[5], in support of earlier proposals[6-10].

hHv1 channels are comprised of two identical subunits, each with four transmembrane spans (TMs) that resemble the voltage sensor domains (VSDs) in other voltage-gated ion channels (VGICs) but lack the two additional TMs that contribute to forming the ion conduction pores in those channels[2, 3]. In hHv1, there are two $H^+$-selective conduction pathways, one in each subunit[11-13].

Albumin (Alb), is the most abundant protein in interstitial fluids where it is present at various levels (7-30 mg/mL)[14] and human plasma (34-54 mg/mL) where it is recognized to transport hormones, metabolites and drugs, serves as a circulating antioxidant, and supports oncotic pressure[15]. This ubiquitous globular protein is composed of 585 amino acids and folds into three domains[16].

We wondered about a physiological connection between Alb and hHv1 based on its contrasting concentrations in semen (just 1 mg/mL, 15 μM)[17] and in uterine fluid (34 mg/mL, 500 μM)[18] and the documented increase in reproductive success when in vitro fertilization (IVF) solutions are supplemented with Alb[19, 20] Furthermore, Alb is implicated in deleterious systemic inflammatory responses mediated by neutrophils after cardiopulmonary bypass and in periodontal disease[21, 22].

Here, we demonstrate that Alb binds directly to hHv1 to activate the channel, increasing the open probability and $H^+$ current. In human sperm, this initiates capacitation while in human neutrophils it increases peak levels of ROS release, sustains ROS production during the respiratory burst, and stimulates release of proteases in response to immune stimulation. The stoichiometry of binding, inferred by the Hill coefficient for changes in $H^+$ currents in response to Alb dose, is confirmed to be one Alb per channel using single molecule total internal reflection fluorescent (smTIRF) microscopy. Alb is shown to bind to hHv1 on the external residues linking the third and fourth transmembrane segments that comprise the voltage sensor (S3-S4 loop) in each subunit using point mutations and chimeric channels generated between hHv1 and the proton channel from *Ciona intestinalis*, CiHv1[3]. Modeling with molecular dynamics (MD) simulation points to two binding sites formed by residues in Alb domain II (DII) for the two S3-S4 loops in each hHv1 channel. The two Alb sites are validated by the effects of mutagenesis on binding as assessed by fluorescence resonance energy transfer (FRET) microscopy and electrophysiology. The structural model of the Alb-hHv1 macromolecular complex suggests an electrostatic gating modification mechanism through which binding of Alb facilitates opening of hHv1 channels by favoring the active "up" conformation of the two VSDs. The essential stimulatory role of Alb in the physiology of both sperm and neutrophils via hHv1 suggests that Alb will have as-yet unrecognized roles in the many other tissues where the channel is critical, including, the heart, the central nervous system, and cancers of the breast and gastrointestinal tract[23, 24].

Results

Alb Acts on hHv1 in Human Sperm to Initiate Capacitation

Human sperm undergo a process called capacitation in the female reproductive tract[25], whereby $pH_i$ rises stimulating Ca²⁺ influx and mobility changes[26]. This process endows sperm with the capacity to undergo the exocytotic acrosomal reaction required to penetrate the zona pellucida and fertilize the oocyte[27]. Here, Alb was observed to activate hHv1 channels in live human sperm by recording proton currents in mature non-capacitated spermatozoa, using whole-cell patch clamp as previously described[5].

The native proton channel currents were elicited by depolarizing voltage steps of 1.5 s from a holding potential of −60 mV every 10 s with a approximately 30-fold proton gradient ($pH_i$=6.0 and $pH_o$=7.4). When 80 μM Alb was applied to the sperm, the currents increased approximately 3-fold, accompanied by a approximately 3-fold acceleration of activation and a approximately 1.6-fold slowing of deactivation at +60 mV (FIG. 1a, left; Supplementary table 1). Applying different concentrations of Alb yielded an $EC_{50}$=158±16 μM with a Hill coefficient of 1.09±0.01. The mean concentration of Alb (15 μM) in human semen was too low to significantly activate hHv1, while the level in the uterus (500 μM) increased sperm proton current approximately 6-fold at +60 mV (FIG. 1b), as did 800 μM Alb in association with a half-maximal shift in the conductance-voltage (G-V) relationship ($V_{1/2}$) of −32 mV (FIG. 1b, c). In contrast, addition of a control soluble protein of similar mass, the Fab fragment of human immunoglobulin G (Fab), had no effect on the proton currents in sperm, whereas Alb-activated currents were suppressed by 1 μM C6, indicating that they were passed by hHv1 channels (FIG. 1a, right). As H⁺ currents depend on driving force, and a variety of proton concentrations ($pH_i$ and $pH_o$) and cell types are studied in this report, the effects of Alb are collated in Supplementary table 1.

We next focused on the effect of Alb on $pH_i$, as capacitation first requires H⁺ efflux via hHv1 to alkalinize sperms[5-7]. The fluorescent ratiometric pH probe BCECF was used to evaluate changes in the cytosolic pH, as previously described[28]. As anticipated, 75 μM Alb induced a robust increase in $pH_i$ in non-capacitated human sperm when compared to a control Fab protein or after blocking hHv1 with C6 (FIG. 1d). Notably, increasing levels of Alb led to greater cytoplasmic alkalization consistent with a dose-dependent increase in H⁺ efflux and changes in $pH_i$ were suppressed by the hHv1 channel blocker C6 (FIG. 1d, Supplementary FIG. 1a).

To confirm that Alb-induced changes in $pH_i$ increased Ca²⁺ influx through CatSper[5-7], non-capacitated sperm incubated with Alb were exposed to progesterone, a stimulus that triggers the acrosome reaction only if sperm have been capacitated by changes in $pH_i$ and intracellular calcium levels ([Ca²⁺]$_i$)[29, 30]. In a concentration dependent manner, Alb enhanced progesterone-induced increases in [Ca²⁺]$_i$, a change that was suppressed by the hHv1 blocker C6 (FIG. 1e, Supplementary FIG. 1b, c). Confirming that Ca²⁺ influx was mediated by CatSper, the increase in [Ca²⁺]$_i$ was also inhibited by 1 μM NNC (Supplementary FIG. 1c). Verifying that Alb did not alter dye loading to produce an artefactual change in measured [Ca²⁺]$_i$, applying the Ca²⁺ ionophore ionomycin to samples after progesterone stimulation produced the same absolute rise in peak [Ca²⁺]$_i$ in the presence and absence of 75 μM Alb (Supplementary FIG. 1d, e, f). Further, Alb was shown to have no direct effect on CatSper currents in human sperm (Supplementary FIG. 2), consistent with a report that CatSper was sensitive to bovine serum albumin (BSA) indirectly[31].

The final step, the exocytotic acrosomal reaction, requires prior capacitation[30] and was rarely observed (approximately 2%) when we added progesterone to non-capacitated sperm in the absence of Alb (FIG. 1f). In contrast, when 75 μM Alb was added to non-capacitated sperm approximately 10% of the sperm underwent exocytosis, an increase that was eliminated when sperm were incubated with the hHv1 blocker C6 (FIG. 1f). Thus, activation of hHv1 by Alb is essential for sperm alkalization and CatSper potentiation (that is, capacitation) and exocytosis (that is, the acrosomal reaction)[30].

Alb Stimulates hHv1 in Neutrophils to Augment ROS Production and Elastase Release Human neutrophils undergo a respiratory burst to produce ROS as a principal effector mechanism to kill bacteria[32]. During the respiratory burst, the NADPH oxidase 2 (NOX2) transfers electrons across the membrane, resulting in membrane depolarization and cytoplasmic acidification that suppresses ROS production[33]. To sustain NOX2 activity and ROS production, H⁺ efflux is required to maintain physiological $pH_i$ and membrane potential[23, 34].

Here, activation of hHv1 in neutrophils by Alb was demonstrated first by recording native proton currents in freshly-isolated cells from human peripheral blood by whole-cell patch clamp. Application of 450 μM Alb led to a approximately 2.5-fold increase in native proton currents at +60 mV, with a approximately 6-fold acceleration of activation and a approximately 1.5-fold slowing of deactivation, offering an estimated equilibrium affinity ($K_d$) of 112±9 μM (FIG. 2a, left) and a shift of −35 mV in the G-V relationship (Supplementary FIG. 3a and Supplementary table 1). As observed with sperm, Fab application had no effect on the current and Alb-activated proton currents were suppressed by 20 μM C6, demonstrating their passage by hHv1 (FIG. 2a, right).

To assess ROS release from the neutrophils, we used a luminol-amplified chemiluminescence assay for superoxide anion ($O_2^{·-}$) measurement[35]. Formylated bacterial peptides like fMLF stimulate the production of ROS by neutrophils by binding to G-protein coupled receptors[36] and triggering intracellular pathways that induce NOX2 to produce $O_2^{·-}$[4, 37]. Here, we observed that 1 μM fMLF stimulated a transient rise and decay in ROS release from neutrophils as expected, whereas the additional presence of 450 μM Alb led to an increase in the peak magnitude of ROS release. More significantly, Alb allowed for sustained ROS production that was still elevated at 60 min, long after release had returned to baseline in the absence of Alb (FIG. 2b, left).

ROS release potentiated by Alb was concentration-dependent across the physiological range, becoming apparent at 15 μM and maintained at a approximately 7-fold increased rate of release after 60 min with 450 μM (FIG. 2b, right). As expected, neither augmentation of peak ROS release, nor sustained ROS production, was observed with 450 μM Fab, and potentiation was fully inhibited by 20 μM C6 (FIG. 2b, right). In the absence of immune stimulation by fMLF, Alb induced no increase in ROS release above low basal levels, consistent with a role as a potentiator and not the primary stimulus (Supplementary FIG. 3b). Further, Alb potentiation of total ROS production was stimulated with as little as 10 nM fMLF (approximately 1.8-fold) and rose to approximately 5-fold with 10 μM fMLF without a shift in the fMLF dose-response curve (FIG. 2c, Supplementary FIG. 3c, d).

During the inflammatory response, neutrophils also release antimicrobial proteases that cleave bacterial virulence factors, such as elastase[38]. Thus, fMLF-induced neutrophil degranulation can be quantified by measurement of elastase release[21]. FIG. 3d shows that Alb augmented fMLF-stimulated elastase release approximately 1.5-fold whereas the same amount of Fab had no effect and, demonstrating dependence on H⁺ efflux via hHv1, augmentation was suppressed by 20 μM C6 (FIG. 2d).

hHv1 shows an "enhanced gating mode" during the neutrophil respiratory burst increasing the likelihood of channel opening that is reported to reflect protein kinase C (PKC) phosphorylation of Thr29 at N-terminus of hHv1[39]. Indicating that Alb-activation was not mediated by this mechanism, we observed that hHv1-T29A channels, which are not subject to PKC phosphorylation, were activated by Alb like WT channels (Supplementary FIG. 4).

Alb Also Activates Cloned hHv1 by Changing the Voltage-Dependence of Gating

To explore the mechanism of Alb activation, hHv1 channels were expressed in HEK293T cells and studied by whole-cell patch clamp with a 10-fold proton gradient ($pH_i$=6.5 and $pH_o$=7.5), as previously described[5]. In the absence of Alb, hHv1 currents activated slowly in response to depolarization and showed fast deactivation (FIG. 3a, left). When 75 μM Alb was added to the bath solution, hHv1 currents increased approximately 5-fold due to a approximately 8-fold acceleration of activation, a approximately 3-fold slowing of deactivation at 0 mV, and a shift in the $V_{1/2}$ of −23 mV (FIG. 3b and Supplementary table 1).

Alb stimulation of hHv1 currents was reversible and concentration-dependent with association and dissociation constants of $k_{on}$=1.3×10³±0.1×10³ M⁻¹s⁻¹ and $k_{off}$=0.084±0.009 s⁻¹ determined by single-exponential fits to the time courses for activation and deactivation, respectively (FIG. 3c). Applying different concentrations of Alb yielded an $EC_{50}$=74.8±8.7 μM with a Hill coefficient of 1.16±0.11, consistent with the binding of one Alb per hHv1 dimer (FIG. 3d). Moving sperm from the concentration of Alb in human semen (15 μM) to that in the uterus (500 μM), increased hHv1 currents approximately 8-fold at 0 mV, shifting the $V_{1/2}$ by −45 mV (FIG. 3d and Supplementary FIG. 5a, b).

The designed peptide C6 inhibits hHv1 by binding to the S3-S4 loops with positive cooperativity, one peptide on each loop (FIG. 3e), thereby biasing the voltage sensors to the down conformation that favors channel closure[5]. As a result, more positive voltages are required to open the channel pores, opening is slowed, and closing is faster; the reverse of the effects of Alb on the channel. Confirming that Alb-induced currents were due to H⁺ permeation through hHv1, 20 μM C6 suppressed nearly all the proton current (FIG. 3f).

Figure 6:
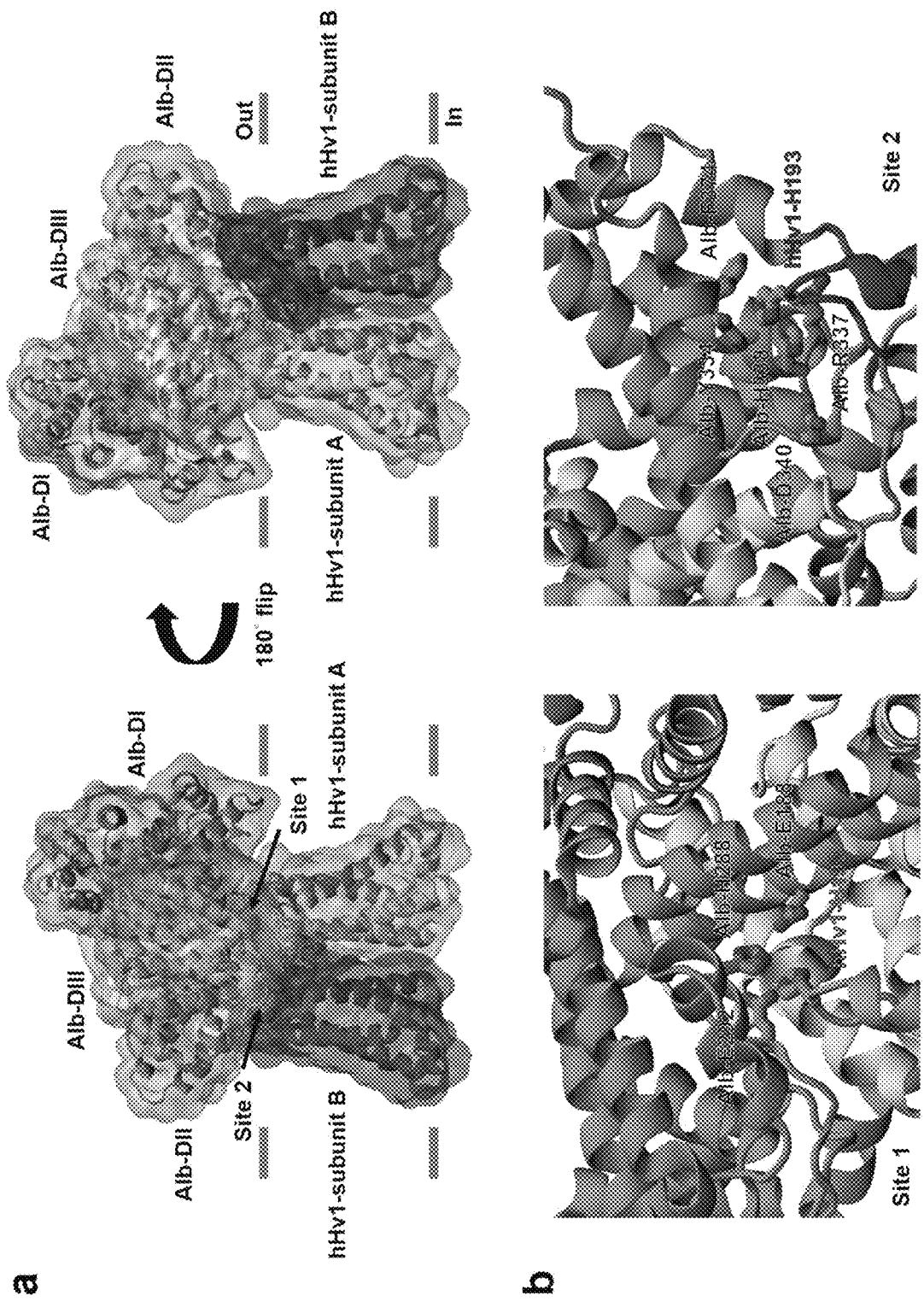

This effect of Alb showed specificity and required that the protein was intact, as neither Fab nor Alb subjected to Proteinase K digestion activated hHv1 at concentrations up to 800 μM (Supplementary FIG. 6). Specificity of Alb for hHv1 was further demonstrated by failure of Alb to activate hKv1.3, hKv2.1, hKv1.5, $hI_{Ks}$ (hKv7.1+hKCNE1), and hNav1.5 (Supplementary FIG. 7) although this represents only a sampling of the many VGICs. Alb activated hHv1 only from the extracellular solution, showing no effect from the cytosol when introduced via the pipette solution (75 μM, n=3 cells), and was observed also to activate hHv1 expressed in *Xenopus* oocytes (Supplementary FIG. 8).

A recent report indicates that a protease-digested form of hHv1 (Hv1Sper) with 68 residues removed from the N-terminus represents as much as half the channel protein isolated from human sperm when visualized by western blotting[40]. We constructed the foreshortened channel by genetic deletion of the residues, expressed it in HEK293T cells and observed the approximately −30 mV shift in the G-V relationship compared to WT hHv1 reported by Berger and colleagues[40]. Indicating that the truncated channels are also sensitive to Alb regulation, we observed application of 500 μM Alb to accelerate activation, slow deactivation, increase current magnitude, and to shift the G-V curve by −15 mV (Supplementary table 1 and supplementary FIG. 9).

Because Human Tubal Fluid Medium (HTF, pH 7.2) is routinely used for human IVF[41] to mimic the native environment, we sought to confirm that the effect of Alb on hHv1 channels was apparent in this solution using a pipette solution at pH 6.7 as estimated for sperm in the human uterus[42]. Indeed, under these conditions, 500 μM Alb increased hHv1 current approximately 10-fold at 0 mV, shifting the $V_{1/2}$ for conduction by −40 mV (Supplementary table 1 and Supplementary FIG. 10). As a result, the voltage at which hHv1 channels start to open ($V_{threshold}$) shifted from approximately 0 mV to −30 mV with Alb (Supplementary FIG. 10). These values are comparable to those observed for native proton currents in sperm where Alb produced an approximately-32 mV hyperpolarization in the $V_{1/2}$ and shifted the $V_{threshold}$ approximately-30 mV (FIG. 1c).

Alb stimulates hHv1 in neutrophils to augment ROS production and elastase release Human neutrophils manifest a respiratory burst to produce reactive oxygen species (ROS) as a principal effector mechanism to kill bacteria (El-Benna et al., 2016; Winterbourn et al., 2016). During the respiratory burst, the NADPH oxidase complex (NOX2) transfers electrons across the membrane, resulting in membrane depolarization and cytoplasmic acidification that suppresses ROS production (DeCoursey et al., 2003). In order to sustain NOX2 activity and ROS production, H⁺ efflux is required to maintain physiological $pH_i$ and membrane potential (DeCoursey, 2004; Seredenina et al., 2015).

Here, activation of hHv1 in neutrophils by Alb was demonstrated first by recording native proton currents in freshly-isolated cells from human peripheral blood by whole-cell patch clamp. Application of 450 μM Alb led to an approximately 2.5-fold increase in native proton currents at +60 mV, with an approximately 6-fold acceleration of activation and an approximately 1.5-fold slowing of deactivation, offering an estimated $K_d$ of 112±9 μM (FIG. 3A, left panel). Again, Fab application had no effect on the current and Alb-activated proton currents were suppressed by 20 μM C6, demonstrating their passage by hHv1 (FIG. 3A, right panel).

To assess ROS release from the neutrophils, we used a luminol-amplified chemiluminescence assay for superoxide anion ($O_2^{·-}$) measurement (Bedouhene et al., 2017). Formylated bacterial peptides like fMLP stimulate the production of ROS by neutrophils (Iizawa et al., 1995) by binding to G-protein coupled receptors (Wittmann et al., 2002) and triggering intracellular pathways that induce NOX2 to produce $O_2^{·-}$ (DeCoursey, 2013; Worthen et al., 1994). Here, we observed that 1 μM fMLP stimulated a transient rise and decay in ROS release from neutrophils as expected, whereas the additional presence of 450 μM Alb led to an increase in the peak magnitude of ROS release. More significantly, this allowed for sustained ROS production that was still elevated at 60 min, long after release had returned to baseline in the absence of Alb (FIG. 3B, left panel).

ROS release potentiated by Alb was concentration-dependent across the physiological range, becoming apparent at 15 μM and maintained at an approximately 7-fold increased rate of release after 60 min with 450 μM (FIG. 3B, right panel). As expected, neither augmentation of peak ROS release, nor sustained ROS production, was observed with 450 μM Fab, and potentiation was fully inhibited by 20 μM C6 (FIG. 3B, right panel). In the absence of immune stimulation by fMLP, Alb induced no increase in ROS release above low basal levels, consistent with a role as a potentiator and not the primary stimulus (FIG. S7A). Further, Alb potentiation of total ROS production was stimulated with as little as 10 nM fMLP (approximately 1.8-fold) and rose to approximately 5-fold with 10 µM fMLP without a shift in the fMLP dose-response curve (FIGS. 3C, S7B and S7C).

During the inflammatory response, neutrophils also release antimicrobial proteases that cleave bacterial virulence factors, such as elastase (Amulic et al., 2012). Thus, fMLP-induced neutrophil degranulation can be quantified by measurement of elastase release (Rabaglia et al., 2002). FIG. 3D shows that Alb augmented fMLP-stimulated elastase release approximately 1.5-fold whereas the same amount of Fab had no effect and, demonstrating dependence on H⁺ efflux via hHv1, augmentation was suppressed by 20 µM C6 (FIG. 3D).

Alb Binds to the External S3-S4 Loop of hHv1

We looked for Alb binding sites on the extracellular portions of hHv1, that is, the residues linking the four membrane-spanning segments, the S1-S2 loop and the S3-S4 loop (FIG. 3e). First, we exchanged the loops in hHv1 with those in CiHv1, a homologous proton channel insensitive to 75 µM Alb, observing when the S1-S2 loop and/or the S3-S4 loops were switched between CiHv1 and hHv1, the channels were functional (FIG. 4a, b).

CiHv1 channels carrying both the S1-S2 and S3-S4 loops of hHv1 ($h_{S1-S2, S3-S4}$CiHv1) were endowed with sensitivity to Alb, whereas transplanting only the S1-S2 loop from hHv1 into CiHv1 ($h_{S1-S2}$CiHv1) was insufficient to confer Alb-activation (FIG. 4a, b). In contrast, transferring only the S3-S4 loop from hHv1 into CiHv1 to create $h_{S3-S4}$CiHv1 conferred Alb sensitivity ($K_d$ approximately 63 µM) at levels similar to that observed with wild type (WT) hHv1 channels (Supplementary table 1). hHv1 carrying the S3-S4 loop of CiHv1 ($Ci_{S3-S4}$hHv1) became insensitive to Alb (FIG. 4a, b), supporting the conclusion that the hHv1 S3-S4 loop was the major binding epitope for Alb. Moreover, transplanting the S3-S4 loop of hHv1 into the hKv2.1 potassium channel conferred weak potentiation by Alb (Supplementary FIG. 11), supporting the notion that the mechanism of Alb action was via the voltage sensor loop.

To explore the role of the hHv1 S3-S4 loop in Alb binding, we carried out a mutational scan where loop residues 1183 to L204 were changed individually to Cys and the response of the mutant channels to Alb was studied (FIG. 4c). Two mutations, hHv1-H193C and hHv1-L200C, fully eliminated Alb activation, suggesting that these two residues may mediate direct interaction with Alb. Three other changes (hHv1-E192C, hHv1-E196C and hHv1-G199C) enhanced Alb activation. Studying these sites with further mutations yielded hHv1-G199L, a proton channel with a approximately 22-fold improvement in the Alb $EC_{50}$ (3.4±0.5 µM) compared to WT hHv1 and no change in the G-V relationship (FIG. 4d and Supplementary table 1). Furthermore, fitting the dose-response curve of Alb on the channel yielded a Hill coefficient of 0.93±0.10 like WT channels, consistent with binding of single Alb. The G199L mutant accelerated Alb association approximately 5-fold ($k_{on}$=6.9×10³±0.7×10³ M⁻¹s⁻¹) and slowed dissociation approximately 4-fold ($k_{off}$=0.022±0.003 s⁻¹).

One Alb Binds to One Dimeric hHv1 Channel

The increased affinity of Alb for hHv1-G199L channels allowed a direct study of binding using smTIRF and live cells (Methods). Alb was labeled with carboxytetramethyl-rhodamine (TAMRA) on its N-terminus to yield TAMRA-Alb and the channel was tagged on its C-terminus with a teal fluorescent protein to produce hHv1-G199L-TFP (FIG. 4e). Incubation of TAMRA-Alb with HEK293T cells expressing hHv1-G199L-TFP produced doubly-labeled particles containing both fluorescent tags at the cell surface (FIG. 4f, left). Cells subjected to intense illumination were used to count the number of Hv1-G199L-TFP subunits and TAMRA-Alb molecules by single molecule fluorophore bleaching, as previously described[5].

Control experiments with hHv1-G199L-TFP subunits showed two stepwise decreases in fluorescence in 89% of particles (FIG. 4f,g and Supplementary Table 2), as expected from hHv1 dimeric assembly. We report few, if any, monomer channels on the cell surface (Supplementary Table 2)[43], as the observed singleton events were consistent with pre-bleaching and missed events based on the bandwidth of the smTIRF systems.

When 3 µM TAMRA-Alb was applied to cells expressing hHv1-G199L-TFP, smTIRF microscopy yielded a mean Manders' coefficient for colocalization (MCC) of 0.50±0.06, suggesting that roughly half the channels were associated with TAMRA-Alb (Supplementary Table 3). Of the hHv1-G199L-TFP particles directly confirmed to be intact dimeric channels (that is, showing two TFP bleaching steps) and to be colocalized with TAMRA-Alb, 95% were observed to be associated with one Alb, and 5% were visualized with two (FIG. 4f, g and Supplementary Table 3). Binding of one Alb per dimeric hHv1 channel is reasonable given its dimensions estimated from 3D structures (30×80×80 Å³, PDB 1BM0)[16], far exceeding the exposed surface of the dimeric hHv1 channel (approximately 40×40 Å²)[43].

Figure 12:
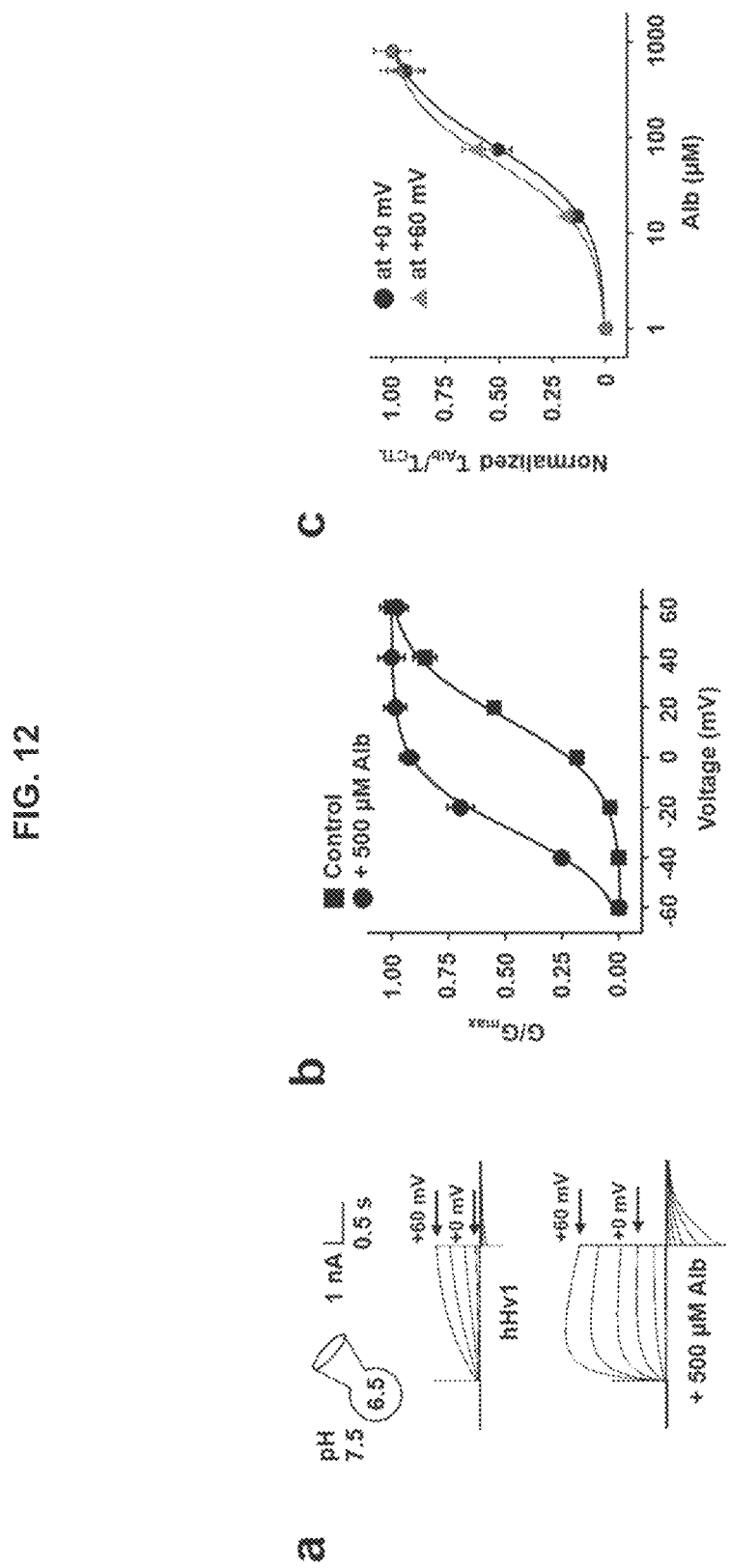

As an independent test of the 1 Alb to 1 dimeric hHv1 channel stoichiometry, we studied monomeric hHv1 (ΔhHv1), engineered by shortening the N-terminus and removing the C-terminus coiled-coil domain, as described[5]. Supplementary FIG. 12 shows that while ΔhHv1 channels were operational, they did not respond to 75 µM Alb. We suspect our observation that high Alb concentrations were able to activate ΔhHv1 with an $EC_{50}$=1,904±155 µM and a Hill coefficient of 1.05±0.06 (Supplementary FIG. 12b), reflects the response of dimeric channels that form as a minor population with these truncated subunits[43].

Alb DII is the Principal Domain for Binding to hHv1

To facilitate characterization of the Alb-hHv1 interaction by mutational screening, we constructed a gene allowing expression of Alb variants on the extracellular surface of cells via a membrane tether. The construct was comprised by the nucleotides encoding Alb (or Alb variants) in-frame with the code for the transmembrane helix of the platelet-derived growth factor receptor carrying the fluorescent protein mVenus (VFP) on its intracellular C-terminus to produce T-Alb-VFP (Methods)[44]. This permitted study of the interaction of T-Alb-VFP constructs and hHv1 tagged with teal fluorescent protein on its C-terminus (hHv1-TFP) in live cells (FIG. 5a) using FRET microscopy[45].

When T-Alb-VFP was expressed with hHv1-TFP, it potentiated the channel to a similar extent as soluble Alb. T-Alb-VFP increased current density at 0 mV approximately 3-fold, speeding the kinetics of activation approximately 4-fold, slowing deactivation approximately 2-fold, and shifting $V_{1/2}$ by −12 mV, values consistent with an effective concentration of free Alb in solution of approximately 35 µM (FIG. 5b-d). Two control tethered constructs, one with C6 peptide (T-C6-VFP) and another with no Alb insert (T-NO-VFP), further validated the approach, producing full inhibition and no potentiation, respectively (FIG. 5b, c). This data is consistent with our prior use of other tethered toxins and channels[46].

The physical interaction of T-Alb-VFP with hHv1-TFP at the membrane surface of HEK293T cells was measured using the photobleaching rate of the TFP donor (FIG. 5e). hHv1-TFP alone, and hHv1-TFP expressed with T-NO-VFP, showed a mean time constant (τ) for photobleaching of 24±4 s and 27±5 s, respectively (FIG. 5f, g). Demonstrating direct interaction of hHv1-TFP and T-Alb-VFP, the τ for hHv1-TFP increased to 54±6 s, on expression with T-Alb-VFP, and to 78±8 s on expression with T-C6-VFP (FIG. 5f, g). Consistent with the failure of Alb to activate CiHv1, no FRET was observed between CiHv1-TFP and T-Alb-VFP (FIG. 5g).

Alb consists of three homologous domains: DI (residues D1 to R197); DII (residues L198 to Q385), and DIII (residues N386 to L585)[15, 47] We investigated how each domain contributed to hHv1 binding by developing six tethered Alb domain variants, T-DI-VFP; T-DII-VFP; T-DIII-VFP; T-DI-DII-VFP; T-DII-DIII-VFP; and T-DI-DIII-VFP (Methods). When the interaction between tethered Alb domains and hHv1 channels on the cell surface were measured by FRET, the variant consisting Alb DII alone (T-DII-VFP) interacted with hHv1-TFP like WT Alb (T-Alb-VFP) (FIG. 5h). In contrast, DI alone (T-DI-VFP) appeared to interact weakly with hHv1-TFP, and T-DIII-VFP showed no evidence for a role in binding to the channel (FIG. 5h). Supporting the notion that DIII was redundant, the DI-DII variant (T-DI-DII-VFP) showed an even stronger interaction than WT Alb, while T-DII-DIII-VFP showed less FRET with hHv1-TFP than DII alone (FIG. 5h). Corroborating an essential role for DII, the variant lacking that domain (T-DI-DIII-VFP) displayed greatly reduced FRET with hHv1-TFP (FIG. 5h).

In the absence of high resolution information for the Alb-hHv1 complex, we performed an in silico docking analysis (HPEPDOCK™)[48] using the crystal structure of Alb (PDB 1BM0)[16] and the 11-residue binding epitope in S3-S4 loop of hHv1 (F190 to L200). Initial docking predicted two sites in Alb, separated by approximately 27 Å, as putative hot spots for interaction (Supplementary FIG. 13a, c). This distance is comparable to that between hHv1-H193 in the two hHv1 channel subunits (approximately 26 Å) in the structural model of hHv1 based on electron paramagnetic resonance (EPR) spectroscopy[43]. Consistent with the loss-of-function mutation that fully-eliminated Alb activation (FIG. 4c), hHv1-H193 appears to be a key component of the Alb "receptor" in the S3-S4 loop. Two low energy poses from in silico docking exhibited interaction between hHv1-H193 and Alb-E188, Alb-H288, Alb-E292 in Site 1 (Supplementary FIG. 13b). Three low energy poses exhibited interaction between hHv1-H193 and Alb-Y334, Alb-R337, Alb-H338, Alb-D340, Alb-F374, Alb-V381 in Site 2 (Supplementary FIG. 13d). These predicted interacting residues are in Alb DII, with the exception of E188 in DI, an observation supported by our FRET data (FIG. 5h).

We tested the docking predictions by generating eleven T-Alb-VFP variants, three in Site 1 (E188A, H288A, E292A) with nearby E184A as a control, and six in Site 2 (Y334A, R337A, H338A, D340A, F374A, V381A) with nearby E311A as a control. Each T-Alb-VFP mutant was evaluated for its impact on the interaction with hHv1-TFP in live cells using FRET (FIG. 5i). In Site 1, the mutation H288A showed the largest effect on Alb binding; mutants E188A, E292A had moderate effects, and nearby E184A did not alter Alb binding. In Site 2, H338A had the largest effect; Y334A, R337A, D340A and F374A had moderate effects, and both V381A and nearby E311A did not alter the binding (FIG. 5i). Thus, Alb residues H288 in Site 1 and H338 in Site 2, both in Alb DII, appeared to be fundamental to binding to hHv1.

Model of Alb Binding to hHv1

Figure 14:
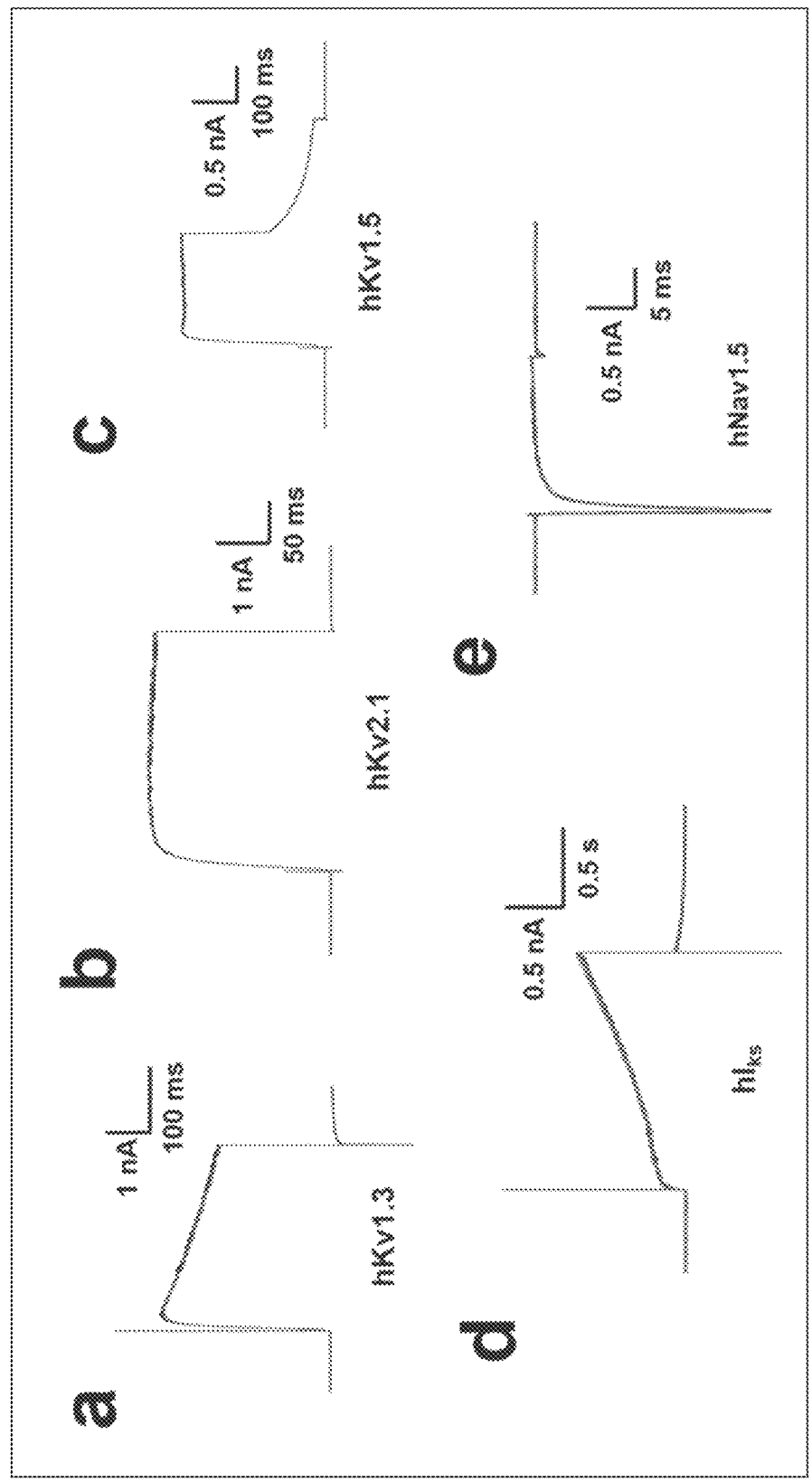

A structural model of the Alb-hHv1 complex was generated from MD simulations using the NAMD™ program[49], based on our knowledge of the interfacial residues identified as critical for binding by patch-clamp (FIG. 4c) and FRET (FIG. 5i) experiments, the crystal structure of Alb (PDB 1BM0)[16], and the EPR-derived structural model of hHv1[43] (FIG. 6a and Supplementary FIG. 14). An all-atom model of the transmembrane region of the dimeric hHv1 channel (residues G90 to I218) was embedded in a lipid bilayer with excess hydration. An Alb molecule was placed in the extracellular solution with the Alb-DII domain facing the extracellular surface of the channel (Supplementary FIG. 11). At the beginning of the simulation, the Alb molecule was pulled slowly toward hHv1 with distance restraints between centers of mass of side-chain heavy atoms of the highest-impact residues, that is, hHv1-H193 in each of channel subunit and Alb-H288 and Alb-H338, in Sites 1 and 2, respectively. These restraints with a target distance of 5 Å were gradually applied over 10 ns using the Colvars module in NAMD. The local residue-residue interactions in Site 1 (containing hHv1-H193 of subunit A and Alb-E188, Alb-H288, and Alb-E292), Site 2 (involving hHv1-H193 of subunit B and Alb-Y334, Alb-R337, Alb-H388 and Alb-F374), and other contact regions of the two proteins were refined in subsequent 150 ns simulations (Supplementary Table 4). Finally, 1.5 μs long timescale ANTON2 simulation[50] was performed to further relax the Alb-hHv1 complex (Supplementary FIGS. 15, 16 and 17).

The final Alb-hHv1 model reveals specific interactions (FIG. 6a) consistent with the experimental observations from scanning mutagenesis of the channel (FIG. 4c) and Alb (FIG. 5i). Thus, the model exhibits electrostatic interactions in Site 1 between hHv1-H193 (subunit A) and Alb-E188 and Alb-E292; and 71-71 stacking interaction between hHv1-H193 and Alb-H288 (FIG. 6b, left). In Site 2, hHv1-H193 (subunit B) interacts with Alb-Y334, Alb-R337, Alb-H338 via electrostatic and hydrogen bonding interactions and with Alb-F374 via the CH-71 or 71-71 stacking interaction (FIG. 6b, right). Here, Alb-D340 is approximately 10 Å away from hHv1-H193 (subunit B), while the mechanism underlying the disruptive effect of its mutation (FIG. 5i) requires more investigation, one explanation could be that its electrostatic interaction with Alb-H338 is important to the interaction of Alb-H338 and hHv1-H193.

hHv1-L200 was found to influence Alb activation (FIG. 4c), but is predicted to be buried in the membrane at resting state[4, 43] and did not appear to be directly involved at the interaction interface in our resting state model; we suspect that mutation might change the structure of Alb-hHv1 complex in a disruptive manner as a consequence of its location in the activated channel state.

Two experiments inspired by the MD simulation results were performed and further supported the model of the Alb-hHv1 complex. First, an unanticipated hydrogen bond between Alb-E382 near Site 2 and hHv1-Y134 (subunit B) was observed in the model. When the Glu residue was neutralized by mutation to alanine (producing T-Alb-E382A-VFP), the binding affinity of Alb to hHv1-TFP assessed by FRET was reduced (FIG. 5i). Second, the model identified hHv1-E192 in subunit A to be within 4 Å of negatively-charged Alb-E285. Neutralizing this acidic residue in Alb (Alb-E285A-VFP) improved binding with WT hHv1 (FIG. 6i). The model further rationalized mutagenesis data that had shown neutralizing hHv1-E192 increased activation by WT Alb (FIG. 4c) by removing the destabilizing electrostatic repulsion with Alb-E285.

Consistent with the notion that Alb binds to the hHv1 VSDs to activate the channels, the binding affinity of Alb was observed to increase with membrane depolarization as judged by FRET. Thus, the proton channel VSDs move "outward" to the active conformation in response to increased membrane potential[4, 5] and we observe that the affinity of the interaction of T-Alb-VFP and hHv1-TFP increased as the resting membrane potential (RMP) was increasingly depolarized from −43±6 mV to −7±2 mV by isotonic replacement of NaCl with KCl in the bath solution (FIG. 5j).

Discussion

Essential Role of Alb in Human Sperm Capacitation

Two outstanding questions in sperm physiology are answered by our identification of Alb activation hHv1 channels as central to initiation of capacitation. First, the RMP of non-capacitated sperm is estimated to be −20 mV to −40 mV[51], whereas the threshold for opening of hHv1 channels was reported to be approximately 0 mV in the ionic environment present in the uterus[4, 52, 53]. This presented an enigma, how did hHv1 open under natural conditions? Here, we answer to the conundrum; because the uterus contains approximately 500 μM Alb, the $V_{threshold}$ for hHv1 shifts to approximately −30 mV (Supplementary FIG. 10). Whereas Alb concentration is too low in semen to activate hHv1 prematurely, the level is high enough in the female reproductive tract to activate the channel and increase $H^+$ efflux, leading to intracellular alkalization and capacitation (FIG. 1, Supplementary FIGS. 1 and 10)[5, 7]. Second, our findings offer a mechanistic rationale for the increase in pregnancy rates with IVF on supplementation with Alb[19,20], one that does not comport with two prior hypotheses for the mechanism by which Alb might enhance oocyte fertilization.

Alb has been proposed to extract cholesterol from the sperm plasma membrane thereby allowing $HCO_3^-$ influx to alkalinize the cells[54], apparently obviating a role for $H^+$ flux via hHv1 that we demonstrated using C6 to block the channel[5]. Here, we observe that when Alb is pre-saturated with cholesterol it induces the same increase in $pH_i$ in non-capacitated human sperm as Alb alone (Supplementary FIG. 1g). Further, Alb pre-saturated with cholesterol activates hHv1 channels in HEK293T cells like Alb alone (Supplementary FIG. 18a), indicating that even when Alb is unable to sequester additional cholesterol it can activate the channel to achieve sperm alkalization. We support an alternative explanation for the loss of cholesterol from sperm during capacitation. Since the equilibrium level of $HCO_3^-$ in cells is a function of total carbon concentration and $pH^{55}$, alkalization caused by increased $H^+$ efflux via hHv1 will increase intracellular $HCO_3^-$ and this has been demonstrated by others to activate adenylyl cyclase and protein kinase A, upregulating phospholipid scramblases that facilitate cholesterol loss from sperm[27, 56].

A second hypothesis for augmented fertilization success with Alb has been that it sequesters $Zn^{2+}$, decreasing the already low concentration of $Zn^{2+}$ in the uterus compared to semen[57], thereby releasing hHv1 from residual $Zn^{2+}$ inhibition?. While such a role for Alb remains possible, we observe that Alb has similar stimulatory effects on hHv1-H140A and WT hHv1 channels (Supplementary FIGS. 18b, c), although the mutant has an approximately 30-fold lower affinity for $Zn^{2+}$ than WT channels[2]. This shows that hHv1 activation by Alb does not require $Zn^{2+}$ chelation.

Furthermore, hHv1 activation by Alb does not appear to result from chelation of trace elements. It has become commonplace to add EDTA or EGTA to bath solutions for biophysical studies of hHv1 because this speeds current activation, slows deactivation, and shifts the G-V relationships to more hyperpolarized potentials, increasing the current magnitude so the channel is easier to study[4]. The effects of EDTA and EGTA have been attributed to chelation of trace heavy metals contaminating salt solutions[4]. We do not support the notion that Alb activates hHv1 by chelation of trace metals, first, because Alb activation is increased (or decreased) by mutating sites on the channel (FIG. 4c) or Alb (FIG. 5i) that mediate Alb-hHv1 binding. Further, we presented two examples of mutations at the Alb-hHv1 binding interface that are suppressed by secondary mutations on the other protein (hHv1-Y134 and Alb-E382; hHv1-E192 and Alb-E285, FIG. 6i) and it seems unlikely that each mutation, and restoring counter mutation, would modify heavy metal binding by Alb especially those on the channel. Finally, the hyperpolarizing shift in the $V_{1/2}$ of hHv1 in sperm induced by EDTA is far less than that produced by Alb. Thus, the $V_{1/2}$ in the absence of both EDTA and Alb is approximately 15 mV, addition of 500 μM Alb produces a negative shift of 53 mV to −38 mV, whereas 1 mM EDTA alone produces a shift only to 4 mV (Supplementary table 5, and Supplementary FIG. 19); further suggesting that they act differently, adding both Alb and EDTA produces a smaller shift, to $V_{1/2}$=−28 mV, than Alb alone.

Similar to what we observed in sperm, 500 μM Alb alone shifts the $V_{1/2}$ of cloned hHv1 channels in HEK293T cells −45 mV (Supplementary table 5). However, in contrast to sperm, EDTA and EGTA equally effective as Alb on the heterologously-expressed channel, inducing a shift approximately −40 mV. Of note, the interaction of T-Alb-VFP and hHv1-TFP measured by FRET increases on application of 1 mM EGTA, in the same fashion as membrane depolarization (FIG. 5j). This suggests that EGTA, like Alb, favors the outward configuration of the hHv1 VSDs to increase Alb binding, shifting the $V_{1/2}$ so far that Alb has no further effect (Supplementary FIG. 20). The partial impact of EGTA/EDTA on sperm $H^+$ current compared to Alb (versus the homologous impact on the cloned channel in HEK293T cells) suggests we do not fully understand how the chemical chelators alter hHv1 function and invites further exploration.

Figure 3:
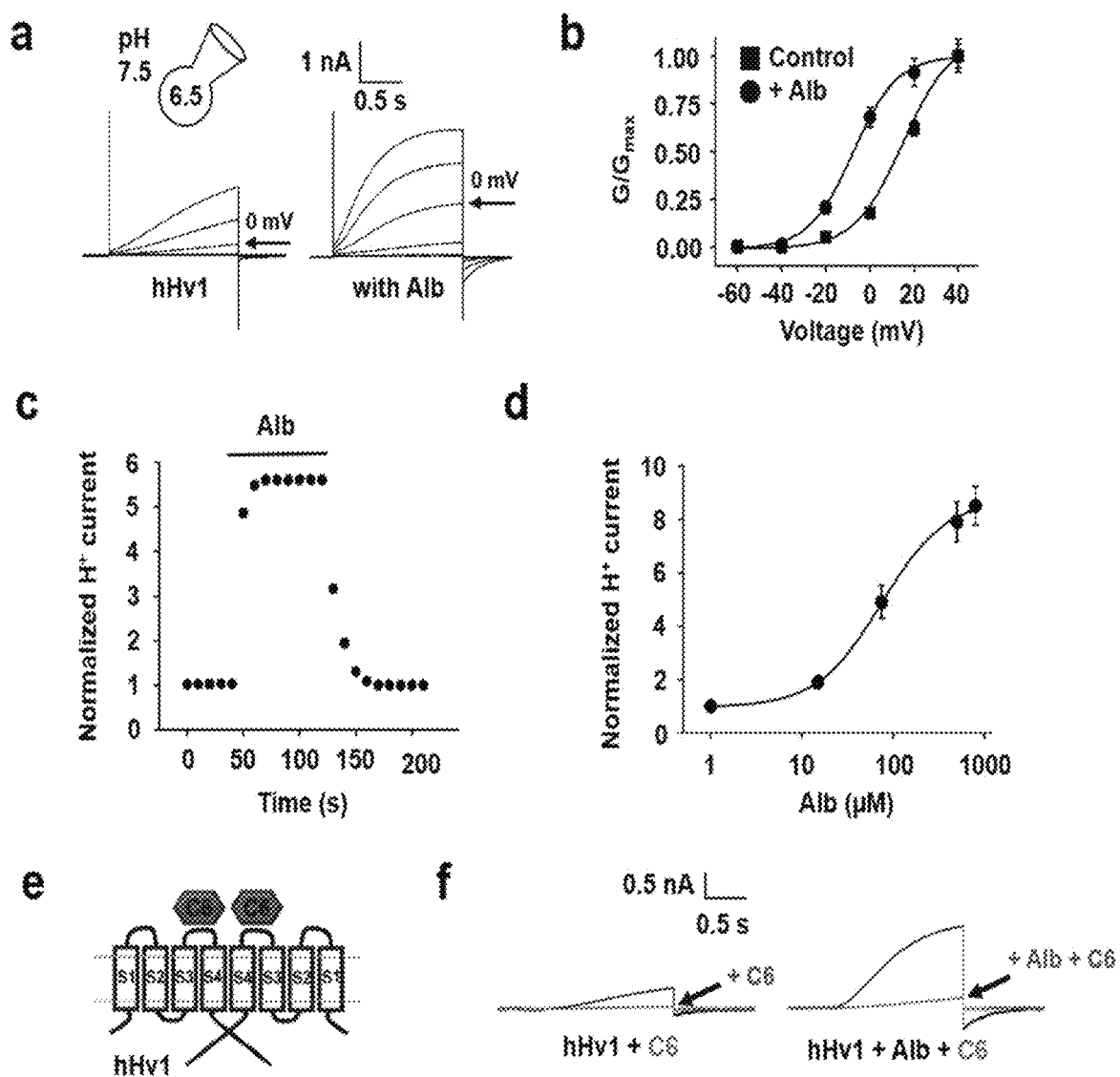
FIG. 3A-F illustrate how Alb reversibly activates hHv1, shifting activation to more negative voltages.

Alb potentiation of hHv1 is established here as a required and natural mechanism for capacitation initiation by three observations (FIG. 7a). First, our prior demonstration that block of hHv1 by C6 inhibits capacitation (FIG. 1 and Supplementary FIG. 1)[5]. Second, our demonstration here that direct binding of Alb to hHv1 shifts the $V_{threshold}$ so the channel is active at the hyperpolarized membrane potentials measured in human sperm (FIG. 1, 3 and Supplementary FIG. 3, 10). And, third, that Alb concentration in the uterus, but not semen, is sufficient to activate hHv1 (FIG. 1).

Alb Modulates the Innate Immune System Via hHv1

Neutrophils are the most abundant white blood cell type and an essential part of the innate immune system that defends against invading pathogens via ROS release, a process that is also implicated in pathogenesis related to oxidative stress[32]. When stimulated, neutrophil NOX2 produces ROS by reducing $O_2$ to $O_2^*$, a reaction that translocates electrons across the plasma membrane, depolarizing cells, and generating protons in the cytoplasm that inhibit further NOX2 activity[23, 33]. Proton efflux via Hv1 allows sustained ROS production by NOX2 by maintaining appropriate membrane potential and $pH_i$[8, 10], as demonstrated by genetic deletion of Hv1 in mice[9] and by C6 blockade in human neutrophils[5].

In this study, we used fMLF to induce the respiratory burst in human neutrophils and show that Alb acts via hHv1 to enhance NOX2 activity. Indeed, Alb was previously observed to increase ROS production by neutrophils although the relevant receptor and mechanism were unknown[22]. The importance of Alb potentiation of hHv1 in neutrophils can be inferred from estimates that during the respiratory burst the cells would depolarize from roughly −60 mV[58] to +200 mV within 20 ms without charge compensation by hHv1[34], and that activation of hHv1 is slower in the absence of Alb (FIGS. 2a and 3a). Moreover, it is projected that NOX2 activity without offset would decrease $pH_i$ by more than five units based on the amount of $O_2^-$ generation[59]. Potentiated by Alb, hHv1 opens at more negative membrane potentials and faster allowing for more effective compensation. Of note, as the concentration of stimulatory fMLF is increased, the potentiating effect of Alb increases to meet the higher demand for compensation (FIG. 2c, Supplementary FIG. 3d).

A number of the attributes of the neutrophil response appear to protect against aberrant inflammatory mediator release. Alb in the absence of a pathogenic stimulus does not induce ROS production (Supplementary FIG. 3b). Further, the level of Alb varies in different tissues[14] but it averages approximately 30 mg/mL (450 μM) in many compartments. This Alb concentration will shift the $V_{threshold}$ of hHv1 approximately-30 mV (Supplementary FIG. 3b), therefore is estimated to bring the neutrophil hHv1 $V_{threshold}$ in native environment ($pH_i$=7.3, $pH_o$=7.4) from approximately 20 mV to −10 mV, a level still far above the RMP approximately −60 mV[58] until immune stimulation produces a respiratory burst that depolarizes the cells. Indeed, in many tissue compartments Alb is low in health but increases with disease, for example, the hallmark of infectious acute respiratory distress syndrome in the lung is accumulation Alb-rich edema and neutrophilic infiltrates in the air-spaces[60]. The presence of Hv1 in mouse neutrophils has been shown to facilitate $Ca^{2+}$ influx[10], and this is required for elastase release[61]. This may explain why the action of Alb on hHv1 also increases elastase release from human neutrophils (FIG. 2d). Our findings demonstrate that Alb is an innate immune system regulator and identifies potentiation of hHv1 as a new immune boosting mechanism that enhances the inflammatory activity of neutrophils in health and disease (FIG. 7b).

A Physical Model for Alb Binding on hHv1

Given the critical physiological roles demonstrated for Alb via hHv1, and in the absence of high resolution atomic structural information, we judged it valuable and feasible to construct a structural model of the Alb-hHv1 macromolecular complex. The Alb-hHv1 model was constructed by MD simulations (FIG. 6a), and evaluated experimentally using Alb and Alb variants tethered to the extracellular surface of the cells expressing hHv1 or hHv1 variants (FIG. 5h, i), a strategy previously applied to peptide neurotoxins to identify residues important in toxin-channel complexes[46]. The model locates hHv1-H193 of subunit A in Site 1 with Alb-H288, and hHv1-H193 of subunit B in Site 2 with Alb-H338 (FIG. 6b). These interactions appear to coordinate Alb binding to the two voltage-sensor loops in hHv1 channels (FIG. 6a, b), while other Alb residues (E188, E292, Y334, R337 and F374) contribute to the two sites through a complex network of residue-residue interactions (FIG. 6b). The model rationalizes why neutralizing hHv1-E192 in the channel improves WT Alb activation (FIG. 4c). We consider limitations of our modeling approach, including the persistence of restraints during long-term simulations and our inability to simulate the complete binding/unbinding process due the large size of the system (approximately 185,000 atoms) in Supplementary FIG. 14.

Alb as an Electrostatic Gating Modifier

Some neurotoxins target VGICs to activate or inhibit the channels by favoring the "up" or "down" state of the voltage sensors, respectively. By this mechanism CssIV activates Nav1.2, while C6 inhibits hHv1[5, 62]. We suggest that the physiological effects of Alb on hHv1 take place by a similar mechanism, whereby Alb favors the activated position of the two hHv1 voltage sensors. hHv1 responds to membrane potential changes via three arginine residues, R205, R208 and R211 in the S4 helix (FIG. 7c)[4]. The residues move in the electric field facilitated by interactions with acidic residues in the neighboring S1-S3 helices[13]. Recently, a μs timescale MD simulation of hHv1 suggested that depolarization moves the S4 helix upward, placing R205 at the polar-apolar membrane surface near D123 in the S1 helix[63]. In our model of the hHv1 resting state, the S4 helices are in the "down" position, placing hHv1-I202 (one helical turn above the first gating charge hHv1-R205) in channel subunits A and B toward Alb-E294 and Alb-E297 of Alb DII, respectively. We posit that upon depolarization, the electrostatic attraction between the two hHv1-R205 residues and the two negative Alb residues, Alb-E294 and Alb-E297, lowers the energy for the upward movement of the S4 helices, accelerating and sustaining the activation of hHv1 (FIG. 7c).

Supporting the notion that Alb acts as a gating modifier, it shifts the activation of hHv1 to more negative potentials (FIG. 3b and Supplementary FIG. 5b) and speeds channel activation (FIG. 3a and Supplementary FIG. 5a). Also supporting this mechanism, the affinity of Alb for hHv1 was observed to increase with depolarization (FIG. 5j and Supplementary FIG. 5c). Finally, we highlight the fact that neutralizing the channel residue to produce hHv1-R205N yields a channel that is insensitive to Alb (Supplementary FIG. 21a), whereas hHv1-R211S channels were activated like WT (Supplementary FIG. 21b). This is in agreement with the molecular mechanism we propose based on a closed state model where hHv1-H193 in each subunit interacts with Alb-H288 or Alb-H338, and an open state model where the "up" sensor position allows the first gating charge in each channel subunit (hHv1-R205) to interact with Alb-E294 and Alb-E297, favoring the active channel conformation and potentiated proton fluxes.

hHv1 is implicated in a wide range of biological processes in addition to the capacitation of sperm and the innate immune responses we study here[4]. The channels have some notable roles in proliferation of cancer cells[24], tissue damage during ischemic stroke[64], and hypertensive injury of the kidney[65]. Because Alb is ubiquitous at levels that vary in different human compartments in health and disease[14], the potentiation of hHv1 by Alb we describe in this report will be wide-spread, tissue-dependent, and play both salutary and unfavorable roles in human physiology.

Method Details

Molecular Biology

The coding sequences for human Hv1 (NM_001040107) or *Ciona intestinalis* Hv1 (NM_001078469) were tagged with a teal fluorescent protein (TFP) via a 13-residue linker using GBLOCK™ gene fragments (Integrated DNA Technologies) and inserted into a laboratory dual-purpose vector pMAX using Gibson Assembly (New England BioLabs). $h_{S1-S2, S3-S4}$CiHv1 was constructed by replacing the nucleotides for the S1-S2 loop (L169-L187) and S3-S4 loop (G231-L254) of CiHv1 with S1-S2 loop (I121-F139) and S3-S4 loop (I183-L204) of hHv1. Similarly, $h_{S1-S2}$CiHv1 was constructed by replacing the S1-S2 loop (L169-L187) of CiHv1 with S1-S2 loop (I121-F139) of hHv1; $h_{S3-S4}$CiHv1 was constructed by replacing the S3-S4 loop (G231-L254) of CiHv1 with S3-S4 loop (I183-L204) of hHv1; and, $Ci_{S3-S4}$Hv1 was constructed by replacing the S3-S4 loop (I183-L204) of hHv1 with S3-S4 loop (G231-L254) of CiHv1. All chimeras were assembled into pMAX using Gibson assembly. Hv1Sper was constructed by truncating 67 residues at the N-terminus of hHv1 (residues from A2 to R68). hKv1.3 (NM_002232), hKv1.5 (NC_000012), hKv2.1 (NP_004966), hKCNQ1 (NM_000218), hKCNE1 (NP_000210.2), hNav1.5 (NC_000003) and the sodium voltage-gated channel R subunit 1 (NC_000019) in pMAX were used as previously described. Tethered Albumin (Alb) constructs were built in pMAX vector. To generate T-Alb-VFP, the PDGF-receptor transmembrane domain was amplified and inserted into pMAX vector. Subsequently, sequences encoding the preprotrypsin secretory pathway signal sequence (secretion signal), Alb sequence and a 16 residues flexible linker region (Gly-Asn)×8 were inserted at the 5' end of the PDGF transmembrane domain. Fluorescent protein mVenus (VFP) was attached to the C-terminus of transmembrane domain. T-C6-VFP with C6 sequence replacing Alb and T-NO-VFP without Alb sequence incorporation was constructed using the same strategy. Tethered Alb domain constructs with sequence insertion of DI (residues 1-194), DII (residues 183-387), DIII (residues 381-585), DI-DII (residues 1-387), DII-DIII (residues 183-585), and DI-DIII (residues 1-194 and 381-585, respectively) were generated[47] using PCR and then ligated into pMAX vector. Point mutations for hHv1 and T-Alb-VFP were introduced using QuikChange Site-Directed Mutagenesis Kit (Agilent). The sequences of all constructs were confirmed by DNA sequencing. Because hHv1 with V187C, L189C and L203C changes did not have expression in HEK293T cells, alanine mutations were studied at these three sites.

Cell Culture

HEK293T cells (RRID: CVCL_0063) were obtained from ATCC and used for heterologous expression. Cells were maintained in Dulbecco's Modified Eagle Medium (DMEM) (ATCC) supplemented with 10% fetal bovine serum and 1% penicillin and streptomycin (Gibco) and incubated at 37° C. in a humidified atmosphere containing 5% $CO_2$/95% air. Plasmids were transfected into cells using Lipofectamine 2000 (Life Technologies) according to the manufacturer's instructions. Experiments were preformed 24-48 hours post transfection.

Proteins, Peptides and Reagents

C6 toxin (MH828728) was purchased as synthetic peptides from CSBio. Peptide toxin folding reactions were quenched by acidification and purified by reverse-phase HPLC, as before[5]. Peptides that were more than 95% pure were lyophilized and stored at −20° C. The composition of the peptides was confirmed by mass spectral analysis. Peptides were dissolved in appropriate external solutions for whole-cell patch clamp recordings or physiological assays before use. Albumin from human serum (lyophilized powder, fatty acid free) was purchased from Sigma (A1887). Proteinase K (Lyophilized) was purchased from Promega (V3021) and the digestion was performed following the protocol supplied with the product. Purified Fab fragment of human IgG was purchased from GenWay Biotech (GWB-DD0665). Alb was labeled with 5,6-TAMRA-SE (5- (and -6-)-carboxytetramethyl-rhodamine succinimidyl ester) (Life Technologies) per manufacturer instructions. Thus, Alb was dissolved in 50 mM HEPES, 100 mM NaCl at pH 7.5 to 10 mg/mL concentration. 5,6-TAMRA-SE dye was dissolved in 500 µL DMSO. Alb and dye were mixed at a molar ratio of 1:10 for 1 h at room temperature on a rotating shaker. The labeled Alb was purified by HPLC over a 20-80% acetonitrile gradient and the corresponding single peak was collected. Samples were lyophilized and stored at −80° C. Labelled protein was dissolved in appropriate external solution before use. All the reagents and chemicals were purchased from Sigma-Aldrich unless otherwise stated.

Human Sperm Preparation

Ejaculates were obtained from healthy donors by masturbation after at least 48 h of sexual abstinence. Only semen samples that fulfilled the World Health Organization (WHO 2010) guidelines were selected for experiments. All semen donors gave written informed consent and the protocol for semen sample handling were approved by the Ethic Committee of the School of Medicine, National University of Cuyo and the Bioethics Committee at the Biotechnology Institute from the National Autonomous University of Mexico. After sample liquefaction (30 minutes at 37° C.), motile sperm were recovered after a swim-up separation for 1 h at 37° C. as described previously[5].

Human Peripheral Blood Neutrophils Purification

Human polymorphonuclear neutrophils were isolated from peripheral blood from healthy donors by Ficoll-Paque Plus (GE Healthcare) density-gradient centrifugation. Peripheral blood was obtained from Institute for Clinical and Translational Science of University of California Irvine. Donor population is composed of 50% female and 50% male with ages ranging from 23-62 years old. 20 mL blood was mixed with 3% dextran in PBS (Sigma-Aldrich) for 20 min in a 50 mL conical tube. The top clear layer containing leukocytes was collected and underlaid with 10 mL of Ficoll-Paque Plus. The cell suspension was centrifuged at 500 g for 30 min at 20° C. to separate mononuclear cells from neutrophils and the remaining red blood cells. The overlying plasma and monocyte layers were aspirated, and the neutrophils and red blood cells pellet was re-suspended in Red Blood Cells Lysis Buffer (eBioscience), incubated for 10 min to lyse red blood cells. 35 mL PBS was added to stop the lysis and the cell suspension was centrifuged at 300 g for 5 min at 4° C. Cell pellet was re-suspended in RPMI1640 (Gibco). An aliquot of neutrophils was mixed with Trypan blue (Gibco) and counted using a hemocytometer. Neutrophils isolated using this method were routinely found to be greater than 97% of the final cell preparation.

Electrophysiology

Proton current from hHv1, CiHv1 and chimera channels were recorded in whole-cell mode using an Axopatch 200B amplifier. Stimulation and data collection were achieved with a Digidata1440A and pCLAMP 10 software (Molecular Devices). HEK293T cells expressing hHv1 channel variants were perfused with a nominally divalent cation-free external solution of 100 mM HEPES, 100 mM NaCl, 10 mM glucose at pH 7.5 or human tubular fluid medium (HTF) comprising 101.6 mM NaCl, 4.69 mM KCl, 0.2 mM $MgSO_4$, 0.37 mM $KH_2PO_4$, 2.04 mM $CaCl_2$), 25 mM $NaHCO_3$, 2.78 mM Glucose, 0.33 mM Na pyruvate and 21.4 mM Na lactate at pH 7.2, unless otherwise noted. Pipettes with resistances between 3-5 MΩ were filled with 100 mM Bis-Tris buffer, 100 mM NaCl, and 10 mM glucose at pH 6.5 or 6.7. For EGTA recordings, 1 mM EGTA was added in the external solution with the supplement of 2 mM $MgCl_2$. Sampling frequency was 10 kHz and was filtered at 1 kHz. Alb was applied in the external solution through a multichannel micro-perfusion system after currents monitored by test pulses to 0 mV for 1.5 s from a holding voltage of −60 mV, with 10 s interpulse intervals, were judged to be stable. Current-voltage relationships were evoked from a holding potential of −60 mV to test pulses from −60 mV to +60 mV for 1.5 s in 20 mV intervals every 10 s. Proton currents in human neutrophils were recorded with an external solution of 100 mM HEPES, 130 mM NMDG, 10 mM glucose at pH 7.5. Pipettes with resistances between 10-15 MΩ were filled with 100 mM MES buffer, 130 mM NMDG, and 1 mM EGTA at pH 6.0. Current-voltage relationships were evoked from a holding potential of −60 mV to test pulses from −60 mV to +60 mV for 5 s in 20 mV intervals every 15 s. Current was assessed at the end of the test pulse.

The G-V relationships were determined as described by DeCoursey[68], the reversal potential ($V_{rev}$) is calculated with the equation $V_{rev}=(I_{end}-I_{tail})/(V_{test}-V_{hold})$, and were fit to the Boltzmann equation, $G=G_{max}/[1+\exp(-zF(V-V_{1/2})/RT)]$, where $G_{max}$ is maximum conductance, V is the test potential, $V_{1/2}$ is the voltage of half-maximal activation, z is the effective valence, T is the temperature, R is the gas constant, and F is the Faraday constant. Deactivation kinetics for hHv1 with and without Alb were determined by fitting traces with single exponential functions. Activation kinetics were fit with a single exponential having a delay. $k_{on}$ and $k_{off}$ were estimated from fits of the kinetics of toxin wash-in and wash-out and calculated using equations:

$$\tau_{on} = (k_{on}[Tx] + k_{off})^{-1} \quad \text{Eqn (1)}$$

and $$\tau_{off} = (k_{off})^{-1} \quad \text{Eqn (2)}$$

A dose-response curve was determined by normalizing the current or the time constants of channel activation (tact) to the values before the application of Alb, then plotting versus concentration of Alb. Dose-response curves were fitted with a Hill equation (Eqn 3) in Origin 8.0.

$$r = [Alb]^h / (EC_{50}^h + [Alb]^h) \quad \text{Eqn (3)}$$

where r is the rate of hHv1 current increasing with Alb at equilibrium, [Alb] is the concentration of Alb, and h is the Hill coefficient. The equilibrium affinity ($K_d$) of Alb for hHv1 binding was estimated similarly by Hill equation, using the rate of hHv1 τ-act increasing and assuming Hill coefficient is 1 (simple bimolecular interaction). Perforated patch clamp was performed with nystatin at 150 μg/ml in the pipette solution. After seal formation, the resting membrane potential of cells expressing hHv1 channels was measured in current-clamp configuration after attainment of whole-cell configuration with 10 mM HEPES, 136 mM KCl, 1 mM $MgCl_2$, 2 mM $K_2ATP$, 5 mM EGTA, pH 7.2 in the pipette and the bath solution described in the section Live cell FRET microscopy.

Xenopus laevis oocytes were injected with cRNA encoding hHv1 and proton current was measured using two-electrode voltage clamp (TEVC) three days thereafter. Recording solution for hHv1 was 60 mM NaCl, 1 mM $MgCl_2$, 2 mM $CaCl_2$), 120 mM HEPES, pH 7.3. Before hHv1 recording, we injected oocytes with 50 nL of 1 M HEPES (pH=7.3) to minimize pH changes due to proton efflux. This results in approximately 100 mM HEPES in the cytosol. For recording the potassium currents, Xenopus laevis oocytes were injected with cRNA encoding hKv2.1 or $h_{S3-S4}$Kv2.1. Recording solution was composed of 50 mM KCl, 50 mM NaCl, 1 mM MgCl2, 0.3 mM $CaCl_2$), 10 mM HEPES, pH 7.5. Recordings were performed with constant gravity flow of solution at 2 mL/min yielding chamber exchange in approximately 5 s. Currents were recorded 1-2 days after cRNA injection using an Oocyte clamp amplifier OC-725C (Warner Instruments, Hamden, CT), and electrodes filled with 3 M KCl with resistance of 0.3-1 MΩ. Data were filtered at 1 kHz and digitized at 20 kHz using pCLAMP 10 and assessed with Clampfit 10 and Origin 8.

Procedures of human sperm electrophysiology were approved by the Bioethics Committee at the Biotechnology Institute from the National Autonomous University of Mexico. Motile sperm were recovered after a swim-up separation for 1 h in modified Krebs-Ringer bicarbonate medium under non-capacitation conditions (without BSA and $Ca^{2+}$) at 37° C. in a humidified atmosphere of 5% $CO_2$-95% air. Spermatozoa were stored in physiological solution comprising 135 mM NaCl, 5 mM KCl, 1 mM $MgSO_4$, 2 mM $CaCl_2$), 5 mM glucose, 1 mM sodium pyruvate, 10 mM lactose and 20 mM HEPES, pH 7.4 until used in electrophysiological recordings. Whole-cell patch clamp was used to record proton currents sealing at the cytoplasmic droplet from mature human spermatozoa plated on poly-lysine coated coverslips.

Pipettes (20-30 MΩ) were filled with 135 mM N-methyl-D-glucamine (NMDG), 5 mM ethylene glycol tetraacetic acid (EGTA), and 100 mM MES adjusted to pH 6.0 with methanesulfonic acid ($CH_3SO_3H$). Seals between the patch pipette and the sperm cytoplasmic droplet were formed in physiological solution. After transition into whole-cell mode, the bath solution was changed to one that was free of added divalent cations comprised of 130 mM NMDG, 1 mM EDTA and 100 mM HEPES, pH 7.4 with $CH_3SO_3H$ to measure dose-dependent activation of proton currents by Alb (FIG. 1 a, b) and the G-V shift after application of 800 μM Alb (FIG. c). To determine the absolute effect of Alb on the G-V shift of sperm proton currents, we used the same bath solution without 1 mM EGTA (Supplementary FIG. 19 and Supplementary Table 1). CatSper currents were recorded in divalent cation-free solutions that contained 150 mM sodium gluconate, 2 mM $Na_2EDTA$, 2 mM EGTA, 20 mM HEPES, pH 7.4, and the pipette solution contained 135 mM Cs-$MeSO_3$, 5 mM CsCl, 5 mM Na-ATP, 10 mM EGTA, 20 mM HEPES, pH 7.0. For CatSper current recordings we used a conventional voltage-ramp protocol from −80 mV to +80 mV lasting 750 ms from a holding potential of 0 mV. Pulse protocol application and data acquisition were performed with a patch-clamp amplifier (Axopatch 200, Molecular Devices) and using the pCLAMP10 software (Molecular Devices). Data were sampled at 2-5 kHz and filtered at 1 kHz, and were analyzed with Clampfit 10 (Molecular Devices) and SigmaPlot 9.0 (Systat Software Inc.). Data were calculated and plotted as the mean standard error of the mean (SEM). All electrophysiological recordings were performed at 23° C.

Sperm Intracellular pH Measurements

After sperm sample liquefaction (30 minutes at 37° C.), highly motile sperm were recovered by swim-up separation for 1 hour in HTF (see above), at 37° C. in an atmosphere of 5% CO$_2$-95% air. Non-capacitated sperm were diluted to 10$^7$ sperm/mL with modified HTF (mHTF: 4 mM NaHCO$_3$ and 21 mM HEPES were used to replace 25 mM NaHCO$_3$ in HTF) and loaded with BCECF (2 µM, cell-permeant, dual-excitation ratiometric fluorescent pH probe) in the dark at 37° C. for 30 min. Fluorescence intensity was measured with an Aminco Bowman II spectrofluorometer ($\lambda_{Ex1}$=508, $\times_{Ex2}$=450, $\times_{Em}$=535). Non-capacitated sperm were allowed to stabilize until there was no change, or a small continuous change, in the fluorescent signal. Then Alb or Fab were added and changes in fluorescence were recorded for 400 s at a frequency of 0.5 Hz. High concentrations of Alb likely to cause quenching of fluorescent dyes, so 75 µM was the highest concentration tested. For the C6 group, non-capacitated sperm were incubated with 20 µM C6 for 1 h before the experiment. Conversion of the BCECF Ratio (508/450 nm) to pH value was performed using a calibration curve adjusted with a conventional pH electrode as previous described[28]. Statistical analyses were performed using the Dunnett Test.

Sperm Intracellular Ca$^{2+}$ Measurements

Non-capacitated sperm were diluted to 10$^7$ sperm/mL with mHTF and loaded with Fluo3-AM (2 µM, cell-permeant fluorescent Ca$^{2+}$ probe) in the dark at 37° C. for 30 min. Non-capacitated sperm were allowed to stabilize before 75 µM Alb was added and the changes in fluorescence intensity were measured ($\lambda_{Ex}$=505 and $\lambda_{Em}$=525) for 950 s at a frequency of 0.5 Hz. The increase in [Ca$^{2+}$]$_i$ was triggered by adding 15 µM progesterone. Raw intensity values were normalized as [(F/F0)−1], where F is fluorescence intensity at time t and F0 is the mean of F taken during the control period. In some studies, 10 µM ionomycin was applied after progesterone to study the ionophore-mediated rise in [Ca$^{2+}$]$_i$ and demonstrate that Alb did not alter dye loading; in this case normalization was to ionomycin induced peak [Ca$^{2+}$]$_i$. Statistical analyses were performed using the Dunnett Test.

Sperm Acrosome Reaction Measurements

Sperm suspensions were diluted to 10$^7$ sperm/mL with HTF and incubated 3-4 h at 37° C. in an atmosphere of 5% CO$_2$-95% air in presence of 5 mg/mL BSA to promote capacitation, or in absence of BSA for non-capacitating conditions. The effect of different concentrations of Alb, in the presence or absence of 20 µM C6 were tested. Spermatozoa were incubated for 30 min at 37° C. with 15 µM progesterone, spotted on slides, air-dried and stained with FITC-coupled Pisum sativum agglutinin (FITC-PSA, 25 µg/mL in PBS) for 40 min at room temperature. The presence of an intact acrosome was assessed in at least 200 cells per condition using an upright Nikon Optiphot II microscope equipped with epifluorescence optics. Statistical analyses were performed using Dunnett Test.

Neutrophil ROS Measurement

Human neutrophils were isolated from peripheral blood and re-suspended in Hank's Balanced Salt Solution (HBSS) comprising 138 mM NaCl, 5.4 mM KCl, 0.34 mM Na$_2$HPO$_4$, 0.44 mM KH$_2$PO$_4$, 1.3 mM CaCl$_2$), 0.5 mM MgCl$_2$, 0.4 mM MgSO$_4$, 4.2 mM NaHCO$_3$, 5.5 mM glucose and 20 mM HEPES, pH 7.2, and dispensed into white 96-Well Immuno Plates (2×10$^5$ cells/well). Neutrophils were incubated with 500 µM Luminol (Sigma) and different concentrations of Alb for 30 min at 37° C. For the C6 group, neutrophils were pre-incubated with 20 µM C6 for 30 min before the incubation with Luminol and Alb. After incubation, neutrophils were stimulated with fMLF and the chemiluminescence was measured immediately every 1 min for 60 min using Fluoroskan FL (ThermoFisher).

Neutrophil Elastase Measurement

Human neutrophils were washed and re-suspended in HBSS. Elastase release from neutrophils was evaluated using Elastase Substrate I, Colorimetric, AAPV-pNA (Millipore). All experiments were performed in polypropylene microcentrifuge tubes. Following the 30 min incubation with Alb or control protein Fab at 37° C. neutrophils (6.5×10$^5$ cells per tube) were subjected to stimulation using 1 µM fMLF. All cells were incubated for another 5 minutes and subsequently centrifuged at 400 g for 5 min. The cell free supernatant was added to individual microplate wells to achieve a total reaction volume of 200 µL per well and an AAPV-pNA concentration of 0.4 mM. Reactions were performed at 37° C. for 1 hour, following which absorbance was measured at 405 nm. An extinction coefficient of 8.8×10$^3$ cm/M was used to calculate the units of elastase released. This number was then divided by the total neutrophil elastase content as determined from the Triton X-100 incubated neutrophils yielding the percentage of total elastase release for each group.

Two Color smTIRF and Photobleaching

HEK293T cells were seeded on glass bottom dishes (Chemglass Life Science) and transfected with hHv1-G199L-TFP. The surface density of channel molecules was kept less than 200 in a 10×10 µm field to minimize the overlapping of multiple channels within a diffraction-limited spot. TAMRA-Alb was added in 100 mM HEPES, 90 mM NaCl, 10 mM KCl, 0.5 mM CaCl$_2$), 1.2 mM MgCl$_2$, and 10 mM glucose, pH 7.5 to the dishes and incubate 30 min for reaching binding equilibrium. Cells were extensively washed to remove nonspecifically bound TAMRA-Alb before recording. Single protein molecules or complexes at the surface of live HEK293T cells were identified using TIRF microscope as described[5]. The critical angle for TIRF was adjusted using a CellTIRF illuminator (Olympus) and a high numerical aperture apochromat objective (150×, 1.45 NA) mounted on an automated fluorescence microscope controlled by Metamorph software (Molecular Devices). Metamorph was used to simultaneously illuminate both fluorophores at a critical angle such that only 100 nm deep was illuminated. TAMRA was excited with the 561 nm laser line and TFP was excited with a 445 nm laser line. Emitted light signals were split with a 520 nm dichroic mirror mounted in a DualView adapter (Photometrics), which allows each wavelength to be directed to one half of a back-illuminated EM-CCD. Stoichiometry was assessed by simultaneous photobleaching with continual excitation. Data was captured as movies of 100-370 frames acquired at 1 Hz.

Data was analyzed as previously described[5]. When TAMRA was with TFP in the same cell, the data for each fluorophore were saved as separate stacks and processed in an identical manner. The Manders' coefficient of colocalization (MMC) between fluorophores was determined by unbiased intensity correlation analysis using the Coloc2 plugin in ImageJ to confirm overlap of the two molecules. Fluorescence measured from each region was plotted versus time to determine the number of bleaching steps at each point. Statistical analyses to calculate estimated confidence with which stoichiometry could be inferred from the observed data and θ, the probability of successfully observing each possible photobleaching event, were performed in R Studio, based on methods developed by Hines[66]. The densities of colocalized and single fluorescent spots were determined following thresholding and watershed separation in ImageJ. Then the particle number was counted in separate regions for 3-5 cells per group using the Analyze particles plugin.

Single-molecule photobleaching events are missed in practical application to biological systems because of fluorophore prebleaching, the quantum efficiency of the fluorophore, and the time resolution of smTIRF system; in our studies, the error is estimated to be less than 10% as previously demonstrated[5, 46].

Live Cell FRET Microscopy

Donor-decay time-course was studied as before[45], using an Olympus inverted epi-fluorescence microscope. HEK293T cells were seeded on glass bottom dishes (Chemglass Life Science) and transfected with hHv1-TFP and T-Alb-VFP variants. Cells were recorded in a solution comprising 100 mM HEPES, 90 mM NaCl, 10 mM KCl, 0.5 mM $CaCl_2$), 1.2 mM $MgCl_2$, and 10 mM glucose, pH 7.5. Resting membrane potential (RMP) was altered by isotonic replacement of extracellular NaCl with KCl. For EGTA studies, 1 mM was added to the 10 mM KCl bath solution. TFP was excited at 445 nm and the emission collected through a 470-500 nm bandpass filter, VFP was excited at 514 nm and the emission collected through a 525-575 nm filter. Images were captured using a scientific camera controlled by Metamorph software (Molecular Devices) and were analyzed with ImageJ as described, 45.

Protein-Peptide in Silico Docking

Unguided docking was performed using the amino acid sequence of the S3-S4 loop peptide of hHv1 (F190 to L200) and the crystal structure of Alb (PDB: 1BM0), to predict potential binding sites, using HPEPDOCK web server[48].

Molecular Dynamics Simulations

The initial structure of the dimeric hHv1 (only the transmembrane region: residues G90 to I218) at resting state was adopted from our previous study where the model was generated and refined by molecular dynamics (MD) simulations using spectroscopic constraints[43]. The hHv1 modeling structure was embedded in an explicit POPC lipid bilayer using the program VMD[69], while the crystal structure of Alb (PDB 1BM0; residues S5 to A582) was placed in the extracellular side with its DII domain and the two potential binding sites facing the S3-S4 loops of hHv1, fully solvated in a 100 mM KCl solution. The final system contained approximately 185,000 atoms and was electrically neutral. The H193 on the subunit A of hHv1 was modeled in a protonated state to form hydrogen bonding interactions with E188 and E292 of Alb. Of note, the two glutamate residues could be the potential hydrogen bond donors as well.

The system was initially minimized for 5,000 steps, followed by 10 ns equilibration with positional restraints (0.5 kcal/mol/Å$^2$) being applied to the backbone of the whole Alb and the transmembrane helices of hHv1 to relax with the lipids. Then, the positional restraints were removed except the intracellular half of the transmembrane helicesS4 of hHv1 (residues R205 to I218), which were used to maintain the dimeric interface of hHv1 as its cytosolic coiled-coil structure was excluded from the model to minimize the size of the system. The distance of center of mass between the side-chain heavy atoms of hHv1-H193 (subunit A) and Alb-H288, and hHv1-H193 (subunit B) and Alb-H338 was gradually decreased (approaching to 5 Å) in 10 ns to pull Alb toward hHv1 using the Colvars module[70]. Meanwhile, the S1-S2 loops of the dimeric hHv1 were given a distance restraint for optimized Alb contact with hHv1. After that, 150 ns simulations were performed with different combinations of distance restraints between hHv1-H193 and their potential partners on Alb (Supplementary Table 4) to explore the interacting networks at the two binding sites and other contact regions of the complex where spontaneously and transiently formed hydrogen bonds between hHv1 and Alb had been found during the simulations. We used the distance restraints without angle restraints to determine if the enforced interaction was favorable. If the restrained interaction was favorable, a correct hydrogen-bonding angle formed automatically (Supplementary FIG. 14).

During the simulations, we found that E294 and E297 on Alb were close to I202 of hHv1, a helix turn upward the first gating charge R205, making E294 and E297 the probable negative countercharges activating the outward movement of the S4 helices of the dimeric hHv1. Thus, we generated and simulated another system of the Alb and hHv1 complex using the "up" state hHv1 (residues G90 to K221) from our previous study[43]. The simulation protocol was similar to the resting state model system with a total simulation time of 150 ns.

The MD simulations were carried out in the periodic boundary conditions with a time step of 2 fs using the NAMD software program[49]. The CHARMM36 parameter set[71] was used for proteins, lipids and ions, and the TIP3P model for water. The temperature and pressure were constrained at 300 K and 1 atm, respectively, using the Langevin dynamics and the Nose-Hoover Langevin piston method[71]. The long-range electrostatic force was calculated with the particle-mesh Ewald method[73], and the short-range electrostatic and van der Waals interactions were smoothly switched off at 10-12 Å.

The evaluate the stability of the binding interactions of the two proteins, the two systems were further subjected to microsecond scale long simulations with ANTON2[50], a special-purpose computer for long time scale MD simulations (Supplementary FIG. 15, 16, 17). The simulations were performed with 16 pairs of distance restraints, as shown in Supplementary Table 4, (derived from the MD simulations with NAMD) for 1.0 µs. These pairwise interactions were selected based on the examination of our initial MD simulation results with NAMD and our functional data. After that, another 0.5 µs run was performed only with the distance restraints being replaced by positional restraints on the backbone atoms of binding site residues (site 1: H288, E188, E292, R160, E153, and site 2: Y334, F374, R337, H338) of Alb and the backbone and $C_\beta$, $C_\gamma$ atoms of hHv1-H193. In all these ANTON2 simulations, positional restraints were applied on the alpha carbon atoms of the intracellular part of the transmembrane helices of hHv1 with the positional restraints on the backbone atoms of the intracellular part of S4 and the center-of-mass of the backbone atoms of the first two domains of Alb. The force filed, temperature, pressure, and time step were the same as those used in the MD simulations with NAMD. The temperature and pressure were constrained using the Nose-Hoover thermostat and the semi-isotropic MTK barostat[72]. PCA analysis was performed using the PyEMMA and Prody packages.

Statistics

Statistical analyses were performed using the Dunnett Test, *P<0.05, P<0.01, *P<0.001. Data are presented, where indicated as the mean±standard error of the mean (SEM). The number of replicates for each study are described in the legends.

FIGURES LEGENDS

FIG. 1. Alb Activates hHv1 in Human Sperm to Initiate Capacitation and Allow the Acrosome Reaction As described in the Methods, mature human spermatozoa were collected and recorded by whole-cell patch clamp or studied using spectrofluorimetry. Alb in all studies was fatty acid-free. Values are mean±SEM, n=3-4 cells (patch clamp) or independent experiments for each condition. $10^7$ sperm were used in each measurement. Statistical analyses were performed using the Dunnett Test, *P<0.05, P<0.01, *P<0.001.

- a, Left, Representative proton current traces in non-capacitated human sperm in the absence (top) and presence (bottom) of 80 µM Alb in response to test pulses from −60 and +60 mV in 20 mV increments from a holding voltage of −60 mV every 10 s with a approximately 30-fold proton gradient ($pH_i$=6.0 and $pH_o$=7.4) using divalent cation-free bath solution. Right, hHv1 currents measured at the end of a test pulse to +60 mV after exposing sperm to 80 µM Fab (black), 80 µM Alb (grey), or 80 µM Alb+1 µM C6 (red). Values are normalized to mean proton current amplitude in the absence of Alb. The C6 peptide blocked 86±3% of the proton current activated by Alb.
- b, Dose-response relationships for Alb potentiation of sperm proton current at depolarization voltage of +60 mV. The half maximal effective concentration ($EC_{50}$) of Alb for activating sperm proton current was estimated from the fit to Hill relationship as 158±16 µM with a Hill coefficient of 1.09±0.01. Values are normalized to mean proton currents amplitude in the absence of Alb.
- c, Conductance-voltage relationships (G-V) for sperm proton currents in the absence (■) or presence of 800 µM Alb (●). The proton conductance in sperm showed a −32±3 mV shift after exposure to 800 µM Alb from 4±1 mV to −28±2 mV (Supplementary table 5). Curves were fit to a Boltzmann equation, as described in Methods.
- d, Left, Non-capacitated sperm were loaded with the fluorescent ratiometric pH probe BCECF and changes of fluorescence intensity were measured. 75 µM Alb (grey) increased $pH_i$ and the increase was inhibited by 20 µM C6 (red). 75 µM Fab alone had no effect (black). Right, BCECF fluorescent signals were converted to ΔpH according to the lineal relation between fluorescence ratio values ($R_{F508/F450}$) and $pH_i$ values as described (Methods). Alb-induced cytoplasmic alkalization in a concentration dependent manner (grey). The Alb-triggered $pH_i$ increase was inhibited by C6 (red) and Fab did not increase the $pH_i$ (black) (and Supplementary FIG. 1a).
- e, Non-capacitated sperm were loaded with the fluorescent intracellular calcium indicator Fluo-3 and changes in fluorescence were measured. Alb potentiates the increase of $[Ca^{2+}]_i$ induced by progesterone (15 µM) in a concentration dependent manner (grey bars). The $[Ca^{2+}]_i$ increase potentiated by 75 µM Alb was 2.3-fold and this was fully suppressed by 20 µM C6 peptide (red bar) (and Supplementary FIG. 1b, c).
- f, Acrosomal exocytosis induced by 15 µM progesterone was evaluated in diluted human sperm suspensions under different conditions as described (Methods). Upon progesterone stimulation, control capacitated sperm underwent the acrosome reaction (Cap, black bar), whereas non-capacitated sperm did not (Non-Cap, black bar). Incubation of C6 peptide (20 µM) with non-capacitated sperm had no effect (C6+Non-Cap, black bar). In a concentration dependent manner, incubation with Alb increased the progesterone-induced acrosome reaction (grey bars) in non-capacitated sperm; addition of C6 (20 µM, red bar) fully inhibited exocytosis stimulated by 75 µM Alb.

Figure 2:
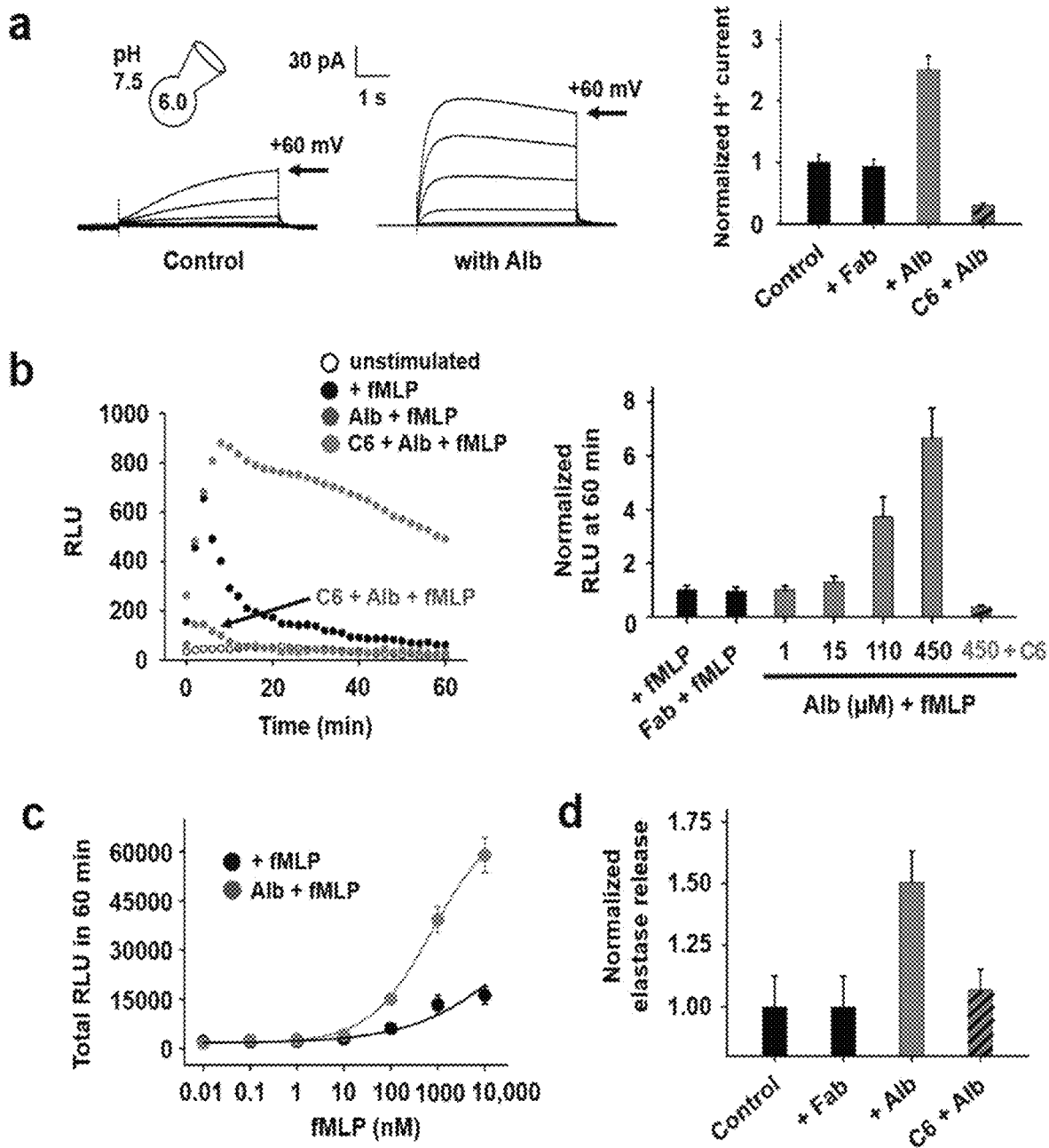
FIG. 2A-D illustrate data showing how Alb activates hHv1 in human neutrophils to increase ROS production and elastase release.

FIG. 2: Alb Activates hHv1 in Human Neutrophils to Increase ROS Production and Elastase Release Human neutrophils were isolated from peripheral blood of healthy volunteers and recorded by whole-cell patch clamp or studied using microplate luminometer (Methods). Values are mean±SEM, n=3-4 human neutrophils (patch clamp) or independent experiments with neutrophils at the numbers indicated.

- a, Representative proton currents via hHv1 in human neutrophils studied in the absence (left) and presence (middle) of 450 µM Alb in response to test pulses from −60 and +60 mV in 20 mV increments, from a holding voltage of −60 mV every 15 s with a approximately 30-fold proton gradient ($pH_i$=6.0 and $pH_o$=7.5) in divalent cation-free bath solution. Fitting the activation and deactivation of proton currents at +60 mV to a single exponential gave time constants that are reported in Supplementary table 1. Right, hHv1 currents measured at the peak of a test pulse to +60 mV after exposing neutrophils to 450 µM Fab (black), 450 µM Alb (grey), or 450 µM Alb+20 µM C6 (red). Values are normalized to mean proton current amplitude in the absence of Alb. The C6 peptide blocked 87±2% of of the proton current activated by Alb.
- b, Left, effect of fMLF alone or in combination with Alb on ROS production by human neutrophils. Human neutrophils ($2\times10^5$ cells) were incubated in HBSS without or with 450 µM Alb for 30 min at 37° C., then stimulated with 1 µM fMLF. ROS was measured using luminol, a chemiluminescent substrate. ROS production from unstimulated neutrophils is negligible (○). Alb (●) enhanced and sustained the fMLF-stimulated ROS production compared to neutrophils stimulated with fMLF alone (●). Incubation with 20 µM C6 (●) inhibited ROS production potentiated by 450 µM Alb. Right, ROS produced 60 min after fMLF stimulation. In a concentration dependent manner, incubation with Alb increased the fMLF-stimulated ROS production by human neutrophils (grey bars); addition of C6 (20 µM, red bar) inhibited the ROS production potentiated by 450 µM Alb. 450 µM Fab had no effect on fMLF-stimulated ROS production (black bar). Values are normalized to mean ROS production by neutrophils stimulated with fMLF alone.
- c, Human neutrophils ($2\times10^5$ cells) were incubated without (0) or with 450 µM Alb (0) and then stimulated with increasing concentrations of fMLF. ROS were measured as described in panel b. The potentiation by Alb of total ROS production became appreciable at 10 nM fMLF and increased with increasing fMLF (Supplementary FIG. 3d). Some error bars are smaller than symbols.
- d, Human neutrophils ($6\times10^5$ cells) were incubated with Alb for 30 min at 37° C. and then stimulated with 1 µM fMLF. Total elastase release at each test condition was measured spectrophotometrically (Methods). The values are normalized to elastase release stimulated with fMLF alone (Control, black). 450 µM Alb increased the elastase release by neutrophils (grey), and the increase was inhibited by 20 µM C6 (red) whereas 450 µM Fab had no effect on fMLF-stimulated elastase release (black).

FIG. 3: Alb Reversibly Activates hHv1, Shifting Activation to More Negative Voltages hHv1 channels were expressed in HEK293T cells and studied by whole-cell patch clamp to determine biophysical parameters using 1.5 s test steps to 0 mV from a holding voltage of −60 mV every 10 s with a 10-fold proton gradient ($pH_i$=6.5 and $pH_o$=7.5) and divalent cation-free bath solution, as described in Methods. Values are mean±SEM, n=6-8 cells for each condition. Some error bars are smaller than symbols.

- a, Representative proton current traces for hHv1 channels before (left), and in the presence of 75 µM Alb (right), with steps of 20 mV increments from −60 mV to +40 mV. The current measured at the end of depolarization was used to determine the extent of activation. Fitting the activation and deactivation of proton currents at 0 mV to a single exponential function gave time constants $\tau_{-act}$ of 2619.8±222.3 ms and 332.3±30.6 ms, $\tau_{-tail}$ of 86.9±8.4 ms and 235.0±29.7 ms without and with Alb, respectively.
- b, G-V for hHv1 in the absence (■) or presence of 75 µM Alb (●). hHv1 channels showed a −23±3 mV shift after exposure to 75 µM Alb from 15±2 mV to −8±1 mV. Curves are fitting to the Boltzmann equation as described in Methods.
- c, Time course for activation and deactivation of hHv1 on acute application (bar) and washout of 75 µM Alb. Currents were recorded at 0 mV. Values are normalized to the control current before the application of Alb.
- d, Dose-response relationships for Alb activation of hHv1 at depolarization voltage of 0 mV. The $EC_{50}$ of Alb for hHv1 channels was estimated from the fit to Hill relationship as 74.8±8.7 µM with a Hill coefficient of 1.16±0.11. Values are normalized to mean proton currents amplitude in the absence of Alb.
- e, Cartoon showing two C6 peptides binding to an intact dimeric hHv1 channel.
- f, 20 µM C6 peptide (red trace) was applied to cells after control pulses (black trace) without Alb (left) or after pre-activation with 75 µM Alb (right). C6 inhibited approximately 92% of proton current through hHv1 (left), which is similar to the extent of inhibition (approximately 89%) with Alb pre-activation (right).

Figure 4:
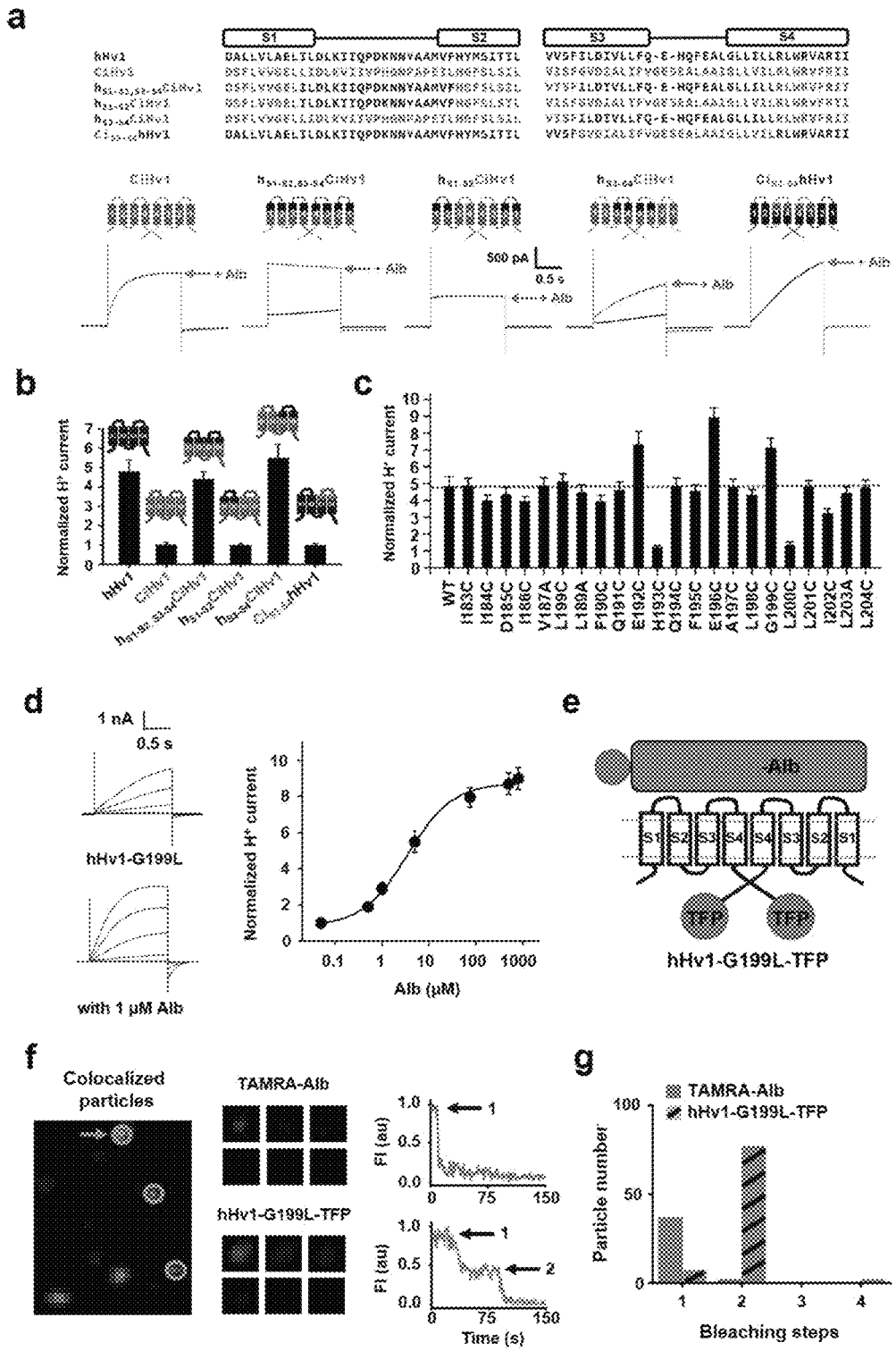

FIG. 4: Alb Binds to S3-S4 Loop of hHv1 Channels hHv1, CiHv1, hHv1-G199L and chimeric channels were expressed in HEK293T cells and studied by whole-cell patch clamp as described in FIG. 3. Alb labeled with a red fluorophore (TAMRA-Alb) was studied with hHv1-G199L channels tagged with teal fluorescent protein (hHv1-G199L-TFP) in HEK293T cells by smTIRF microscopy as described in the Methods. Values are mean±SEM, n=3-8 for each channel construct or mutation.

- a, Top, sequence alignments of the S1-S2 and S3-S4 motifs of hHv1 (black), CiHv1 (blue) and loop-transplant chimeras. The S1-S2 or/and S3-S4 loop of hHv1 or CiHv1 (I121 to F139 and I183 to L204, respectively, numbered according to hHv1) were transplanted into the corresponding region of CiHv1 or hHv1 to produce functional chimeric channels, as described (Methods). Bottom, representative proton current traces at 0 mV for channels in the absence (black trace) or presence of 75 µM Alb (red trace).
- b, Activation by Alb (75 µM) of WT and chimeric channels, current at the end of a test pulse to 0 mV is plotted. Values are normalized to the control current amplitude before the Alb application. The cartoons represent the topology of a single subunit with hHv1 segments in black and CiHv1 segments in blue). The S3-S4 loop of hHv1 confers Alb sensitivity to $h_{S3-S4}$CiHv1 channel chimeras.
- c, A mutagenesis scan of the S3-S4 loop of hHv1 (substitution with Cys except for V187A, L189A and L203A) showing changes in Alb activation; the numbering corresponds to the amino acid sequence of hHv1. Each mutant was examined with Alb at 75 µM and measured with tests pulse to 0 mV. Values are normalized to the control currents amplitude before the application of Alb.
- d, Left, representative proton current traces for hHv1-G199L channels in the absence (up) and presence of 1 µM Alb (bottom) with steps of 20 mV from −60 mV to +40 mV. Right, Alb dose-response relationship for hHv1-G199L provides an $EC_{50}$ for Alb activation of 3.4±0.5 µM when estimated by the fit to a Hill relationship with a coefficient of 0.93±0.10. Values are normalized to mean proton current amplitude in the absence of Alb. Some error bars are smaller than symbols.
- e, Cartoon of one TAMRA-Alb molecule binding to the two subunits in a hHv1-G199L-TFP channel.
- f, Left, incubation of TAMRA-Alb (red) with heterologously expressed hHv1-G199L-TFP (teal) results in single colocalized particles (white) with both TAMRA and TFP fluorescence at the surface of cells (yellow circles). Middle, montage of photobleaching time course of a single fluorescent particle (indicated by arrow in left panel) during continuous excitation to bleach the fluorophores (every fifth frame shown). Right, time courses for simultaneous photobleaching of both fluorophores in the particle, showing one stepwise change in fluorescence intensity for TAMRA-Alb and two for hHv1-G199L-TFP (arrows).
- g, Histogram of photobleaching steps for hHv1-G199L-TFP (teal bars) and TAMRA-Alb (red bars) on simultaneous photobleaching. 89% of studied particles with hHv1-TFP were bleached in 2 steps. The data analyzed by the approach of Hines[66] estimate hHv1-G199L channels in surface particles formed with two subunits, with an assessed confidence of >0.999 (Supplementary Table 2). Among all colocalized particles containing both fluorescent colors, 95% have one TAMRA-Alb bleaching step at 3 µM TAMRA-Alb (Supplementary Table 3).

Figure 5:
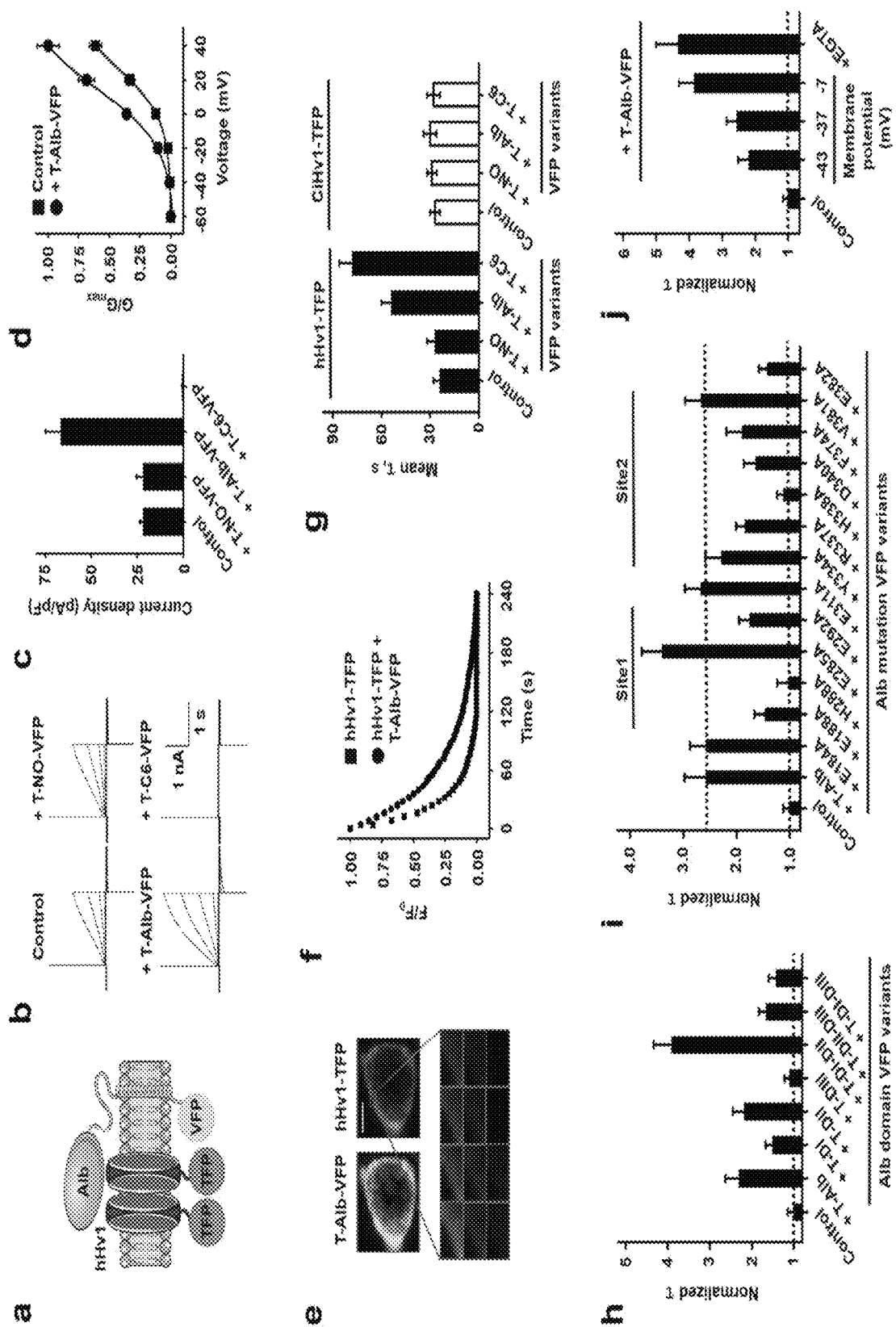

FIG. 5: DII of Alb is Required for Binding to hHv1 Channels

Tethered Alb and other tethered constructs carried VFP were designed as described (Methods). The VFP constructs were co-expressed with hHv1-TFP or CiHv1-TFP in HEK293T cells and studied by FRET microscopy. FRET between intracellular VFP and TFP resulted from the extracellular interaction of Alb (and variants) or C6 with hHv1 and was assessed by measuring the mean time constant (τ) for TFP (donor) photobleaching in the presence of VFP (acceptor) from 3 regions of 6 cells per group. Values are mean±SEM.

- a, Schematic representation of T-Alb-VFP showing binding of Alb to the hHv1-TFP channel. T-Alb-VFP is a fusion protein of Alb with an N-terminal signal peptide (naturally cleaved after expression), Alb protein (orange), a hydrophilic flexible linker, the transmembrane domain of the platelet-derived growth factor receptor (yellow), and the monomeric yellow fluorescent protein, mVenus at the intracellular C-terminus. Extracellular interaction of Alb and hHv1 brought the TFP and VFP fluorophores into close proximity (<10 nm), resulting in FRET that is quantitated by changes in donor photobleaching.

b, Representative current traces (studied as in FIG. 2a with steps from −60 to +40 mV) for hHv1-TFP channels without (Control) or with co-expression of T-Alb-VFP, T-NO-VFP (no Alb inserted) and T-C6-VFP. When co-expressed with hHv1-TFP, T-Alb-VFP activates while T-C6-VFP fully inhibits the outward proton current. Co-expression with T-NO-VFP had no effect comparing with hHv1 alone.

c, Whole-cell peak current density of hHv1-TFP channels measured at 0 mV without (Control) or with co-expression of T-NO-VFP, T-Alb-VFP and T-C6-VFP are plotted from the experiments shown in panel b.

d, G-V relationship for hHv1-TFP without (■) or with co-expression of T-Alb-VFP (●). Curves are fit to the Boltzmann equation as described (Methods).

e, hHv1-TFP (cyan) and T-Alb-VFP (yellow) are shown to reach the cell surface. Scale bar is 10 m. The boxed area of membrane shows donor photobleaching with continuous illumination.

f, Exemplar photobleaching showing the decay of fluorescence intensity for regions of single cells expressing hHv1-TFP (■) or hHv1-TFP with T-Alb-VFP (●). τ was determined by single-exponential fits to the time course of photobleaching.

g, FRET showed that hHv1-TFP (black bars) assembled with T-Alb-VFP and T-C6-VFP but not with T-NO-VFP. In contrast, CiHv1-TFP (white bars), a proton channel that is not activated by Alb or inhibited by C6[5], did not show FRET with T-Alb-VFP and T-C6-VFP.

h, Tethered Alb domain variants (T-DI-VFP, T-DII-VFP, T-DIII-VFP, T-DI-DII-VFP, T-DII-DIII-VFP and T-DI-DIII-VFP) were produced as described in Methods and co-expressed with hHv1-TFP for FRET studies. τ of photobleaching for each pair was normalized to the τ of photobleaching of hHv1-TFP alone (Control).

i, T-Alb-VFP with mutations were designed based on two predicted Alb sites as hot spots for interaction with S3-S4 loop peptide of hHv1 from in silico docking analysis (Supplementary FIG. 13), produced as described in Methods, and co-expressed with hHv1-TFP for FRET studies. τ of photobleaching for each pair was normalized to the T of photobleaching of hHv1-TFP alone (Control).

FIG. 6: Alb-hHv1 Structural Model from Molecular Dynamics Simulations

The structural model of Alb-hHv1 complex was generated using the VMD software program, using the crystal structure of Alb (PDB 1BM0) and our reported modeling structure of dimeric hHv1 at rest[43]. The final complex model was equilibrated and refined by MD simulations in a hydrated lipid bilayer, using residue-residue interactions suggested by in silico docking (Supplementary FIG. 13), electrophysiological scanning (FIG. 4c) and FRET studies (FIG. 5h,i).

a, The Alb-hHv1 complex in two orientations showing the three Alb domains DI (grey), DII (orange) and DIII (wheat) and the two subunits (cyan and blue) of a dimeric hHv1 channel. The horizontal gray lines indicate the position of the membrane boundary.

b, Close-up view of the interaction interface between Alb and two individual hHv1 subunits in two binding sites in the structural model. Left, interaction Site 1, H193 of hHv1 subunit A (cyan) may form direct interaction with Alb residue H288 and the adjacent E188 and E192. Right, interaction Site 2, H193 of hHv1 subunit B (blue) may form direct interaction with Alb residue H338 and the adjacent Y334, R337 and F374.

FIG. 7: Physiology of Alb Activation of hHv1 in Human Sperm and Neutrophils and Proposed Molecular Mechanism Physiology and Molecular Mechanisms:

a, The higher level of Alb in the female reproductive tract activates hHv1 in sperm leading to $H^+$ efflux and cytosolic alkalization, initiating capacitation by potentiating CatSper. The synergy of hHv1 and CatSper in human sperm capacitation has been described[5]-7.

b, Activation of hHv1 in neutrophils by Alb potentiates $H^+$ efflux, maintaining physiological $pH_i$ and compensating for the depolarization caused by NOX2, enhancing enzyme activity and allowing sustained ROS production. During the neutrophil respiratory burst (here, stimulated by fMLF), NOX2 translocates electrons from NADPH across the membrane to reduce $O_2$ to $O_2^-$; this efflux of electrons generates $H^+$ in the cytoplasm and depolarizes cells, inhibiting the activity of NOX2[5, 8-10].

c, Alb activation of hHv1 is proposed to proceed by an electrostatic gating modification mechanism. Two binding sites in the Alb DII domain interact with the two S3-S4 loops in hHv1 channels. The two Alb sites each have an adjacent negatively-charged residue (Alb-E294 and Alb-E297) that attracts the first channel gating charge (hHv1-R205) to facilitate outward movement of the voltage sensors and stabilizes the sensors in the activated "up" conformation. Side chains of three gating charges (R205, R208 and R211), the "hydrophobic gasket" formed by F150 that separates the internal and external aqueous solutions[67], and I202, one helical turn above R205, are shown on hHv1 subunit A (cyan).

Supplementary Information Summary

Supplementary FIG. 1. Alb induces intracellular alkalization and enhances progesterone induced $Ca^{2+}$ influx Supplementary FIG. 2. Alb does not activate CatSper in human sperm Supplementary FIG. 3. Alb activates neutrophils proton currents and increases fMLF-stimulated ROS production by human neutrophils Supplementary FIG. 4. Alb activates hHv1-T29A Supplementary FIG. 5. Physiological concentration and voltage dependent activation of Alb on hHv1

Supplementary FIG. 6. Human protein Fab or Proteinase K digested Alb does not potentiate hHv1 current Supplementary FIG. 7. Alb does not activate other voltage-gated channels that were studied Supplementary FIG. 8. Alb activates hHv1 expressed in *Xenopus* oocytes Supplementary FIG. 9. Alb activation on Hv1Sper Supplementary FIG. 10. Alb activates hHv1 in human tubal fluid Supplementary FIG. 11. The S3-S4 loop of hHv1 confers Alb activation on to hKv2.1

Figure 13:
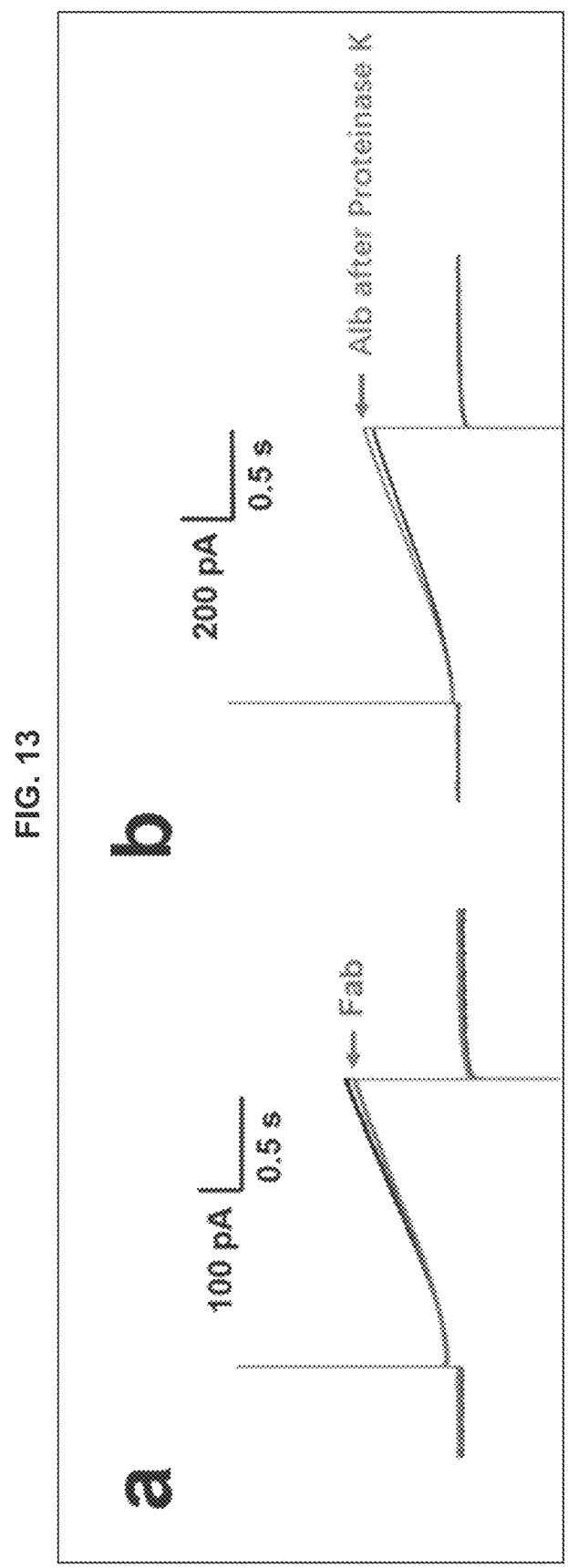

Supplementary FIG. 12. ΔHv1 monomeric channels appear to be insensitive, or weakly activated, by Alb Supplementary FIG. 13. In silico prediction of interaction between Alb and S3-S4 loop of hHv1

Supplementary FIG. 14. Molecular dynamics simulation system of the Alb-hHv1 complex Supplementary FIG. 15. Structural stability of Alb and the Alb-hHv1 complex.

Figure 16:
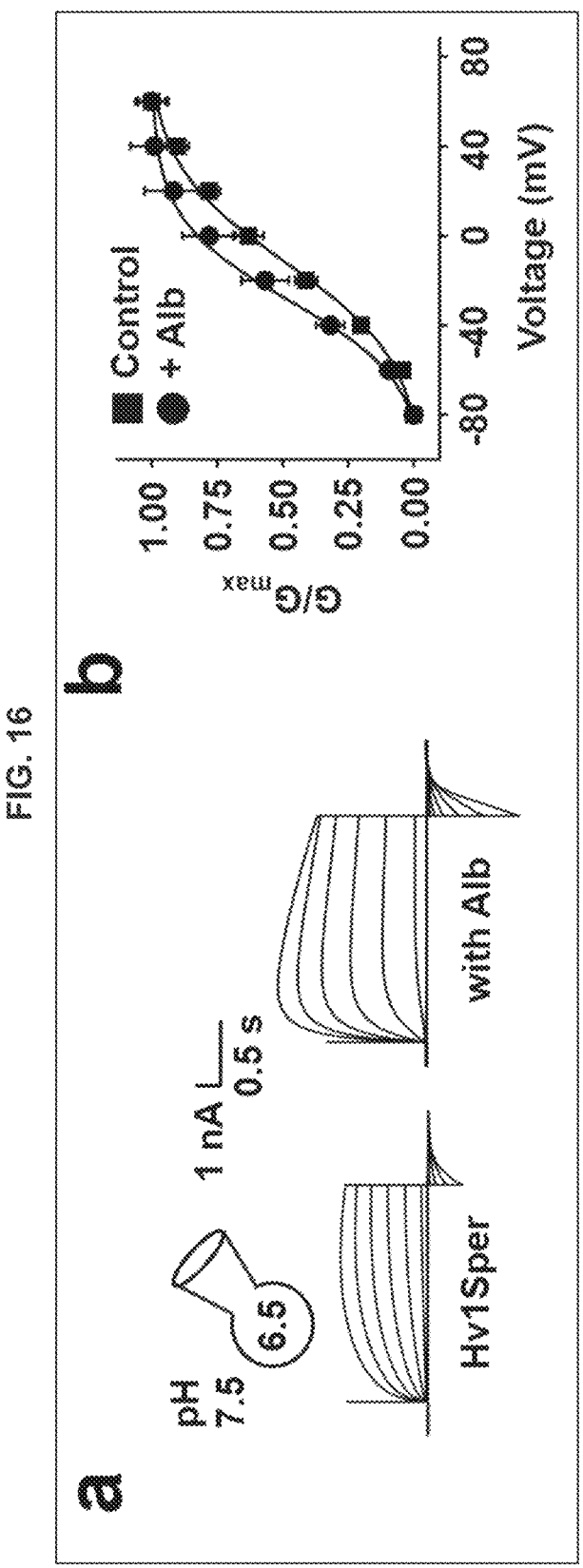

Supplementary FIG. 16. Principal component analysis of global and intra-molecular conformational changes of Alb during the simulations.

Figure 17:
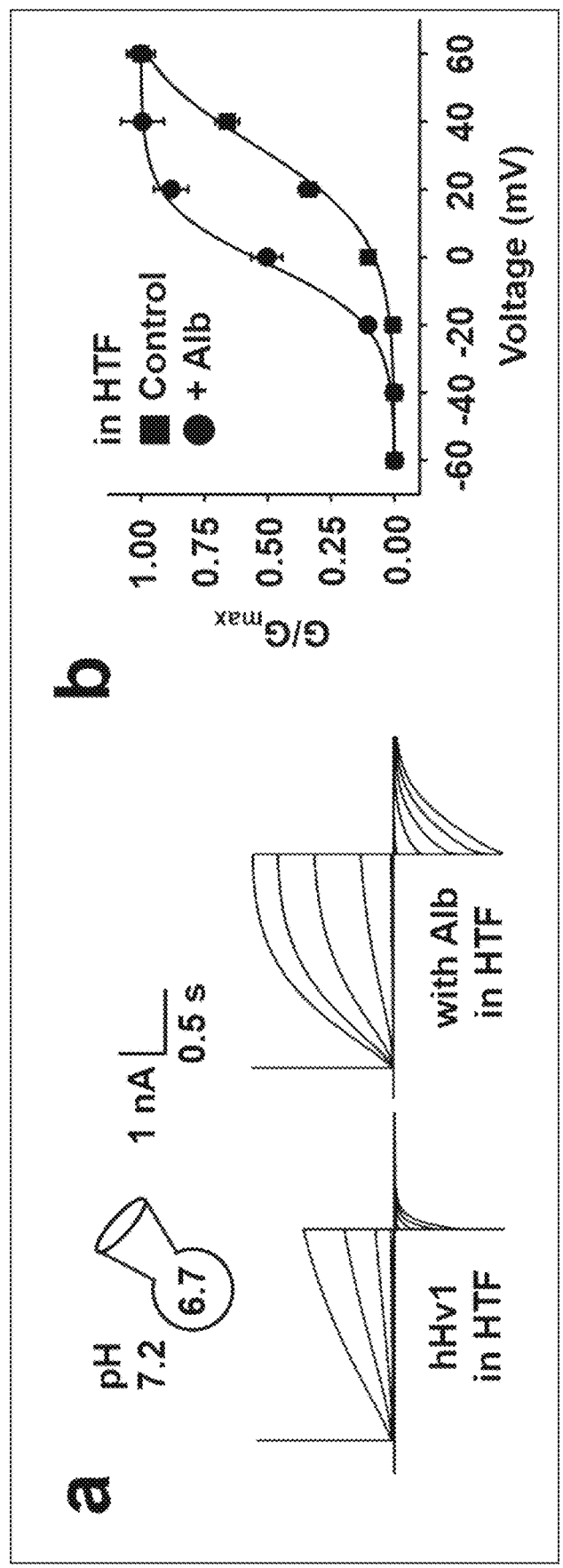

Supplementary FIG. 17. The distance distributions of two atoms or centers of mass of two groups of atoms from representative pairs of residues.

Figure 18:
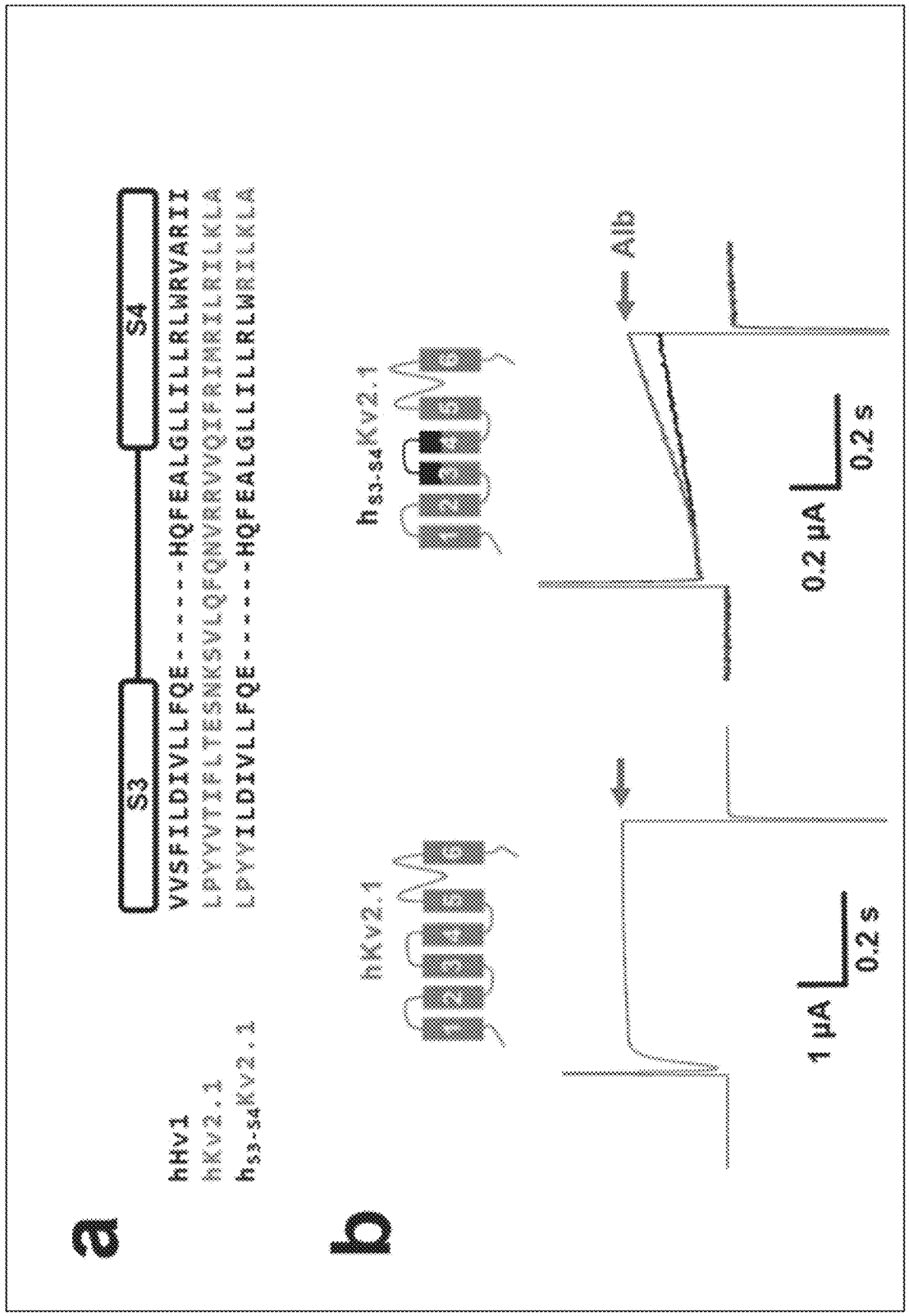

Supplementary FIG. 18. Cholesterol saturated Alb activates hHv1 like untreated Alb, and Alb activates hHv1-H140A but not hHv1-H193A channels.

Figure 19:
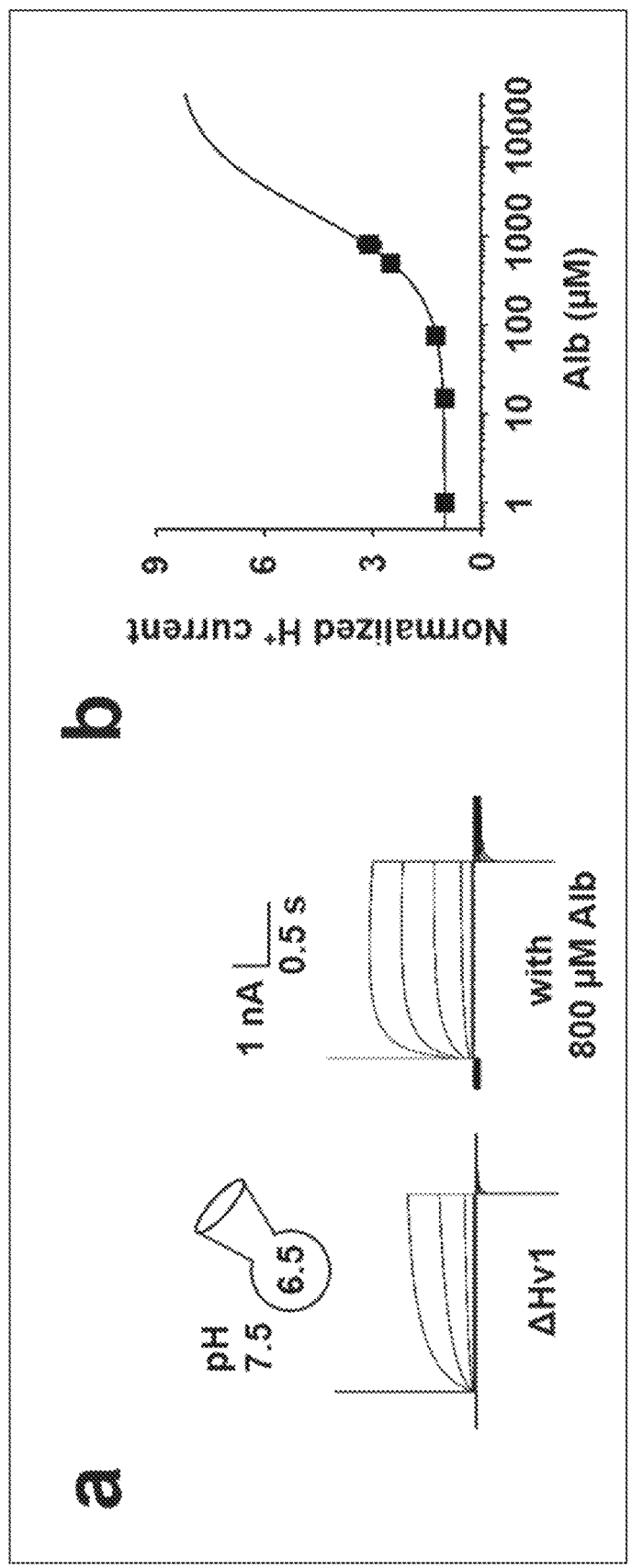

Supplementary FIG. 19. Alb activation of sperm proton currents without EDTA.

Figure 20:
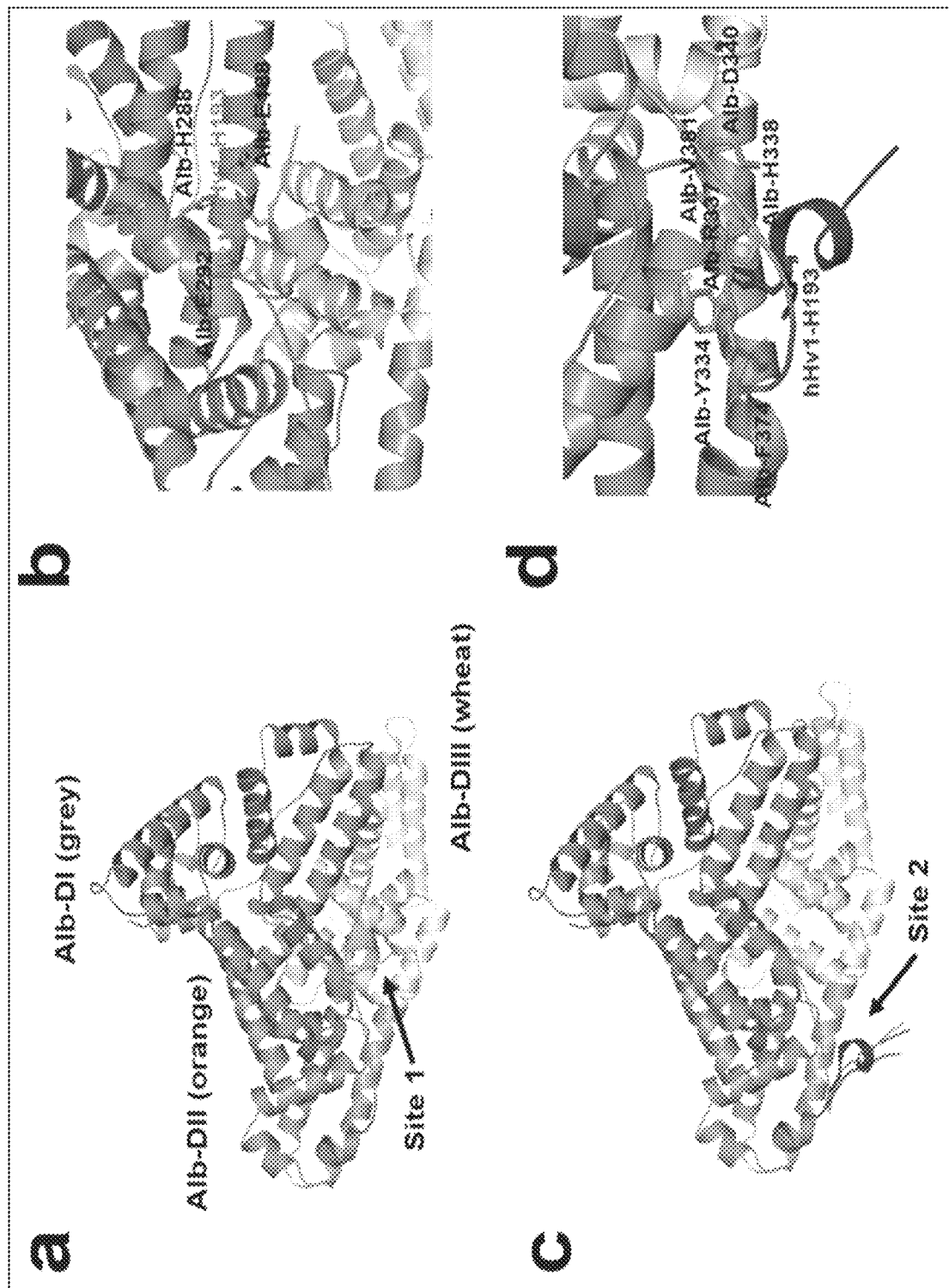

Supplementary FIG. 20. EGTA activation of hHv1.

Supplementary FIG. 21. Alb dose not activate hHv1-R205N, but activates hHv1-R211S channels normally.

Supplementary table 1. Parameters for Alb activation of hHv1 in HEK293T cells, human sperm and neutrophils, illustrated in FIG. 29: WT hHv1, $h_{S3-S4}$CiHv1, hHv1-G199L and Hv1Sper were expressed in HEK293T cells and studied by whole-cell patch clamp, as described in FIG. 3 and Supplementary FIG. 10. Proton currents in human sperm (without EDTA in recording solution) and neutrophils were studied by whole-cell patch clamp, as described in FIGS. 1, 2 and Methods. Half-maximal activation voltages ($V_{1/2}$) were determined by fits to a Boltzmann function, as described in Methods and FIG. 3b. τ for activation and deactivation were determined from single exponential fits, as described in FIG. 3a. ND, not determined. Data are mean±SEM for 3-8 cells studied for each channel construct. Recording solutions are described in the Methods.

Supplementary table 2. Stoichiometry of hHv1-G199L-TFP channels: hHv1-G199L-TFP was expressed in HEK293T cells and studied by smTIRF (Methods). The number of photobleaching steps observed for TFP in each single fluorescent spot reports on the stoichiometry of channels. Like WT hHv1[5], hHv1-G199L-TFP channels are dimeric. Analysis was performed according to methods described by Hines[66]. The statistical confidence in the null hypotheses that hHv1-G199L-TFP forms dimers was assessed to be greater than 0.999. Prebleaching and variance in quantum efficiency reduce the probability of observing each possible bleaching event (θ). θ is calculated from the value of n and the distribution of the photobleaching data[66]. θ is decreased when the distribution is altered to estimate the possibility that higher numbers of missed bleaching steps, for example θ+1, indicating that this stoichiometry is less likely.

Supplementary table 3. Parameters of single molecule photobleaching with hHv1-G199L TFP and TAMRA-Alb by smTIRF: hHv1-G199L-TFP was expressed in HEK293T cells and incubated with 3 μM TAMRA-Alb to reach equilibrium. Simultaneous, two-color, single particle photobleaching was studied by TTRF (Methods). Mean Manders' coefficient of colocalization were generated by using unbiased intensity correlation analysis as described in the Methods. The number of colocalized particles and photobleaching steps observed for TFP and TAMRA fluorophores in each single fluorescent spot were analyzed as previously described[5] and used for determining the binding stoichiometry of Alb with channels.

Supplementary table 4. Distance restraints between pairs of residues used in the molecular dynamics simulations: The distance between two selected atoms or centers of mass of two groups of atoms was harmonically restrained with a force constant of 5 kcal/mol/Å² or less, centered at 3.5 Å for the hydrogen bond donor/accepter pairs and 4 or 5 Å for the rest. Different combinations of the restraints were applied during the refinement process. The restraints applied in the ANTON2 simulations were highlighted in red.

Supplementary table 5. Impact of EDTA and EGTA on the voltage-dependence of hHv1 activation ($V_{1/2}$) with and without Alb in sperm and HEK293T cells: Proton currents in human sperm were studied by whole-cell patch clamp, as described in FIG. 1, Supplementary FIG. 19 and Methods. hHv1 were expressed in HEK293T cells and studied by whole-cell patch clamp, as described in FIG. 3 and Supplementary FIG. 20. The $V_{1/2}$ of channel activation were determined by fits to a Boltzmann function, as described in Methods. Data are mean±SEM for 3-8 cells studied for each condition. Recording solutions are described in the Methods.

Figure 8:
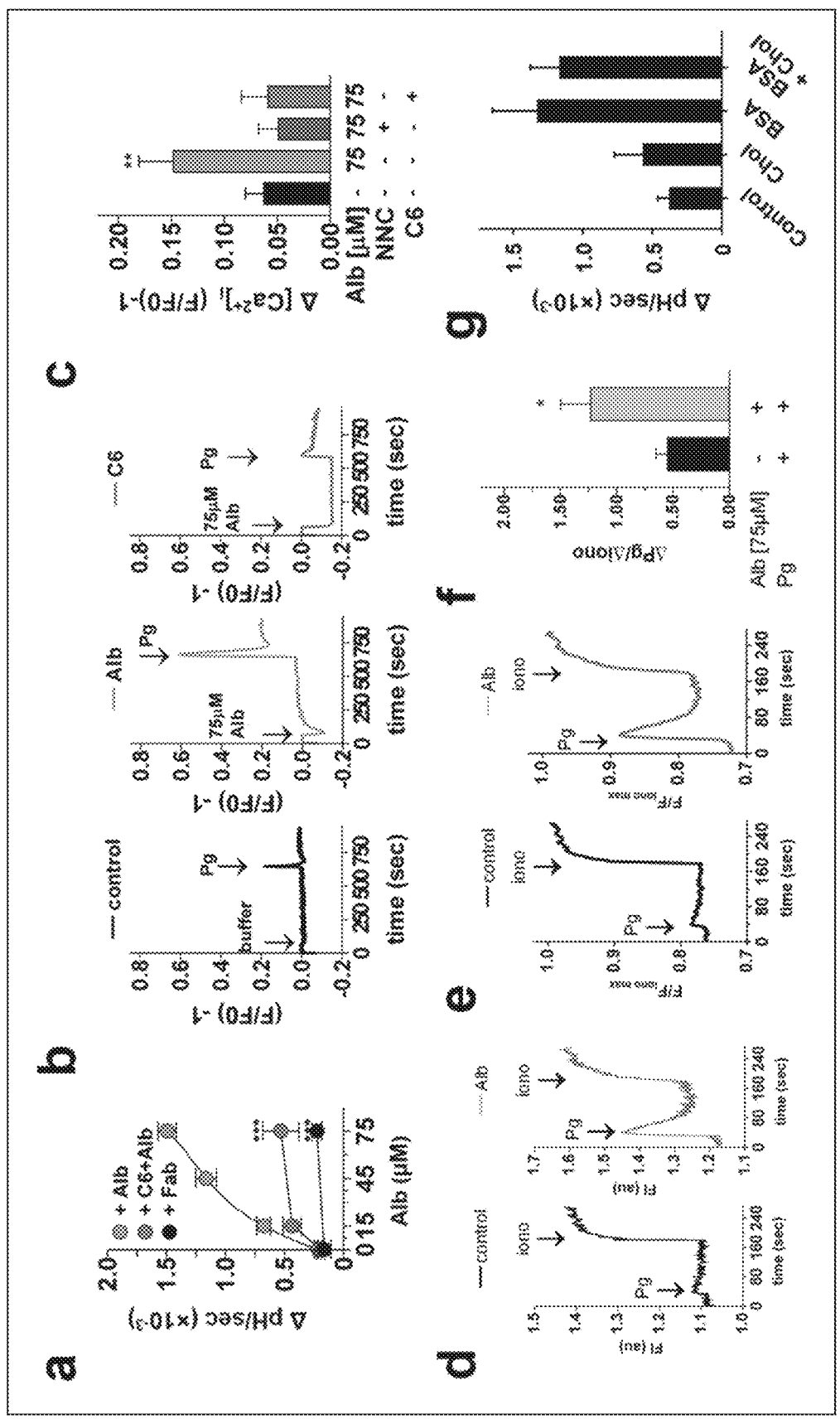

FIG. 8, or S1 (Supplementary FIG. 1). Alb Induces Intracellular Alkalization and Enhances Progesterone-Induced $Ca^{2+}$ Influx Mature human spermatozoa were collected and studied using spectrofluorometry. $pH_i$ and $[Ca^{2+}]_i$ were determined in non-capacitated sperm as described in Methods using BCECF and Flour-3, respectively. Values are the mean±SEM for 3-5 independent experiments. Reagent included 15 μM progesterone (Pg), 75 μM Alb or bovine serum albumin (BSA), the Fab fragment of human IgG (Fab) at 20 μM, C6 at 20 μM, the CatSper channel blocker NNC at 1 μM, the $Ca^{2+}$ ionophore ionomycin (iono) at 10 M, Statistical analyses were performed using the Dunnett Test, P<0.01, *P<0.001.

a, $pH_i$ changes were measured with BCECF and converted to ΔpH as described in Methods. Alb increased the speed of cytoplasmic alkalization in a concentration dependent manner. C6 inhibited intracellular alkalization induced by Alb (red) whereas did not (black).

b, The increase in $[Ca^{2+}]_i$ triggered by Pg was measured in the absence of Alb (left) and after adding Alb (middle). The fluorescence increase stimulated by Pg in presence of Alb was inhibited by C6 (right).

c, The presence of Alb (grey bar) increased peak $[Ca^{2+}]_i$ stimulated by Pg 2.4-fold over baseline and this increase was inhibited by C6 (red bar) or NNC (blue bar).

d, Representative recordings of $[Ca^{2+}]_i$ without (left) or with (right) BSA in arbitrary fluorescence units (au). BSA enhanced $[Ca^{2+}]_i$ influx induced by Pg. The absolute rise in au on subsequent addition of iono was similar with BSA (0.31±0.05 au) and without BSA (0.39±0.03 au) indicating similar dye loading in the two conditions.

e, $[Ca^{2+}]_i$ changes normalized to peak au on addition of iono.

f, Five independent samples of human sperm with BSA (right, grey) showed a 2.2-fold increase in peak $[Ca^{2+}]_i$ compared to control (left, black) here calculated as ΔPg/Δiono, where ΔPg and Δiono are the change in peak $[Ca^{2+}]_i$ induced by Pg and iono, respectively.

g, $pH_i$ changes were measured as described in panel a. BSA increased the speed of cytoplasmic alkalization and BSA pre-saturated and applied with a 10-fold molar excess cholesterol had a similar effect on the rate of $pH_i$ increase as did untreated BSA alone.

Figure 9:
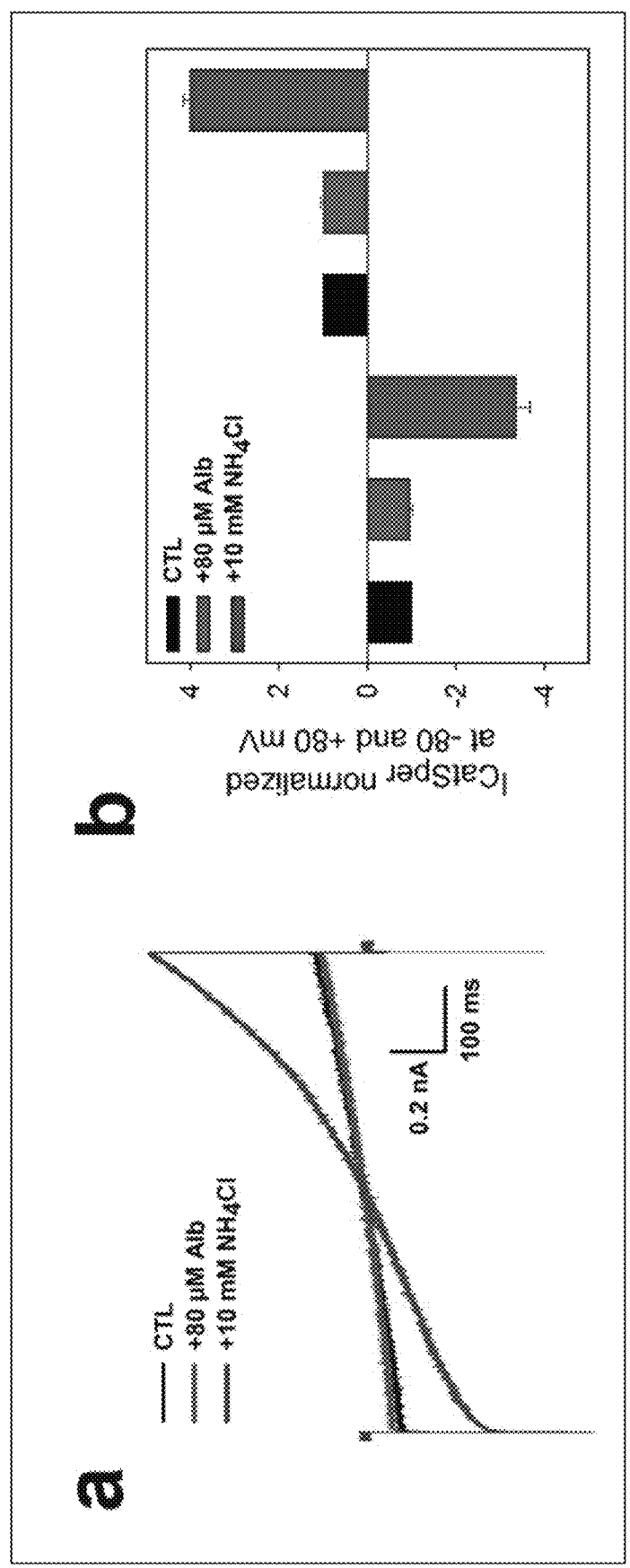

FIG. 9, or S2 (Supplementary FIG. 2). Alb does not Activate CatSper in Human Sperm A typical voltage-ramp protocol was used for recording monovalent CatSper current in whole-cell voltage-clamp experiments with non-capacitated human sperm, as described in Methods.
- a, The representative monovalent CatSper current trace in the absence (black trace) and presence (red trace) of 80 µM Alb, or in presence of 10 mM NH$_4$Cl (blue trace) are shown.
- b, Relative current amplitudes measured at +80 and −80 mV from experiments as shown in panel a. Values are mean±SEM, n=4.

Figure 10:
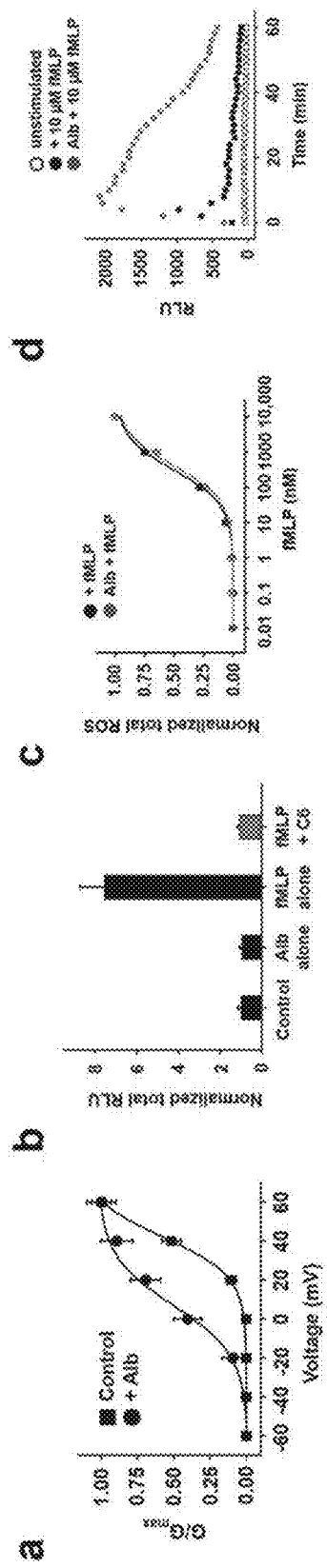

FIG. 10, or S3 (Supplementary FIG. 3). Alb Activates Proton Currents and Increases fMLF-Stimulated ROS Production by Human Neutrophils As described in Methods, human neutrophils were isolated from peripheral blood of healthy volunteers and recorded by whole-cell patch clamp or measured using a microplate luminometer for ROS production. Values are mean±SEM, n=3 cells or independent experiments for each condition.
- a, Proton currents via hHv1 in human neutrophils were studied as described in FIG. 2a with a approximately 30-fold proton gradient (pH$_i$=6.0 and pH$_o$=7.5). G-V for neutrophils proton currents in the absence (■) or presence of 450 µM Alb (●). The proton conductance in neutrophils showed a −35±3 mV shift after exposure to 450 µM Alb. Curves are fitting to the Boltzmann equation as described in Methods.
- b, The ROS production was measured as described in FIG. 2b. fMLF alone (1 µM) stimulated ROS production by human neutrophils which could be inhibited by 20 µM C6, while 450 µM Alb alone did not increase ROS production comparing to unstimulated human neutrophils (Control).
- c, Normalized ROS production by human neutrophils without (●) or with the incubation of 450 µM Alb (●) stimulated with an increasing concentration of fMLF equivalent to the FIG. 2c. Values of the total ROS production were normalized such that the ROS production stimulated by 0.01 nM and 10 µM fMLF correspond to 0 and 1, respectively. Some error bars are smaller than symbols.
- d, Effect of 10 µM fMLF alone or in combination with 450 µM Alb on ROS production by human neutrophils. Incubation with Alb enhanced and sustained the ROS production by human neutrophils FIG. 11, or S4 (Supplementary FIG. 4).

hHv1-T29A channels, carrying change in PKC-δ phosphorylation site at the N terminus of hHv1 were expressed in HEK293T cells and studied using whole-cell voltage clamp with 1.5 s pulses from a holding voltage of −60 mV with 10 s interval and a 10-fold proton gradient (pH$_i$=6.5 and pH$_o$=7.5). 75 µM Alb (red trace) was applied after control pulses (black trace). Alb-activation increases hHv1-T29A currents of approximately 3-fold at 0 mV (n=3).

FIG. 12, or S5. Voltage Dependent Activation of hHv1 by Alb at 500 JIM, the Concentration in the Female Reproductive Tract hHv1 channels expressed in HEK293T cells were studied using whole-cell voltage clamp with 1.5 s pulses from a holding voltage of −60 mV with 10 s interval and a 10-fold proton gradient (pH$_i$=6.5 and pH$_o$=7.5). Values are mean±SEM, n=6-8 cells for each condition. Some error bars are smaller than symbols.
- a, Representative proton current traces for hHv1 channels before (top), and in the presence of 500 µM Alb (bottom) with steps of 20 mV increments from −60 mV to +60 mV
- b, Conductance-voltage relationships (G-V) for hHv1 in the absence (■) or presence of 500 µM Alb (●). hHv1 channels showed a 45±4 mV shift after exposure to 500 µM Alb (Supplementary table 1). Curves are fitted to the Boltzmann equation as described in Methods.
- c, Dose-response relationships for Alb on increasing of the activation time constants (τ act) of hHv1 at depolarizing voltages of 0 mV and +60 mV. The activation of proton currents at 0 mV and +60 mV were fitted with a single exponential function to determine the extent of Alb activation on $\tau_{act}$. Values of the ratio of $\tau_{act}$ in the presence and absence of Alb were normalized such that the ratio of $\tau_{act}$ in the presence of 1 µM Alb and 800 µM Alb values correspond to 0 and 1, respectively. The equilibrium affinity ($K_d$) of Alb for hHv1 channels activation at 0 mV and +60 mV was estimated from the fit to Hill relationship as 84.5±9.8 µM with a Hill coefficient of 1.08±0.13, and 54.6±6.7 µM with a Hill coefficient of 1.19±0.14, respectively.

FIG. 13, or S6. Human Protein Fab or Proteinase K-Digested Alb do not Potentiate hHv1 Current hHv1 channels expressed in HEK293T cells were studied using whole-cell voltage clamp with 1.5 s pulses to 0 mV from a holding voltage of −60 mV with 10 s interval and a 10-fold proton gradient (pH$_i$=6.5 and pH$_o$=7.5).
- a, 800 µM Fab (red trace) was applied after control pulses (black trace) and shows no activation of the proton current.
- b, Alb was incubated and digested with proteinase K at a concentration of 800 PM, as described in Methods. Alb after digestion (red trace) was applied after control pulses (black trace) and shows no activation of the proton current.

FIG. 14, or S7.

Alb does not Activate Other Voltage-Gated Channels that were Studied
- a-d, Voltage gated potassium channels were expressed in HEK293T cells, and studied using 300 ms (hKv1.3, hKv2.1, hKv1.5) or 1.5 s (hI$_{ks}$) pulses to 0 mV from a holding voltage of −80 mV with 10 s interval. Bath solution comprises 130 mM NaCl, 4 mM KCl, 1.2 mM MgCl$_2$, 2 mM CaCl$_2$), and 10 mM HEPES; pH was adjusted to 7.4 with NaOH. Electrodes were filled with a solution containing 130 mM KCl, 1 mM MgCl$_2$, 5 mM EGTA, 5 mM K$_2$ATP, and 10 mM HEPES; pH was adjusted to 7.4 with KOH. 75 µM Alb (red trace) was applied after control pulses and shows no activation comparing to control current before application (black trace).
- e, hNav1.5 was expressed in HEK293T cells, and studied using 20 ms pulses to 0 mV from a holding voltage of −100 mV with 10 s interval. Bath solution comprises 130 mM NaCl, 4 mM CsCl, 2 mM CaCl$_2$), 1.2 mM MgCl$_2$, 5.5 mM glucose, and 10 mM HEPES, pH 7.4 with NaOH. Electrodes were filled with a solution containing 60 mM CsCl, 80 mM CsF, 1 mM CaCl$_2$), 1 mM MgCl$_2$, 5 mM Na$_2$ATP, 10 mM EGTA and 10 mM HEPES, pH 7.4 with CsOH. 75 µM Alb (red trace) was applied after control pulses and shows no activation comparing to control current before application (black trace).

FIG. 15, or S8. Alb Activates hHv1 Expressed in *Xenopus* Oocytes hHv1 channels were expressed in *Xenopus* oocytes and studied by two-electrode voltage clamp (TEVC) with a holding voltage of −60 mV and 1.5 s steps to 100 mV every 10 s in the absence of proton gradient ($pH_i=pH_o=7.3$) as described in Methods. 75 µM Alb (red trace) was applied after control pulses (black trace) and increased hHv1 currents approximately 1.8-fold (n=3).

FIG. 16, or S9. Alb Activation on Hv1Sper

Hv1Sper was constructed by truncating 67 residues at the N-terminus of hHv1 (residues from A2 to R68). Hv1Sper channels expressed in HEK293T cells were studied using whole-cell voltage clamp with 1.5 s pulses from a holding voltage of −80 mV with 10 s interval and a 10-fold proton gradient ($pH_i=6.5$ and $pH_o=7.5$). Values are mean±SEM, n=3 cells for each condition. Some error bars are smaller than symbols. Curves are fitted to the Boltzmann equation.

- a, Representative proton current traces for Hv1Sper channels before (left), and in the presence of 500 µM Alb (right) with steps of 20 mV increments from −80 mV to +60 mV.
- b, G-V for Hv1Sper in the absence (■) or presence of 500 µM Alb (●). Hv1Sper channels showed a 15±2 mV shift after exposure to 500 µM Alb (Supplementary table 1).

FIG. 17, or S10. Alb Activates hHv1 in Human Tubal Fluid hHv1 channels expressed in HEK293T cells were studied using whole-cell voltage clamp with 1.5 s pulses from a holding voltage of −60 mV with 10 s interval and a 3-fold proton gradient ($pH_i=6.7$ and $pH_o=7.2$) in human tubal fluid (HTF) medium. Values are mean±SEM, n=3 cells for each condition. Some error bars are smaller than symbols.

- a, Representative proton current traces for hHv1 channels in HTF medium before (left), and in the presence of 500 µM Alb (right), with steps of 20 mV increments from −60 mV to +60 mV.
- b, G-V for hHv1 in HTF medium in the absence (■) or presence of 500 µM Alb (●). hHv1 channels showed a 40±4 mV shift in $V_{1/2}$ after exposure to 500 µM Alb (Supplementary table 1). The voltage at which hHv1 channels start to open ($V_{threshold}$) shifted from approximately 0 mV to −30 mV with Alb application. Curves are fit to a Boltzmann equation.

FIG. 18, or S11. The S3-S4 Loop of hHv1 Confers Alb Activation to hKv2.1

The $h_{S3-S4}$Kv2.1 chimera channel was constructed as described in Methods. hKv2.1 and $h_{S3-S4}$Kv2.1 were expressed in *Xenopus* oocytes and studied by TEVC with a holding voltage of −80 mV and 0.5 s steps to −20 mV every 10 s.

- a, Sequence alignment of hKv2.1 (cyan), hHv1 (black) and $h_{S3-S4}$Kv2.1 chimera transplanting the S3-S4 loop of hHv1 into hKv2.1.
- b, Representative current trace for hKv2.1 and $h_{S3-S4}$Kv2.1 without (black) or with 500 µM Alb application (red). hKv2.1 was insensitive to 500 µM Alb, while the same concentration of Alb increased $K^+$ current through $h_{S3-S4}$Kv2.1 approximately 1.9-fold (n=3).

FIG. 19, or S12.

ΔHv1 Monomeric Channels Appear to be Insensitive, or Weakly Activated, by Alb

ΔHv1 channels were expressed in HEK293T cells and studied by whole-cell patch clamp to assess activation parameters using a holding voltage of −60 mV, 1.5 s test pulses, and a 10 s interpulse interval, $pH_i=6.5$, $pH_o=7.5$. Values are mean±SEM, n=3-8 cells for each condition. Some error bars are smaller than symbols.

- a, Representative proton current traces for ΔHv1 channels before (left), and in the presence of 800 µM Alb (right) with steps of 20 mV from −60 mV to 40 mV. Fitting the activation and deactivation of proton currents at 0 mV to a single exponential function gave time constants Tact of 350±42 ms and 152±19 ms, T tan of 33±5 ms and 60±9 ms without and with 800 µM Alb, respectively. The observed activation is suspected to be due to a subpopulation of dimeric channels that forms with the truncated subunits.
- b, Dose-response relationships for Alb activation of ΔHv1. $EC_{50}$ of Alb for ΔHv1 channels was estimated from the fit to Hill relationship as 1,904±155 µM with a Hill coefficient of 1.05±0.06. The maximal Alb (800 µM) potentiated currents amplitude on WT hHv1 (FIG. 3d) was set as the maximal effect for fitting FIG. 20, or S13. In Silico Prediction of Interaction Between Alb and S3-S4 Loop of hHv1

A computational protein-peptide docking web server (HPEPDOCK)[48] was used to predict the binding configurations of a minimal 11-residue binding epitope (F190 to L200) within the S3-S4 loop of hHv1 on the Alb crystal structure (PDB: 1BM0). HPEPDOCK™ performed the protein-peptide docking through a hierarchical algorithm. Top 20 low energy models were favorably clustered in two binding sites, with 25% S3-S4 loop peptides clustered in Site 1, while 70% in Site 2 (three binding poses in Site 1 and two binding poses in Site 2 are shown). The distance between two predicated binding sites is approximately 27 Å, matching the distance (approximately 26 Å) between two individual hHv1 subunits of one dimeric channel.

- a, Docking result for two low energy poses of S3-S4 loop peptide (cyan and lime) with Alb, showing binding Site 1 on DI (grey) and DII (orange) of Alb is one hot spot for hHv1 channel interaction.
- b, Close-up view of interaction interface between S3-S4 loop peptide and Alb in Site 1 in a docking model. The hHv1-H193 (cyan) could be a partner to Alb-E188, Alb-H288 and Alb-E292.
- c, Docking result for three low energy poses of S3-S4 loop peptide (blue, green, and red) with Alb, showing binding Site 2 on DII (orange) of Alb is the other hot spot for hHv1 channel interaction.
- d, Close-up view of interaction interface between S3-S4 loop peptide and Alb in Site 2 in a docking model. The hHv1-H193 (blue) could be a partner to Alb-Y334, Alb-R337, Alb-H338, Alb-D340, Alb-F374 and Alb-V381.

FIG. 21, or S14. Molecular Dynamics Simulation System of the Alb-hHv1 Complex

Starting configuration of Alb and hHv1 for all-atom MD simulations. The Alb, hHv1 and water were shown in a surface representation, and the lipid molecules and ions in spheres, respectively. The Alb was orientated with its DII (orange) facing the extracellular side of the dimeric hHv1 (cyan for subunit A, blue for subunit B). Some lipid molecules were removed for the sake of clarity.

Restraints were persistently used during long-term stimulation in order to maintain the Alb-hHv1 complex (Methods). The reasons were (1) the large thermal fluctuation of Alb. The size of Alb is very large, comprising of 578 residues in the model, compared with its binding partner the S3-S4 loop of hHv1 which is about 10 amino acids long. (2) Only the H193 residue on hHv1 was actively involved in the residue-residue interaction networks with Alb at channel "down" state. (3) The steric clash between the third domain of Alb and the S1-S2 loop of hHv1. The root-mean-square deviation (RMSD) analysis and principle component analysis (PCA) of the 1.5 s ANTON2 trajectories showed that there is a dramatic steric clash between Alb-DIII and the S1-S2 loop of hHv1 (Supplementary FIGS. 15 and 16). This unfavorable interaction will push Alb away from hHv1, which is in good agreement with our FRET microscopy results showing that the Alb domain variant containing only the first two domains (Alb-DI-DII) has higher binding affinity to hHv1 than the WT Alb (FIG. 5h). (4) the lack of the atomic structure of the dimeric hHv1. We used the homology model of hHv1 from our previous study to build and refine the Alb-hHv1 complex. The deviation of the hHv1 homology model itself may bias our simulation results of the Alb-hHv1 complex.

Due to the large size of the system (approximately 185, 000 atoms), we cannot simulate the complete binding/unbinding process to further evaluate the binding conformation. However, our RMSD and PCA results based on the multi-microseconds long restrained simulations showed that the global binding conformation between Alb and hHv1 is stable considering the big size of Alb, the flexibility of the S3-S4 loop of hHv1 at the binding interface, and only a few distance/positional restraints surrounding hHv1-H193 have being applied. In addition, by analyzing the last 0.5 s ANTON2™ trajectories, we found that the important hydrogen binding and π-π stacking interactions shown in FIG. 6 still exist (Supplementary FIG. 17), considering the corresponding distance restraints had already been replaced by a few positional restraints during the simulations. It implies that these critical residue-residue interactions are favorable in the proposed model of the complex, or in the binding state of the two proteins.

Figure 22:
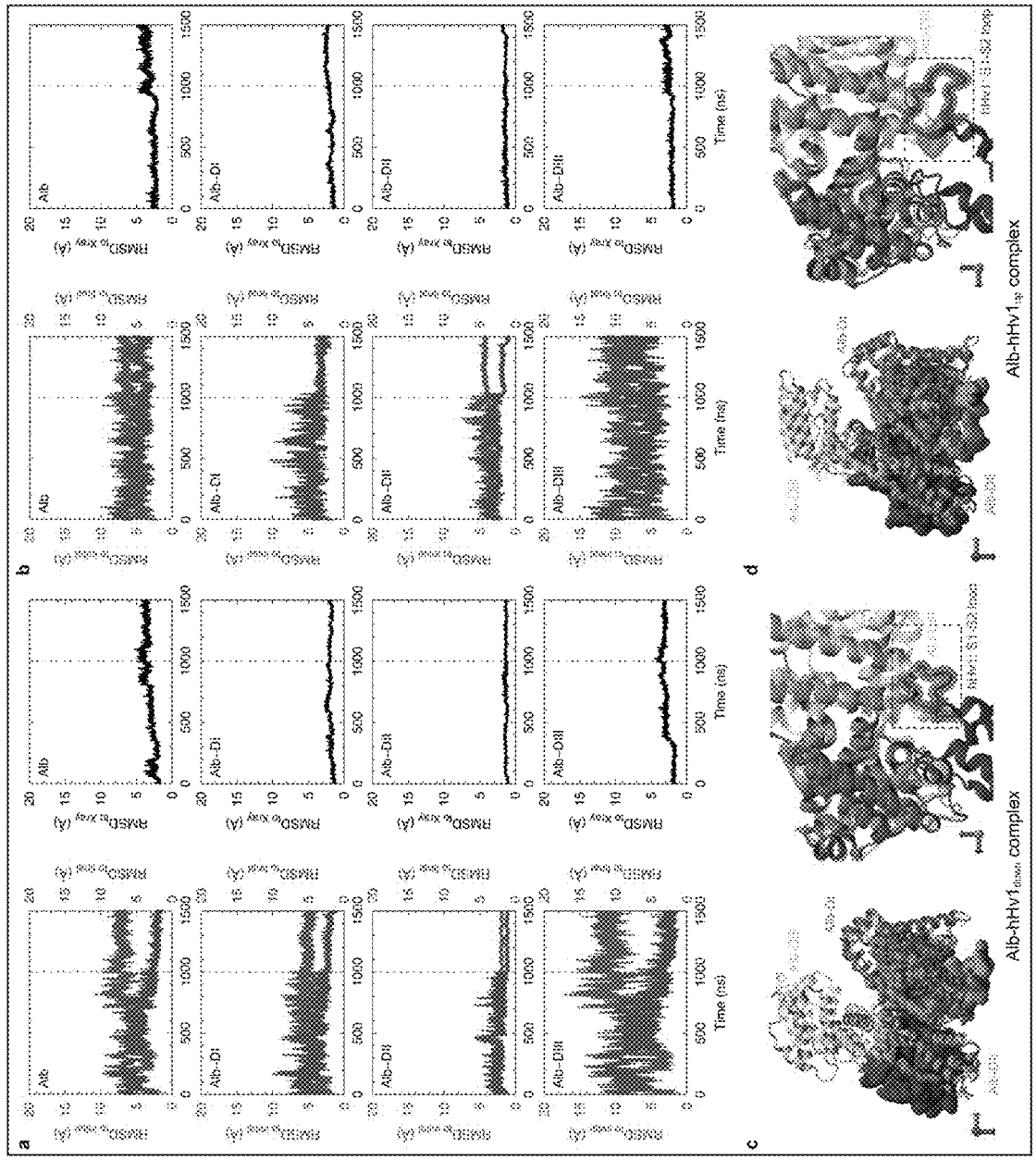

FIG. 22, or S15. Structural Stability of Alb and the Alb-hHv1 Complex.

Time series of the backbone RMSDs of Alb and its three domains Alb-DI, Alb-DII, Alb-DIII in reference to the corresponding initial (red), final (blue) and crystal (black) structures in the 1.5 s ANTON2 simulation of the Alb-hHv1$_{down}$ system (a) and the Alb-hHv1$_{up}$ system (b). No initial structural alignment was performed in the RMSD calculations using the initial and final structures as reference to show the movement of Alb during the MD simulations. The vertical dashed line highlights the time boundary of two periods of the simulation. Top-view (left panel) and side-view (right panel) of the final structure of the Alb-hHv1$_{down}$ complex (c) and the Alb-hHv1$_{up}$ complex (d). The crystal structure of Alb was superimposed in transparent ribbon representation, showing the distortion of the Alb-DIII domain due to its steric clash with the S1-S2 loop of hHV1 (highlighted in the dashed box). The subunit A of hHv1 and the Alb-DI domain are not shown in the side-view for clarity FIG. 23, or S16. Principal Component Analysis of Global and Intra-Molecular Conformational Changes of Alb During the Simulations.

Principal component analysis (PCA) was performed on Cartesian coordinates of the Cα atoms of Alb generated in the 1.5 μs ANTON2 simulation of the Alb-hHv1$_{down}$ system (a, b, c) and the Alb-hHv1$_{up}$ system (d, e, f). Structural alignment based on the backbone atoms of the DII domain of the crystal structure was performed before the PCA analysis of the intra-molecular conformational changes of Alb (b, c, e, f), while no initial structural alignment was performed for the PCA analysis of the global conformational changes of Alb (a, d). The projections of all the conformations (n=2084) onto the first two principal components, PC1 and PC2, are shown as heat maps (a, b, d, e). Projections of the initial, final and crystal structures onto PC1 and PC2 are depicted as scattered points. c, f, Comparison of the square displacement of each residue along PC1 and PC2.

Figure 24:
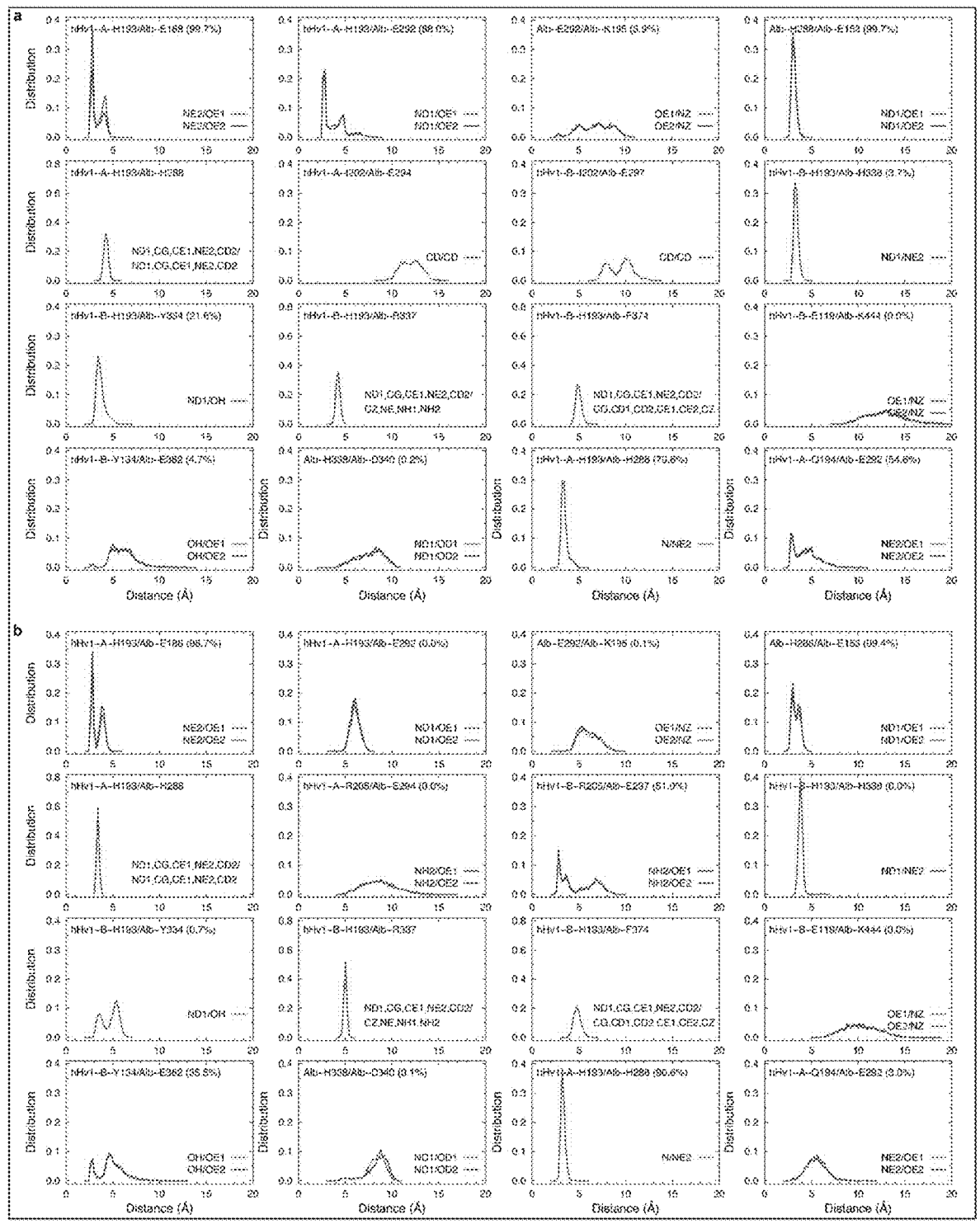

FIG. 24, or S16. The Distance Distributions of Two Atoms or Centers of Mass of Two Groups of Atoms from Representative Pairs of Residues.

Snapshots from the last 500 ns ANTON2 trajectories of the Alb-hHv1$_{down}$ (a) and Alb-hHv1$_{up}$ (b) systems were used for the calculation (n=2084). The number in the parentheses represents the hydrogen bond propensity between the two residues. A hydrogen bond is defined as the distance between the hydrogen donor and acceptor atoms is shorter than 3.5 Å and the angle between the donor, the hydrogen and the acceptor atoms is larger than 120°.

Figure 25:
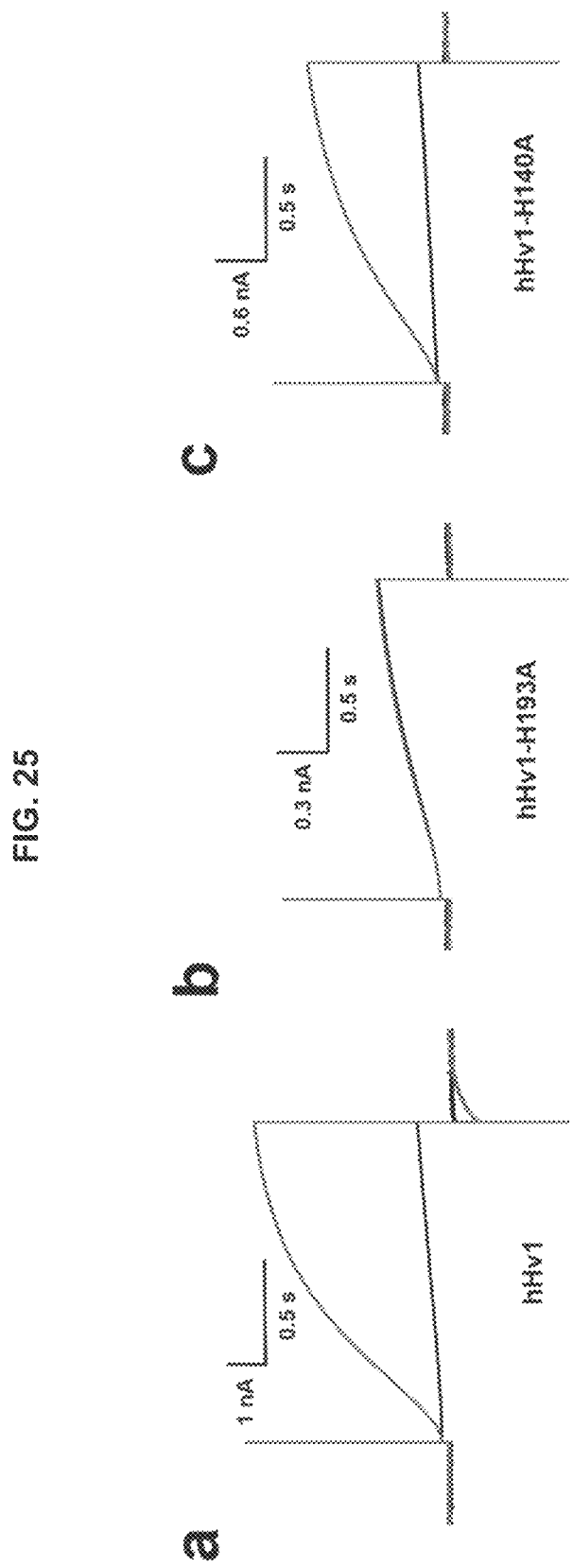

FIG. 25, or S17. The Distance Distributions of Two Atoms or Centers of Mass of Two Groups of Atoms from Representative Pairs of Residues.

Snapshots from the last 500 ns ANTON2 trajectories of the Alb-hHv1$_{down}$ (a) and Alb-hHv1$_{up}$ (b) systems were used for the calculation (n=2084). The number in the parentheses represents the hydrogen bond propensity between the two residues. A hydrogen bond is defined as the distance between the hydrogen donor and acceptor atoms is shorter than 3.5 Å and the angle between the donor, the hydrogen and the acceptor atoms is larger than 120°.

FIG. 25, or S18. Cholesterol Saturated Alb Activates hHv1 Like Untreated Alb, and Alb activates hHv1-H140A but not hHv1-H193A channels a, hHv1 channels were expressed in HEK293T cells, and studied using whole-cell voltage clamp with 1.5 s pulses to 0 mV from a holding voltage of −60 mV with 10 s intervals with a 10-fold proton gradient (pHi=6.5 and pH$_o$=7.5) and divalent cation-free bath solution. 75 μM Alb that was presaturated with sodium cholesteryl sulfate (red trace) was applied after control pulses (black trace) and increased hHv1 currents approximately 8-fold (n=3).

b-c, hHv1-H193A and hHv1-H140A channels, carrying changes in either the Zn$^{2+}$ binding histidine residue in the S3-S4 loop or in the S1-S2 loop, respectively, were expressed in HEK293T cells, and studied using whole-cell voltage clamp with 1.5 s pulses to 0 mV with a holding voltage of −60 mV with 10 s interval. 75 μM Alb (red trace) was applied after control pulses (black trace). The H193A mutation disrupts activation so 75 μM Alb has no effect on hHv1-H193A (panel b), same as shown in FIG. 4c for hHv1-H193C; in contrast, mutation of the Zn$^{2+}$ binding residue in the S1-S2 loop did not alter Alb-activation showing an increase in hHv1-H140A currents of approximately 6-fold (panel c) (n=3).

FIG. 26, or S19. Alb Activation of Sperm Proton Currents without EDTA

As described in the Methods, mature human spermatozoa were collected and recorded by whole-cell patch clamp. G-V for sperm proton conductance showed a −53±5 mV shift in $V_{1/2}$ after exposure to 500 μM Alb in EDTA free recording solution from 15±2 mV to −38±3 mV (Supplementary table 2). The $V_{threshold}$ shifted from approximately-30 mV to −70 mV with Alb application (Supplementary table 1). Curves are fitting to the Boltzmann equation as described in Methods. Values are mean±SEM, n=5 cells FIG. 27, or S20. EGTA Activates hHv1 hHv1 channels expressed in HEK293T cells were studied using whole-cell voltage clamp with 1.5 s pulses from a holding voltage of −60 mV with 10 s interval and a 10-fold proton gradient ($pH_i$=6.5 and $pH_o$=7.5) with addition of 2 mM $MgCl_2$ (Methods). Values are mean±SEM, n=3 cells for each condition. Some error bars are smaller than symbols.

a, Representative proton current traces for hHv1 channels before (left), and in the presence of 1 mM EGTA (right), with steps of 20 mV increments from −80 mV to +40 mV.

b, G-V for hHv1 in the absence (U) or presence of 1 mM EGTA (0). hHv1 channels showed a 40±3 mV shift after exposure to 1 mM EGTA from 15±1 mV to −25±2 mV. Curves are fitting to the Boltzmann equation.

c, 500 μM Alb (red trace) was applied after control pulses after pre-activation with 1 mM EGTA (black trace) and shows attenuated activation of the proton current.

FIG. 28, or S21.

hHv1-R205N and hHv1-R211S channels, carrying changes in the first and the third voltage sensing Arg residue in S4, respectively, were expressed in HEK293T cells, and studied using whole-cell voltage clamp with 1.5 s pulses to 0 mV (hHv1-R205N) or +40 mV (hHv1-R211S) from a holding voltage of −60 mV with 10 s interval with a 10-fold proton gradient ($pH_i$=6.5 and $pH_o$=7.5) and divalent cation-free bath solution. After control pulses (black trace), 75 μM Alb (red trace) was applied.

a, The R205 mutation fully eliminate activation by 75 μM Alb b, The mutation of R211 did not alter Alb-activation showing an approximately 5-fold increase in current (n=3).

SUPPLEMENTARY TABLE 2

Stoichiometry of hHv1-G199L-TFP channels

|  | Subunits expressed hHv1-G199L-TFP |
|---|---|
| Determined stoichiometry | 2 |
| Particles studied | 86 |
| Particles with | |
| One step | 7 |
| Two steps | 77 |
| Three steps | 0 |
| Four steps | 2 |
| Confidence | 0.999 |
| θ | 0.96 |
| θ + 1 | 0.64 |

SUPPLEMENTARY TABLE 3

Parameters of single molecule photobleaching with hHv1- G199L-TFP and TAMRA-Alb by smTIRF

| Protein expressed/applied | hHv1-G199L-TFP + TAMRA-Alb |
|---|---|
| Determined stoichiometry | 2:1 |
| Manders' coefficient of colocalization | 0.50 ± 0.06 |
| Particles studied | |
| Total | 86 |
| Two TFP (dimeric channels) | 77 |
| Colocalized TFP and TAMRA | 39 |
| Dimeric hHv1 with one Alb | 37 |
| Dimeric hHv1 with two Alb | 2 |

SUPPLEMENTARY TABLE 4

Distance restraints between pairs of residues used in the molecular dynamics simulations.

| Residue i | Residue j |
|---|---|
| hHv1-B-H193: ND1, CG, CE1, NE2, CD2 | Alb-Y334: CG, CD1, CE1, CZ, OH, CD2, CE2 |
| hHv1-B-H193: ND1, CG, CE1, NE2, CD2 | Alb-R337: CZ, NH1, NE, NH2 |
| hHv1-B-H193: ND1, CG, CE1, NE2, CD2 | Alb-H338: ND1, CG, CE1, NE2, CD2 |
| hHv1-B-H193: ND1, CG, CE1, NE2, CD2 | Alb-F374: CG, CD1, CD2, CE1, CE2, CZ |
| hHv1-B-H193: CE1 | Alb-F374: CG, CD1, CD2, CE1, CE2, CZ |
| hHv1-B-E119: OE2 | Alb-K444: NZ |
| hHv1-B-D123: OD2 | Alb-R445: NH2 |
| hHv1-B-K125: NZ | Alb-E393: OE1 |
| hHv1-B-K125: NZ | Alb-E396: OE1 |
| hHv1-B-Y134: OH | Alb-E382: OE1 |
| hHv1-B-E192: OE1 | Alb-K378: NZ |
| hHv1-B-E193: CG | Alb-F374: CG |
| hHv1-B-H193: CE1 | Alb-F374: CZ |
| hHv1-B-H193: ND1 | Alb-Y334: OH |
| hHv1-B-H193: ND1 | Alb-R337: NH1 |
| hHv1-B-H193: ND1 | Alb-H338: NE2 |
| hHv1-B-H193: NE2 | Alb-A306: N |
| hHv1-B-H193: NE2 | Alb-Y334: OH |
| hHv1-B-H193: NE2 | Alb-R337: NH1 |
| hHv1-B-H193: NE2 | Alb-H338: NE2 |
| hHv1-B-I202: CD | Alb-E297: CD |
| hHv1-B-R205: NH2 | Alb-E297: CD |
| hHv1-A-H193: ND1, CG, CE1, NE2, CD2 | Alb-E188: OE1, OE2, CD |
| hHv1-A-H193: ND1, CG, CE1, NE2, CD2 | Alb-H288: ND1, CG, CE1, NE2, CD2 |
| hHv1-A-H193: ND1, CG, CE1, NE2, CD2 | Alb-H288: CE1 |
| hHv1-A-Y134: OH | Alb-E280: OE1 |
| hHv1-A-Y141: OH | Alb-E280: OE1 |
| hHv1-A-E192: OE1 | Alb-R160: NH1 |
| hHv1-A-H193: CD2 | Alb-H288: NE2 |
| hHv1-A-H193: CD2 | Alb-H288: CG |
| hHv1-A-H193: CE1 | Alb-H288: CE1 |
| hHv1-A-H193: ND1 | Alb-E188: OE1 |
| hHv1-A-H193: ND1 | Alb-E188: OE2 |
| hHv1-A-H193: ND1 | Alb-H288: CD2 |
| hHv1-A-H193: ND1 | Alb-H288: CG |
| hHv1-A-H193: ND1 | Alb-H288: NE2 |
| hHv1-A-H193: ND1 | Alb-E292: OE1 |
| hHv1-A-H193: ND1 | Alb-E292: OE2 |
| hHv1-A-H193: NE2 | Alb-E188: OE1 |
| hHv1-A-H193: NE2 | Alb-E188: OE2 |
| hHv1-A-H193: NE2 | Alb-H288: CE1 |
| hHv1-A-H193: NE2 | Alb-H288: ND1 |
| hHv1-A-H193: NE2 | Alb-H288: NE2 |
| hHv1-A-H193: NE2 | Alb-E292: OE2 |
| hHv1-A-H193: N | Alb-H288: NE2 |
| hHv1-A-Q194: OE1 | Alb-K195: NZ |
| hHv1-A-Q194: NE2 | Alb-E292: OE1 |
| hHv1-A-E196: OE2 | Alb-K439: NZ |
| hHv1-A-I202: CD | Alb-E294: CD |
| hHv1-A-R205: NH2 | Alb-E294: CD |
| Alb-E188: CD | Alb-R160: CZ |
| Alb-E188: OE1 | Alb-R160: NH2 |
| Alb-E188: OE2 | Alb-R160: NH1 |
| Alb-E188: OE2 | Alb-R160: NH2 |
| Alb-H288: ND1 | Alb-E153: OE1 |
| Alb-H288: ND1 | Alb-E153: OE2 |
| Alb-H288: NE2 | Alb-R160: NH2 |
| Alb-E292: CD | Alb-K195: NZ |
| Alb-E292: OE1 | Alb-K195: NZ |
| Alb-H338: ND1 | Alb-D340: OD1 |

SUPPLEMENTARY TABLE 5

Impact of EDTA and EGTA on the voltage-dependence of hHv1 activation ($V_{1/2}$) with and without Alb in sperm and HEK293T cells

| | Before (Control) | After application | Shift |
|---|---|---|---|
| Sperm H⁺ current $V_{1/2}$ in mV (pH$_i$ = 6.0, pH$_o$ = 7.4) | | | |
| Alb (500 uM) | 15 ± 2 | −38 ± 3 | 53 |
| EDTA (1 mM) | 15 ± 2 | 4 ± 1 | 11 |
| EGTA (1 mM) | 17 ± 3 | −10 ± 4 | 27 |
| Alb (800 uM) + EDTA (1 mM) | 15 ± 2 | −28 ± 2 | 43 |
| hHv1 in HEK293T cells, $V_{1/2}$ in mV (pH$_i$ = 6.5, pH$_o$ = 7.5) | | | |
| Alb (500 uM) | 15 ± 2 | −30 ± 2 | 45 |
| EDTA (1 mM) | 15 ± 2 | −29 ± 3 | 44 |
| EGTA (1 mM) | 15 ± 1 | −25 ± 2 | 40 |
| Alb (500 uM) + EDTA (1 mM) | 15 ± 2 | −30 ± 3 | 45 |
| Alb (500 uM) + EGTA (1 mM) | 15 ± 1 | −25 ± 3 | 40 |

Example 2: hHv1 Channels in Neutrophils, and the Innate Immune Inflammatory Response This example demonstrates that methods and compositions as provided herein are effective for inhibiting, ameliorating or preventing PMN-mediated inflammation in vivo.

This research addresses a specific unmet medical need, the absence of an effective medical therapy for Acute Respiratory Distress Syndrome (ARDS), a disorder that is fatal in 40% of patients (and is seen, for example, in patients with SARS-CoV-2 infection). The work is broadly impactful because the white blood cells called neutrophils (PMN) that damage the lungs in ARDS also cause other acute and chronic inflammatory diseases. In the last period, we showed that the human voltage-gated proton channel (hHv1) in PMN is essential to produce the inflammatory response, and provided herein are compositions and methods to confront ARDS by a novel strategy: targeting hHv1 in PMN, both directly and by blocking a natural activator of hHv1 we describe here to be required for normal hHv1 operation, thereby offering two ways to confront the disease at the earliest stage before it becomes a more complex disorder.

Treatments to prevent or ameliorate ARDS have resisted efforts for decades, in-part because many insults can lead to the disease, and once underway the pathology becomes complex, dysregulating a wide array of downstream processes[8]. Our demonstration that hHv1 in human PMN is required to initiate and sustain the release of inflammatory mediators[5], and the essential role of endogenous Alb we describe here, compels us to investigate inhibition of hHv1 as a therapy for ARDS either by direct block of hHv1 and/or suppression of the newly-discovered, Alb-activation of hHv1.

PMN are the most abundant phagocytes in humans, accounting for 50-60% of the circulating white blood cells, and they are usually the first cells to arrive at sites of infection. Perhaps, the most dramatic example of damage caused by the PMN inflammatory response is ARDS, a disease that is fatal in approximately 40% of cases[8]. PMN are recognized as a hallmark feature and the driver of ARDS, see FIG. 21. PMNs are recruited into the pulmonary airspaces from the circulation by chemokines secreted by resident lung macrophages[6]. Both migration and ROS production are suppressed in mHv1 knock-out mice[13], consistent with our studies of ROS in human PMN using C6 to block hHv1. When activated, PMN release ROS, proteases, cytokines, and neutrophil extracellular traps (NETs), all of which play a role in killing pathogens[14]. These same mediators injure the lung leading to accumulation of Alb-rich alveolar edema, poor gas exchange and arterial hypoxemia. ARDS mortality correlates with the extent of neutrophilia in the lungs.[7] Systemic hypoxemia is caused by ventilation-perfusion mismatch and right-to-left intrapulmonary shunting. In addition, impaired release of carbon dioxide is a major component of respiratory failure and is an independent predictor of mortality in ARDS as is decreased respiratory compliance[15]. The last parameter is among those we show to be improved by administration of our designed inhibitor (C6) in the mouse lung-injury model, a proxy for human ARDS.

FIG. 30: C6 protects in the LPS-induced acute lung injury mouse model. ARDS is marked by PMN-mediated inflammation and acute respiratory failure, features that are reflected in the LPS mouse including recruitment and activation of PMN in the lungs, damage to the alveolar permeability barrier and ROS production. FIG. 30 offers evidence that C6 is protective in two trials performed by A. Schwingshackl (UCLA), by methods he uses routinely[92]. LPS was administered intravenously (IV)+/−C6 (10 mg/kg) IV to C57BL/6 mice (n=6-7). At 24 h, lung compliance was measured and lung lavage performed (BAL). LPS alone produced the deleterious hallmarks of pulmonary injury, including markedly decreased compliance, and increased BAL levels of ROS, protein and cells, and this was suppressed by C6. Furthermore, C6 inhibited LPS-induced accumulation of proinflammatory cytokines in the BAL fluid. Interestingly, in addition to these lung injury markers, LPS-treated mice showed marked baseline tremor and decreased motility, and this was entirely absent in mice given C6. These data offer strong support for our hypothesis that inhibiting Hv1 to suppress PMN activation and lung inflammation offers a potential new therapeutic approach to ARDS.

FIG. 30: C6 improves ARDS parameters in LPS mouse model: lung compliance (C), and lavage ROS, protein, and cell count.

C6 is a de novo inhibitor isolated from over 10⁶ combinatorial variants of voltage-sensor directed neurotoxins, and C6 allowed us to demonstrate that hHv1 is required for the normal operation of human sperm and the PMN innate immune response. This was not feasible when the available hHv1 inhibitors were promiscuous and of low affinity ($Zn^{2+}$ ions[29], HaTx1[30,31], and guanidinium derivatives[32]). As the studies show, Alb is an endogenous hHv1 activator that is required for human sperm and PMN to operate. Further, we present a testable structural-mechanistic model for hHv1 activation by Alb whereby the two S3-S4 hHv1 sensor loops bind to sites in the Alb domain II. This allowed us to rationally-design a new agent (L*), a peptide that suppresses Alb-activation and ROS production by human PMN.

We reveal as well that oxidized metabolites of Alb formed naturally at sites of inflammation by PMN are even more potent activators of hHv1 and ROS release. Provided is in vivo support for our underlying hypothesis that suppression of hHv1 can be therapeutic: C6 administration inhibits pulmonary compromise and inflammatory mediator release in an acute lung injury mouse model.

Figure 31:
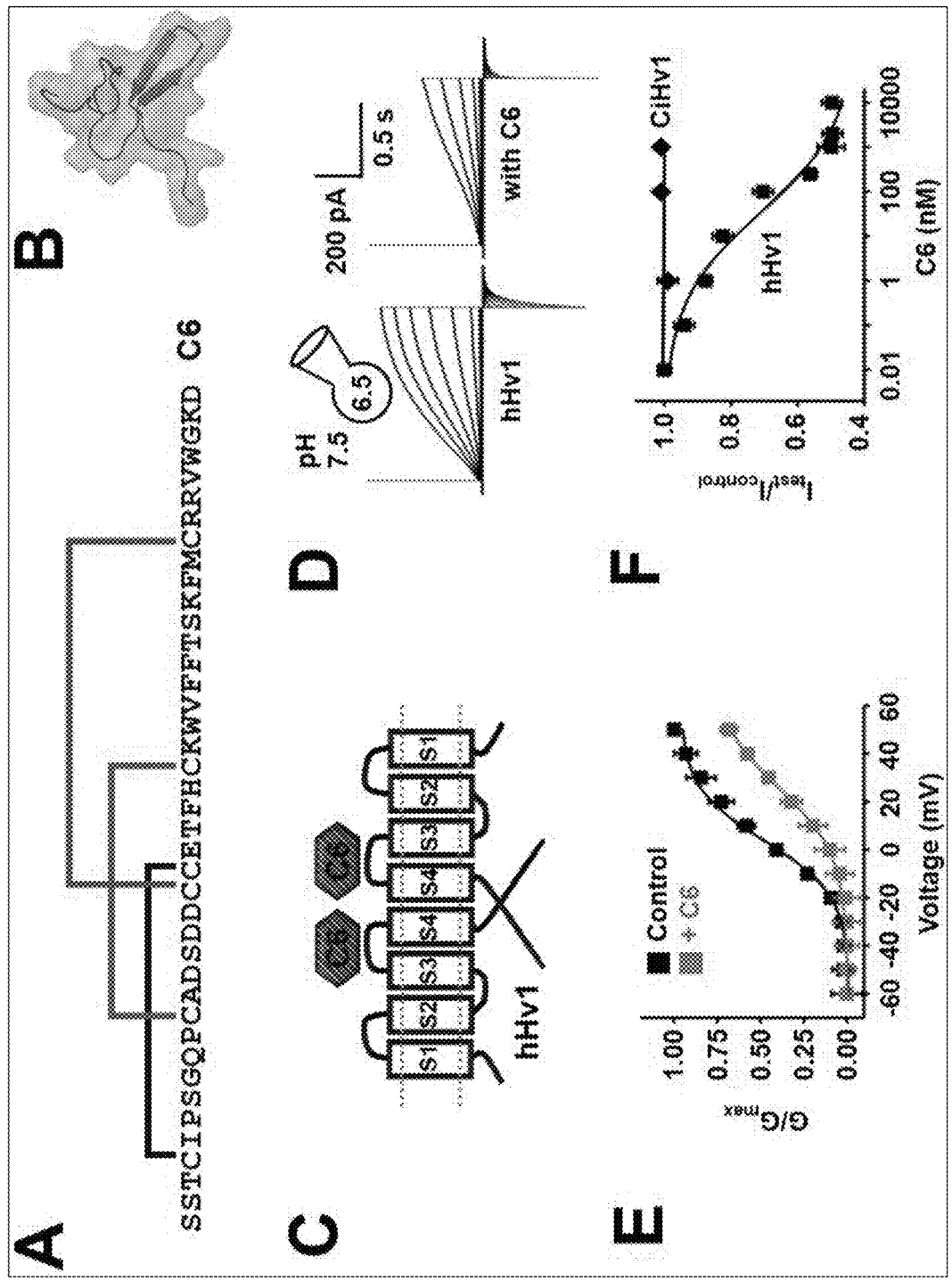

FIG. 31: C6, a designed peptide blocker for hHv1. Studies of hHv1 were impeded when known inhibitors, like $Zn^{2+}$, were indiscriminate and weak suppressors[27,28]. To create C6, we designed a combinatorial library of approximately 1 million novel peptides on the inhibitor cysteine knot (ICK) scaffold of gating-modifier toxins that bind to the VSDs in VGICs—these peptides "ride" the sensors to alter their movement and show state-dependent affinities[36,37]. Phage expressing C6 were selected by their capacity to bind to purified hHv1 channels[5]. C6 has 41 residues and an ICK structure stabilized by three disulfide bonds[5]. Synthesized C6 inhibits hHv1 in a dose-dependent, voltage-dependent, and cooperative manner (for example, binding of the first C6 increases the affinity of the second approximately 12-fold). We used chimeras of hHv1 and CiHv1, an $H^+$ channel from *Ciona intestinalis* we determined to be C6-insensitive, to show that C6 binds to the external loop linking the S3 and S4 TM segments. With single molecule TTRF (smTIRF) microscopy, we showed that two C6 bind to hHv1, one on each S3-S4 loop. C6 binding favors the "down" sensor conformation associated with closed channels (as do other inhibitory gating-modifier toxins), showing greater affinity at the negative RMP of sperm and PMN (approximately 0.75 nM at −50 mV) compared to open channels (approximately 30 nM at +50 mV). As expected, C6 slows activation, speeds deactivation, and shifts the voltage required to open hHv1 to more positive potentials. Conversely, we show next that one Alb binds to both S3-S4 loops, favoring the "up" sensor position, and has the opposite effects as C6 on the kinetics and voltage-dependence of hHv1 activation.

FIG. 31. C6 blocks hHv1: A C6 residues and disulfides. B 3D model of C6. C Two C6 on two hHv1 subunits. D hHv1 current −/+250 nM C6 (1EK293T cells, steps of 10 mV, −60 mV to 50 mV). E G-V for hHv1+/−250 nM C6. F C6 inhibition of hHv1 and CiHv1. The $K_i$ for hHv1 estimated from fit to a Hill equation is 30±10 nM with a coefficient of 0.5±01.

Figure 32:
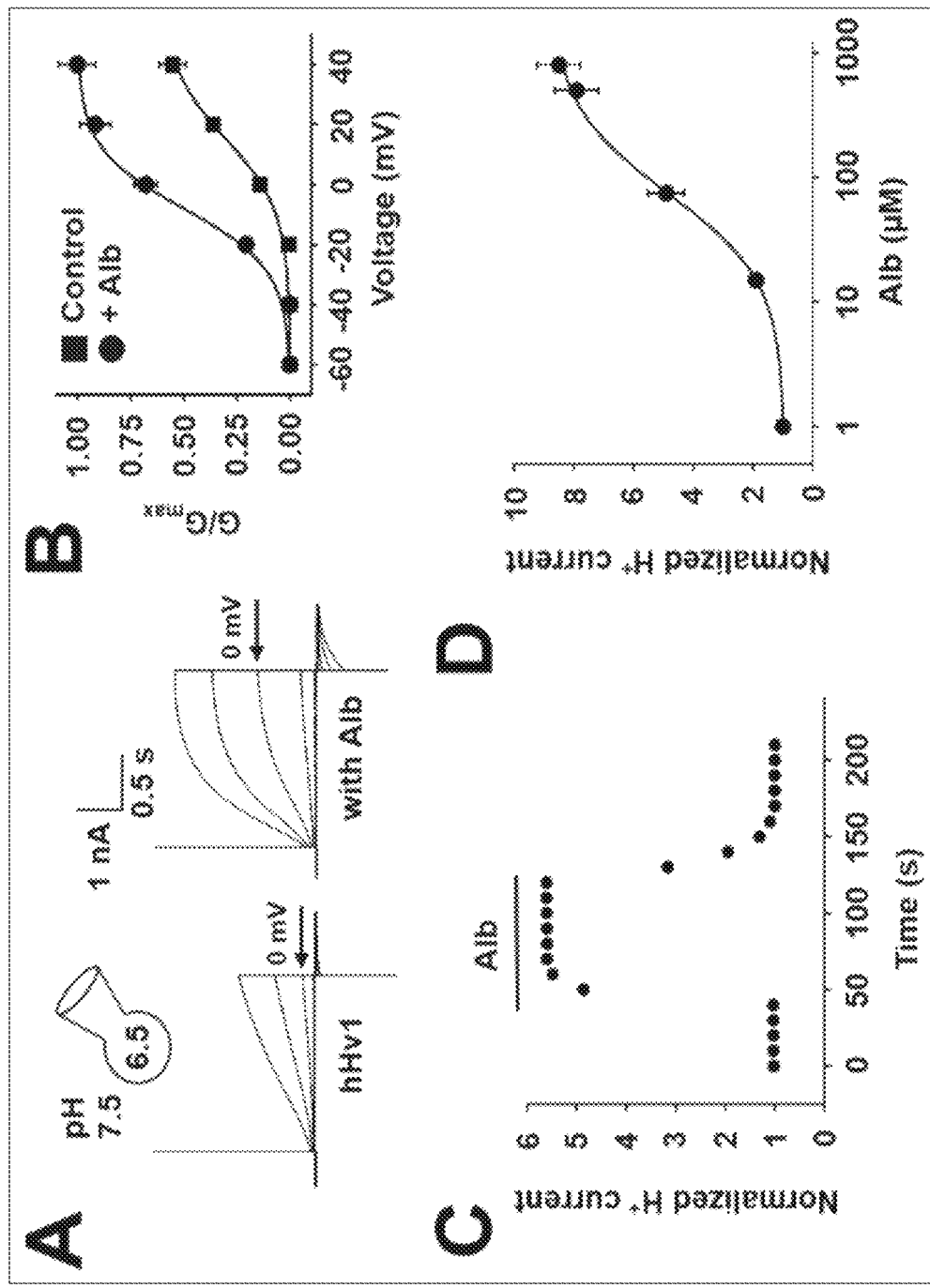

FIG. 32. A/b activates hHv1. Alb is the most abundant protein in interstitial fluids where it is present at various levels (7-30 mg/mL)[38] and in plasma (34-54 mg/mL) where it transports hormones, metabolites and drugs, serves as an antioxidant, and supports oncotic pressure[39]. We wondered about a physiological connection between Alb and hHv1 based on the documented increase in reproductive success when in vitro fertilization solutions are supplemented with Alb[40,41] and the contrasting concentrations of Alb in semen (just 15 µM, 1 mg/mL)[42] and in uterine fluid (500 µM, 34 mg/mL)[43].

Alb was implicated in the deleterious systemic inflammatory responses mediated by PMN after cardiopulmonary bypass and in periodontal disease[44,45] When 75 µM Alb is added to the bath, hHv1 currents in HEK293T cells increase approximately 5-fold at 0 mV due to an approximately 8-fold acceleration of activation, approximately 3-fold slowing of deactivation, and a shift in the $V_{1/2}$ of approximately −23 mV (FIG. 24). Alb stimulation of hHv1 currents is reversible ($k_{on}$ approximately $1.3\times10^3$ $M^{-1}s^{-1}$, $k_{off}$ approximately 0.084±0.009 $s^{-1}$) and concentration-dependent, with a dose-response EC50 of 75±9 µM and Hill coefficient of 1.2±0.1, consistent with binding of one Alb per hHv1 dimer at 0 mV. Confirming Alb-induced currents are passed by hHv1, 20 µM C6 blocks all the Alb-induced current (not shown).

FIG. 32: Alb activates hHv1. A Alb (75 µM) activates hHv1 (in HEK293T cells, 20 mV steps, −60 mV to +40 mV). B Alb shifts G-V to favor opening. C Time-course for activation and deactivation on application (bar), at 0 mV normalized to pre-Alb level. D Dose-response for Alb activation at 0 mV.

Figure 33:
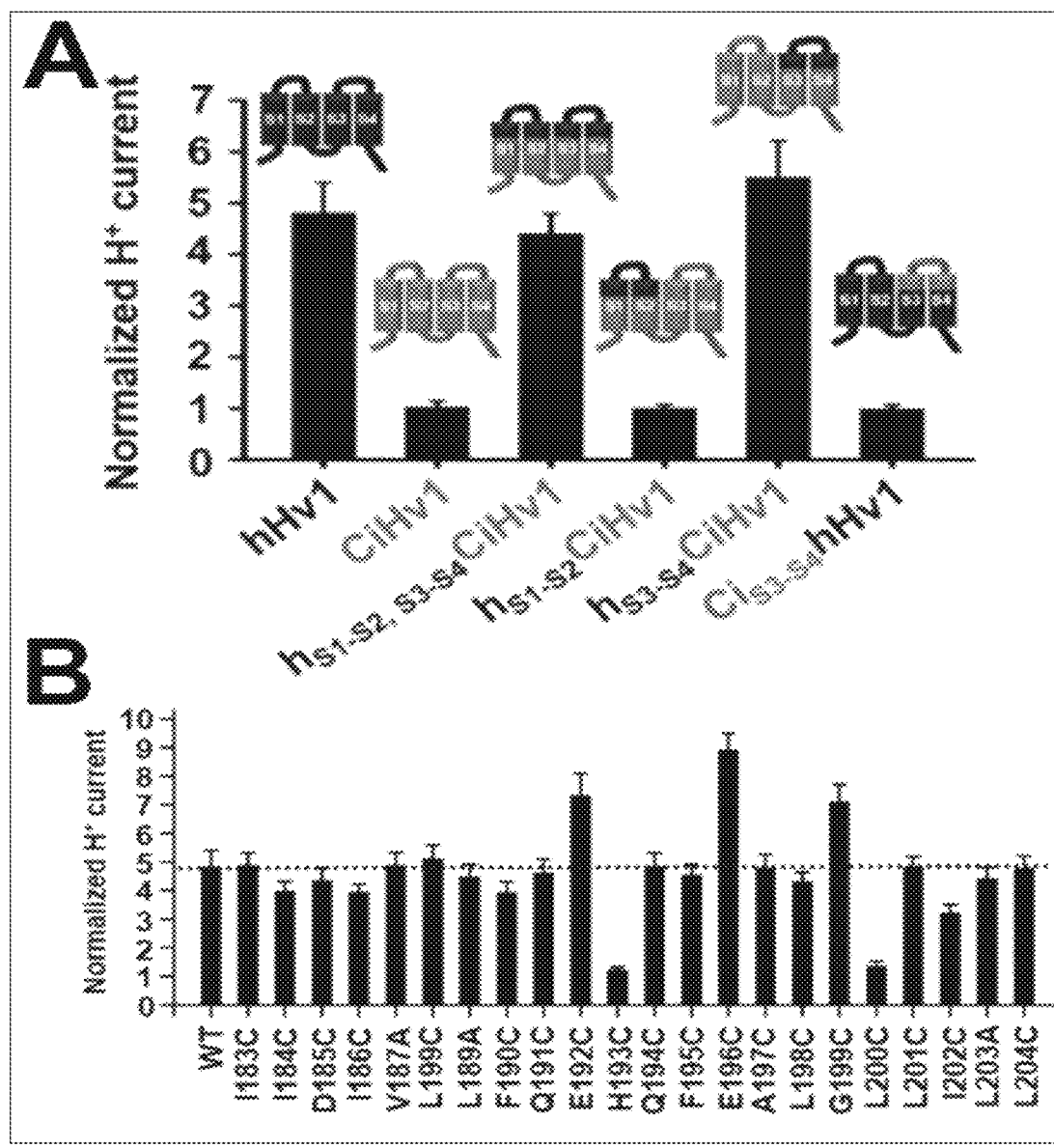

FIG. 33: Alb binds to the hHv1 S3-S4 loop. Because CiHv1 is insensitive to Alb, we were able to use the chimeras designed to identify the S3-S4 loop as the binding sites for C6 (FIG. 33A). CiHv1 becomes sensitive to Alb if its carries just the S3-S4 loop of hHv1 (hS3-S4CiHv1) or both the S1-S2 and S3-S4 loops (hS1-S2, S3-S4CiHv1), showing affinity like that for WT hHv1 channels in both cases. As expected, hHv1 with the S3-S4 loop of CiHv1 (CiS3-S4hHv1) is insensitive to Alb, supporting the conclusion the hHv1 S3-S4 loop is the major binding epitope for Alb.

Important loop residues (FIG. 33B). A mutational scan of the hHv1 S3-S4 loop (residues 1183 to L204) reveals five noteworthy sites: channels with H193C or L200C are no longer activated by Alb, suggesting these residues may interact directly. Changing three other sites (E192C, E196C and G199C) produces enhanced Alb activation. Studying the sites with other mutations offered hHv1-G199L, a proton channel with an approximately 22-fold improvement in the Alb EC50 (3.4±0.5 µM) compared to WT and no change in the G-V relationship. This work has been useful for interaction studies (next section) and the development of L*, a peptide based on hHv1 that blocks Alb-activation.

FIG. 33: Alb binds to hHv1 S3-S4 loop. A Drawings of hHv1 (black) & CiHv1 (blue) chimeras; current at 0 mv, 75 µM Alb, normalized to pre-Alb levels. B A mutant scan of the hHv1 S3-S4 loop shows 5 key sites.

Figure 34:
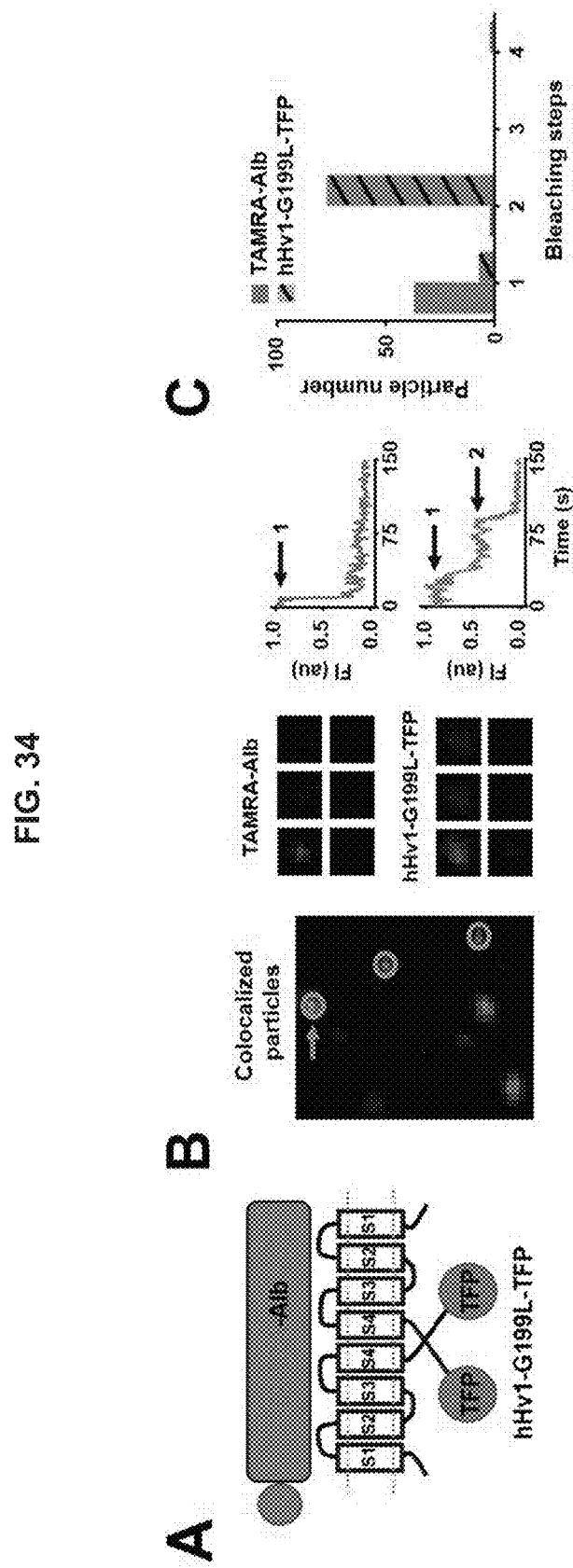

FIG. 34: One Alb binds to dimeric hHv1 channels. The increased affinity of Alb for hHv1-G199L channels allowed a direct study of the interaction using the multiwavelength smTIRF microscope to study the surface of live cells. Alb was labeled with TAMRA on its N-terminus (TAMRA-Alb) and the channel tagged with a teal fluorescent protein on its C-terminus, hHv1-G199L-TFP (FIG. 34). Incubation of TAMRA-Alb with HEK293T cells expressing hHv1-G199L-TFP produced particles containing both fluorophores at the cell surface (FIG. 34B), and continuous illumination allowed the number of channel subunits and TAMRA-Alb molecules to be counted simultaneously by bleaching. hHv1-G199L-TFP channels showed two stepwise decreases in fluorescence in 89% of particles, as expected for a dimeric channel (for hHv1-TFP we also judged approximately 10% singleton events to be consistent with missed events and pre-bleaching at the system bandwidth[5]). With TAMRA-Alb at 3 µM, we calculate a mean Manders' coefficient for colocalization (MCC) of 0.50±0.06, suggesting approximately half the surface channels are associated with TAMRA-Alb. For particles with both fluorophores, confirmed to be intact dimeric channels by observation of two hHv1-G199L-TFP bleaching steps, 95% were associated with one TAMRA-Alb. This stoichiometry is consistent with the dimensions of Alb (30×80×80 Å3, PDB 1BM0)[46] and the estimated, exposed surface area of the dimeric hHv1 channels (approximately 40×40 A2)[1].

FIG. 34: Alb-hHv1 channel stoichiometry is 1:1. A Cartoon of TAMRA-Alb and hHv1-G199L-TFP channel. B Colocalization of TAMRAAlb (red) and hHv1-G199L-TFP (teal) at cell surface (yellow circles). Photobleaching time course montage for particle at arrow (every $5^{th}$ frame shown). Time courses for photobleaching of both fluorophores, show one step for TAMRA-Alb and two for hHv1-G199L-TFP. C Steps histogram. Analysis per 4 supports 1 Alb:2 hHv1 subunits in complex.

Figure 35:
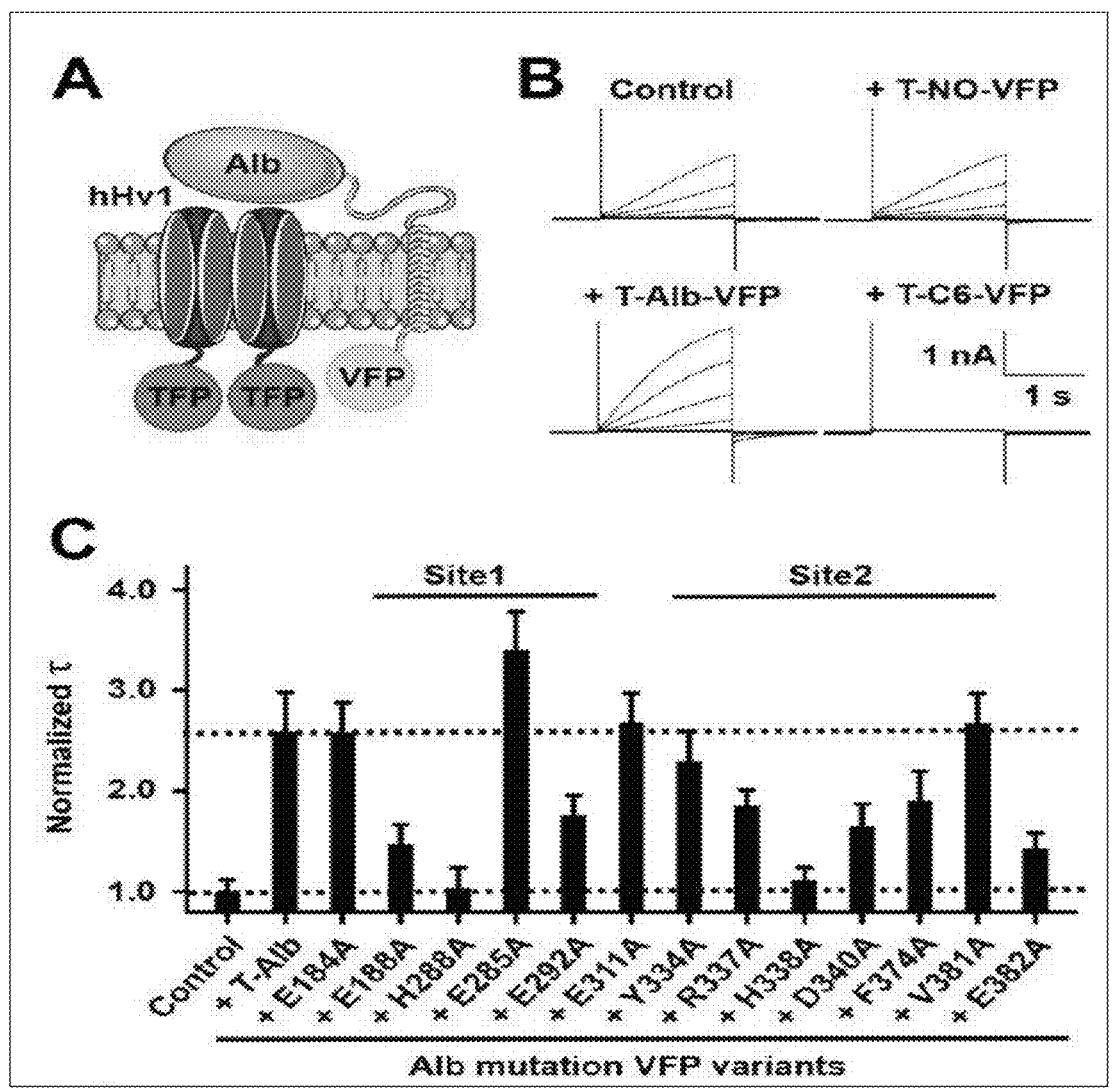

FIG. 35: Alb tethered to the cell surface (T-Alb) allows demonstration that domain II binds to hHv1 and identifies key residues. In the last period, we showed the utility of expressing peptide toxins tethered to the external cell surface (T-toxins) to ease assessment of the effects of changing residues on binding and block of K-channels. The strategy allows mutational scans with simple genetic changes to the toxin gene and avoids the time and expense of synthesis of individual peptides[47,48] Here, we validate and apply the strategy to Alb. Similar to the toxins, the T-Alb construct is comprised of the gene encoding Alb (or variants) in-frame with those for the TM helix of a platelet-derived growth factor receptor and the fluorescent protein mVenus (VFP) on the intracellular C-terminus, to produce T-Alb-VFP (FIG. 35A). When T-Alb-VFP is expressed with hHv1-TFP, it is observed to activate the channel in a manner reminiscent of soluble Alb in the example, the effect is like 35 μM free Alb in solution, that is, the current at 0 mV increases approximately 3-fold, activation increases approximately 4-fold, deactivation slows approximately 2-fold, and $V_{1/2}$ shifts by −12 mV. In contrast, tethered constructs with no insert (T-NO-VFP) have no effect on hHv1 current while T-C6-VFP fully suppresses the current (FIG. 35B). Expression of T-Alb-VFP (or T-C6-VFP) with hHv1-TFP allows the use of donor-decay FRET microscopy to show physical interaction of T-Alb (or T-C6) with the channel on the external cell surface because the intracellular fluorophores are brought together, as before with T-toxins[49,50]. Thus, hHv1-TFP alone, and hHv1-TFP with T-NO-VFP, have mean time constants for photobleaching ($\tau$) of 24±4 s and 27±5 s, respectively, whereas, hHv1-TFP with T-Alb-VFP and T-C6-VFP, show $\tau$ of 54±6 s and 78±8 s, respectively. Applying this strategy to each of 3 domains of Alb (that others had previously shown express and fold separately[46]) allowed us to identify domain II as carrying the site(s) for hHv1 interaction (data not shown, submitted[2]).

To model the Alb-hHv1 complex in the absence of high resolution information, in silico docking was performed (HPEPDOCK)[51] using the crystal structure of Alb (PDB 1BM0)[46] and the 11-residue binding epitope we identified in S3-S4 loop of hHv1 (F190 to L200). Initial docking predicted two sites in Alb, separated by approximately 27 Å, as putative hot spots for interaction. This distance is comparable to that between H193 residues in the two hHv1 subunits (approximately 26 Å) in the 3D model based on electron paramagnetic resonance (EPR) spectroscopy[1]. Consistent with the mutation that eliminated Alb activation (FIG. 25B), hHv1-H193 is predicted by docking to be a key component of the Alb "receptor" in the S3-S4 loop. In Site 1, two low energy poses from in silico docking exhibit interaction of hHv1-H193 and Alb-E188, Alb-H288, Alb-E292. In Site 2, three low energy poses exhibit interaction of hHv1-H193 and Alb-Y334, Alb-R337, Alb-H338, Alb-D340, Alb-F374, Alb-V381. We tested these docking predictions with 11 T-Alb-VFP variants, three in Site 1 (E188A, H288A, E292A) with nearby E184A as a control, and six in Site 2 (Y334A, R337A, H338A, D340A, F374A, V381A) with nearby E311A as a control. Each T-Alb-VFP mutant was evaluated for its impact on the interaction with hHv1-TFP in live cells using FRET. hHv1-H288 in Site 1 and hHv1-H338 in Site 2, appear to be fundamental to Alb binding (FIG. 35C).

FIG. 35: Key residues revealed by T-Alb scanning. A Cartoon of TAlb-VFP and hHv1-TFP channel. B hHv1-TFP current −/+ expression with T-Alb-VFP, T-NO-VFP (no insert) and T-C6-VFP. C FRET validates prediction of T-Alb-VFP residues interact with hHv1 S3-S4.

A structural model and mechanistic hypothesis for Alb activation (with E Perozo). A model of the Alb-hHv1 complex was generated based on the residues identified as critical for binding by voltage-clamp and FRET (FIG. 25B), the crystal structure of Alb (PDB 1BM0)[46], and the EPR-derived 3D model of hHv1. An all-atom model of the TM region of the dimeric hHv1 channel (residues G90 to I218) was embedded in a lipid bilayer with excess hydration. MD simulations were run first with distance restraints (<5 Å) involving the highest-impact residues (hHv1-H193 in each subunit and Alb-H288 and Alb-H338, in Sites 1 and 2, respectively). These restraints were gradually applied over 10 ns using the Colvars module in NAMD. Local hydrogen bonding networks in Site 1 and Site 2 were refined in subsequent 150 ns simulations. Finally, a 1 μs long timescale ANTON2 simulation[52] was performed to further relax the Alb-hHv1 complex (FIG. 35A). This resting state model sanctions a mechanistic hypothesis whereby a "one-click rotation" of the two S3-S4 loops allows the first gating charge (R205) in each sensor to rise up into the binding sites in the DII domain to be adjacent to a negatively-charged Alb residue (Alb-E294 and Alb-E297), an electrostatic attraction we theorize facilitates outward movement of the two VSDs (FIG. 35B).

Figure 36:
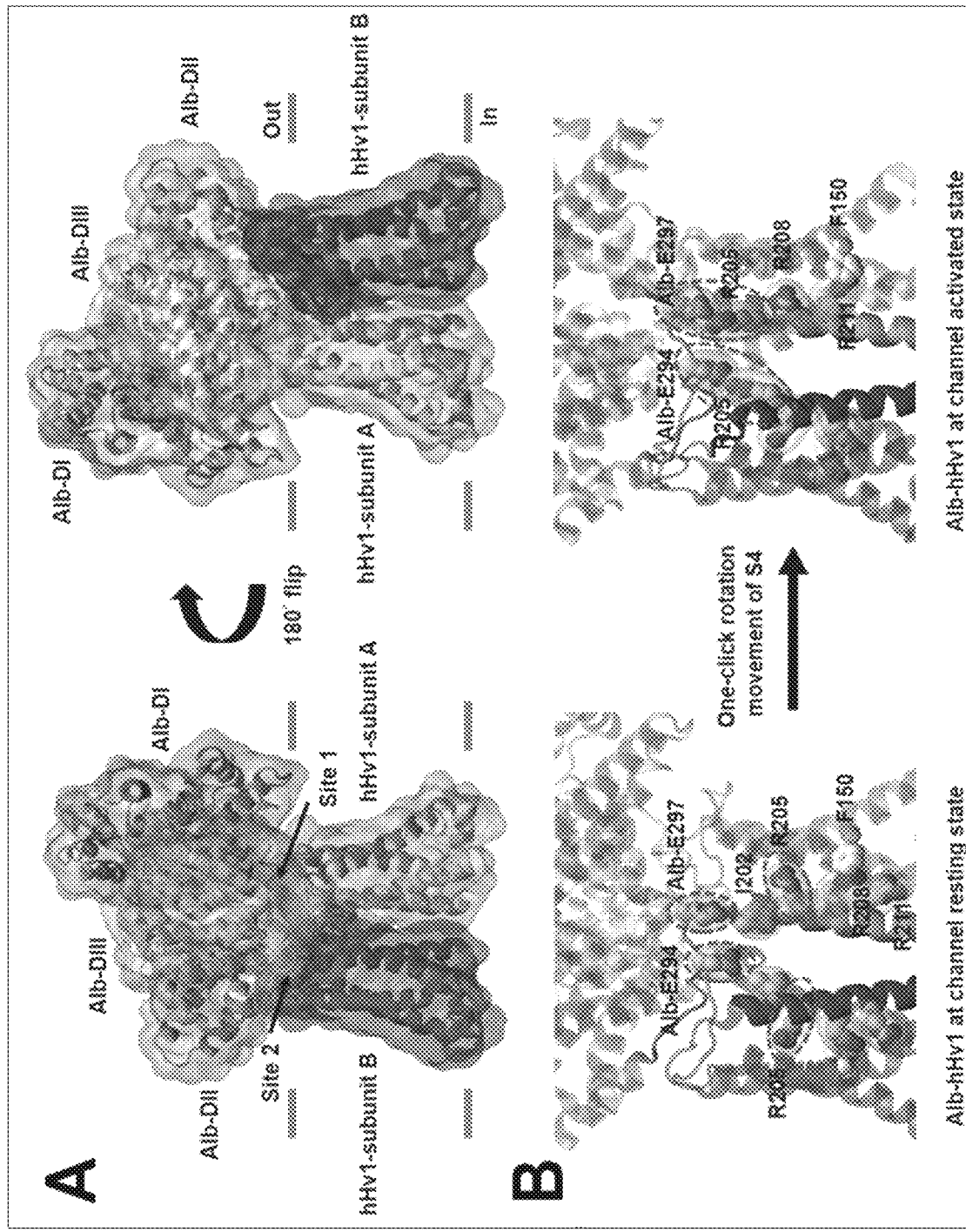

FIG. 36: A structural model of Alb-hHv1 complex. A. Alb-hHv1 complex in two orientations showing the 3 Alb domains DI (grey), DII (orange) and DIII (wheat) and the two subunits of a dimeric hHv1 channel (cyan and blue). B A proposed gating modification mechanism.

Figure 37:
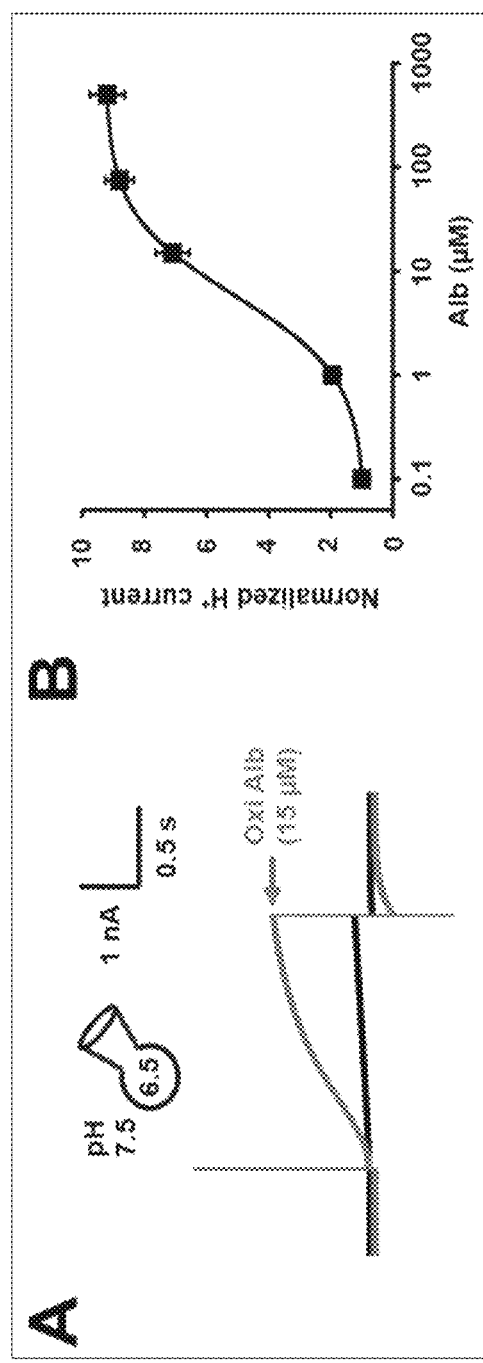

FIG. 37: Oxidized Alb is produced at sites of inflammation and has greater potency as an activator of hHv1. ROS production at sites of inflammation leads to oxidative modifications of Alb[53]. This is documented in human pathological conditions[54-56] in a growing number of diseases[54]. For these reasons, we studied the action of ROS-oxidized Alb on hHv1. We observe that oxidized Alb activates hHv1 channels approximately 15-fold more effectively (EC50=5.3±0.6 μM) than WT Alb (FIG. 37). We judge this to be important because oxidized Alb is produced when PMN release ROS and we suspect this amplifies inflammatory mediator release and damage; indeed, Alb oxidation is posited to be an inflammatory accelerant due to neutrophil activation in patients with diabetic neuropathy[57] and on hemodialysis[53].

FIG. 37: Oxidizing Alb enhances activation of hHv1. A hHv1 current +/−15 μM oxidized Alb (red trace), 0 mV, HEK293T cells. B Dose response relationship for oxidized Alb activation of hHv1 normalized pre-Alb current.

FIG. 38: Alb stimulates hHv1 current and ROS generation in human PMN. To produce ROS, NOX2 transfers electrons across the membrane, depolarizing and acidifying the cell, and this acts to suppress more NOX2 activity[21] unless there is $H^+$ efflux[72,73], a process we showed to require hHv1 activity in human PMN using C6[5]. In the new data, we show Alb is also required for PMN to produce ROS. FIG. 30A shows that Alb increases $H^+$ currents in human PMN approximately 2.5-fold at +60 mV (Kd approximately 110 μM) and, confirming the currents are passed by hHv1, they are blocked by 20 μM C6.

To measure ROS release we use a luminol-amplified chemiluminescence assay for superoxide anion $(O_2{*}^-)^{74}$. When we apply an immune stimulus (1 μM fMLP[75]) without Alb, a transient rise and decay in ROS release is observed (FIG. 30B); in contrast, with 450 μM Alb (normal tissue range), the peak magnitude of ROS release increases and, more significantly, ROS production is sustained so it is still elevated approximately 7-fold at 60 min, long after release returns to baseline in the absence of Alb. ROS potentiation by Alb is concentration-dependent, whereas a control protein (Fab) neither augments peak nor sustains ROS production. Alb potentiation is fully inhibited by 20 μM C6, indicating that hHv1 mediates the response. In the absence of fMLP, Alb does not increase ROS release, consistent with its role as a potentiator and not an immune stimulus (not shown).

FIG. 38: Human PMN current and ROS. A Left, H⁺ currents increase with Alb, steps −60 to 60 mV. Right, Current with Fab, Alb, Alb+20 µM C6 (60 mV, n=4 cells). B Left, Alb increases and sustains ROS; C6 blocks ROS. Right, Alb increases ROS levels.

FIG. 39: Oxidized albumin is more potent than Alb. We show above that oxidized Alb stimulates hHv1 H⁺ currents more effectively than WT Alb. Here, we show that oxidized Alb is also at least 2-fold more effective than WT in potentiating ROS production (FIG. 30), a finding we expected after showing the role of H⁺ efflux via hHv1 in PMN NOX2-dependent ROS production[5]. We have studied the biophysics of cloned hHv1 with Alb and oxidized Alb; here, we study the native channel in human PMN. We expect to observe acceleration of activation by Alb, that is enhanced by Alb oxidation, leading to faster control of membrane potential and $pH_i$ during immune stimulation 28 and, thereby, faster $Ca^{2+}$ influx, migration, and release of cytokines, elastase and NETs[13,76].

Figure 40:
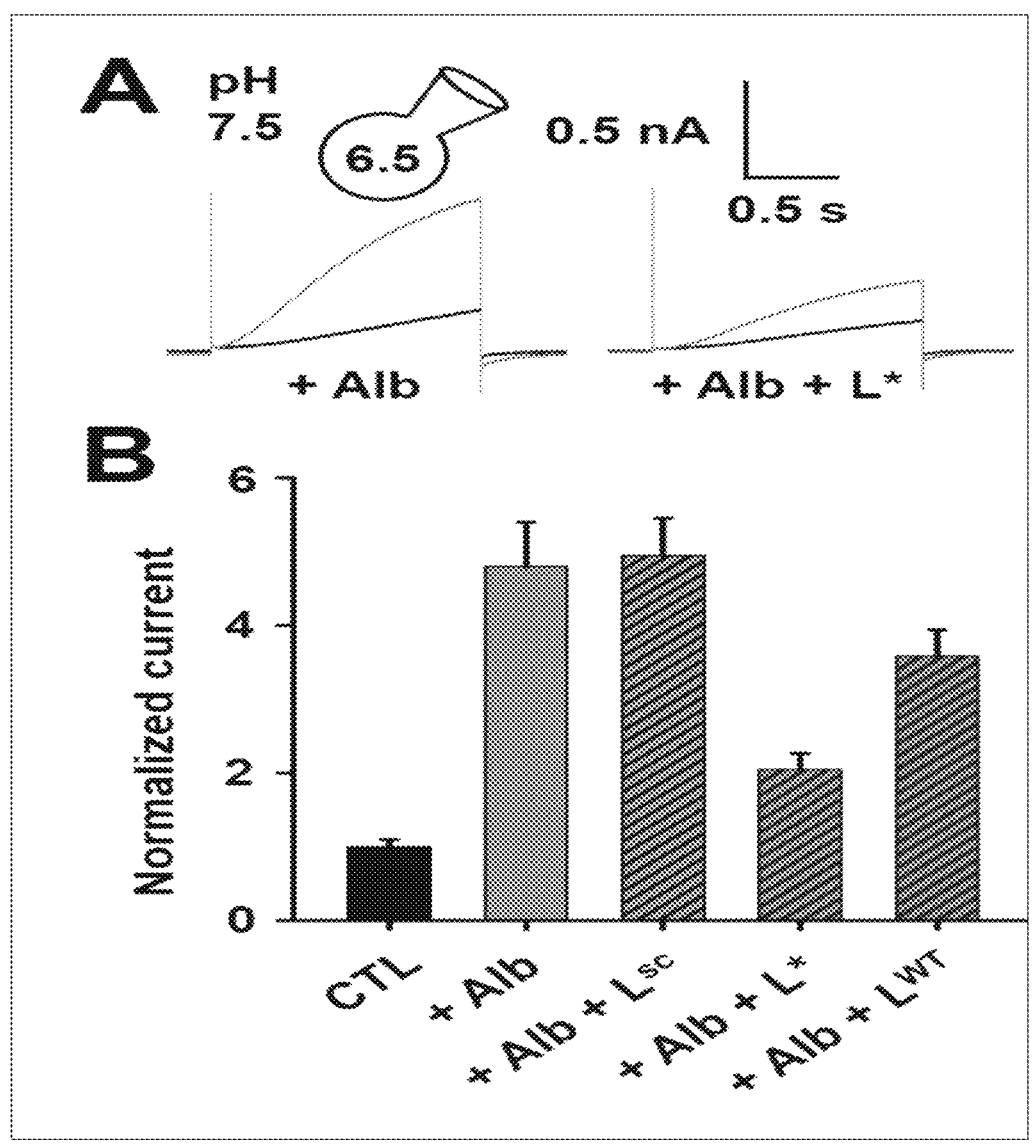

FIG. 40: A designed peptide based on the S3-S4 loop peptide (L*) inhibits Alb activation of hHv1 and human PMN ROS production. Scanning the S3-S4 loop of hHv1 showed two changes, E192C and G199C, that improved activation by Alb. Studying these sites with further mutations yielded hHv1-E192A-G199L, a proton channel with an approximately 110-fold increase in the Alb EC50 (0.68±0.07 µM) compared to WT hHv1. We synthesized a loop peptide (L*) of 11 residues corresponding to the hHv1 S3-S4 loop Alb binding residues (F190 to L200), carrying E192A and G199L anticipating it might compete favorably with the hHv1 channel for Alb binding. Indeed, L* decreased the amplitude Alb potentiation of cloned hHv1 H⁺ current (FIG. 40). In contrast, a scrambled L* peptide (Lsc) did not hinder activation, and WT loop peptide (L) had a weaker effect. L* suppresses Alb potentiation of human PMN H⁺ current and ROS production similarly (not shown).

FIG. 40: L* suppresses Alb-activation of hHv1. hHv1 current, 0 mV, HEK293T cells. A+/−500 µM L* (red), B−/+75 µM Alb+500 µM Lsc (scramble) L* or L.

FIG. 41: Bivalent C6, a 2nd generation inhibitor with greater affinity. We have shown that hHv1 has two C6 binding sites, one on the S3-S4 loop of each subunit, and that binding of the first C6 increases the affinity of the second approximately 12-fold[5]. As natural bivalent peptide toxins are reported to have high affinity for their targets[90], we estimated the distance separating the two C6 sites in hHv1, and designed a bivalent C6 using the linker in the bivalent spider toxin, DkTx[90]. We have tested bivalent C6 in tethered form offering preliminary evidence for greater hHv1 blocking efficacy than for the monovalent form.

Figure 42:
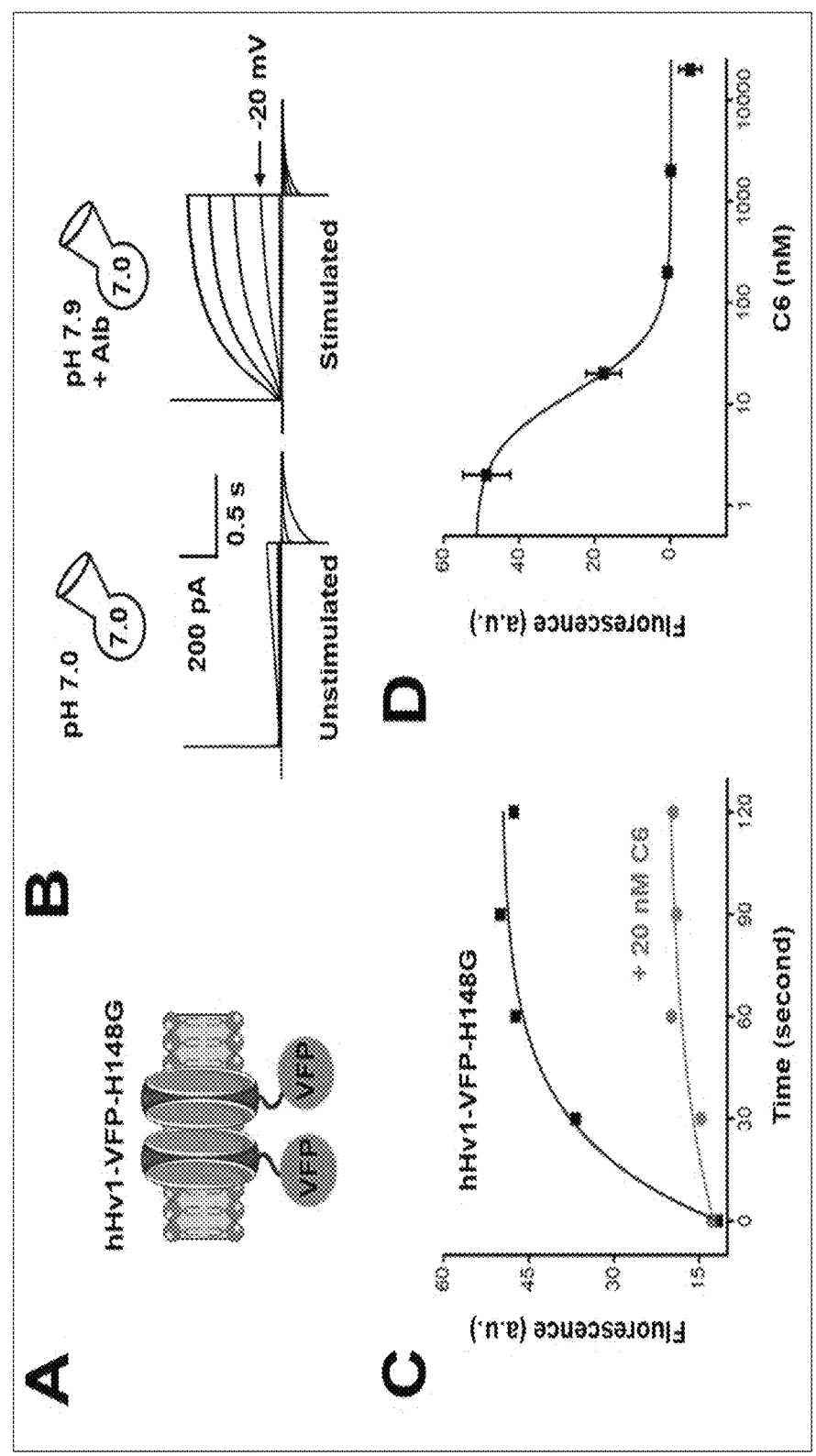

FIG. 42: High-throughput assay for hHv1 regulators. We have designed and validated a new assay to monitor changes in $pH_i$ based on hHv1 function in live cells, in real time. The Islas group created hHv1-VFP-H148G from mVenus (VFP) showing that protonation decreases fluorescence intensity and that the H148G change shifts the pKa to 7.6 (from 5.7), into the physiological range. They expressed the construct in Xenopus oocytes and demonstrated H⁺ efflux via hHv1 to deplete protons near the channel and increase pH[91]. To produce a high throughput assay, we expressed the construct from a CMV promotor in HEK293T cells so that 2×10⁵ cells can be studied in 96-well format with rapid solution exchange (approximately 5 ms) in a microplate fluorometer (Fluoroskan). The assay works because the natural intracellular H⁺ level is low (less than (<) 0.1 µM at pH 7.2), and is altered readily with H⁺ efflux via hHv1 given the small solute space (FIG. 42A). With symmetric pH 7.0, the cells pass little current at the RMP (approximately 20 mV based on current clamp) (FIG. 33B); on a rapid shift to pH 7.9 hHv1 currents can be readily measured at 20 mV (here we show the variation with augmentation by Alb) and this underlies the assay. On excitation at 510 nm and emission collection at 538 nm, cells with hHv1-VFP-H148G show a rise in fluorescence due to $pH_i$ elevation that is suppressed by C6 with a $K_i$ approximately 13 nM (FIG. 42C, FIG. 42D). L* also suppresses hHv1 in the assay when Alb is present (not shown). Cells with T-VFP but no channel (T-VFP-H148G) serve to normalize baseline. The assay also has identified channel activators (not shown). Note: with solutions of varied pH and the H⁺ ionophore nigericin, we also measure the pKa of hHv1-VFP-H148G to be approximately 7.55 (not shown).

FIG. 42: hHv1-VFP-H148G assay. A: Channel. B: Switch bath from pH 7 to 7.9±500 µM Alb activates hHv1, C: Raising $pH_i$ & fluorescence unless hHv1 is blocked (curves normalized to TVFP-H148G). D: C6 Ki approximately 13 nM, 3 wells per dose.

FIG. 30: C6 protects in the LPS-induced acute lung injury mouse model. ARDS is marked by PMN-mediated inflammation and acute respiratory failure, features that are reflected in the LPS mouse including recruitment and activation of PMN in the lungs, damage to the alveolar permeability barrier and ROS production. FIG. 34 offers exciting evidence that C6 is protective in two trials performed by A. Schwingshackl (UCLA), by methods he uses routinely[92]. LPS was administered intravenously (IV)+/−C6 (10 mg/kg) IV to C57BL/6 mice (n=6-7). At 24 h, lung compliance was measured and lung lavage performed (BAL). LPS alone produced the deleterious hallmarks of pulmonary injury, including markedly decreased compliance, and increased BAL levels of ROS, protein and cells, and this was suppressed by C6. Furthermore, C6 inhibited LPS-induced accumulation of proinflammatory cytokines in the BAL fluid (IL-6, CCL-2, and CXCL-10/IP-10, n=7, data not shown). Interestingly, in addition to these lung injury markers, LPS-treated mice showed marked baseline tremor and decreased motility, and this was entirely absent in mice given C6. These data offer strong support that inhibiting Hv1 to suppress PMN activation and lung inflammation offers a new therapeutic approach to ARDS.

FIG. 30: C6 improves ARDS parameters in LPS mouse model: lung compliance (C), and lavage ROS, protein, and cell count.

Example 3: Mouse Model for Bacterial Pneumonia (LPS Administration into the Lungs) and Sepsis is Suppressed by C6 Peptide This example demonstrates that methods and compositions as provided herein are effective for inhibiting, ameliorating or preventing PMN-mediated inflammation in vivo.

Here, we demonstrate that a mouse model for bacterial pneumonia (LPS administration into the lungs) and sepsis is suppressed by C6 peptide. The pathologic stimulus is LPS delivered into the lungs and the treatment is C6 given intravenously.

Method

C57BL/6 mice aged 9-12 weeks (half male half female) were used for experiments. Lipopolysaccharide (LPS, 10 mg/mL, 50 µL) was administrated intratracheally (IT) to induce acute lung injury. 5 hours post LPS induction, 2.5 mg/kg C6 peptide was administrated intravenously (IV) for treatment. 24 post LPS induction, another dose of C6 peptide (2.5 mg/kg) was administrated IV in order to supplement the bioavailability of C6. DMSO was used as negative control for treatment. 48 hours post LPS induction, the lung compliance was determined using the Flexivent system, then mice were sacrificed and other lung injury parameters were quantified. Briefly, alveolar-capillary barrier dysfunction was accessed based on the total bronchoalveolar lavage (BAL) fluid protein concentration and total BAL cells counts, inflammation level was assessed by quantification of BAL inflammatory cytokines levels, and ROS production level in BAL fluids.

Results

C6 Reduces the Body Weight Loss of Mice Induced by LPS (FIG. 1).

FIG. 43: Legend: LPS induced mice treated with DMSO had continuing body weight loss in 24 and 48 hours, while mice treated with C6 has significant less weight loss in 24 h and less (although not significant) weight loss in 48 h.

ARDS is marked by PMN-mediated inflammation and acute respiratory failure, features that are reflected in the LPS-induced mice including recruitment and activation of PMNs to the lungs, damage to the alveolar permeability barriers, and a decrease in lung compliance. Administration of C6 improves the lung compliance of mice induced by LPS (FIG. 44).

FIG. 44: LPS induced mice treated with DMSO had decreased lung compliance after 48 hours, while mice treated with C6 had improved lung compliance.

The healthy lung is structured to facilitate rapid gas transfer across the distal alveolar-capillary unit. The alveoli consist of a continuous monolayer of endothelial and epithelial cells that restrict the passage of solutes and fluid but allow diffusion of carbon dioxide and oxygen from the vasculature. Large numbers of PMNs traverse the alveolar capillaries. During ARDS, alveolar endothelial cells and resident macrophages secrete chemokines to recruit circulating PMNs to migrate into the alveoli damaging the alveolar-capillary barrier. Administration of C6 decreases the total cell accounts (including neutrophils) in BAL fluid (FIG. 45).

Figure 45:
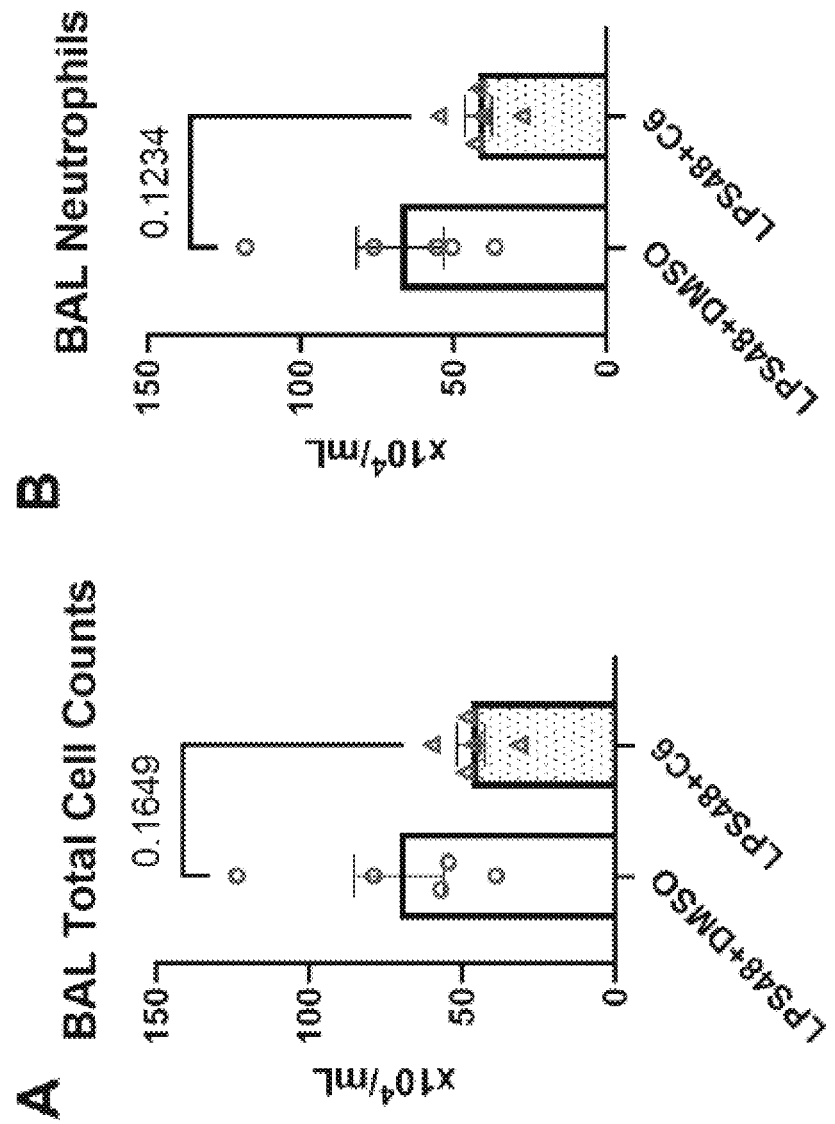

FIG. 45: LPS induced mice treated with DMSO had cell influx in lung after 48 hours, while mice treated with C6 has approximately 30% less cell influx (A), most of which are neutrophils (B).

Protein-rich fluid influx into the lung after the damage of the alveolar-capillary barrier in ARDS. Administration of C6 decreases the total protein concentration in BAL fluid (FIG. 45).

FIG. 46: LPS induced mice treated with DMSO had protein influx in lung after 48 hours, while mice treated with C6 has significantly less protein influx.

When activated, PMNs release ROS, which plays a role in killing pathogens, but also injures the lung leading to accumulation of alveolar edema, poor gas exchange and arterial hypoxemia.

Administration of C6 decreases the total ROS production by cells in BAL fluid (FIG. 47). FIG. 47: Cells in BAL fluid was recovered by centrifuge and the ROS production by cells was continually quantitated for 9 hours using DCFDA. Cells from LPS induced mice treated with DMSO had large ROS production during 9 hours measurement, while cells from mice treated with C6 have significantly less ROS production (ROS production at three time points, 3 h, 6 h, and 9 h were compared and shown).

The levels of proinflammatory cytokines are elevated in BAL fluid in ARDS patients. C6 prevented LPS-induced accumulation of proinflammatory cytokines, including IL-6, IFN-γ and IP-10 in the BAL fluid (FIG. 48).

FIG. 48: LPS induced mice treated with DMSO had increased proinflammatory cytokines accumulation in BAL after 48 hours, while administration of C6 significantly decrease the level of IL-6, IFN-7 and IP-10 in the BAL fluid.

Example 4: Molecular Determinants of Inhibition of the Human Proton Channel hHv1 by the Designer Peptide C6 and a Bivalent Derivative Before the development of C6, known hHv1 inhibitors were pharmacologically promiscuous or of low affinity (8-10). Synthesized C6 inhibits hHv1 by binding with positive cooperatively to the external channel residues linking the S3 and S4 transmembrane spans (S3-S4 loop), one peptide on each loop, and holds the voltage sensor in a conformation that favors channel closure (FIG. 1A) (1). As a result, the channel passes fewer $H^+$ ions because more positive voltages are required to open the pores. C6 does not inhibit Ciona intestinalis Hv1 (CiHv1) and other voltage-gated $K^+$, $Na^+$, $Ca^{2+}$ channels that we tested (1). Single-molecule total internal reflection fluorescent (smTIRF) microscopy was used to show that C6 binds to hHv1 expressed in HEK293T cells with a dissociation constant ($K_d$) of 0.75 nM at resting membrane potential (−49 mV) (1). C6 affinity for hHv1 decreases with depolarization, achieving just 50% inhibition with 1 μM C6 at +40 mV with a partial block $K_i$ of 31 nM (1).

Here, we demonstrate that as with natural gating modifier toxins, C6 dissociation is accelerated by depolarization (11, 12). As expected, mutations in the S4 of hHv1 that favor the open channel state show a lower affinity for C6, while mutants that favor channel closure enhance C6 inhibition. Using point mutations, we identity five residues in the hHv1 S3-S4 loop that alter the free energy of blockade (ΔΔG) by more than 2 kcal/mol and that we therefore characterize as important for C6 binding. Taking advantage of a membrane-tethered toxin method (13), we scanned 35 non-cysteine residues in tethered C6 (T-C6) and identified seven that also significantly decrease affinity. We also show that C6 partitions most readily into lipid membranes that contain negatively charged phospholipids. Based on these screening results, molecular dynamics (MD) simulations were carried out to predict energetically important residue-residue interactions in the binding of C6 to hHv1 and the potential role of the lipid bilayer in inhibition. Three predicted C6-hHv1 interaction pairs were confirmed by thermodynamic mutant cycle analysis, supporting the presented structural model of the complex. This model undepins a gating modification mechanism through which binding of C6 holds the S4 helix of hHv1 in the closed "down" conformation. hHv1 operates differently than well-studied voltage-gated channels like those for $K^+$, $Na^+$ and $Ca^{2+}$ ions that have one central pore and four peripheral voltage sensors. Our findings assess the operation and ICK toxin inhibition of $H^+$ channels that are dimeric, with two pores, one within each voltage sensor.

Natural bivalent toxin peptides, such as DkTx and Hi1a, isolated from spider venoms have been shown to modify the function of TRPV1 and ASIC1a channels, respectively. The natural toxins act with superior affinity due to their extremely slow dissociation rate (14, 15) and are comprises of two non-identical ICK motifs that target two adjacent binding epitopes in the channel (16). Guided by the C6-hHv1 complex model, we constructed a homobivalent C6 (C6$_2$) linking two C6 peptides via a 10-residue linker and show that it fully inhibits hHv1 at +40 mV with a K$_i$ of 630 µM. The importance of blocking the channel at positive potentials is clear when considering neutrophils that depolarize during the inflammatory respiratory burst to +58 mV (17), a voltage where monomeric C6 has low affinity. C6$_2$ offers a powerful tool for basic studies of hHv1 and serves with the state dependent blocker C6 as a lead for studying treatment of diseases where the channel contributes to pathology, including pulmonary damage by leukocytes in pneumonia and acute respiratory distress syndrome (an inflammatory lung disease that is lethal in 40% of patients) (18), ischemic stroke (19), cancer (20), and both neuropathic and inflammatory pain (21, 22).

Materials and Methods

Molecular Biology

Human Hv1 (NM_001040107) tagged with a teal fluorescent protein (TFP) was constructed using gBlock gene fragments and inserted into pMAX+ vector, as reported (1). Per our prior reports (13), T-C6 was constructed by replacing the sequence of lynx1, a natural tethered nicotinic acetylcholine receptor peptide modulator, by the sequence of C6 (with N-terminus at front) in frame between the trypsin secretory signal sequence and a six residues flexible linker containing Gly-Asn repeat. The whole sequence of T-C6 was cloned into the pCS2+ plasmid vector that has an SP6 promoter for in vitro transcription of cRNA. T-C6$_{46}$ has a 46 residues flexible linker in which a c-Myc epitope tag is incorporated. T-C6$_2$ was constructed in the backbone of T-C6 by replacing the C6 sequence with nucleotides encoding two C6 peptides linked by a flexible linker of either 5 or 20 Gly-Asn repeats using gBlocks. Point mutations of hHv1 and T-C6 were introduced using the QuikChange Site-Directed Mutagenesis Kit. The sequences of all constructs were confirmed by DNA sequencing.

Toxin Peptide Synthesis and Purification: C6 peptide (GenBank: AZI15804) and its variants, including C6-extN and C6-extC, were synthesized by CSBio. Peptides were dissolved in external solutions for electrophysical recordings before use.

Whole-cell patch-clamp: Proton currents passed by hHv1 were recorded in whole cell mode using an Axopatch 200B amplifier. Stimulation and data collection were done with a Digidata1322A and pCLAMP 10 software (Molecular Devices). Cells were perfused with an external solution comprised of 100 mM HEPES, 100 mM NaCl, 10 mM glucose at pH 7.5. Pipettes with resistances between 3-5 MΩ were filled with 100 mM Bis-Tris buffer, 100 mM NaCl, and 10 mM glucose at pH 6.5. Capacitance was subtracted online. Sampling frequency was 10 kHz with filtering at 1 kHz. C6 block and unblock, current-voltage relationships, conductance-voltage relationships and the dose response curves were determined as described in the SI Materials and Methods.

Two Electrode Voltage Clamp: *Xenopus laevis* stage VI oocytes were selected and injected with 10 ng of cRNA encoding hHv1 in the laboratory pMAX+ vector, as before (13, 46). To study the blocking effect of T-C6 (or variants), cRNAs for T-C6 (or variants) and hHv1 were mixed and co-injected into the oocytes. Recording solution was 60 mM NaCl, 1 mM MgCl$_2$, 2 mM CaCl$_2$), 120 mM HEPES, 40 mM sucrose at pH 7.2. To prevent changes in intracellular pH due to the proton efflux, oocytes were injected with 50 nL 1 M HEPES (pH=7.2), to produce approximately 100 mM HEPES in the cytosol, 30 min before recording. Currents were recorded 2 days after cRNA injection using an Oocyte clamp amplifier OC-725C (Warner Instruments) with electrodes filled with 3 M KCl and resistances of 0.3-1 MΩ.

Enzyme-linked Immunosorbent Assay: Surface expression of T-toxins were quantitated using ELISA as previously described (13). Oocytes injected with cRNAs of T-C6 variants bearing the c-Myc tag were blocked with BSA and then bound with c-Myc-Tag monoclonal antibody HRP (1 µg/mL) (Invitrogen). Oocytes were washed and then incubated with 50 µL of 1-Step Ultra TMB-ELISA solution (Thermo Fisher Scientific). The reaction was stopped by adding 50 µL of 2 M H$_2$SO$_4$. Surface ELISA signals were quantitated at 450 nm.

Toxin Depletion Assay: 1-palmitoyl-2-oleoyl-sn-glycero-3-phosphocholine (POPC) and 1-palmitoyl-2-oleoyl-sn-glycero-3-phosphoglycerol (POPG) were dried from a chloroform solution under a nitrogen stream. The dried lipids were rehydrated in a buffer comprised of 10 mM HEPES, 150 mM NaCl, 2 mM CaCl$_2$), 1 mM EDTA at pH 7.5. The resulting dispersions were extruded through 100 nm pore size polycarbonate filters (Millipore) and mixed at POPC: POPG=3:1 ratio to form large unilamellar vesicles (LUVs). Varying concentrations of POPC:POPG LUVs or POPG only LUVs were added to an aqueous C6 solution (final concentration of C6 was 50 µM in 200 L) and incubated with gentle agitation for 30 min at room temperature. LUVs were separated by high-speed centrifugation (100,000 g, 20 min). C6 toxin remaining in the aqueous phase was determined using HPLC. Depletion experiments with native cell membranes are described in the SI Materials and Methods.

Simulation Systems and Molecular Dynamics Simulations: The homology model of C6 was constructed with the MODELLER program (47) using the NMR structure of the natural inhibitor cysteine knot (ICK) spider toxin Mu-agatoxin-Aa1a as the template (PDB: 1EIT) as described in the SI Materials and Methods. The bilayers of POPC:POPG (3:1) or pure POPC lipids were built using the web service CHARMM-GUI (48). The six cysteine residues of C6 were patched to form three disulfide bonds using the psfgen plugin of VMD (49). The C6 was placed on the extracellular side of the bilayer, and then solvated with 100 mM KCl solution using VMD. The two final C6-membrane systems were minimized and equilibrated using NAMD (50), and then simulated for 1 µs on the special purpose computer Anton2 (51). The starting system of the C6-hHv1 complex was constructed using the equilibrated C6 structure and the transmembrane region (residues: G90 to I216) of the resting state dimeric hHv1 model adopted from our previous study (23) using VMD. hHv1 homology model was inserted into a bilayer of POPC:POPG (3:1) lipids, and two C6 molecules were placed on the extracellular side of hHv1 with the F28 containing loop (loop 4) facing the lipids and the potential binding interface facing the S3-S4 loop of each monomer of the channel. A stepwise target MD simulations protocol (13) was used to refine the complex with distance restraints between C6-lipids and C6-hHv1 using NAMD as described in the SI Materials and Methods. The "up" state of the hHv1 model was built by moving the S4 helix of the "down" state one helical turn outward, while leaving the S1-S3 helices unchanged as in our previous study (23). The C6$_2$ model was built using MODELLER as described in the SI Materials and Methods. The C6$_2$ model was inserted into the C6-hHv1 system to replace the two C6 monomer and then simulated as described in the SI Materials and Methods.

TABLE 1

C6 and C6$_2$ blockade of hHv1 channels: Legend: hHv1, hHv1-R205N and hHv1-R211S channels were expressed in HEK293T cells and studied by whole-cell patch clamp. The blockade parameters were assessed using a holding voltage of −60 mV and 1.5-s test pulses at test voltages as described in FIG. 1. The K$_i$ and Hill coefficients of peptides for hHv1 channels were estimated from a fit of the dose-response to Eq. 1. The k$_{on}$ and k$_{off}$ were determined from fits of the kinetics of block and unblock of hHv1 on acute application and washout of 250 nM C6 or 10 nM C6$_2$ and approximated using Eqs. 3 and 4, relationships derived for bimolecular binding reactions. Values are mean ± SEM; n = 3-6 cells for each condition.

| Peptide | Channel | Voltage | K$_i$ (nM) | Hill coefficient | k$_{on}$ (M$^{-1}$s$^{-1}$) | k$_{off}$ (s$^{-1}$) |
|---|---|---|---|---|---|---|
| C6 | hHv1 | 0 mV | 1.5 ± 0.2 | 1.22 ± 0.17 | 5 × 10$^5$ ± 1 × 10$^5$ | 0.0015 ± 0.0001 |
| C6 | hHv1 | +20 mV | 4.9 ± 0.8 | 0.69 ± 0.05 | 4 × 10$^5$ ± 1 × 10$^5$ | 0.0043 ± 0.0002 |
| C6 | hHv1 | +40 mV | 31 ± 3 | 0.48 ± 0.04 | 3 × 10$^5$ ± 0.8 × 10$^5$ | 0.022 ± 0.001 |
| C6$_2$ | hHv1 | 0 mV | 0.041 ± 0.003 | 1.07 ± 0.03 | 1 × 10$^6$ ± 0.2 × 10$^6$ | 5.7 × 10$^{-5}$ ± 0.9 × 10$^{-5}$ |
| C6$_2$ | hHv1 | +40 mV | 0.63 ± 0.05 | 1.01 ± 0.03 | 9 × 10$^5$ ± 1 × 10$^5$ | 7 × 10$^{-4}$ ± 1 × 10$^{-4}$ |
| C6 | hHv1-R205N | +40 mV | 161 ± 19 | 0.5 ± 0.1 | 3 × 10$^5$ ± 0.5 × 10$^5$ | 0.19 ± 0.03 |
| C6 | hHv1-R211S | +40 mV | 0.6 ± 0.1 | 0.4 ± 0.1 | 5 × 10$^5$ ± 1 × 10$^5$ | 0.0008 ± 0.0001 |

Figure Legends Example 4

Figure 49:
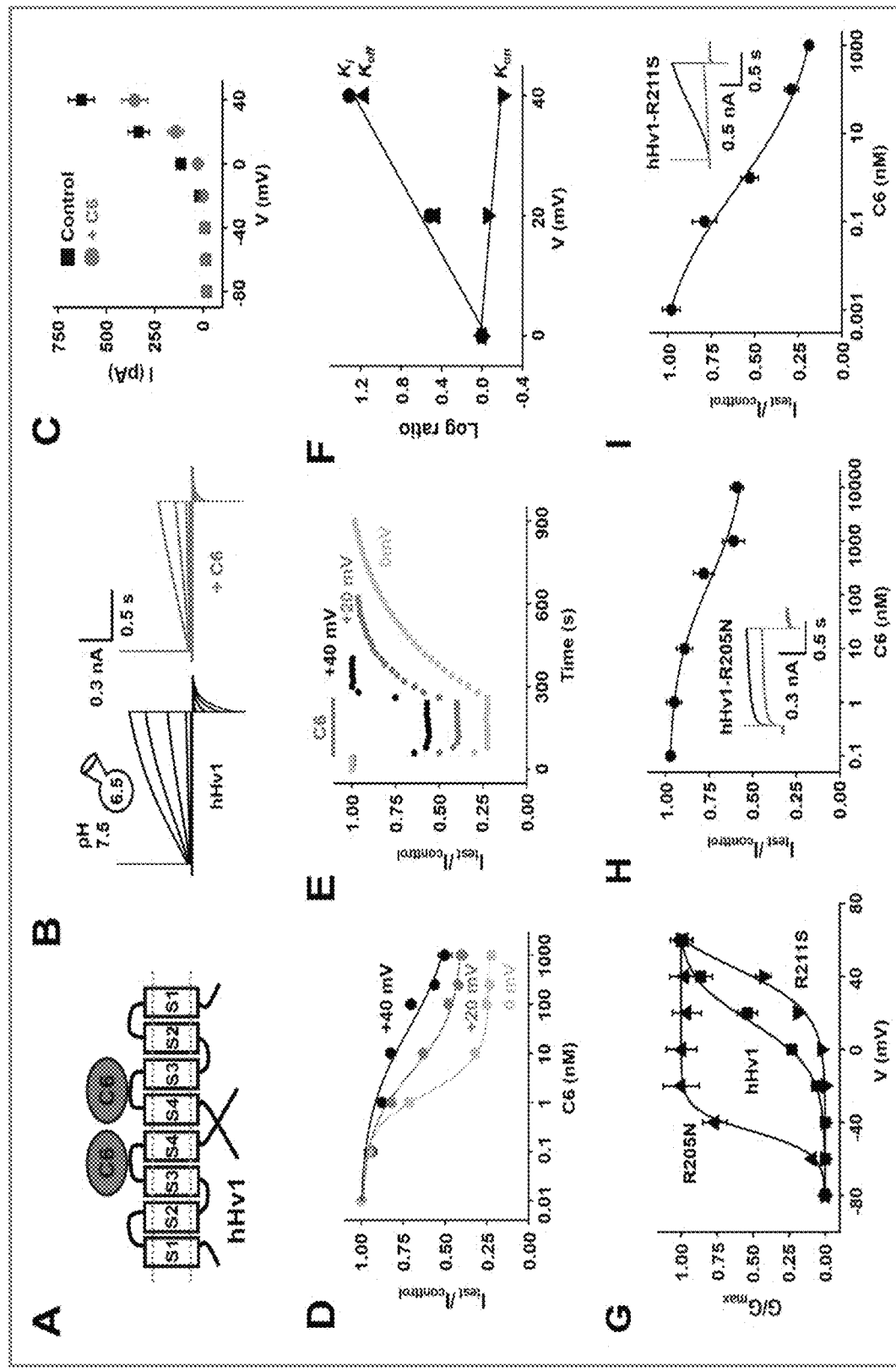

FIG. 49 (or FIG. 1, Example 4): State-dependent inhibition of C6 on hHv1 channels. hHv1, hHv1-R205N and hHv1-R211S channels were expressed in HEK293T cells and studied by whole-cell patch clamp to assess blocking parameters with a holding voltage of −60 mV, 1.5-s test pulses, and 10-s interpulse intervals, with pH$_i$=6.5 and pH$_o$=7.5. Values are mean±SEM; n=3-6 cells for each condition.

(A) Cartoon showing two C6 peptides binding on two subunits of a hHv1 channel.

(B) Representative H$^+$ current traces for hHv1 channels before (left), and in the presence of 250 nM C6 (right) with steps of 20 mV from −60 to +40 mV. The peak current at the end of the step was used to determine the extent of block.

(C) Current-voltage relationships for hHv1 in the absence (■) or presence of 250 nM C6 (●). C6 inhibition was greater at more hyperpolarized potentials with a maximal blockade of 90% at −20 mV, which decreased to 77% at 0 mV.

(D) Dose-response relationships for C6 inhibition of hHv1 studied at +40 mV (0), +20 mV (●) and 0 mV (●). The inhibition constant K$_i$ of C6 for hHv1 channels at +40 mV, +20 mV and 0 mV were estimated from the fit to Eq. 1 to be 30.9±3.4 nM (with a Hill coefficient h=0.48±0.04), 4.9±0.8 nM (h=0.69±0.05), and 1.5±0.2 nM (h=1.22±0.17), respectively (Table 1, Example 4). Some error bars are smaller than symbols.

(E) The time course for block and unblock of hHv1 on acute application (red bar) and washout of 250 nM C6 recorded at +40 mV (●), +20 mV (●) and 0 mV (●). The association rate constants (k$_{on}$) and dissociation rate constants (k$_{off}$) were approximated from the kinetics of block and unblock using Eqs. 3 and 4, relationships derived for bimolecular binding reactions, because the kinetics were well-fitted with single exponentials (Table 1).

(F) Effect of voltage on C6 blocking kinetics. The k$_{on}$ was insensitive to voltage, whereas k$_{off}$ and K$_i$ were responsive. Blocking parameters, k$_{on}$ (▲), k$_{off}$ (♦), K$_i$ (●) were normalized to its value at 0 mV. K$_i$, k$_{on}$ and k$_{off}$ were determined as described in panel D and E. Error bars are smaller than symbols.

(G) Conductance-voltage relationships (G-V) for hHv1 (m), hHv1-R205N (A) and hHv1-R211S (V). Curves are fitting to the Boltzmann equation (Materials and Methods). The V$_{1/2}$ of G-V of channels are reported in Table S1.

(H) Dose-response relationship for C6 inhibition of hHv1-R205N studied at +40 mV. Insert: representative current traces with 1 μM C6 (red) or without C6 (black).

(I) Dose-response relationship for C6 inhibition of hHv1-R211S studied at +40 mV. Insert: representative current traces with 1 μM C6 (red) or without C6 (black).

FIG. 50 (or FIG. 2, Example 4): Effects of mutations in S3-S4 loop of hHv1 on C6 affinity: hHv1 and point mutant channels were expressed in HEK293T cells and the K$_i$ for C6 was determined by whole-cell patch clamp as in FIG. 1. Because some of the point mutants show a right shift in the G-V relationship (Table S1) they pass almost no H$^+$ current at 0 mV, therefore all mutants were studied at +40 mV for comparison. The K$_i$ of 14 mutants were determined by studying the response to varying doses of C6 (8 are shown in this figure) and based on those findings the K$_i$ for the other 14 mutants were estimated using Eq. 1 and assuming the same Hill coefficient as determined for the WT channel (Table S1). Changes of free energy of C6 blockade (ΔΔG) were calculated using Eqs. 5 and 6. Values are normalized to the K$_i$ of C6 for WT hHv1. Values are mean±SEM; n=3-6 cells for each construct.

FIG. 51A-E (or FIG. 3, Example 4): T-C6 blocks hHv1 channels:

hHv1 expressed in *Xenopus* oocytes was studied by TEVC to assess T-C6 inhibition at equilibrium from a holding voltage of −60 mV with 1.5-s test pulses and a 10-s interpulse intervals, with symmetric pH$_o$ and pH$_i$=7.2 maintained by injection of 50 nL 1 M HEPES into oocytes (Materials and Methods). Values are mean±SEM; n=12 cells for each condition.

(A) T-C6 was constructed as chimeric fusion protein with an N-terminal secretory signal sequence (SP; gray), the C6 sequence (red), a hydrophilic flexible linker (6 residues), and a C-terminal GPI membrane anchor targeting sequence (orange) (FIG. S2). The colors in the schematic mark T-C6 components.

(B) Representative current traces (steps from −60 to +80 mV) for hHv1 channels without (CTL) or with 20 ng T-C6 cRNA coinjection.

(C) hHv1 currents at +80 mV (Peak) and −60 mV (Tail) with T-C6 (20 ng of cRNA) normalized to the unblocked condition (CTL).

(D) T-C6 linker variants with hydrophilic flexible linkers range from 6 to 66 residues show different extent of inhibition to hHv1. The average proton currents at +80 mV with T-C6 linker variants (20 ng of cRNA) were normalized to the unblocked condition (CTL). Phosphatidylinositol-specific phospholipase C (PI-PLC) treatment reverses blockade by T-C6 (6 residues linker).

(E) Concentration-response for T-C6 inhibition of hHv1 currents at +80 mV normalized to the unblocked condition (CTL).

Figure 52:
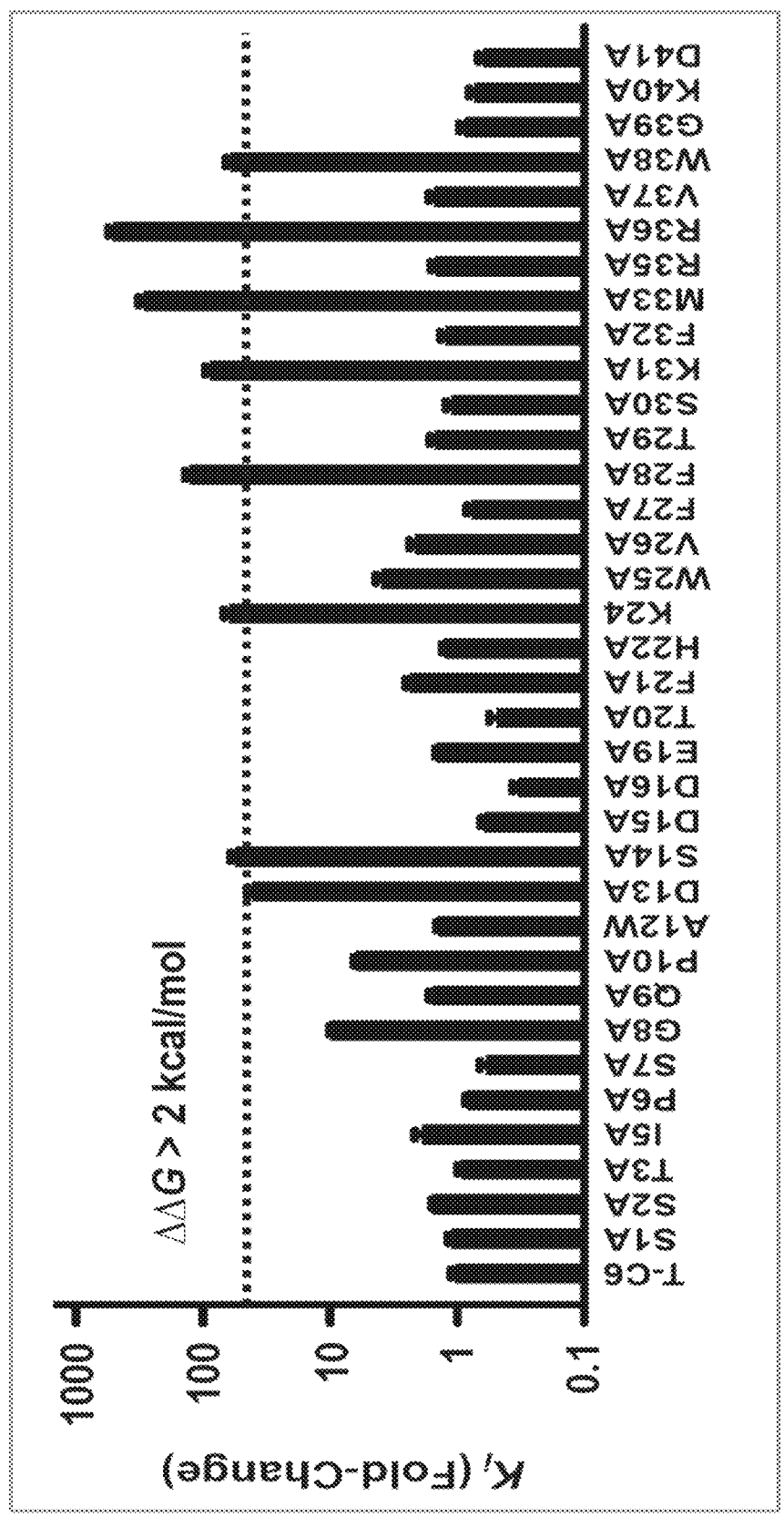

FIG. 52 (or FIG. 4, Example 4): T-C6 Screening Mutagenesis.

hHv1 was expressed in oocytes and inhibition by T-C6 and variants were studied by TEVC after coinjection of 20 ng of the cRNAs. hHv1 currents at +80 mV with T-C6 variants were measured as in FIG. 3 and normalized to the unblocked condition (CTL). A pulse voltage of +80 mV was used for variant screening to generate sufficiently large $H^+$ currents in oocytes under symmetrical conditions ($pH_o$=$pH_i$=7.2). The change in $K_i$ for the mutants was estimated relative to WT using Eq. 5 and assuming the same Hill coefficient as determined for the WT channel. The changes of free energy of C6 blockade (ΔΔG) were calculated using Eqs. 5 and 6. Values are mean SEM; n=12 cells for each variant.

FIG. 53A-D (or FIG. 5, Example 4): Partitioning of C6 into Lipid Membranes.

A depletion assay (Materials and Methods) was used to determine the partitioning of C6 into lipid membranes. Large unilamellar vesicles (LUVs) were prepared with POPC:POPG (3:1) and incubated with C6 solution. C6 peptide remaining in the aqueous phase was quantitated by HPLC (FIG. S4). The C6 structure was modeled based on the NMR structure of Mu-agatoxin-Aa1a (PDB: 1EIT) using MODELLER program, and the interaction between C6 and POPC:POPG (3:1) lipids was simulated using NAMD program as described in Materials and Methods.

(A) Ratio of bound/free C6 (red) or AgTx2 (black) plotted as a function of LUVs concentration. Values are mean±SEM; n=3 for each condition. Some error bars are smaller than symbols.

(B) Surface and ribbon representations of the homology model of C6. The heavy sidechain and Cα atoms of key residues derived from screening mutagenesis (FIG. 4) are highlighted in stick and surface representation. Three disulfide bonds (C4-C18, C11-C23, and C17-C34) that demonstrate a classic ICK scaffold are highlighted in stick representation. Basic, polar and hydrophobic residues are colored blue, green and yellow, respectively.

(C) Time series of the z coordinate of the center-of-mass of Cα atoms of the six cysteines (orange line) of C6, phosphate atoms in the upper and inner lipid leaflets (gray lines), and the heavy sidechain atoms of F28 (red line) and W38 (blue line) of C6, respectively, in the molecular dynamics (MD) simulations system with a POPC:POPG lipid bilayer.

(D) Snapshot of C6 partitioning into a POPC:POPG lipid bilayer using its hydrophobic motifs in the MD simulations. Phosphate atoms of lipids are shown in sphere representation (only part of the lipids are shown for clarity). The two hydrophobic residues of C6, F28 and W38 (yellow), inserting into the lipid bilayer are shown in stick and surface representation. Three disulfide bonds are shown in stick representation (cyan).

FIG. 54A-B (or FIG. 6, Example 4): C6-hHv1 structural model from molecular dynamics simulations: The homology model of C6 and our 'down' state dimeric hHv1 model (23) were used to build a structural model of C6-hHv1 complex using MD simulations (Materials and Methods) with knowledge of the orientation of C6 anchoring into a POPC:POPG lipid bilayer (FIG. 5), and the important toxin-channel interaction residues identified by electrophysiological mutant scans (FIG. 2 and FIG. 4, Example 4).

(A) The C6-hHv1 complex in two orientations showing two C6 molecules (orange) bind to the two subunits (cyan and blue) of an intact dimeric hHv1 channel. The transmembrane helices S1 and S4 form the dimer interface. The horizontal gray lines indicate the position of the membrane boundary.

(B) Close-up view of the interaction interface between one C6 and one hHv1 subunit in the structural model. F28, M33 and W38 (yellow side chains) of C6 form hydrophobic interactions with L200, H193 and V187 (yellow side chains) of hHv1, respectively. K31 and R36 (blue side chains) of C6 form salt bridges with E196 and E192 (red side chains) of hHv1, respectively.

FIG. 55A-I (or FIG. 7, Example 4): Mutant Cycle Analysis Validates Modeled Pairwise Interactions Between C6 and hHv1.

Peptides of C6, C6-F28A, C6-K31A, and C6-R36A were synthesized and tested on hHv1, hHv1-V187A, hHv1-E192A, hHv1-Q194A, hHv1-E196A and hHv1-L200A in HEK293T cells using whole-cell patch clamp (at +40 mV) as described in FIG. 1. Values are mean±SEM; n=3-6 cells for each condition.

(A-F) Dose-response curves for the inhibition of WT and mutant channels by C6 and variants. $K_i$ were determined by fitting the curves to the Hill equation (Eq. 1). $K_i$ of all combinations are reported in Table S3.

(G) A thermodynamic cycle for mutations C6-R36A and hHv1-E192A, showing large coupling energy. Each corner of the cycle represents the $K_i$ of an indicated toxin-channel combination pair. Q is defined in Eq. 8, and the coupling energy is calculated using Eq. 9; these are approximations using relationships derived for bimolecular binding reaction.

(H) In contrast to panel G, a cycle for C6-K31A with hHv1-E192A shows negligible coupling energy ($\ln\Omega \approx 0$), despite the large energetic effect of the C6-K31A mutation alone (FIG. 4).

(I) Coupling energy values for the indicated combinations of peptide C6 variants and hHv1 mutations. Three toxin-channel pairs, C6-F28 and hHv1-L200 (ΔΔG=1.5 kcal/mol), C6-K31 and hHv1-E196 (1.6 kcal/mol), C6-R36 and hHv1-E192 (2.7 kcal/mol), show large coupling energies.

FIG. 56 (or FIG. 8, Example 4): hHv1 Inhibition by C6$_2$.

Inhibition by T-C6$_2$ of hHv1 was studied in oocytes by TEVC, as in FIG. 3 (n=12 cells for each condition), and in HEK293T cells using whole-cell patch clamp, as in FIG. 1 (n=6 cells for each condition). Values are mean±SEM.

(A) T-C6$_2$ was constructed using T-C6 and replacing the encoding sequence for C6 with two C6 connected by flexible linkers with either 10 or 40 residues (Materials and Methods).

(B) Inhibition of hHv1 currents in oocytes by T-C6 and T-C6$_2$ linker variants (20 ng cRNA) studied at +80 mV and shown normalized to the unblocked condition (CTL).

(C) Conjugation of C6 peptides using Sortase A transpeptidase enzyme. C6 peptides with C-terminal (C6-extC) or N-terminal (C6-extN) extensions were synthesized. Sortase A cleaves between Thr and Gly in the recognition sequence at the C-terminus of C6-extC and catalyzes the formation of an amide bond with the nucleophilic polyglycine at the N-terminus of C6-extN.

(D) Representative H$^+$ current traces for hHv1 channels in HEK293T cells before (Left), and in the presence of 10 nM C6$_2$ peptide (Right) with steps of 20 mV from −60 to +40 mV. The peak current measured at the end of depolarization was used to determine the extent of block.

(E) The time course for block and unblock of hHv1 in HEK293T cells on acute application (red bar) and washout of 10 nM C6$_2$ peptide recorded at +40 mV.

(F) Dose-response relationships for C6$_2$ peptide inhibition of hHv1 in HEK293T cells at +40 mV. The inhibition constant K$_i$ of C6$_2$ for hHv1 channels was estimated from the fit to Eq. 1 to be 631±52 µM with a Hill coefficient of 1.01±0.03.

(G) The homology model of C6$_2$ and the 'down' state dimeric hHv1 model were used to build a structural model of C6$_2$-hHv1 complex using MD simulations (Materials and Methods). The C6$_2$-hHv1 complex in two orientations shows two C6 epitopes (orange) connected by a 10-residue peptide linker (LPATGGGGGG) (SEQ ID NO:14) binding simultaneously to the two hHv1 subunits (cyan and blue). The horizontal gray lines indicate the position of the membrane boundary.

Results

State Dependent Inhibition of hHv1 by C6

We previously reported the construction of an ICK scaffold phage-display library with over 1 million variants (1). The ICK scaffold is widely seen in venom toxins that bind to the VSDs of a variety of voltage-gated channels and modify the movement of the voltage sensors. Toxin variants possessing the ICK scaffold are stabilized by six cysteines that form three intramolecular disulfide bonds and are expressed on the phage surface via encoding into coat protein pIII allowing for screening. C6 was isolated by sorting the library on purified hHv1 channels. Stably bound phage were enriched by washing to remove weak and non-specific interactions, followed by elution, amplification and rebinding through five rounds of panning. The most enriched phagemids expressed C6 and were increased approximately 65,000-fold from starting abundance. Subsequent characterization using smTIRF microscopy showed that the C6 peptide binds to hHv1 expressed in HEK293T cells with a K$_d$ of 0.75 nM at −49 mV (a potential favoring the channel closed state), whereas the K$_i$ is attenuated to 31 nM at +40 mV as determined using whole-cell patch clamp to study block of current passed by the open channels (1). Arguing for positive cooperativity of C6 binding at resting membrane potential, such that binding of the first C6 on the dimeric channel facilitates binding of a second C6 on the other subunit, we found the dose-binding curve was well-fitted using the Hill equation with a coefficient of 1.5 and, further, a fit using the Monod-Wyman-Changeux relationship estimated the first C6 to bind with approximately 12-fold lower affinity than the second C6 at the two allosterically coupled sites (1).

To explore the mechanism of voltage-dependent inhibition of C6, hHv1 channels were expressed in HEK293T cells and studied by whole-cell patch clamp with a 10-fold proton gradient (pH$_i$=6.5 and pH$_o$=7.5), as before (1). Here, by assessing C6 blocking parameters, we show that C6 affinity for hHv1 decreases on membrane depolarization largely due to acceleration in the C6 dissociation rate. This is recapitulated by point mutations of "gating charge" residues in the hHv1 S4 helix that respond to voltage to mediate channel opening.

At +40 mV, 250 nM C6 decreased hHv1-mediated outward H$^+$ currents by approximately 45% (FIG. 49A). C6 inhibition was greater at less depolarized potentials, showing a fraction of blocked current of approximately 58% at +20 mV and approximately 77% at 0 mV (FIG. 49C). Fitting the dose-response curve with a Hill equation (Eq. 1) at +40 mV gave a K$_i$ for C6 of 31±3 nM with a coefficient of 0.48±0.04 for partial hHv1 blockade (FIG. 49D, Table 1, Example 4) where F$_{un}$ is the fraction of unblocked current at equilibrium, [C6] is the effective C6 concentration, and h is the Hill coefficient, as before (1).

$$F_{un} = \left(1 + \left([C6]/K_i\right)^h\right)^{-1} \quad \text{Eq. 1}$$

The dose-response for C6 block of hHv1 at +20 mV and 0 mV plotted similarly (FIG. 49D) offered K$_i$ values of 4.9±0.8 nM with a Hill coefficient of 0.69±0.05, and 1.5±0.2 nM with a Hill coefficient of 1.22±0.17, respectively (Table 1).

The K$_i$ for toxin block can also be estimated by the ratio of the first-order dissociation rate constant (k$_{off}$) and the second-order association rate constant (k$_{on}$) according to Eq. 2.

$$K_i = k_{off}/k_{on} \quad \text{Eq. 2}$$

Furthermore, k$_{on}$ and k$_{off}$ are related to the association constant ($\square_{on}$) and dissociation constant ($\square_{off}$) derived from single exponential fits of the time courses for toxin block and unblock by Eqs. 3 and 4.

$$t_{on} = (k_{on}[Tx] + k_{off})^{-1} \quad \text{Eq. 3}$$
$$t_{off} = (k_{off})^{-1} \quad \text{Eq. 4}$$

Thus, the time course of wash-in and washout of 250 nM C6 can be fitted with single exponentials, allowing approximation of the time course of inhibition, k$_{on}$=3×10$^5$±0.8×10$^5$ M$^{-1}$s$^{-1}$, and recovery, k$_{off}$=0.022±0.001 s$^{-1}$ at +40 mV (FIG. 49E) (1). Comparing the kinetics of C6 wash off at various potentials made it readily apparent that toxin dissociation was strongly dependent on voltage (FIG. 49E), showing a approximately 15-fold slower dissociation at 0 mV than +40 mV, whereas the C6 association rate was slowed only approximately 1.6-fold at +40 mV (FIG. 49F, Table 1). Of note, the positive cooperativity of C6 binding to the second subunit observed at −49 mV showed a Hill coefficient of 1.5 (1), which we demonstrate here by studying current inhibition decreases with depolarization from 1.22 at 0 mV to 0.48 at +40 mV, the last value suggestive of negative cooperativity (Table 1). Thus, the simplifying utility of Eqs. 3 to 4, derived for bimolecular binding reactions, and the use of single exponential fits, represent a practical strategy to approximate parameters of C6 binding to the two sites in hHv1 that are allosterically coupled differently at various voltages.

The S4 helix of hHv1 contains three conserved Arg residues (R205, R209, R211) which confer the channel with sensitivity to voltage (4). These conserved Arg form salt-bridges with acidic residues in the S1-S3 helices during state transitions similar to conventional voltage-gated channels and enzymes (23-26). We neutralized two Arg residues in the hHv1 S4 and observed conductance-voltage (G-V) relationship shifts consistent with the hypothesis that R205 helps maintain a closed state of hHv1, while R211 contributes to stabilizing an open state (2, 27). Thus, the hHv1-R205N mutation shifted $V_{1/2}$ by approximately −57 mV, favoring channel opening, while the hHv1-R211S mutation shifted the $V_{1/2}$ by approximately +33 mV, favoring the closed state (FIG. 49G). To investigate state-dependent inhibition by C6, its dose-dependence was studied at +40 mV, and the results fit with Eq. 1. As predicted, hHv1-R205N showed a $K_i$ for C6 blockade of 161±19 nM with a Hill coefficient of 0.5±0.1, whereas hHv1-R211 S showed a $K_i$=0.6±0.1 nM with a Hill coefficient of 0.4±0.1 (FIG. 49H-I, Table 1). Compared to WT hHv1, C6 blocking kinetics of R211S at +40 was slowed approximately 28-fold (Table 1) and it was accelerated approximately 9-fold by the R205N mutation (Table 1). This is consistent with the idea that C6 dissociates more rapidly from the open channel state, leading to higher affinity in the closed state.

Mapping the residues in the hHv1 S3-S4 loop critical for C6 binding: We showed that C6 binds to the external S3-S4 loop of hHv1 by "transplanting" the hHv1 loop region (I183 to L204) into the C6-insensitive channel CiHv1, conferring the chimeric channel with toxin sensitivity similar to that of WT hHv1 (1). To explore the role of individual S3-S4 loop residues in C6 binding, 22 loop residues (I183 to L204) were individually mutated and C6 blockade of the mutant hHv1 channels were studied at +40 mV using whole-cell patch clamp (FIG. 50). Of the 22 mutant channels, hHv1-V187C, hHv1-E192C, hHv1-H193C, hHv1-E196C and hHv1-L200C showed changes in the ΔΔG of C6 blockade of more than 2 kcal/mol ($K_{i\ mutation}/K_{i\ WT}$>43-fold, FIG. 50), according to Eqs. 5 and 6, where R is the gas constant and T is the temperature in degrees Kelvin.

$$K_{i\,mutation}/K_{iWT} = \left[(1-F_{unWT})F_{un\,mutation}/(1-F_{un\,mutation})F_{unWT}\right]^{1/h} \quad \text{Eq. 5}$$

$$\Delta\Delta G = RT\ln\left(K_{i\,mutation}/K_{iWT}\right) \quad \text{Eq. 6}$$

By consensus, a value of 2 kcal/mol is used as the cutoff for ΔΔG to identify residues most likely to be engaged in statistically relevant energetic interactions at protein-protein interaction interfaces (28, 29). Thus, the observed large free energy changes in C6 binding suggest that these five channel residues may mediate direct interaction with C6. We also found three mutations (hHv1-D185C, hHv1-G199C and hHv1-L203C) that enhanced C6 inhibition more than 4-fold (FIG. 50). Among them, hHv1-G199C is noteworthy for its approximately 16-fold improvement in the C6 $K_i$ (1.9±0.2 nM) compared to WT hHv1 with no change in the G-V relationship.

Identification of critical toxin residues using T-C6 variants: The in vitro synthesis and folding of venom toxin peptides can be technically challenging, costly, and time consuming. To facilitate characterization of C6 by mutational screening, we employed a strategy whereby C6, or its variants, were expressed from a gene in tethered form on the extracellular surface of cells via a glycosyl phosphatidyl inositol (GPI)-anchored membrane-embedded leash, as we have before with other toxins (13). The construct included a signal peptide sequence, C6 or its variants, and a flexible linker followed by a GPI targeting sequence (FIG. 51A and Materials and Methods). This permitted study of the inhibition of hHv1 by T-C6 and variants in *Xenopus* oocytes using two-electrode voltage clamp (TEVC) (13, 30). Complementary RNA (cRNA) for T-C6 was synthesized in vitro and co-injected with cRNA encoding hHv1 into oocytes. The result was T-C6 expressed on the extracellular leaflet of the oocyte membrane via the GPI anchor after natural cleavage of the signal peptide as well as hHv1 channels (FIG. 51A-B). When hHv1 currents were measured three days after injecting 10 ng channel cRNA and 20 ng T-C6 cRNA, blockade was approximately 65% of the outward $H^+$ current at +80 mV and approximately 92% of the tail current at −60 mV (FIG. 51B-C); this was the equivalent of adding 30 μM C6 peptide to the bath solution. The impact of the length of linker between C6 and the GPI anchor was evaluated using constructs with 6, 26, 46 and 66 intervening residues. All constructs blocked hHv1 effectively, with the 6-residue linker offering the greatest inhibition (FIG. 51D), and this was used subsequently for scanning mutagenesis. Demonstrating the reversibility of T-C6 inhibition, treatment with phosphatidylinositol-specific phospholipase C (PI-PLC) that cleaves GPI-anchored proteins from the oocyte surface, restored outward currents to control levels (FIG. 51D). When T-C6 cRNA was injected in amounts from 1 ng to 20 ng, outward $H^+$ current inhibition increased from 8% to 65% (FIG. 51E).

C6 has 41 residues with three disulfide bonds that maintain the ICK toxin scaffold. To identify the C6 residues that might mediate direct interaction with the S3-S4 loop of hHv1 (or membrane lipids around the channels), we generated T-C6 point mutations at the 35 positions that were not Cys (FIG. 52). Injection of 20 ng WT T-C6 cRNA inhibited 65% of hHv1 outward current at +80 mV, and seven of the T-C6 variants inhibited less than 23%, corresponding to a change in ΔΔG of more than 2 kcal/mol, according to Eqs. 5 and 6 (FIG. 52). The most dramatic effect on inhibition was seen with T-C6-R36A, which decreased the $K_i$ approximately 500-fold. Other mutations with high impact were S14A, K24A, F28A, K31A, M33A, and W38A (FIG. 52).

To confirm that the effects of mutations were not due to changes in surface expression, we constructed the same mutations in T-C6 with 46-residue linker (T-C646), which carries a c-Myc epitope, allowing comparison of the surface levels of T-C646 and variants by ELISA, as we have described (13). Injection of 20 ng T-$C6_{46}$ cRNA inhibited 39% of hHv1 outward current (FIG. 51D), the seven critical mutations of T-$C6_{46}$ produced changes in $K_i$ like the same mutations in T-C6 and none showed a significant change in surface expression by ELISA, ruling out altered expression as the cause for lowered blockade.

Figure 53:
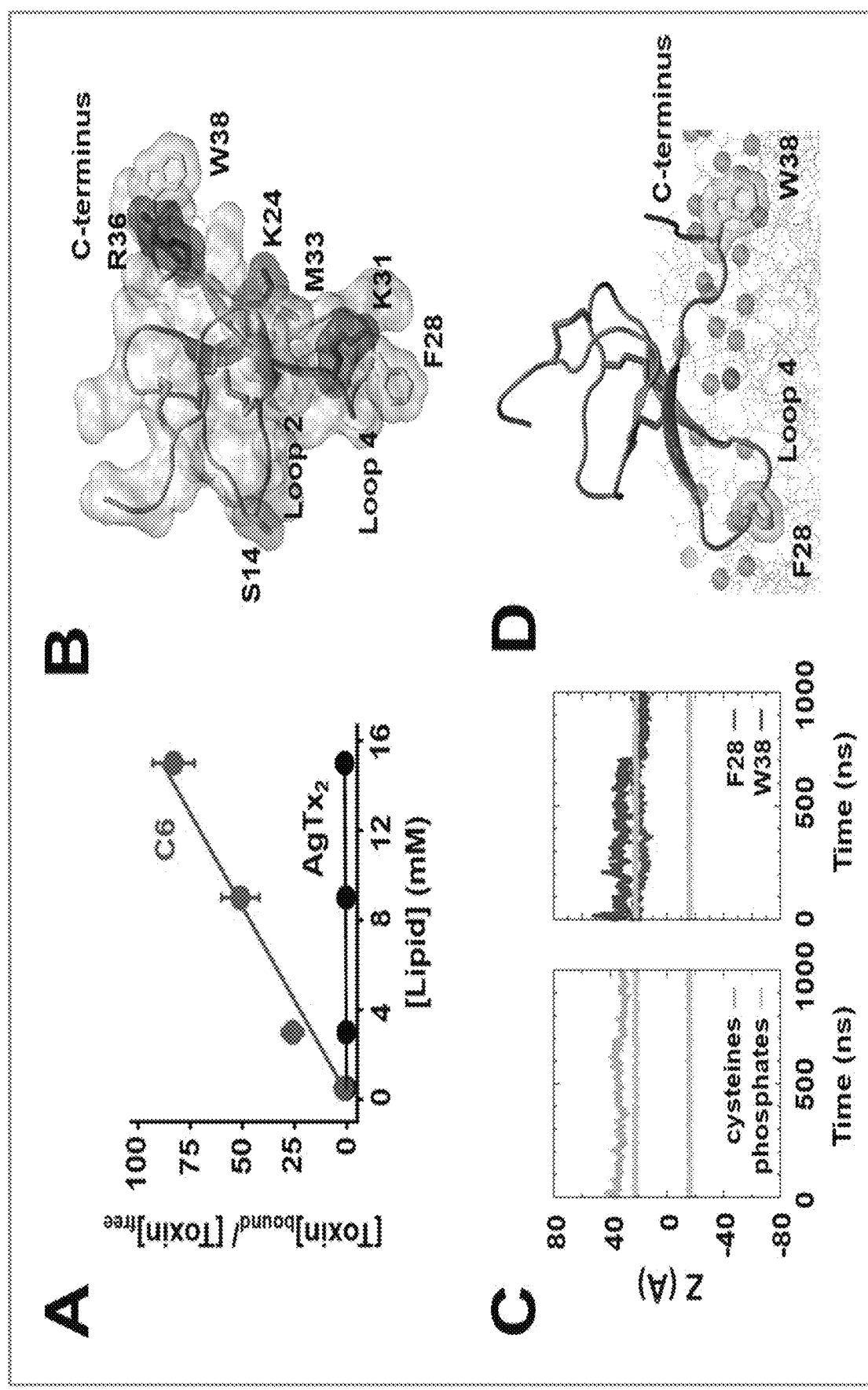

C6 partitioning into cell membranes: ICK toxins like HaTx and ProTx2 from spiders inhibit voltage-gated channels by first partitioning into the plasma membrane followed by direct interaction with VSDs (31, 32). We studied the partitioning of C6 into large unilamellar vesicles (LUVs) composed of a 3:1 mixture of zwitterionic 1-palmitoyl-2-oleoyl-sn-glycero-3-phosphocholine (POPC) and anionic 1-palmitoyl-2-oleoyl-sn-glycero-3-phosphoglycerol (POPG) phospholipids using a toxin depletion assay (33). Varying amounts of LUVs were incubated with C6 in solution, and liposome-bound C6 was separated by ultracentrifugation. C6 remaining in the aqueous phase was quantified using reverse-phase, high-performance liquid chromatography (HPLC). Roughly 50% of C6 peptide partitioned into 0.5 mM LUVs (FIG. 53A). This increased to 99% when the LUVs concentration was raised to 15 mM (FIG. 53A). As a control, AgTx2, a scorpion toxin that binds in the external pore region of $K^+$ channels (34), did not partition into LUVs (FIG. 53A). The mole fraction partition coefficient ($K_p$) of C6 estimated from the titration data was $3.2 \times 10^5 \pm 0.4 \times 10^5$ using Eq. 7, where the fraction of C6 partitioned into the membrane ($F_p$) is equal to ($[C6_{total}]-[C6_{free}])/[C6_{total}]$, [L] is the LUVs concentration and [W] is the molar concentration of water (55.3 mol/L).

$$K_p = [F_p/(1-F_p)][W]/[L] \qquad \text{Eq. 7}$$

The $K_p$ of C6 is comparable to that reported for HaTx ($5.3 \times 10^5$) (31), suggesting C6, like other natural ICK toxins, interacts with membrane lipids (31, 32). To confirm that C6 partitions into native membranes, we examined the ability of intact *Xenopus* oocytes and HEK293T cells to deplete C6 from physiological solutions (Materials and Methods). When cells are agitated gently in a solution containing C6, we observed depletion of 34% and 67% of C6 from the aqueous phase by oocytes and HEK293T cells, respectively. In contrast, others have shown that less than 1% of AgTx2 toxin peptide was depleted by the same number of oocytes (31).

A homology model of C6 and its interaction with lipids: Mu-agatoxin-Aa1a is a spider ICK toxin that activates insect voltage-gated $Na^+$ channels (35) and shows 40% identity to the C6 peptide sequence. The NMR structure of Mu-agatoxin-Aa1a (PDB: 1EIT) was chosen as a template to generate a C6 homology model (Materials and Methods). Our C6 model employs a standard ICK scaffold with four solvent accessible loops protruding from a disulfide-bonded globular core (FIG. 53B). C6 has two hydrophobic patches on its surface, W25-F28 in loop 4 and V37-W38 at C-terminus (FIG. 53B). These six solvent-exposed hydrophobic residues form two prime motifs for membrane partitioning. Five positively charged basic residues (K24, K31, R35, R36, and K40) were arranged around the edge of the hydrophobic motifs, while four out of the five negatively charged acidic residues (D13, D15, D16, E19, but not D41) clustered on the other side of the structure. We mapped the mutagenesis results onto the C6 homology modeling structure to show the position of the C6 residues critical for blocking hHv1 (FIG. 53B).

One face of C6 stands out as containing six out of the seven critical residues (K24, F28, K31, M33, R36, and W38) where mutations to Ala increased $K_i$ values >43-fold ($\Delta\Delta G > 2$ kcal/mol, FIG. 52). These residues are arrayed in a half concentric ring that we anticipate forms intimate interactions with the VSD in hHv1 (FIG. 53B). In contrast, residue S14 in loop 2 located on the opposite side of C6 most likely contributes to toxin conformation stability (36) or lipid interaction (16).

To investigate the interaction of C6 and lipids, we constructed an all-atom system of C6 and a fully hydrated lipid bilayer of POPC:POPG (3:1) as used in the toxin depletion assay (FIG. 53A), with the C6 placed initially in the extracellular solution (Materials and Methods). During 1 μs MD simulations, C6 spontaneously partitioned into POPC:POPG lipids with the bulky sidechain of F28 initially, and W38 later, anchoring deep into the hydrophobic core of the lipid bilayer (FIG. 53C-D). In contrast, C6 was not able to partition into a bilayer of pure POPC lipids in our MD simulations. Consistent with the simulation, the $K_p$ of C6 for binding to POPC liposomes was 3,000-fold less than with POPC:POPG (3:1) ($1.1\times10^2\pm0.1\times10^2$). Thus, C6 partitions into membranes containing anionic lipids like other natural VSD toxin modifiers (31, 37). Analysis of the simulation trajectories showed that electrostatic interactions between C6 basic residues and anionic lipids facilitated the dwell time of the toxin on the membrane surface. This is promoted by the formation of extensive salt bridges between the basic residue sidechains and the phosphate and ester oxygen atoms of lipids, leading to the insertion of bulky hydrophobic residues into the hydrophobic core of lipids (FIG. 53C-D).

A proposed model of C6 binding to the hHv1 closed state: Based on our knowledge of the orientation of C6 partitioning into lipids (FIG. 53D), and the toxin and channel residues identified as critical for binding by patch-clamp (FIG. 52), a structural model of the C6-hHv1 complex was constructed and refined using MD simulations (FIG. 50). As the starting structures for the complex modeling, the transmembrane regions (residues G90 to 1218) of the homology model of dimeric hHv1 in its electron paramagnetic resonance (EPR)-validated closed state (Materials and Methods) (23), and the homology model of C6 (FIG. 53B) were used. Two C6 molecules were placed in the extracellular solution with the loop 4 region facing the membrane and the S3-S4 loop of each subunit of the channel. Stepwise distance restraints were applied between C6 and lipids, and C6 and hHv1, to move C6 toward hHv1 (Materials and Methods). The final C6-hHv1 complex model (FIG. 54A) displays specific interactions consistent with the experimental observations from scanning mutagenesis of the channel and C6. In particular, the model exhibits electrostatic interaction between hHv1-E192 and C6-R36, hHv1-E196 and C6-K31; and hydrophobic interactions between hHv1-V187 and C6-W38, hHv1-H193 and C6-M33, and hHv1-L200 and C6-F28 (FIG. 54B).

Validation of the model by point mutations: Two charge reversal experiments inspired by our MD simulations further support the model of the C6-hHv1 complex by meeting the expectations for salt-bridges between hHv1-E192 and C6-R36, and between hHv1-E196 and C6-K31. When the side chain hHv1-E192 was reversed in charge by mutation to Lys (producing hHv1-E192K), inhibition by T-C6 was reduced approximately 52-fold. When the predicted C6 charge partner, R36, was reversed to Glu (producing T-C6-R36E), toxin inhibition of hHv1-E192K was restored. As a control, two other point mutations, T-C6-K24E and T-C6-K31E were studied with hHv1-E192K channels and they did not restore inhibition. Similarly, T-C6 inhibition was reduced by approximately 12-fold with hHv1-E196K channels, block was restored by the counter mutation T-C6-K31E, but the control changes T-C6-K24E and T-C6-R36E did not restore inhibition. These 'side chain swaps' validate the model position of hHv1-E192 and hHv1-E196 near C6-R36 and C6-K31, respectively.

Pairwise interactions confirmed by mutation cycle analysis: We used thermodynamic mutant cycle analysis to verify pairwise interactions suggested by the C6-hHv1 complex model, an approach brought to the fore by mapping the binding site of scorpion toxins in the pore of the K⁺ channels (38). The interaction between residues on the channel and toxin are identified by making channel mutations (Mut) and toxin variants (Var) and measuring the $K_i$ for different combinations of modified and unmodified pairs. The coupling energy $\Delta\Delta G$ between Mut and Var can be calculated from the measured $K_i$ according to Eqs. 8 and 9. The size of the $\Delta\Delta G$ quantifies the strength of interaction between the Mut and Var.

$$\Omega = (K_{i\ WT\ C6,\ WT\ hHv1} \times K_{i\ C6\ variant,\ hHv1\ mutation}) / (K_{i\ WT\ C6,\ hHv1\ mutation} \times K_{i\ C6\ variant,\ WT\ hHv1}) \quad \text{Eq. 8}$$

$$\Delta\Delta G = RT \ln\Omega \quad \text{Eq. 9}$$

Figure 54:
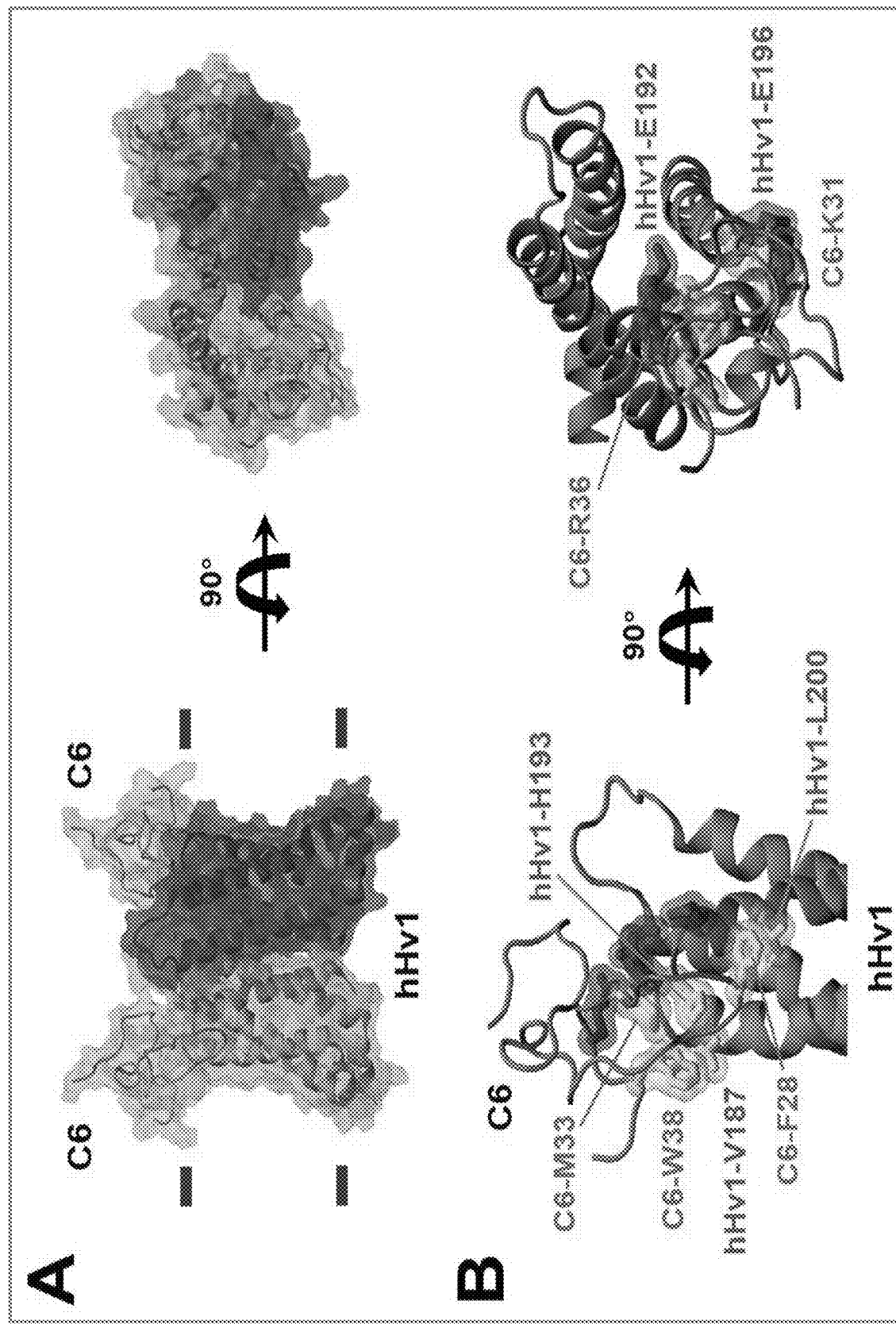
Figure 55:
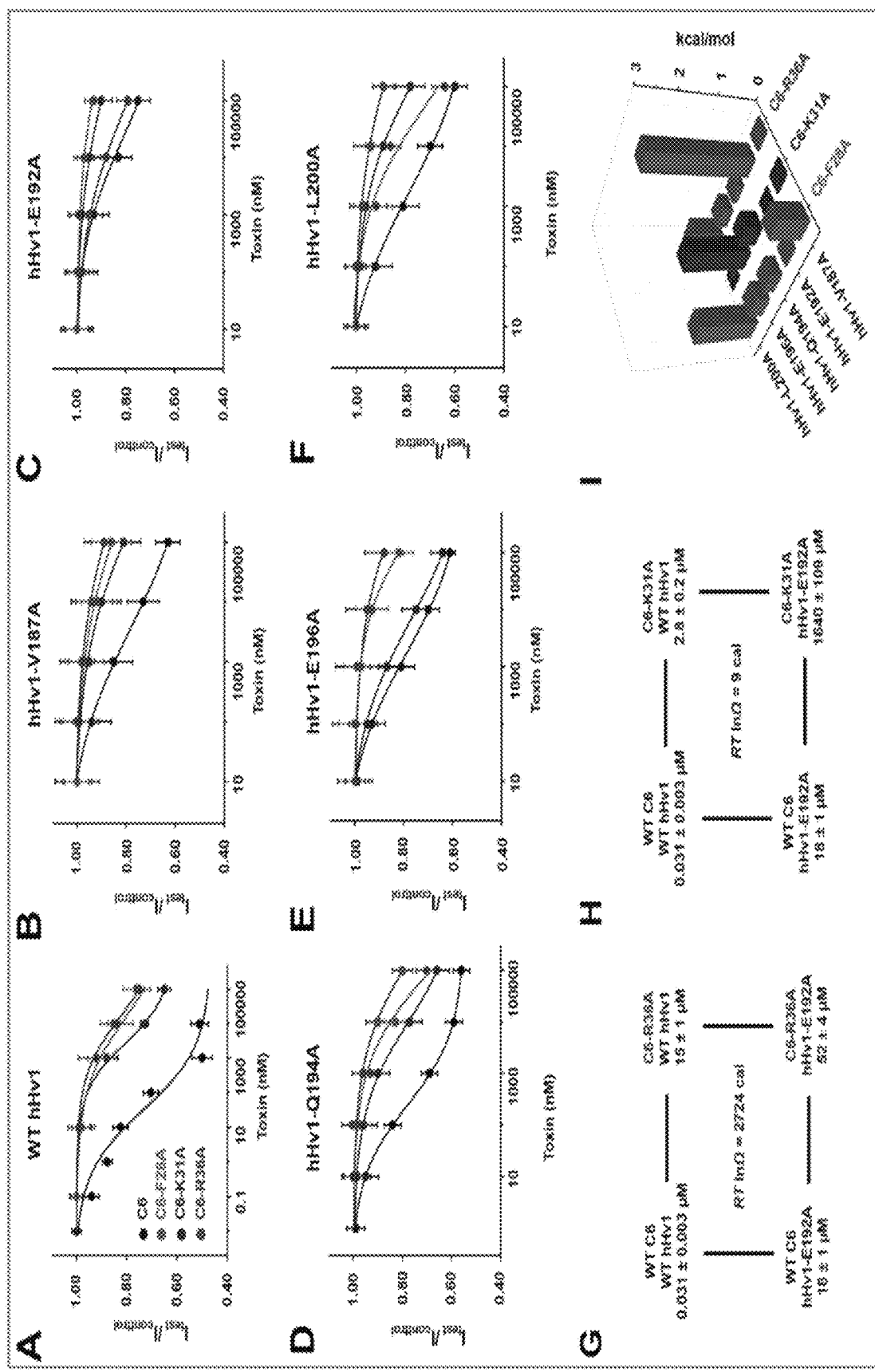

We synthesized peptides for three C6 variants, C6-F28, C6-K31A and C6-R36A for the mutant cycle analysis. On the channel, we investigated mutations of five residues, hHv1-V187A, hHv1-E192A, hHv1-Q194A, hHv1-E196A and hHv1-L200A in the S3-S4 loop (FIG. 7). We tested C6 and the three toxin variants on the WT hHv1 and the five channel mutants and determined the dose-response for inhibition of the 24 channel-toxin combinations by whole-cell patch clamp with test steps to +40 mV (FIG. 55A-F). The $K_i$ estimated by fitting the dose-response curves to Eq. 1 were used to calculate the $\Delta\Delta G$ of coupling for each combination. FIG. 55G and FIG. 55H show two examples of individual mutant cycle analyses. In FIG. 55G, C6-R36A is paired to hHv1-E192A, and the combination produces a $\Delta\Delta G$ approximately 2.7 kcal/mol. In FIG. 55H, C6-K31A is paired with hHv1-E192A, and the combination produces a $\Delta\Delta G$ approximately 0.01 kcal/mol. These results support an interaction between hHv1-E192 and C6-R36 but not C6-K31. All values of the $\Delta\Delta G$ are shown in FIG. 55I, where three combinations, hHv1-E192 and C6-R36, hHv1-E196 and C6-K31, hHv1-L200 and C6-F28 show $\Delta\Delta G$ coupling values >1 kcal/mol, suggesting these are direct interaction pairs, consistent with the C6-hHv1 model (FIG. 54B).

A designed bivalent C6 inhibits hHv1 fully at depolarized voltages: In the C6-hHv1 model, the two VSDs are stabilized by two C6 peptides (FIG. 55A). The distance between the C-terminus of one C6 and the N-terminus of the other C6 is approximately 30 Å. This inspired the design of a bivalent toxin containing two C6 molecules (C6₂) that we anticipated would bind to the two hHv1 subunits simultaneously, slowing toxin dissociation, as observed for natural bivalent toxins (16, 39). To examine the idea, we first created two tethered bivalent C6 constructs with either a 10 or 40 residue flexible linker connecting two C6 sequences, T-C6$_{2(10)}$ and T-C6$_{(40)}$, respectively (FIG. 56A-B, Materials and Methods). Co-injection of 20 ng cRNA of T-C6$_{2(10)}$ inhibited approximately 95% of the outward H⁺ current at +80 mV, far superior to block by the monomer T-C6 (approximately 65% inhibition) (FIG. 56B). In contrast, T-C6$_{2(40)}$ inhibited like WT T-C6, approximately 64% of the current.

Bivalent toxin peptides are difficult to synthesize and fold in vitro due to their long and disulfide-rich sequences. Sortase A is a bacterial thiol transpeptidase that can ligate peptides with a C-terminal recognition sequence (LPXTG) (SEQ ID NO:15) to peptides containing an N-terminal polyglycine sequence. Because the reaction conditions do not require a reduced environment, and show outstanding efficiency, Sortase A has been used to link toxin peptides (40). Here, we synthesized two C6 peptides, C6-extC and C6-extN, with 6 additional residues (LPATGG (SEQ ID NO:16) or GGGGGG (SEQ ID NO:17)) at C-terminus or N-terminus, respectively, and ligated the two peptides using Sortase A to create a bivalent C6 peptide with a 10-residue connecting linker, LPATGGGGGG (SEQ ID NO:18) (FIG. 56C, Materials and Methods). C6₂ produced by the ligation reaction was purified using HPLC and studied on hHv1 channels expressed in HEK293T cells using whole-cell patch clamp. Application of 10 nM C6₂ decreased outward H⁺ currents through hHv1 approximately 96% at +40 mV (FIG. 56D). Acute application and washout of 10 nM C6₂ gave $k_{on} = 9 \times 10^5 \pm 1 \times 10^5$ M⁻¹s⁻¹, and $k_{off} = 0.0007\ 0.0001$ s⁻¹ at +40 mV (FIG. 56E), an on-rate approximately 2.6-fold faster and an off-rate approximately 31-fold slower than monomeric C6. Fitting the dose-response of C6₂ with hHv1 at +40 mV to Eq. 1 gave a $K_i$ of 631±52 µM with a Hill coefficient of 1.01±0.03 (FIG. 56F, Table 1). Supporting the specificity of C6₂ for hHv1, CiHv1 was insensitive to 1 µM C6₂ despite its homology to hHv1. Similarly, 1 µM C6₂ did not inhibit the human voltage-gated potassium and sodium channels hKv1.3 and hNav1.5, that are also naturally expressed in human neutrophils. The dose-response curve of C6₂ at 0 mV showed a $K_i$ of 41±3 µM with a Hill coefficient of 1.07±0.03 (Table 1).

A homology model of C6₂ and the 'down' state hHv1 was used to build a structural model of C6₂-hHv1 complex using MD simulations (Materials and Methods). The C6₂-hHv1 complex in two orientations showing two C6 molecules (orange) are connected by the linker of 10 residues and therefore both hHv1 subunits (cyan and blue) can bind a C6 epitope simultaneously (FIG. 56G).

Discussion

State-Dependent Binding of C6

The role hHv1 plays in acid extrusion and membrane potential compensation place the channel in the midst of important human physiological processes and classify it as a promising pharmacological target (3). Here, we study inhibition of hHv1 by the specific designer toxin C6, which we created to delineate the roles of the hHv1 in sperm and neutrophils, in order to better understand the structural-mechanistic basis for C6 action and thereby its potential as a drug lead. Because C6 targets the hHv1 VSDs, binding is voltage-dependent, and inhibition is only partial at both 0 mV and +40 mV with affinities of $K_i$=1.5 nM and 31 nM, respectively (FIG. 49D, Table 1). To characterize the molecular basis for voltage-dependent blockade we used mutational scans to identify the residues on C6 and the channel that mediate binding, built a model for the C6-hHv1 complex in the closed state, validated the model by confirming predicted pairwise contacts on the interaction surface, and designed C6₂ based on the model, a variant that fully suppresses the channel at depolarized potentials with pM affinity.

As observed for natural gating modifier toxins (11, 12), we demonstrate that depolarization induces a change from the closed channel conformation that binds C6 with high affinity to states that accelerate C6 dissociation, approximately 15-fold faster at test pulses to +40 mV compared to 0 mV (Table 1). In-keeping with this observation, a mutation in the S4 that favors the closed state (hHv1-R211S) slows C6 dissociation approximately 28-fold compared to WT channels, whereas a mutation that favors the open state (hHv1-R211S) accelerates C6 dissociation approximately 9-fold. Whereas C6 shows high affinity for the closed channel and positive cooperativity in binding, as the voltage becomes more depolarized, toxin association is slower, dissociation is faster, and negative cooperativity is observed, with a concomitant decrease in the extent of maximal blockade; thus, 250 nM C6 inhibits 90% of the current at −20 mV and 77% at 0 mV, due a decrease in the on-rate of 1.2-fold and an increase in the off-rate of 2-fold, across this small change in potential (FIG. 49C). We produced a model of the C6-hHv1 complex by MD simulations based on studies of residues interaction identified in the channel S3-S4 loop (FIG. 50) and on C6 in its tethered form (FIG. 52), that latter a strategy we have applied to identify important residues in other toxin-channel complexes (13). Toxin depletion experiments and MD simulations (FIG. 53) revealed the importance of membrane lipids in C6 binding to hHv1. The model of the C6-hHv1 complex allows rationalization of state-dependent C6 affinity changes using MD simulations and comparison to the mechanism of action of natural ICK toxins.

Inhibition by C6 Compared to Natural ICK Toxins

The mechanism of C6 blockade appears to have at least one similarity and two differences with natural ICK toxins that act on voltage-gated $K^+$ and $Na^+$ channels and TRPV1 (16, 32, 41). Like ICK spider toxins VSTx1 and HaTx (31, 37), C6 partitions into membranes by interaction with anionic lipids. Our MD simulations predict that basic residues in C6 form hydrogen bonds with lipid phosphate, ester oxygen atoms, and hydroxyl oxygen atoms in the head groups of anionic lipids. The electrostatic interactions of C6 basic residues and the anionic lipids stabilize adhesion of C6 onto the surface of the membrane, enabling formation of extensive hydrogen bond interactions of C6 residues and lipid polar head groups, and insertion of bulky C6 hydrophobic side chains into the hydrophobic core of the membrane lipids (FIG. 53D). These interactions restrain the orientation of C6 in the membrane and its binding interface with hHv1 channel.

The first apparent difference in the binding mechanism of C6 and natural ICK toxins is seen in the loop regions the toxins use for membrane partitioning. Here we compare C6 with findings for DkTx and ProTx2 visualized in complexes with TRPV1 and Nav1.7 channels, respectively, in a membrane-like environment using cryoelectron microscopy (16, 32). Whereas C6 uses two hydrophobic motifs locating in loop 4 (W25-F28) and C-terminus (V37-W38) for membrane partition (FIG. 53D), DkTx activates TRPV1 by inserting both loop 4, where it carries F27, and loop 2, where it carries the bulky hydrophobic residue W11 (corresponding to C6-D13). When ProTx2 blocks Nav1.7, hydrophobic residues in loop 1, loop 4, and the C-terminus anchor the toxin via four Trp residues (W5, W7, W24 and W30) in a double-stranded antiparallel β-sheet that runs parallel to the membrane (32). These differences in membrane partitioning result in different lipid insertion orientations and channel binding orientations for the two native toxins and C6.

A second difference is that C6 binds to residues in the S3-S4 loop of hHv1 that project out toward the lipid membrane (FIG. 54), while the natural ICK toxins ProTx2 and HwTx-IV in complex with Nav1.7 insert positively charged residues into the extracellular crevice formed by the transmembrane segments of the channel VSD (32, 41). Thus, two basic residues in ProTx2 form salt bridges with negatively charged residues in the extracellular crevice of Nav1.7 VSD2 via the cleft between S2 and S3 and antagonize the movement of the gating charge residues in the S4 to impede channel activation (32). Similarly, HwTx-IV inhibits Nav1.7 by inserting three basic residues into the extracellular crevice of VSD2 to form salt bridges with negatively charged residues in the S1-S3 to stabilize a closed channel state (32, 41). A structural comparison shows that the S3 helix of hHv1 is one helical turn longer than the VSD2 in Nav1.7 blocking the cleft between S2 and S3, suggesting toxins like ProTx2 are unable to reach the extracellular crevice of the hHv1 VSDs (32). In contrast, our C6-hHv1 model shows hydrophobic interactions between C6-F28 and hHv1-L200 and C6-W38 and hHv1-V187 are within the lipid membrane (FIG. 54B) while other C6 residues (K31, M33 and R36) interact with the extracellular S3-S4 loop of hHv1, so that C6 associates with the closed state of hHv1 on the lipid facing surface of the channel formed by S3, S4 and the S3-S4 loop.

Three pairs of toxin-channel interaction suggested by the model were validated by mutant cycle analysis and these serve to rationalize the voltage-dependent blocking mechanism. In the model, the S4 helices of hHv1 are in the "down" position, placing V187 and L200 adjacent to W38 and F28 in C6, respectively. The distance between E192 and E196 in S3-S4 loop (16 Å) matches the distance between K31 and R36 in C6 (15 Å), enabling a favorable electrostatic interaction (FIG. 54B). We hypothesize that C6 is destabilized on its closed state binding site by depolarization because upward movement of S4 by one helical turn to the active conformation is predicted to cause a steric clash that breaks interactions like the salt-bridge between C6-K31 and hHv1-E196. Our functional data show that mutations of residues G199 and I202 change the binding affinity of C6 significantly in opposite directions: G199C enhances inhibition by C6 and I202C reduces inhibition (FIG. 50). In contrast to the five critical channel residues that we conclude make direct contact with C6 (FIG. 54B), G199 and I202 are away from the proposed hHv1-C6 binding interface in both our model and the ALPHAFOLD™ model (Alphabet/Google DeepMind). In a recent study of the ICK spider toxin ProTx2 (32), Xu et al. propose that a phenylalanine in the S3 of domain II in the human sodium channel Nav1.7 underlies its sensitivity to the toxin compared to other Nav channel subtypes that bear glycine in the position, a residue that has lower helical propensity, thereby destabilizing the DII-S3 helix. The G199C mutation of hHv1 may play a similar role by increasing the helical propensity of the extracellular end of S4 to influence C6 binding to hHv1. In addition, G199 and I202 are in contact with L117 and I121 on S1 of the other channel subunit in our dimeric hHv1 homology model where mutations might perturb the stability of the dimer to impact cooperative binding of C6.

Bivalent C6 is an advanced blocker for suppressing hHv1: We designed C6 to block hHv1 because previously reported blockers, including $Zn^{2+}$ ions (42), HaTx (a spider toxin that blocks numerous $K^+$ and $Ca^{2+}$ channels) (9), and guanidinium derivatives that block from the inside of the membrane (10) are promiscuous and of low affinity, limiting their potential use in delineating the roles of hHv1 in physiology or as therapeutics. The case for hHv1 as a drug target is strong. While hHv1 is required to sustain the ROS production by neutrophils that is essential for clearance of bacterial infections by innate immune cells, excessive ROS production induces tissue damage, thrombosis and red blood cell dysfunction, contributing, for example, to the severity of COVID-19 (43). Further, in the central nervous system, ROS production by microglia was lower in an Hv1 knockout mouse than in wildtype, and this decreased the damage of ischemic stroke (19), and in a spinal cord injury mouse model the knockout prevented secondary damage after spinal cord injury (44). In addition, Hv1 is upregulated in some B-cell malignancies and breast cancers, and this is correlated with an increased metastatic potential (20, 45).

Figure 56:
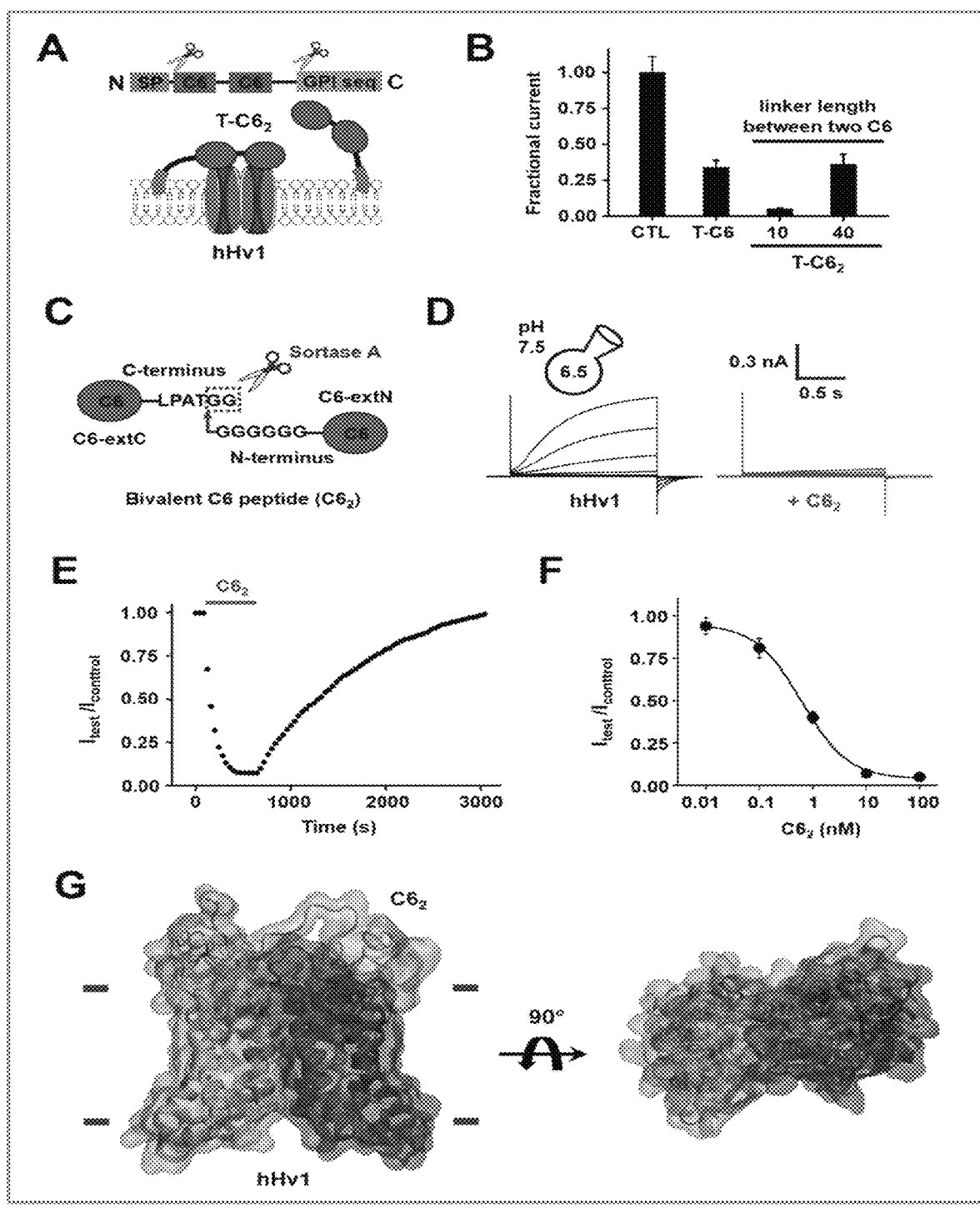

The ability of C6 to suppress sperm capacitation and sustained release of inflammatory mediators, including ROS, from neutrophils (1), is likely due to high affinity toxin binding to closed channels, the state favored at the resting membrane potential of the cells ($K_d$ of 0.75 nM at −49 mV). While C6 stabilization of the closed state, and partial open channel blockade, might be sufficient for some therapeutic applications, we sought a more potent bivalent blocker that would bind to both hHv1 subunits simultaneously and used our C6-hHv1 model as a guide to design $C6_2$ (FIG. 56). $C6_2$ is notable, first, because it can fully inhibit hHv1 at depolarized voltages (FIG. 56D). Second, the affinity of $C6_2$ is approximately 50-fold better than C6 at +40 mV (FIG. 49D, FIG. 56E). Considering as an example the significant membrane depolarization of human neutrophils during the respiratory burst (17), both attributes of $C6_2$ can be expected to enhance its efficacy as a suppressant of hHv1-mediated, neutrophil-associated inflammatory pathophysiology.

References Example 1

1. Roos, A. & Boron, W. F. Intracellular pH. *Physiol Rev* 61, 296-434 (1981).
2. Ramsey, I. S., et al. A voltage-gated proton-selective channel lacking the pore domain. *Nature* 440, 1213-1216 (2006).
3. Sasaki, M., Takagi, M. & Okamura, Y. A voltage sensor-domain protein is a voltage-gated proton channel. *Science* 312, 589-592 (2006).
4. DeCoursey, T. E. Voltage-gated proton channels: molecular biology, physiology, and pathophysiology of the H(V) family. *Physiol Rev* 93, 599-652 (2013).
5. Zhao, R. et al. Role of human Hv1 channels in sperm capacitation and white blood cell respiratory burst established by a designed peptide inhibitor. *Proceedings of the National Academy of Sciences of the United States of America* 115, E11847-E11856 (2018).
6. Kirichok, Y., et al. Whole-cell patch-clamp measurements of spermatozoa reveal an alkaline-activated Ca2+ channel. *Nature* 439, 737-740 (2006).
7. Lishko, P. V., et al. Acid extrusion from human spermatozoa is mediated by flagellar voltage-gated proton channel. *Cell* 140, 327-337 (2010).
8. Morgan, D. et al. Voltage-gated proton channels maintain pH in human neutrophils during phagocytosis. *Proc Natl Acad Sci USA* 106, 18022-18027 (2009).
9. Ramsey, I. S., et al. Hv1 proton channels are required for high-level NADPH oxidase-dependent superoxide production during the phagocyte respiratory burst. *Proc Natl Acad Sci USA* 106, 7642-7647 (2009).
10. El Chemaly, A. et al. VSOP/Hv1 proton channels sustain calcium entry, neutrophil migration, and superoxide production by limiting cell depolarization and acidification. *J Exp Med* 207, 129-139 (2010).
11. Musset, B. et al. Aspartate 112 is the selectivity filter of the human voltage-gated proton channel. *Nature* 480, 273-277 (2011).
12. Tombola, F., Ulbrich, M. H. & Isacoff, E. Y. The voltage-gated proton channel Hv1 has two pores, each controlled by one voltage sensor. *Neuron* 58, 546-556 (2008).
13. Takeshita, K. et al. X-ray crystal structure of voltage-gated proton channel. *Nat Struct Mol Biol* 21, 352-357 (2014).
14. Ballmer, P. E. Causes and mechanisms of hypoalbuminaemia. *Clin Nutr* 20, 271-273 (2001).
15. Quinlan, G. J., Martin, G. S. & Evans, T. W. Albumin: biochemical properties and therapeutic potential. *Hepatology* 41, 1211-1219 (2005).
16. Sugio, S., Kashima, A., Mochizuki, S., Noda, M. & Kobayashi, K. Crystal structure of human serum albumin at 2.5 Å resolution. *Protein engineering* 12, 439-446 (1999).
17. Elzanaty, S., Erenpreiss, J. & Becker, C. Seminal plasma albumin: origin and relation to the male reproductive parameters. *Andrologia* 39, 60-65 (2007).
18. Casslen, B. & Nilsson, B. Human uterine fluid, examined in undiluted samples for osmolarity and the concentrations of inorganic ions, albumin, glucose, and urea. *Am J Obstet Gynecol* 150, 877-881 (1984).
19. Laverge, H., De Sutter, P., Desmet, R., Van der Elst, J. & Dhont, M. Prospective randomized study comparing human serum albumin with fetal cord serum as protein supplement in culture medium for in-vitro fertilization. *Hum Reprod* 12, 2263-2266 (1997).
20. Balaban, B., Sakkas, D. & Gardner, D. K. Laboratory procedures for human in vitro fertilization. *Semin Reprod Med* 32, 272-282 (2014).
21. Rabaglia, J. L., Gonzalez, R., Moore, E. E. & Harken, A. H. Pooled human albumin primes neutrophils. *J Card Surg* 17, 209-213 (2002).
22. Dias, I. H. et al. Activation of the neutrophil respiratory burst by plasma from periodontitis patients is mediated by pro-inflammatory cytokines. *J Clin Periodontol* 38, 1-7 (2011).
23. Seredenina, T., Demaurex, N. & Krause, K. H. Voltage-Gated Proton Channels as Novel Drug Targets: From NADPH Oxidase Regulation to Sperm Biology. *Antioxid Redox Signal* 23, 490-513 (2015).
24. Fernandez, A., Pupo, A., Mena-Ulecia, K. & Gonzalez, C. Pharmacological Modulation of Proton Channel Hv1 in Cancer Therapy: Future Perspectives. *Mol Pharmacol* 90, 385-402 (2016).
25. Austin, C. R. The capacitation of the mammalian sperm. *Nature* 170, 326 (1952).
26. Lishko, P. V. & Kirichok, Y. The role of Hv1 and CatSper channels in sperm activation. *J Physiol* 588, 4667-4672 (2010).
27. Puga Molina, L. C. et al. Molecular Basis of Human Sperm Capacitation. *Front Cell Dev Biol* 6, 72 (2018).
28. Chavez, J. C. et al. Acrosomal alkalization triggers Ca(2+) release and acrosome reaction in mammalian spermatozoa. *J Cell Physiol* 233, 4735-4747 (2018).
29. Lishko, P. V., Botchkina, I. L. & Kirichok, Y. Progesterone activates the principal Ca2+ channel of human sperm. *Nature* 471, 387-391 (2011).
30. Darszon, A., Nishigaki, T., Beltran, C. & Trevino, C. L. Calcium channels in the development, maturation, and function of spermatozoa. *Physiol Rev* 91, 1305-1355 (2011).
31. Xia, J. & Ren, D. The BSA-induced Ca2+ influx during sperm capacitation is CATSPER channel-dependent. *Reprod Biol Endocrinol* 7, 119 (2009).
32. Winterbourn, C. C., Kettle, A. J. & Hampton, M. B. Reactive Oxygen Species and Neutrophil Function. *Annu Rev Biochem* 85, 765-792 (2016).
33. DeCoursey, T. E., Morgan, D. & Cherny, V. V. The voltage dependence of NADPH oxidase reveals why phagocytes need proton channels. *Nature* 422, 531-534 (2003).

34. DeCoursey, T. E. During the respiratory burst, do phagocytes need proton channels or potassium channels, or both? *Sci STKE* 2004, pe21 (2004).
35. Bedouhene, S., Moulti-Mati, F., Hurtado-Nedelec, M., Dang, P. M. & El-Benna, J. Luminol-amplified chemiluminescence detects mainly superoxide anion produced by human neutrophils. *Am J Blood Res* 7, 41-48 (2017).
36. Wittmann, S., Frohlich, D. & Daniels, S. Characterization of the human fMLP receptor in neutrophils and in *Xenopus* oocytes. *Br J Pharmacol* 135, 1375-1382 (2002).
37. Worthen, G. S., Avdi, N., Buhl, A. M., Suzuki, N. & Johnson, G. L. FMLP activates Ras and Raf in human neutrophils. Potential role in activation of MAP kinase. *J Clin Invest* 94, 815-823 (1994).
38. Amulic, B., Cazalet, C., Hayes, G. L., Metzler, K. D. & Zychlinsky, A. Neutrophil function: from mechanisms to disease. *Annu Rev Immunol* 30, 459-489 (2012).
39. Hondares, E. et al. Enhanced activation of an aminoterminally truncated isoform of the voltage-gated proton channel HVCN1 enriched in malignant B cells. *Proc Natl Acad Sci USA* 111, 18078-18083 (2014).
40. Berger, T. K. et al. Post-translational cleavage of Hv1 in human sperm tunes pH- and voltage-dependent gating. *J Physiol* 595, 1533-1546 (2017).
41. Kleijkers, S. H. et al. Influence of embryo culture medium (G5 and HTF) on pregnancy and perinatal outcome after IVF: a multicenter RCT. *Hum Reprod* 31, 2219-2230 (2016).
42. Chavez, J. C., Darszon, A., Trevino, C. L. & Nishigaki, T. Quantitative Intracellular pH Determinations in Single Live Mammalian Spermatozoa Using the Ratiometric Dye SNARF-5F. *Front Cell Dev Biol* 7, 366 (2019).
43. Li, Q. et al. Resting state of the human proton channel dimer in a lipid bilayer. *Proceedings of the National Academy of Sciences of the United States of America* 112, E5926-5935 (2015).
44. Auer, S. et al. Silencing neurotransmission with membrane-tethered toxins. *Nat Methods* 7, 229-236 (2010).
45. Plant, L. D., Xiong, D., Romero, J., Dai, H. & Goldstein, S. A. N. Hypoxia Produces Pro-arrhythmic Late Sodium Current in Cardiac Myocytes by SUMOylation of NaV1.5 Channels. *Cell Rep* 30, 2225-2236 e2224 (2020).
46. Zhao, R., Dai, H., Mendelman, N., Chill, J. H. & Goldstein, S. A. N. Tethered peptide neurotoxins display two blocking mechanisms in the K(+) channel pore as do their untethered analogs. *Sci Adv* 6, eaaz3439 (2020).
47. Andersen, J. T. et al. Structure-based mutagenesis reveals the albumin-binding site of the neonatal Fc receptor. *Nat Commun* 3, 610 (2012).
48. Zhou, P., Jin, B., Li, H. & Huang, S. Y. HPEPDOCK: a web server for blind peptide-protein docking based on a hierarchical algorithm. *Nucleic Acids Res* 46, W443-W450 (2018).
49. Phillips, J. C. et al. Scalable molecular dynamics with NAMD. *J Comput Chem* 26, 1781-1802 (2005).
50. Shaw, D. E. et al. in Proceedings of the International Conference for High Performance Computing, *Networking, Storage and Analysis* 41-53 (IEEE Press, New Orleans, Louisana; 2014).
51. Sanchez-Carranza, O., Torres-Rodriguez, P., Darszon, A., Trevino, C. L. & Lopez-Gonzalez, I. Pharmacology of hSlo3 channels and their contribution in the capacitation-associated hyperpolarization of human sperm. *Biochem Biophys Res Commun* 466, 554-559 (2015).
52. Macdonald, R. R. & Lumley, I. B. Endocervical pH measured in vivo through the normal menstrual cycle. *Obstet Gynecol* 35, 202-206 (1970).
53. Nishigaki, T. et al. Intracellular pH in sperm physiology. *Biochem Biophys Res Commun* 450, 1149-1158 (2014).
54. Jin, S. K. & Yang, W. X. Factors and pathways involved in capacitation: how are they regulated? *Oncotarget* 8, 3600-3627 (2017).
55. Ferrier, J. M. Apparent Bicarbonate Uptake and Possible Plasmalemma Proton Efflux in Chara corallina. *Plant Physiol* 66, 1198-1199 (1980).
56. Demarco, I. A. et al. Involvement of a Na+/HCO-3 cotransporter in mouse sperm capacitation. *J Biol Chem* 278, 7001-7009 (2003).
57. Lishko, P. V. et al. The control of male fertility by spermatozoan ion channels. *Annu Rev Physiol* 74, 453-475 (2012).
58. Decoursey, T. E. Voltage-gated proton channels and other proton transfer pathways. *Physiol Rev* 83, 475-579 (2003).
59. Demaurex, N. et al. Proton currents in human granulocytes: regulation by membrane potential and intracellular pH. *J Physiol* 466, 329-344 (1993).
60. Matthay, M. A. et al. Acute respiratory distress syndrome. *Nat Rev Dis Primers* 5, 18 (2019).
61. Kokot, K., Teschner, M., Schaefer, R. M. & Heidland, A. Stimulation and inhibition of elastase release from human neutrophil-dependence on the calcium messenger system. *Miner Electrolyte Metab* 13, 189-195 (1987).
62. Cestele, S. et al. Voltage sensor-trapping: enhanced activation of sodium channels by beta-scorpion toxin bound to the S3-S4 loop in domain II. *Neuron* 21, 919-931 (1998).
63. Geragotelis, A. D. et al. Voltage-dependent structural models of the human Hv1 proton channel from long-timescale molecular dynamics simulations. *Proceedings of the National Academy of Sciences of the United States of America* 117, 13490-13498 (2020).
64. Wu, L. J. et al. The voltage-gated proton channel Hv1 enhances brain damage from ischemic stroke. *Nat Neurosci* 15, 565-573 (2012).
65. Jin, C. et al. HV1 acts as a sodium sensor and promotes superoxide production in medullary thick ascending limb of Dahl salt-sensitive rats. *Hypertension* 64, 541-550 (2014).
66. Hines, K. E. Inferring subunit stoichiometry from single molecule photobleaching. *J Gen Physiol* 141, 737-746 (2013).
67. Banh, R. et al. Hydrophobic gasket mutation produces gating pore currents in closed human voltage-gated proton channels. *Proc Natl Acad Sci USA* 116, 18951-18961 (2019).
68. Musset, B. & Decoursey, T. Biophysical properties of the voltage gated proton channel H(V)1. *Wiley interdisciplinary reviews. Membrane transport and signaling* 1, 605-620 (2012).
69. Humphrey, W., Dalke, A. & Schulten, K. VMD: visual molecular dynamics. *J Mol Graph* 14, 33-38, 27-38 (1996).
70. Fiorin, G., Klein, M. L. & Henin, J. Using collective variables to drive molecular dynamics simulations. *Molecular Physics* 111, 3345-3362 (2013).

71. Klauda, J. B. et al. Update of the CHARMM all-atom additive force field for lipids: validation on six lipid types. *J Phys Chem B* 114, 7830-7843 (2010).
72. Martyna, G. J., Tobias, D. J. & Klein, M. L. Constant pressure molecular dynamics algorithms. *The Journal of Chemical Physics* 101, 4177-4189 (1994).
73. Essmann, U. et al. A smooth particle mesh Ewald method. *The Journal of Chemical Physics* 103, 8577-8593 (1995).

References Example 4

1. R. Zhao et al., Role of human Hv1 channels in sperm capacitation and white blood cell respiratory burst established by a designed peptide inhibitor. *Proc Natl Acad Sci USA* 115, E11847-E11856 (2018).
2. T. E. DeCoursey, Voltage-gated proton channels: molecular biology, physiology, and pathophysiology of the H(V) family. *Physiol Rev* 93, 599-652 (2013).
3. T. Seredenina, N. Demaurex, K. H. Krause, Voltage-Gated Proton Channels as Novel Drug Targets: From NADPH Oxidase Regulation to Sperm Biology. *Antioxid Redox Signal* 23, 490-513 (2015).
4. I. S. Ramsey, M. M. Moran, J. A. Chong, D. E. Clapham, A voltage-gated proton-selective channel lacking the pore domain. *Nature* 440, 1213-1216 (2006).
5. M. Sasaki, M. Takagi, Y. Okamura, A voltage sensor-domain protein is a voltage-gated proton channel. *Science* 312, 589-592 (2006).
6. B. Musset et al., Aspartate 112 is the selectivity filter of the human voltage-gated proton channel. *Nature* 480, 273-277 (2011).
7. R. Zhao et al., Direct activation of the proton channel by albumin leads to human sperm capacitation and sustained release of inflammatory mediators by neutrophils. *Nat Commun* 12, 3855 (2021).
8. V. V. Cherny, T. E. DeCoursey, pH-dependent inhibition of voltage-gated H(+) currents in rat alveolar epithelial cells by Zn(2+) and other divalent cations. *J Gen Physiol* 114, 819-838 (1999).
9. A. A. Alabi, M. I. Bahamonde, H. J. Jung, J. I. Kim, K. J. Swartz, Portability of paddle motif function and pharmacology in voltage sensors. *Nature* 450, 370-375 (2007).
10. L. Hong, M. M. Pathak, I. H. Kim, D. Ta, F. Tombola, Voltage-sensing domain of voltage-gated proton channel Hv1 shares mechanism of block with pore domains. *Neuron* 77, 274-287 (2013).
11. L. R. Phillips et al., Voltage-sensor activation with a tarantula toxin as cargo. *Nature* 436, 857-860 (2005).
12. J. Wang et al., Mapping the receptor site for alpha-scorpion toxins on a Na+ channel voltage sensor. *Proc Natl Acad Sci USA* 108, 15426-15431 (2011).
13. R. Zhao, H. Dai, N. Mendelman, J. H. Chill, S. A. N. Goldstein, Tethered peptide neurotoxins display two blocking mechanisms in the K(+) channel pore as do their untethered analogs. *Sci Adv* 6, eaaz3439 (2020).
14. C. J. Bohlen et al., A bivalent tarantula toxin activates the capsaicin receptor, TRPV1, by targeting the outer pore domain. *Cell* 141, 834-845 (2010).
15. I. R. Chassagnon et al., Potent neuroprotection after stroke afforded by a double-knot spider-venom peptide that inhibits acid-sensing ion channel 1a. *Proc Natl Acad Sci USA* 114, 3750-3755 (2017).
16. Y. Gao, E. Cao, D. Julius, Y. Cheng, TRPV1 structures in nanodiscs reveal mechanisms of ligand and lipid action. *Nature* 534, 347-351 (2016).
17. T. E. DeCoursey, During the respiratory burst, do phagocytes need proton channels or potassium channels, or both? *Sci STKE* 2004, pe21 (2004).
18. M. A. Matthay et al., Acute respiratory distress syndrome. *Nat Rev Dis Primers* 5, 18 (2019).
19. L. J. Wu et al., The voltage-gated proton channel Hv1 enhances brain damage from ischemic stroke. *Nat Neurosci* 15, 565-573 (2012).
20. Y. Wang et al., Specific expression of the human voltage-gated proton channel Hv1 in highly metastatic breast cancer cells, promotes tumor progression and metastasis. *Biochem Biophys Res Commun* 412, 353-359 (2011).
21. J. Peng et al., The voltage-gated proton channel Hv1 promotes microglia-astrocyte communication and neuropathic pain after peripheral nerve injury. *Mol Brain* 14, 99 (2021).
22. Q. Zhang et al., Inhibiting Hv1 channel in peripheral sensory neurons attenuates chronic inflammatory pain and opioid side effects. *Cell Res* 10.1038/s41422-022-00616-y (2022).
23. Q. Li et al., Resting state of the human proton channel dimer in a lipid bilayer. *Proc Natl Acad Sci USA* 112, E5926-5935 (2015).
24. V. Yarov-Yarovoy et al., Structural basis for gating charge movement in the voltage sensor of a sodium channel. *Proc Natl Acad Sci USA* 109, E93-102 (2012).
25. S. B. Long, E. B. Campbell, R. Mackinnon, Voltage sensor of Kv1.2: structural basis of electromechanical coupling. *Science* 309, 903-908 (2005).
26. Q. Li et al., Structural mechanism of voltage-dependent gating in an isolated voltage-sensing domain. *Nat Struct Mol Biol* 21, 244-252 (2014).
27. A. D. Geragotelis et al., Voltage-dependent structural models of the human Hv1 proton channel from long-timescale molecular dynamics simulations. *Proc Natl Acad Sci USA* 117, 13490-13498 (2020).
28. R. Ranganathan, J. H. Lewis, R. MacKinnon, Spatial localization of the K+ channel selectivity filter by mutant cycle-based structure analysis. *Neuron* 16, 131-139 (1996).
29. S. Lise, C. Archambeau, M. Pontil, D. T. Jones, Prediction of hot spot residues at protein-protein interfaces by combining machine learning and energy-based methods. *BMC Bioinformatics* 10, 365 (2009).
30. R. Zhao, S. A. N. Goldstein, "Tethered peptide toxins for ion channels" in *Methods in Enzymology*. (Academic Press, 2021), https://doi.org/10.1016/bs.mie.2021.03.002.
31. M. Milescu et al., Tarantula toxins interact with voltage sensors within lipid membranes. *J Gen Physiol* 130, 497-511 (2007).
32. H. Xu et al., Structural Basis of Nav1.7 Inhibition by a Gating-Modifier Spider Toxin. *Cell* 176, 702-715 e714 (2019).
33. S. Y. Lee, R. MacKinnon, A membrane-access mechanism of ion channel inhibition by voltage sensor toxins from spider venom. *Nature* 430, 232-235 (2004).
34. A. Gross, R. MacKinnon, Agitoxin footprinting the shaker potassium channel pore. *Neuron* 16, 399-406 (1996).
35. D. O. Omecinsky, K. E. Holub, M. E. Adams, M. D. Reily, Three-dimensional structure analysis of mu-agatoxins: further evidence for common motifs among 36. B. Dang et al., Inversion of the Side-Chain Stereochemistry of Indvidual Thr or Ile Residues in a Protein Molecule: Impact on the Folding, Stability, and Structure of the ShK Toxin. *Angew Chem Int Ed Engl* 56, 3324-3328 (2017).
37. H. J. Jung et al., Solution structure and lipid membrane partitioning of VSTx1, an inhibitor of the KvAP potassium channel. *Biochemistry* 44, 6015-6023 (2005).
38. P. Hidalgo, R. MacKinnon, Revealing the architecture of a K+ channel pore through mutant cycles with a peptide inhibitor. *Science* 268, 307-310 (1995).
39. C. Bae et al., Structural insights into the mechanism of activation of the TRPV1 channel by a membrane-bound tarantula toxin. *Elife* 5 (2016).
40. A. J. Agwa, L. V. Blomster, D. J. Craik, G. F. King, C. I. Schroeder, Efficient Enzymatic Ligation of Inhibitor Cystine Knot Spider Venom Peptides: Using Sortase A To Form Double-Knottins That Probe Voltage-Gated Sodium Channel NaV1.7. *Bioconjug Chem* 29, 3309-3319 (2018).
41. G. Wisedchaisri et al., Structural Basis for High-Affinity Trapping of the NaV1.7 Channel in Its Resting State by Tarantula Toxin. *Mol Cell* 81, 38-48 e34 (2021).
42. B. Musset et al., Zinc inhibition of monomeric and dimeric proton channels suggests cooperative gating. *J Physiol* 588, 1435-1449 (2010).
43. M. Laforge et al., Tissue damage from neutrophil-induced oxidative stress in COVID-19. *Nat Rev Immunol* 20, 515-516 (2020).
44. M. Murugan et al., The voltage-gated proton channel Hv1 contributes to neuronal injury and motor deficits in a mouse model of spinal cord injury. *Mol Brain* 13, 143 (2020).
45. M. Capasso et al., HVCN1 modulates BCR signal strength via regulation of BCR-dependent generation of reactive oxygen species. *Nat Immunol* 11, 265-272 (2010).
46. R. Zhao et al., Designer and natural peptide toxin blockers of the KcsA potassium channel identified by phage display. *Proc Natl Acad Sci USA* 112, E7013-7021 (2015).
47. A. Sali, T. L. Blundell, Comparative protein modelling by satisfaction of spatial restraints. *J Mol Biol* 234, 779-815 (1993).
48. S. Jo, T. Kim, V. G. Iyer, W. Im, CHARMM-GUI: a web-based graphical user interface for CHARMM. *J Comput Chem* 29, 1859-1865 (2008).
49. W. Humphrey, A. Dalke, K. Schulten, VMD: visual molecular dynamics. *J Mol Graph* 14, 33-38, 27-38 (1996).
50. J. C. Phillips et al., Scalable molecular dynamics with NAMD. *J Comput Chem* 26, 1781-1802 (2005).
51. D. E. Shaw et al. (2014) *Anton* 2: raising the bar for performance and programmability in a special-purpose molecular dynamics supercomputer. in *Proceedings of the International Conference for High Performance Computing, Networking, Storage and Analysis* (IEEE Press, New Orleans, Louisiana), pp 41-53.

A number of embodiments of the invention have been described. Nevertheless, it can be understood that various modifications may be made without departing from the spirit and scope of the invention. Accordingly, other embodiments are within the scope of the following claims.

What is claimed is:

1. A synthetic peptide for inhibiting activity of a voltage-gated proton channel polypeptide (Hv1), wherein the synthetic peptide comprises:
    (a) an amino acid sequence QXHQFEXXXX (SEQ ID NO:1);
    (b) an amino acid sequence QAHQFEAXXX (SEQ ID NO:2);
    (c) an amino acid sequence QAHQFEALLL (SEQ ID NO:3), or
    (d) a homodimer or a heterodimer comprising a peptide of (a), (b), or (c),
    wherein X is any hydrophobic amino acid, and optionally the hydrophobic amino acid is glycine (G), alanine (A), valine (V), leucine (L), isoleucine (I) or phenylalanine (F).

2. A recombinant nucleic acid encoding a synthetic peptide of claim 1.

3. An expression vehicle comprising or having contained therein a recombinant nucleic acid of claim 2, wherein optionally the expression vehicle comprises or is an expression cassette, a plasmid, an expression vector or a recombinant virus.

4. A cell comprising or having contained therein a synthetic peptide of claim 1.

5. A pharmaceutical composition comprising: a synthetic peptide of claim 1.

6. The pharmaceutical composition of claim 4, formulated as a liposome, a dendrimer or a nanoparticle; or formulated as an aerosol, a lyophilate or a powder.

7. A method for:
    reducing intracellular alkalization, initiating capacitation, acrosomal reaction, and oocyte fertilization capabilities of human sperm,
    reducing the ability of neutrophils, or polymorphonuclear leukocytes (PMNs), to release reactive oxygen species (ROS),
    ameliorating neutrophil (PMN) contribution to an inflammatory response, or
    treating or ameliorating a neutrophil (PMN)-meditated inflammatory-related pathology, comprising:
    administering to an individual in need thereof:
    a synthetic peptide as set forth in claim 1, a recombinant nucleic acid encoding the synthetic peptide, an expression vehicle having contained therein the nucleic acid, a cell having contained therein the nucleic acid, or a pharmaceutical composition having contained therein or comprising the nucleic acid or synthetic peptide.

8. The method of claim 7, wherein the neutrophil (PMN)-meditated inflammatory-related pathology is acute respiratory distress syndrome (ARDS),
    and optionally ARDS caused by a viral, bacterial or fungal infection; a sepsis; pancreatitis; trauma or injury; pneumonia; or, aspiration into the lungs.

9. The method of claim 7, wherein the synthetic peptide, or the recombinant nucleic acid encoding the synthetic peptide, or the cell, or the pharmaceutical composition, is formulated and/or administered as a liposome, a dendrimer or a nanoparticle; or formulated or administered as an aerosol, a lyophilate or a powder.

10. A kit comprising a synthetic peptide of claim 1, a recombinant nucleic acid encoding the synthetic peptide, an expression vehicle having contained therein the nucleic acid, a cell having contained therein the nucleic acid, or a pharmaceutical composition having contained therein or comprising the nucleic acid or synthetic peptide.

11. The method of claim 7, wherein the neutrophil (PMN)-meditated inflammatory-related pathology is caused by a
    viral infection, and optionally the viral infection is an influenza or a coronavirus infection, and optionally the coronavirus infection is a COVID-19 infection.

12. The method of claim 7, wherein the synthetic peptide is formulated and/or administered as a liposome, a dendrimer or a nanoparticle; or formulated or administered as an aerosol, a lyophilate or a powder.

* * * * *